(12) United States Patent
Breed

(10) Patent No.: US 7,744,122 B2
(45) Date of Patent: Jun. 29, 2010

(54) DRIVER SIDE ASPIRATED AIRBAGS

(75) Inventor: David S. Breed, Boonton Township, NJ (US)

(73) Assignee: Automotive Technologies International, Inc., Denville, NJ (US)

( * ) Notice: Subject to any disclaimer, the term of this patent is extended or adjusted under 35 U.S.C. 154(b) by 0 days.

(21) Appl. No.: 11/929,133

(22) Filed: Oct. 30, 2007

(65) Prior Publication Data
US 2008/0277911 A1 Nov. 13, 2008

Related U.S. Application Data

(60) Division of application No. 11/131,623, filed on May 18, 2005, now Pat. No. 7,481,453, which is a continuation-in-part of application No. 10/974,919, filed on Oct. 27, 2004, now Pat. No. 7,040,653.

(51) Int. Cl.
*B60R 21/203* (2006.01)
*B60R 21/30* (2006.01)

(52) U.S. Cl. .......... 280/731; 280/728.2; 280/738

(58) Field of Classification Search .......... 280/728.2, 280/731, 738, 741, 742
See application file for complete search history.

(56) References Cited

U.S. PATENT DOCUMENTS

| 3,414,292 | A |   | 12/1968 | Oldberg et al. |
| 3,680,884 | A | * | 8/1972 | Stephenson ............... 280/731 |
| 3,744,817 | A | * | 7/1973 | Ousset ..................... 280/730.1 |
| 3,762,741 | A |   | 10/1973 | Fleck et al. |
| 3,843,150 | A |   | 10/1974 | Harada et al. |
| 3,843,152 | A | * | 10/1974 | Nonaka ..................... 280/731 |
| 3,863,948 | A | * | 2/1975 | Vancil ...................... 280/731 |
| 3,909,037 | A |   | 9/1975 | Stewart |
| 3,929,350 | A |   | 12/1975 | Peck |
| 3,994,506 | A |   | 11/1976 | Weman |
| 4,076,277 | A |   | 2/1978 | Kuwakado et al. |
| 4,771,650 | A | * | 9/1988 | Kerner .................... 280/731 |
| 4,877,264 | A |   | 10/1989 | Cuevas |
| 5,066,038 | A | * | 11/1991 | Frantom et al. ............ 280/737 |
| 5,129,674 | A | * | 7/1992 | Levosinski ................ 280/738 |
| 5,152,358 | A | * | 10/1992 | Kozuka ..................... 180/78 |
| 5,207,450 | A |   | 5/1993 | Pack, Jr. et al. |
| 5,277,442 | A | * | 1/1994 | Cuevas ..................... 280/731 |

(Continued)

FOREIGN PATENT DOCUMENTS

EP 0663325 A1 7/1995

(Continued)

*Primary Examiner*—Paul N. Dickson
*Assistant Examiner*—George D. Spisich
(74) *Attorney, Agent, or Firm*—Brian Roffe

(57) ABSTRACT

Airbag module mounted in connection with a steering wheel includes an inflator for generating gas and arranged on the steering wheel assembly, a conduit between the inflator and the interior of the airbag, and an aspirating structure arranged in connection with the conduit for enabling air from a passenger compartment to flow into the conduit and thus into the interior of the airbag. The airbag may be housed in a housing in a middle of the steering wheel. The aspirating structure may include one or more nozzles and/or one or more valves to allow for air flow from the passenger compartment into the conduit and prevent reverse flow. The inflator may include propellant distributed around an outer wall of the inflator.

19 Claims, 35 Drawing Sheets

U.S. PATENT DOCUMENTS

| | | | |
|---|---|---|---|
| 5,286,054 A | 2/1994 | Cuevas | |
| 5,338,061 A | 8/1994 | Nelson et al. | |
| 5,398,963 A * | 3/1995 | Fohl | 280/731 |
| 5,435,595 A | 7/1995 | Lauritzen et al. | |
| 5,437,473 A | 8/1995 | Henseler | |
| 5,441,303 A * | 8/1995 | Rozanski | 280/738 |
| 5,505,485 A | 4/1996 | Breed | |
| 5,542,695 A | 8/1996 | Hanson | |
| 5,676,395 A * | 10/1997 | Oe et al. | 280/730.2 |
| 5,685,559 A * | 11/1997 | Cuevas | 280/728.2 |
| 5,772,238 A | 6/1998 | Breed et al. | |
| 5,829,780 A * | 11/1998 | Tesauro et al. | 280/731 |
| 5,901,979 A | 5/1999 | Schneider et al. | |
| 5,954,359 A * | 9/1999 | Ross | 280/731 |
| 6,129,374 A * | 10/2000 | Yamada et al. | 280/728.2 |
| 6,206,408 B1 | 3/2001 | Schneider | |
| 6,213,496 B1 | 4/2001 | Minami et al. | |
| 6,227,566 B1 | 5/2001 | Kusaka et al. | |
| 6,314,889 B1 | 11/2001 | Smith | |
| 6,517,105 B1 | 2/2003 | Ford | |
| 7,055,857 B2 | 6/2006 | Marotzke | |

FOREIGN PATENT DOCUMENTS

| | | |
|---|---|---|
| GB | 2191450 A | 12/1987 |
| GB | 2308102 B | 6/1997 |

* cited by examiner

NEURAL NETWORK SINGLE POINT, PASSENGER COMPARTMENT MOUNTED SENSOR PERFORMANCE

| SCALED VELOCITY | BARRIER SCALING FACTOR | | | | | |
|---|---|---|---|---|---|---|
| | 1 | 1.2 | 1.4 | 1.6 | 1.8 | 2 |
| 8 MPH | NT | NT | NT | NT | NT | NT |
| 10 MPH | NT | 0.7/2.9 | 0.9/3.1 | 1.0/3.0 | NT | NT |
| 12 MPH | 0.0/1.1 | 0.8/3.5 | 0.9/3.5 | 1.0/3.4 | 1.4/3.9 | 2.0/4.7 |
| 14 MPH | 0.0/1.2 | 0.9/4.1 | 1.0/3.8 | 1.2/4.0 | 1.3/4.0 | 1.7/4.5 |
| 16 MPH | 0.0/1.4 | 0.9/4.4 | 1.0/4.0 | 1.1/4.0 | 1.4/4.3 | 1.7/4.6 |
| 18 MPH | 0.0/1.6 | 0.8/4.2 | 0.7/3.6 | 1.2/4.5 | 1.6/4.8 | 1.8/4.9 |
| 20 MPH | 0.0/1.8 | 0.7/4.3 | 0.7/4.0 | 1.1/4.3 | 1.3/4.4 | 1.0/3.8 |
| 22 MPH | 0.0/1.9 | 0.5/3.9 | 0.7/4.0 | 0.9/4.1 | 1.2/4.6 | 1.1/4.2 |
| 24 MPH | 0.0/2.1 | 0.1/2.3 | 0.8/4.4 | 0.8/4.2 | 1.3/5.0 | 1.4/4.8 |
| 26 MPH | 0.0/2.3 | 0.1/2.5 | 0.5/4.0 | 0.9/4.5 | 1.0/4.4 | 1.2/4.6 |
| 28 MPH | 0.0/2.5 | 0.0/2.1 | 0.1/2.4 | 0.7/4.2 | 0.8/4.1 | 0.5/3.2 |
| 30 MPH | 0.0/2.7 | 0.0/2.3 | 0.1/2.6 | 0.1/2.3 | 0.8/4.4 | 1.2/5.0 |
| 32 MPH | 0.0/2.8 | 0.0/2.4 | 0.1/2.8 | 0.1/2.5 | 0.9/4.7 | 1.1/4.9 |
| 34 MPH | 0.0/3.0 | 0.0/2.3 | 0.0/2.0 | 0.0/1.8 | 0.6/4.2 | 1.2/5.3 |

*Fig. 3*

OPTIMIZED SINGLE POINT, PASSENGER COMPARTMENT MOUNTED SENSOR PERFORMANCE

| SCALED VELOCITY | BARRIER SCALING FACTOR | | | | | |
|---|---|---|---|---|---|---|
| | 1 | 1.2 | 1.4 | 1.6 | 1.8 | 2 |
| 8 MPH | NT | NT | NT | NT | NT | NT |
| 10 MPH | 4.7/10.3* | NT | NT | NT | NT | NT |
| 12 MPH | 2.2/6.7 | 5.8/12.1 | NT | NT | NT | NT |
| 14 MPH | 2.2/7.2 | 2.7/7.5 | 3.9/8.9 | NT | NT | NT |
| 16 MPH | 2.2/7.6 | 2.7/7.9 | 3.4/8.5 | 4.2/9.3 | NT | NT |
| 18 MPH | 2.2/8.0 | 2.8/8.7 | 3.6/9.2 | 4.2/9.7 | 5.0/10.5 | 17.8/27.5 |
| 20 MPH | 2.0/7.9 | 3.1/9.3 | 3.7/9.7 | 4.3/11.2 | 5.0/10.9 | 5.9/11.7 |
| 22 MPH | 1.0/5.3 | 2.7/8.9 | 3.9/10.4 | 4.5/10.9 | 5.2/11.5 | 5.9/12.2 |
| 24 MPH | .5/4.2 | 1.6/6.5 | 3.9/10.8 | 4.8/11.6 | 5.4/12.0 | 6.1/12.8 |
| 26 MPH | .4/4 | 1.2/5.7 | 2.0/6.8 | 4.5/11.5 | 5.8/13 | 6.4/13.5 |
| 28 MPH | .4/4.1 | .6/4.0 | 1.8/6.6 | 2.7/7.8 | 5.9/13.5 | 6.8/14.4 |
| 30 MPH | .4/4.2 | .5/4.0 | .8/4.2 | 2.2/6.9 | 6.4/14.5 | 7.1/15.1 |
| 32 MPH | .3/4.2 | .5/4.1 | .7/7.2 | 2.1/7.0 | 2.6/7.4 | 3.4/8.4 |
| 34 MPH | .3/4.0 | .5/4.2 | .7/4.3 | .9/4.5 | 2.6/7.5 | 4.0/9.6 |

*Fig. 4*

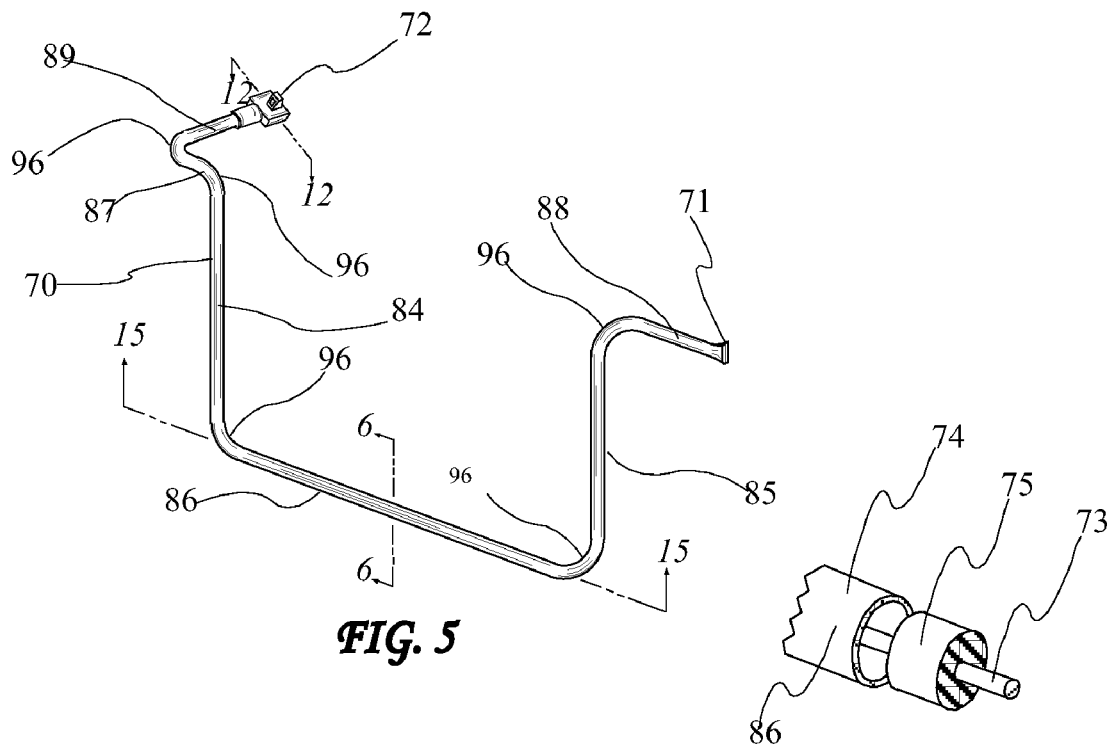
FIG. 5
FIG. 6
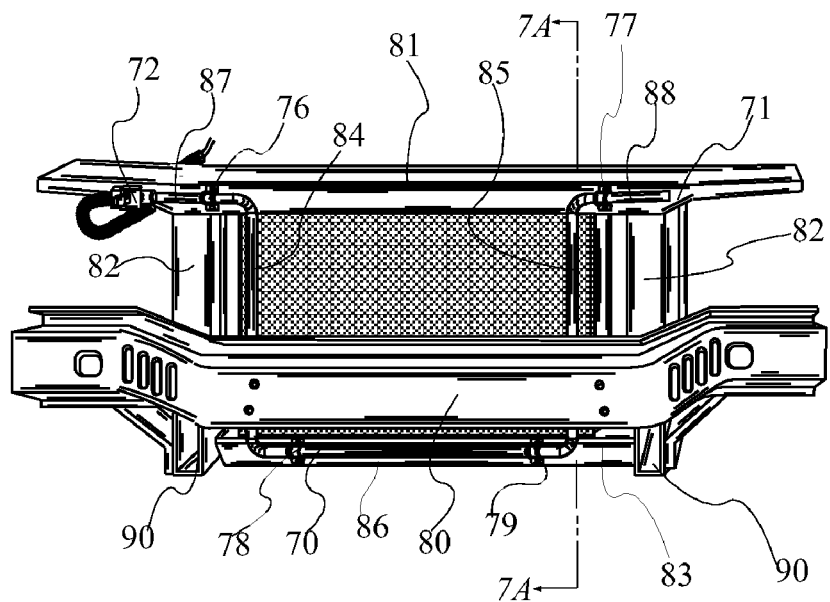
FIG. 7

RUBBER   TIN COATED BRASS   PLASTIC

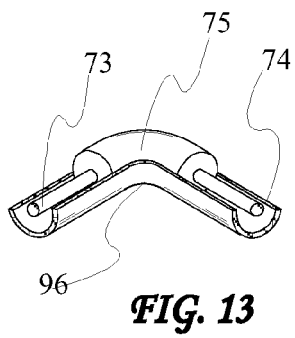
FIG. 13
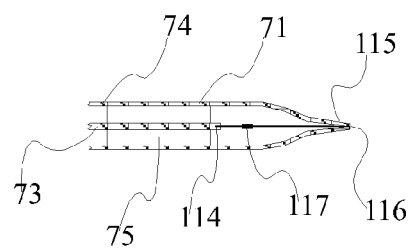
FIG. 14
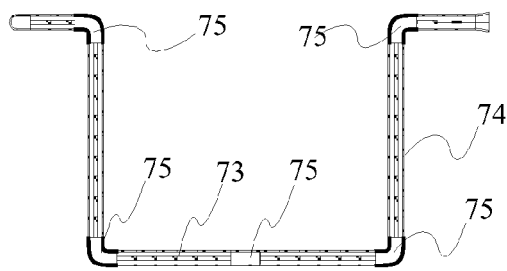
FIG. 15
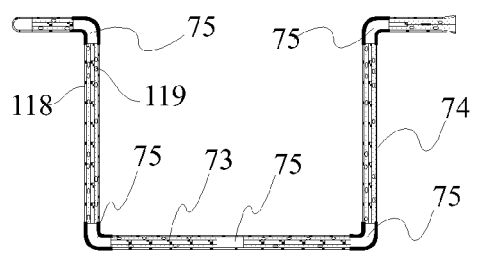
FIG. 16  ▭ GREASE
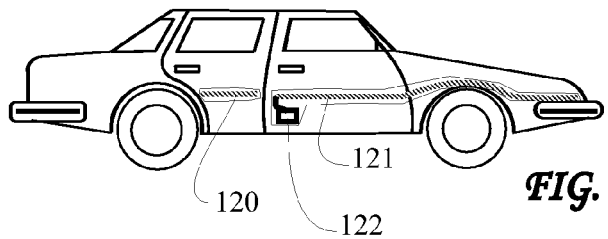
FIG. 17
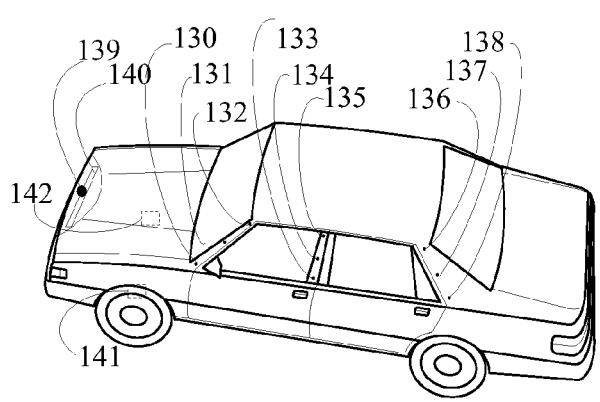
Fig. 18

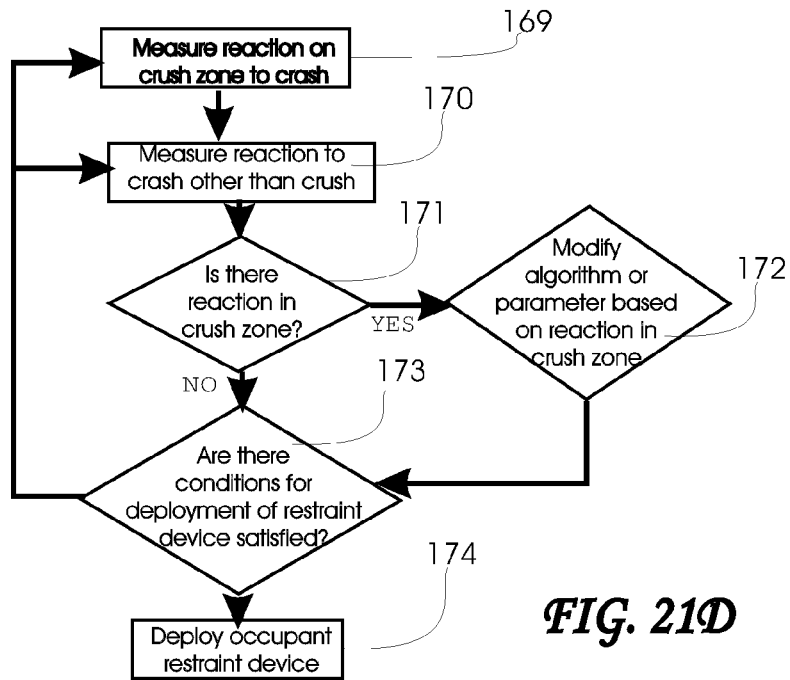
FIG. 21D
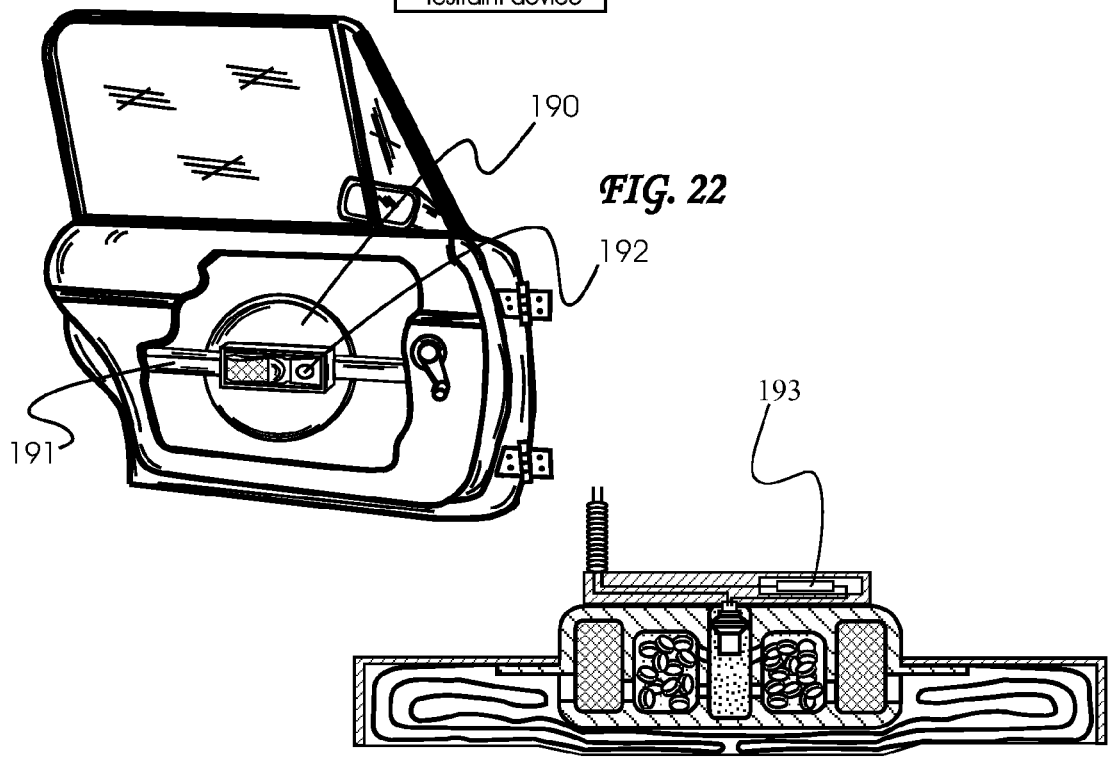
FIG. 22
FIG. 23

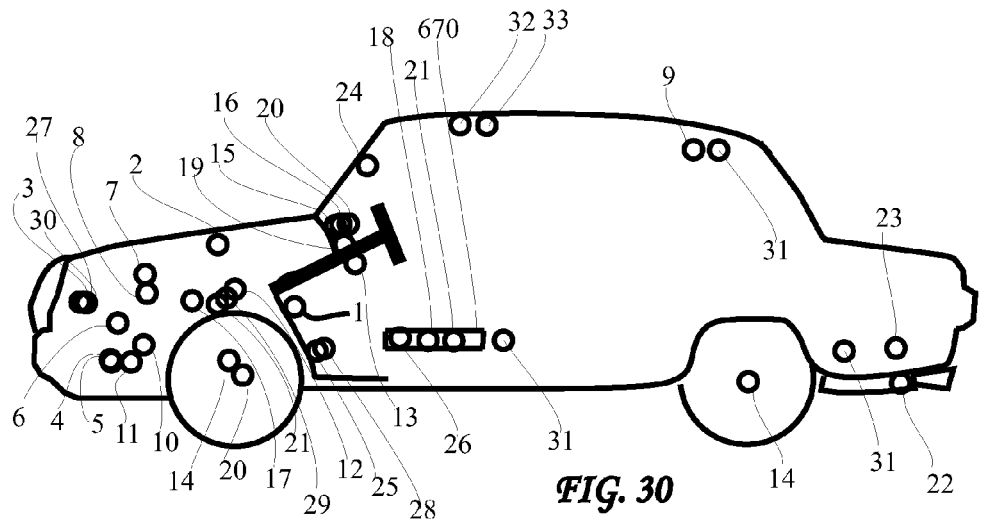

FIG. 30

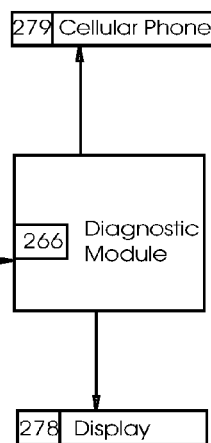

| 1 | Crash Sensor |
| 2 | Microphones |
| 3 | Coolant Thermometer |
| 4 | Oil Pressure Sensor |
| 5 | Oil Level Sensor |
| 6 | Air Flow Meter |
| 7 | Voltmeter |
| 8 | Ammeter |
| 9 | Humidity Sensor |
| 10 | Engine Knock Sensor |
| 11 | Oil Turbidity Sensor |
| 12 | Throttle Position Snsr |
| 13 | Steering Torque Sensor |
| 14 | Wheel Speed Sensor |
| 15 | Tachometer |
| 16 | Speedometer |
| 17 | Oxygen Sensor |
| 18 | Pitch & Roll Sensor |
| 19 | Clock |
| 20 | Odometer |
| 21 | Pwr Str Pressure Snsr |
| 22 | Pollution Sensor |
| 23 | Fuel Gage |
| 24 | Cabin Thermometer |
| 25 | Transmission Fld Lvl |
| 26 | Yaw Sensor |
| 27 | Coolant Level Sensor |
| 28 | Trans. Fluid Turbidity |
| 29 | Break Pressure Sensor |
| 30 | Coolant Pressure Snsr |
| 31 | Accelerometers |
| 32 | GPS Receiver |
| 33 | IMU Kalman Filter |

FIG. 31

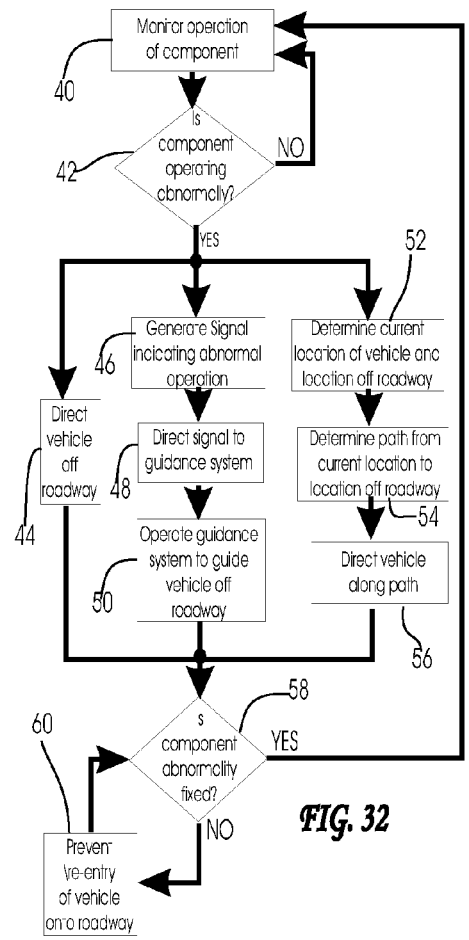

FIG. 32

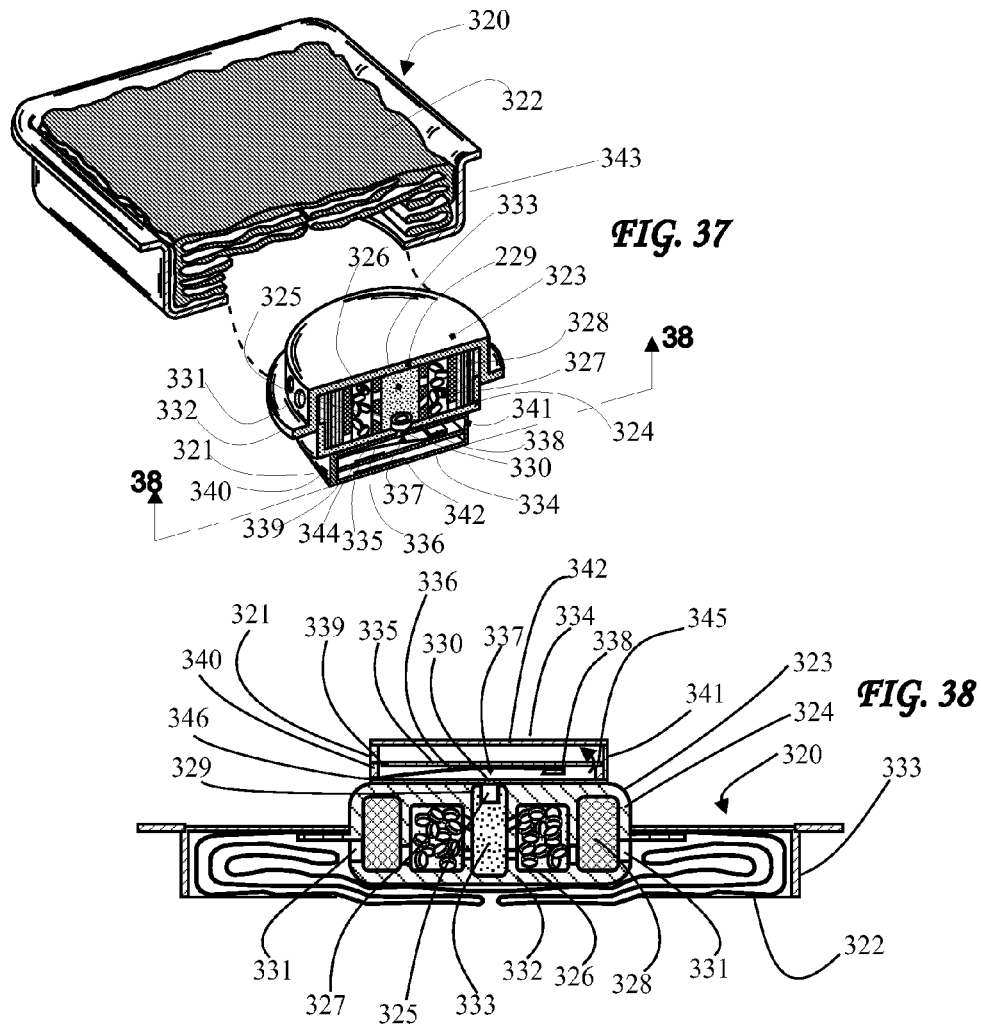
*FIG. 37*
*FIG. 38*
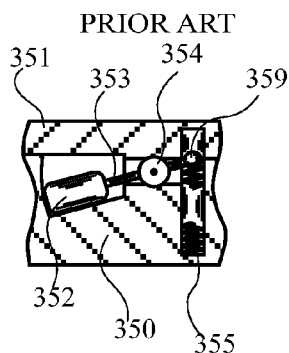
*FIG. 39*
PRIOR ART
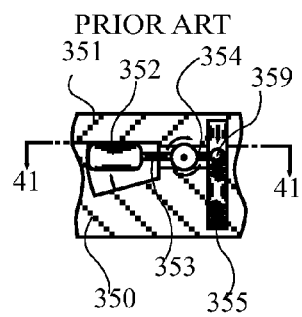
*FIG. 40*
PRIOR ART
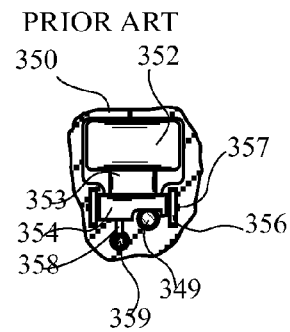
*FIG. 41*
PRIOR ART

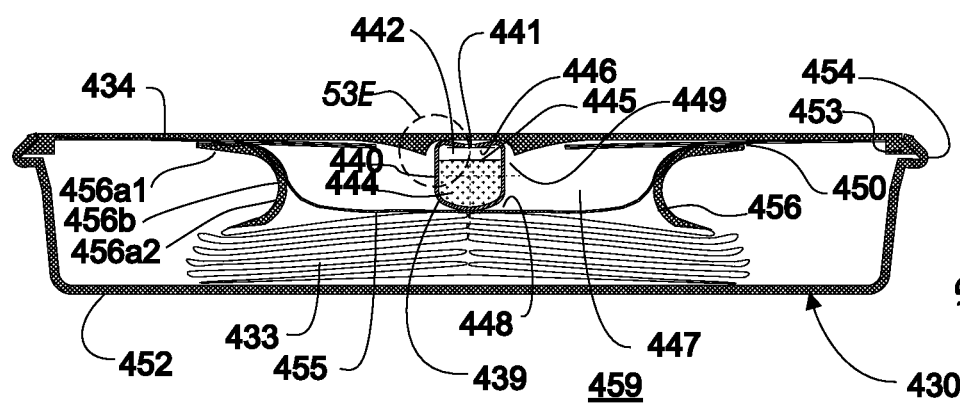
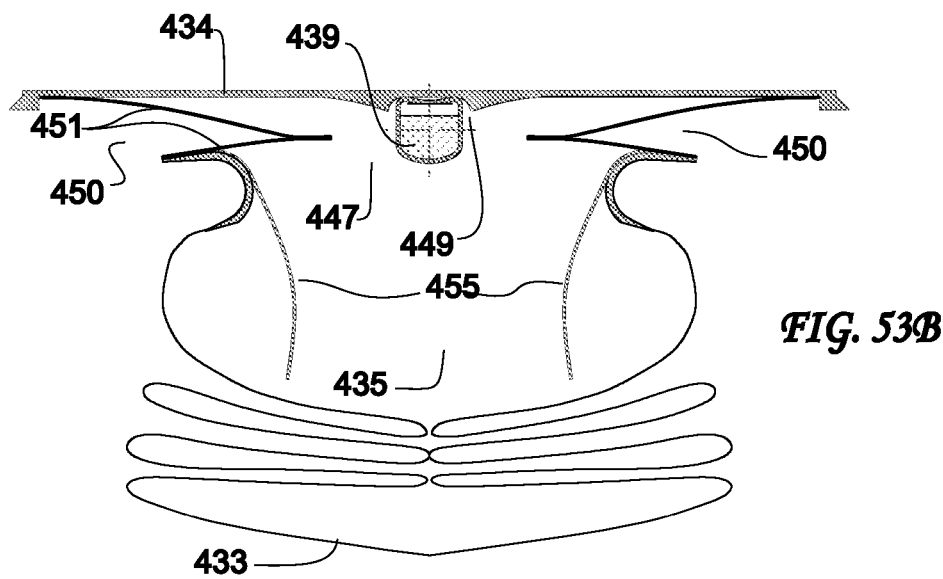
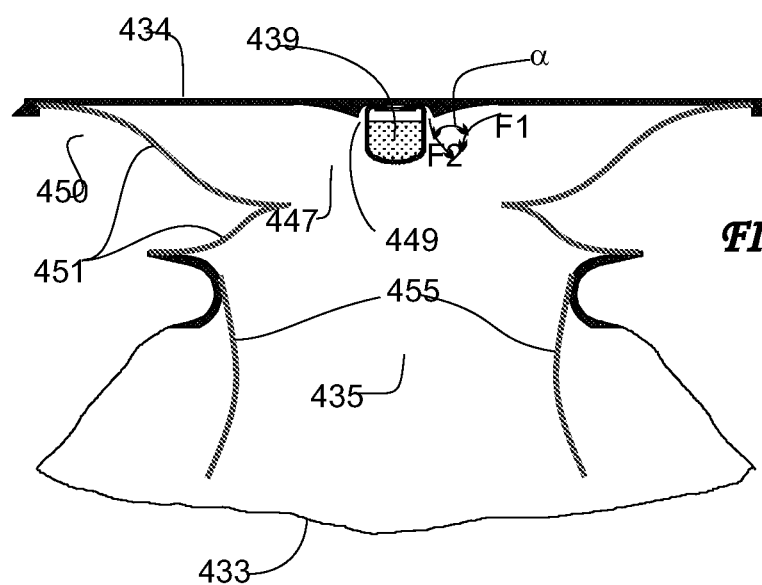

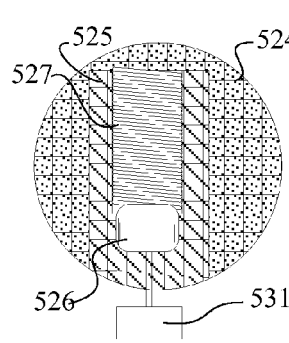
FIG. 65A
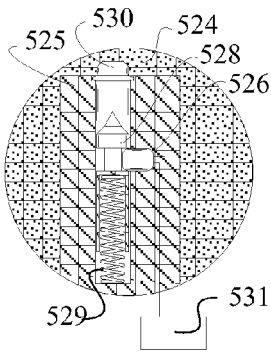
FIG. 65B
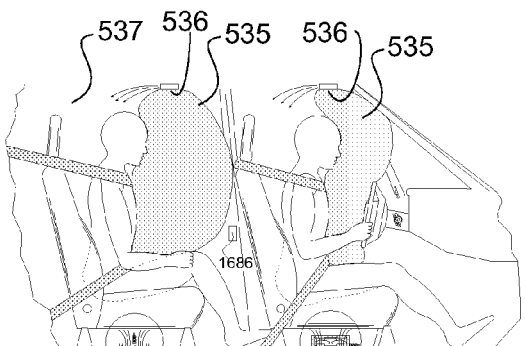
FIG. 66
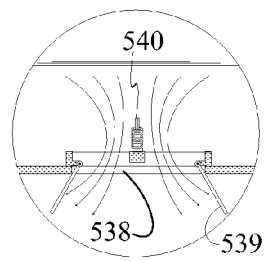
FIG. 66A
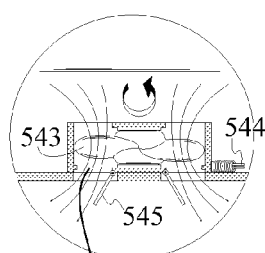
FIG. 66B
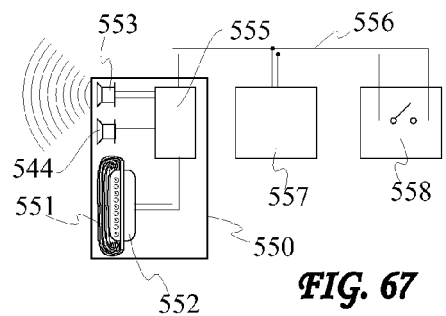
FIG. 67
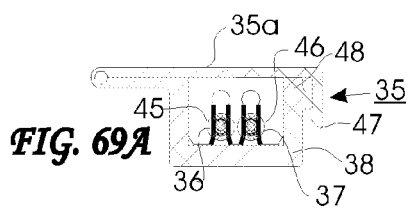
FIG. 69A
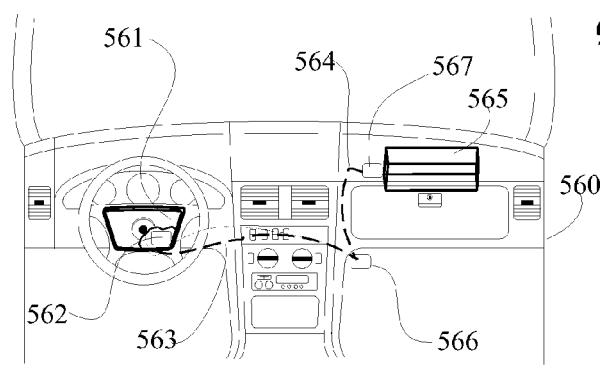
FIG. 68
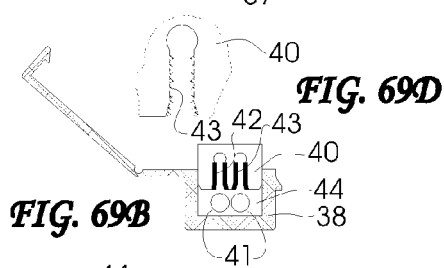
FIG. 69B
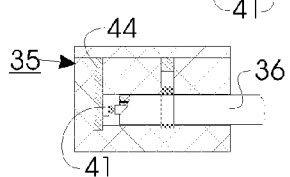
FIG. 69C
FIG. 69D

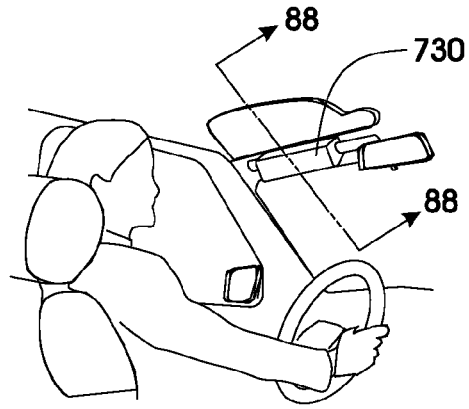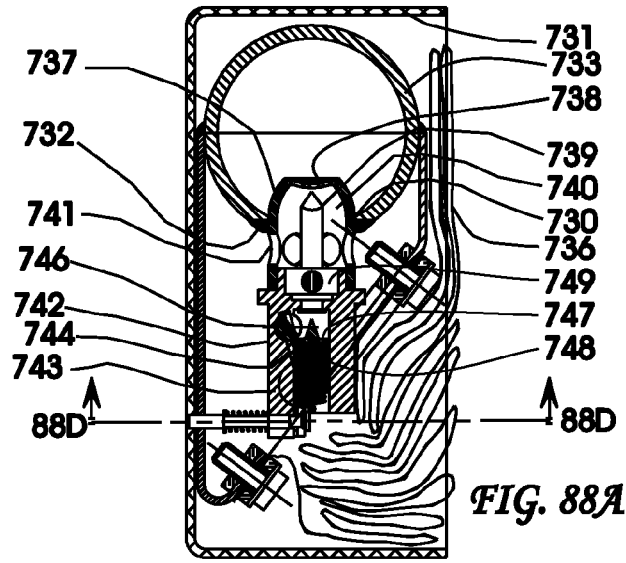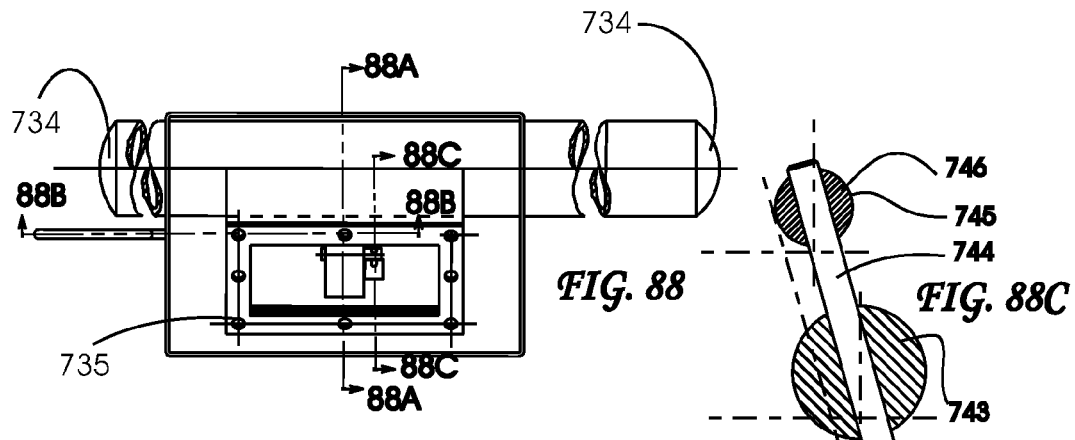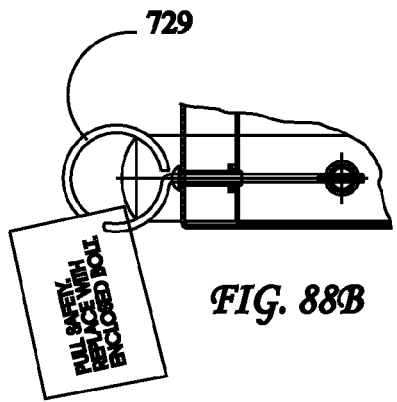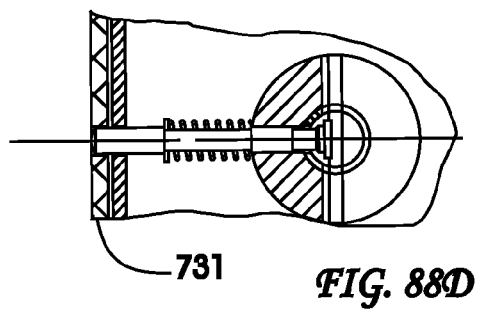

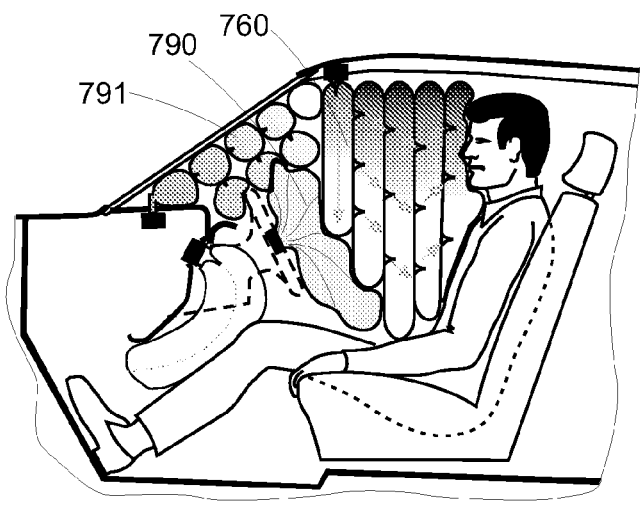
*FIG. 94*
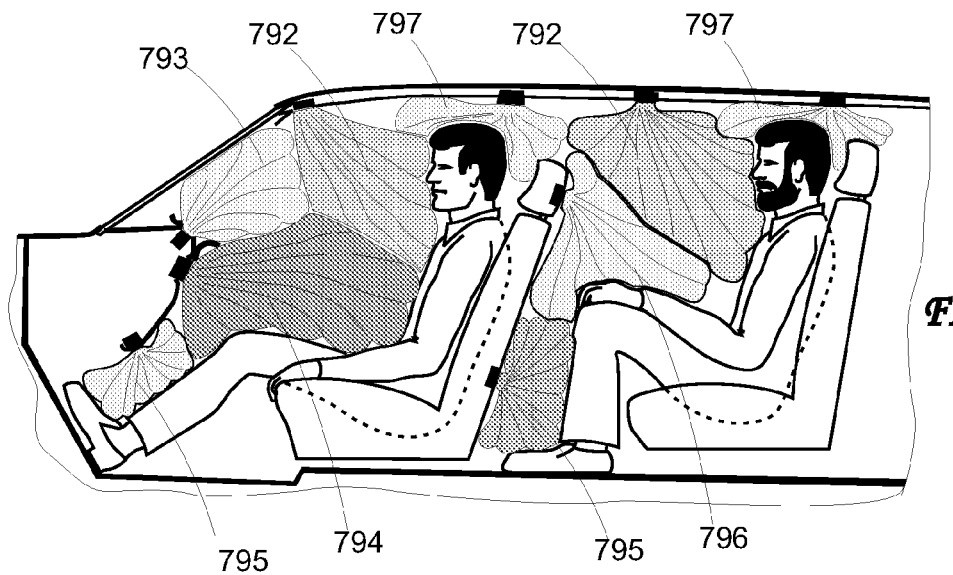
*FIG. 95*
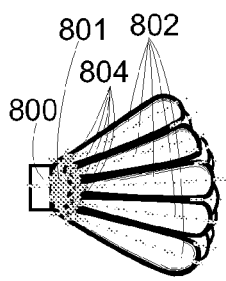
*FIG. 96*
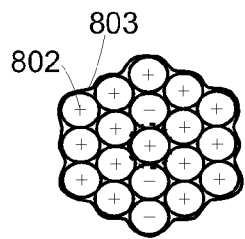
*FIG. 96A*
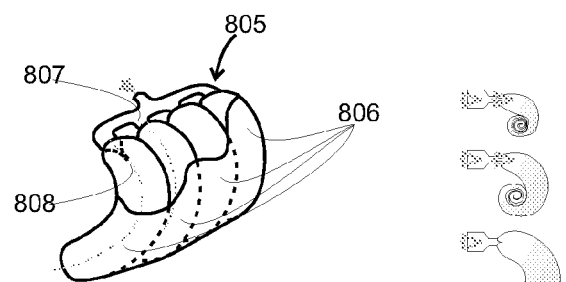
*FIG. 97*
*FIG. 97A*

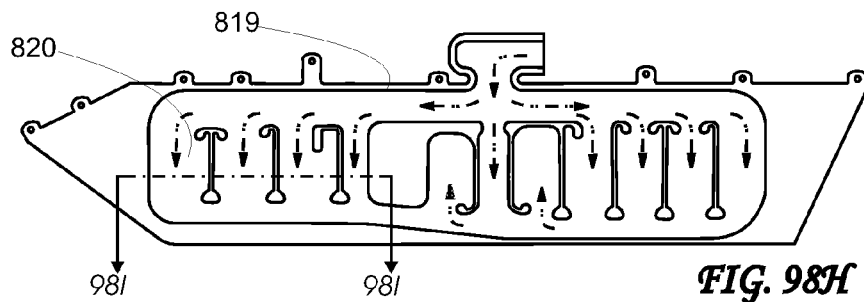
FIG. 98H
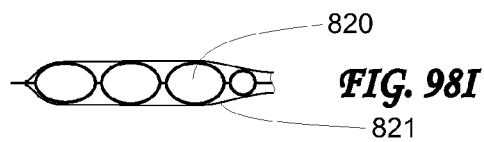
FIG. 98I
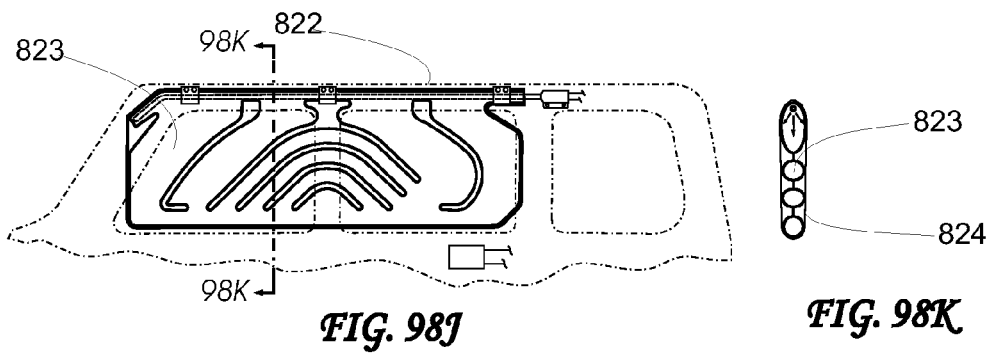
FIG. 98J
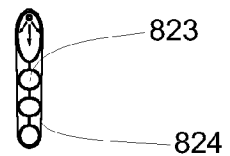
FIG. 98K
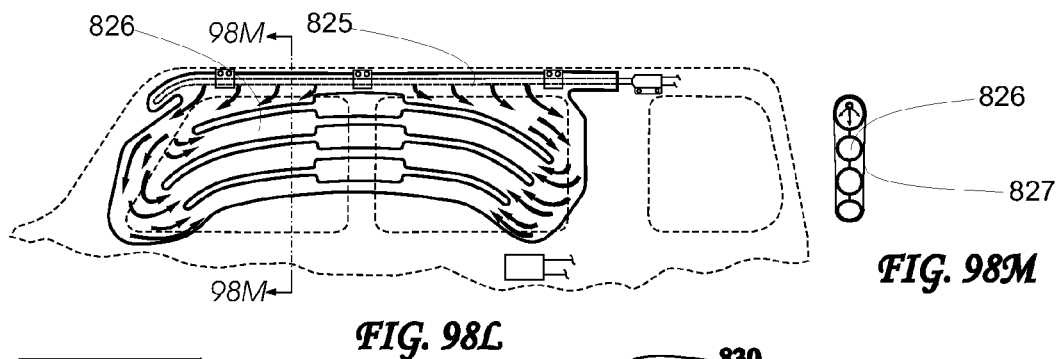
FIG. 98L
FIG. 98M
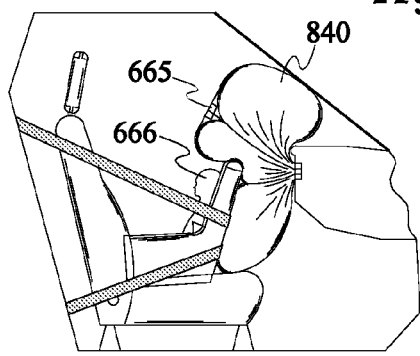
FIG. 99
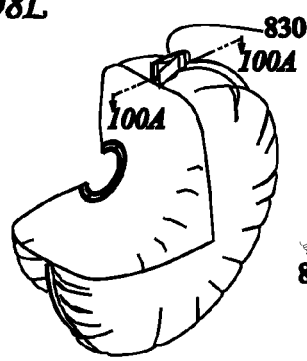
FIG. 100
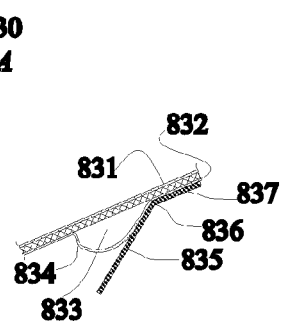
FIG. 100A

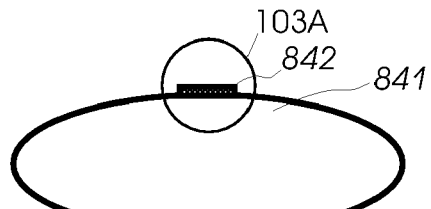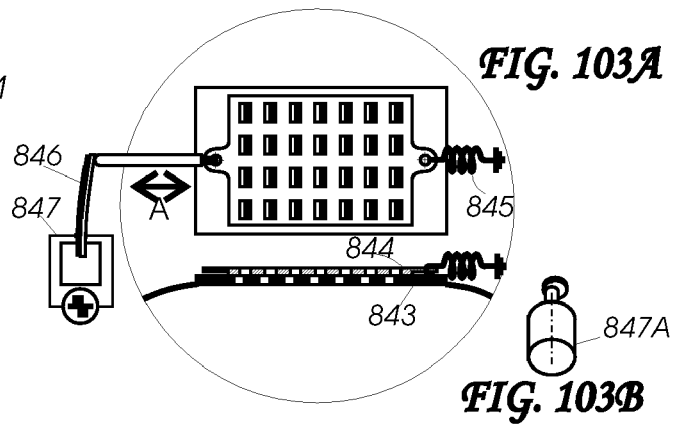
FIG. 103
FIG. 103A
FIG. 103B
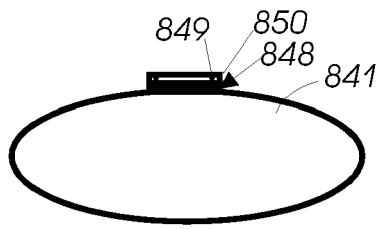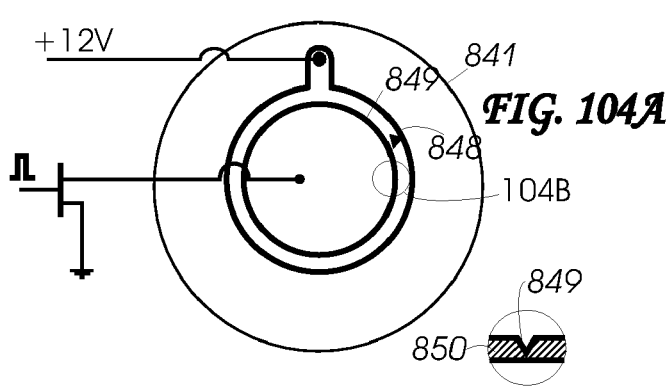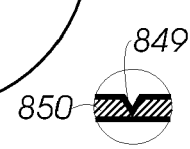
FIG. 104
FIG. 104A
FIG. 104B
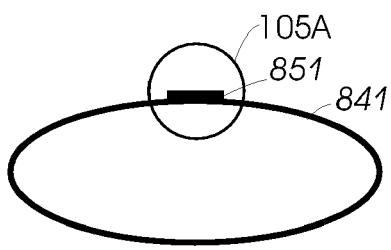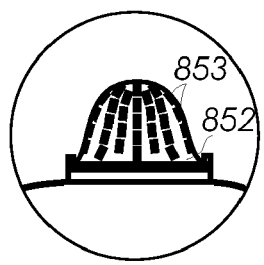
FIG. 105
FIG. 105A
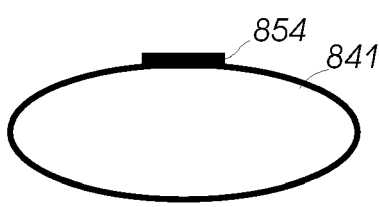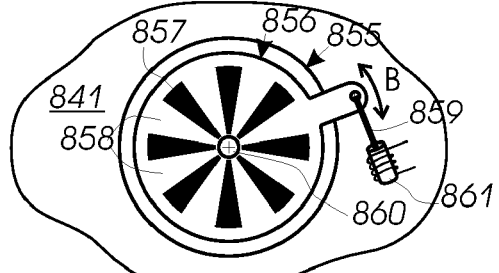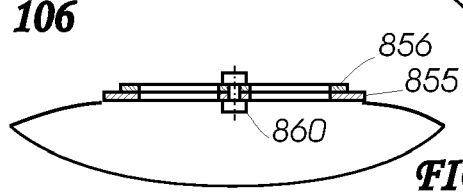
FIG. 106
FIG. 106B
FIG. 106A

FIG. 107
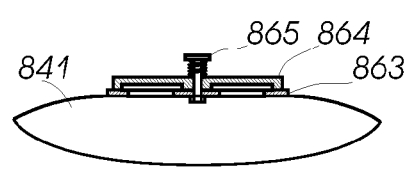
FIG. 107A
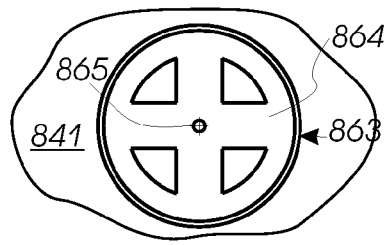
FIG. 107B
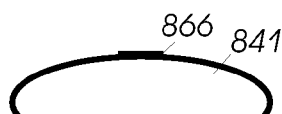
FIG. 108
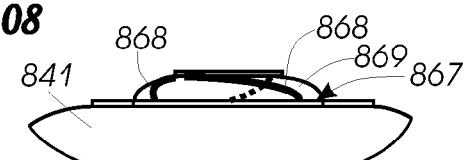
FIG. 108A
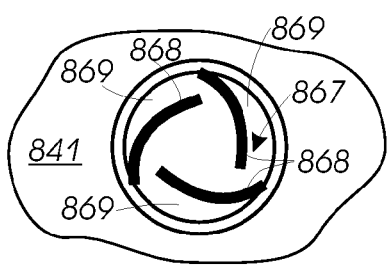
FIG. 108B
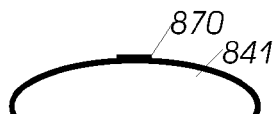
FIG. 109
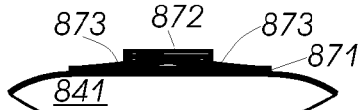
FIG. 109A
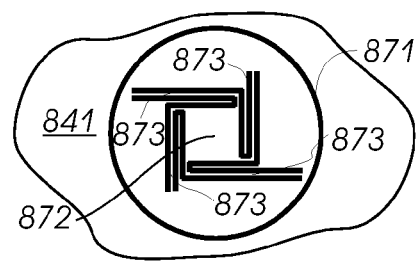
FIG. 109B
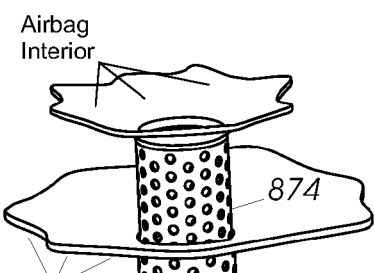
FIG. 110A
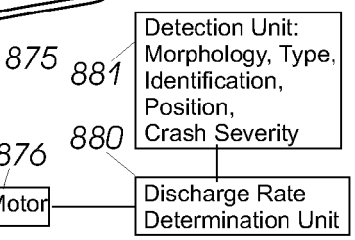
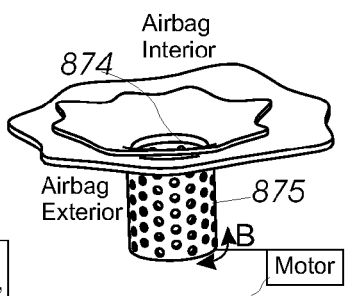
FIG. 110B

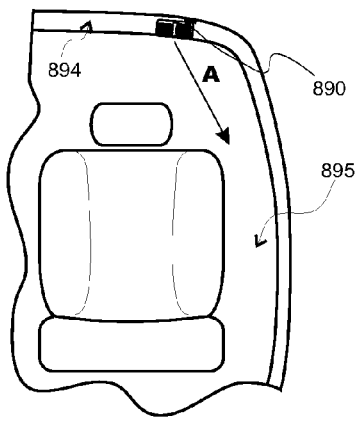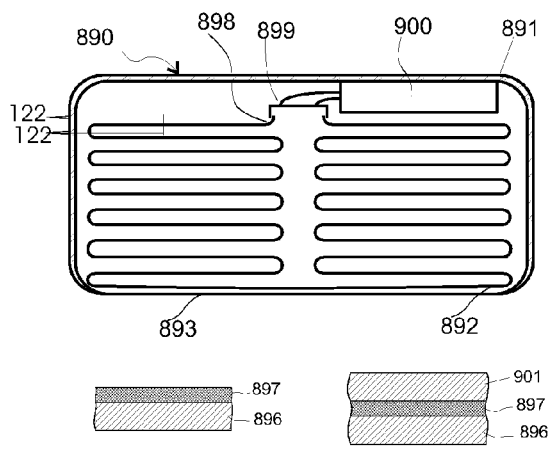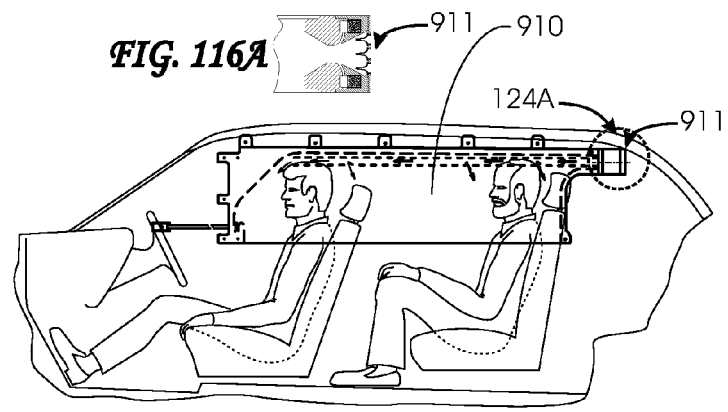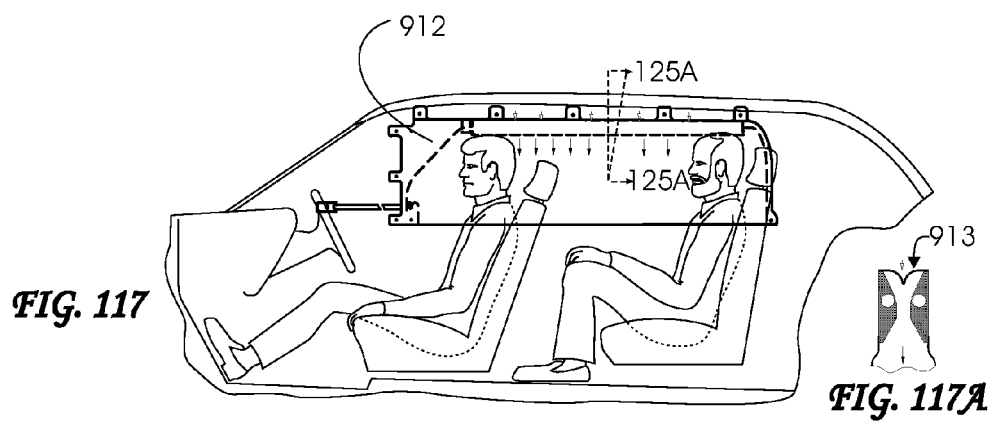
FIG. 113
FIG. 114
FIG. 115A
FIG. 115B
FIG. 116A
FIG. 116
FIG. 117
FIG. 117A

DRIVER SIDE ASPIRATED AIRBAGS

CROSS-REFERENCE TO RELATED APPLICATIONS

This application is a divisional of U.S. patent application Ser. No. 11/131,623 filed May 18, 2005, now U.S. Pat. No. 7,481,453, which is a continuation-in-part (CIP) of U.S. patent application Ser. No. 10/974,919 filed Oct. 27, 2004, now U.S. Pat. No. 7,040,653.

All of the above applications and patents, and U.S. patent application Ser. No. 10/043,557 filed Jan. 11, 2002, now U.S. Pat. No. 6,905,135, U.S. patent application Ser. No. 09/925,062 filed Aug. 8, 2001, now U.S. Pat. No. 6,733,036, U.S. patent application Ser. No. 09/767,020 filed Jan. 23, 2001, now U.S. Pat. No. 6,533,316, U.S. patent application Ser. No. 09/073,403 filed May 6, 1998, now U.S. Pat. No. 6,179,326, and U.S. patent application Ser. No. 08/571,247 filed Dec. 12, 1995, now U.S. Pat. No. 5,772,238, and any applications, publications and patents mentioned below, are incorporated herein by reference in their entirety and made a part hereof.

FIELD OF THE INVENTION

The present invention relates to aspirated airbags for a driver, i.e., arranged in connection with the steering wheel.

BACKGROUND OF THE INVENTION

Background of the invention is set forth in the '623 application, in particular at sections 2.2 and 2.3, and the definitions in section 5 thereof are applicable herein.

All mentioned patents, published patent applications and literature are incorporated by reference herein.

OBJECTS AND SUMMARY OF THE INVENTION

It is an object of the present invention to provide driver side aspirated airbags. Other objects and advantages of the present invention will become apparent from the following description of the preferred embodiments taken in conjunction with the accompanying drawings, and some are also set forth in the parent '623 application.

In order to achieve this object, an airbag module mounted in connection with a steering wheel in accordance with the invention includes an inflator for generating gas and arranged on the steering wheel assembly, a conduit between the inflator and the interior of the airbag, and an aspirating structure arranged in connection with the conduit for enabling air from a passenger compartment to flow into the conduit and thus into the interior of the airbag. The airbag may be housed in a housing in a middle of the steering wheel. The aspirating structure may include one or more nozzles and/or one or more valves to allow for air flow from the passenger compartment into the conduit and prevent reverse flow. The inflator may include propellant distributed around an outer wall of the inflator.

The inflator and the aspirating structure may be arranged on one side of the steering column or to surround the steering column. The inflator may rotate with the steering wheel. On the other hand, bearings may be provided to enable the inflator to remain stationary while the steering column rotates.

BRIEF DESCRIPTION OF THE DRAWINGS

The following drawings are illustrative of embodiments of the invention and are not meant to limit the scope of the invention as encompassed by the claims.

FIG. 3 contains the results of a neural network algorithm on a crash matrix created using the techniques of velocity and crash scaling.

FIG. 4 contains the results of a standard single point crash sensor on a crash matrix created using the techniques of velocity and crash scaling.

FIG. 5 is a perspective view of a preferred embodiment of the sensor of this invention for use in frontal impacts shown removed from the vehicle.

FIG. 6 is a perspective view taken along line 6-6 of the sensor shown in FIG. 5 with the interior parts pulled apart to illustrate the interior structure.

FIG. 7 is a frontal view of another preferred embodiment of the sensor of shown mounted on a vehicle to sense frontal impacts with portions of the vehicle removed to permit viewing of the sensor.

FIG. 13 is a partial cutaway view of a portion of the sensor illustrating a bend in the sensor.

FIG. 14 is a cutaway of the sensor end showing the welded seal.

FIG. 15 is a view of the sensor of FIG. 5 taken along the line 15-15 with part of the tube and rod cut away illustrating the positioning of spacers within the sensor and their use to change the sensitivity of the sensor to deformation.

FIG. 16 is a view of the sensor of FIG. 5 with portions of the tube and rod cut away illustrating the use of a grease to fill the cavity between the rod and tube to minimize the effects of vibration and to protect the surfaces of the conductors from corrosion.

FIG. 17 is a side view of another preferred embodiment of a sensor in accordance with the invention shown mounted on a vehicle in a position to sense both frontal and side impacts, with portions of the vehicle removed to permit viewing of the sensor.

FIG. 18 is a perspective view of an automobile, as viewed partially from above, of a side impact anticipatory sensor system using the same computer as the single point crash sensor and also showing inputs from a front mounted crush zone sensor, an engine speed sensor, and an antilock braking system sensor.

FIG. 21D is a flow chart showing the manner in which an occupant restraint device may be deployed using the crash sensor arrangement of FIG. 21C.

FIG. 22 is a perspective view of a side impact airbag system illustrating the placement of the airbag vents in the door panel and the exhausting of the inflator gases into the vehicle door and also showing the use of a pusher plate to adjust for the mismatch between the point of impact of an intruding vehicle and the sensor of a self-contained side impact airbag system.

FIG. 23 is a cross section view of a self-contained side impact airbag system using an electronic sensor.

FIG. 30 is a schematic of a vehicle with several components and several sensors and a total vehicle diagnostic system in accordance with the invention utilizing a diagnostic module in accordance with the invention and which may be used in a method in accordance with the invention.

FIG. 31 is a flow diagram of information flowing from various sensors onto the vehicle data bus and thereby into the diagnostic module in accordance with the invention with outputs to a display for notifying the driver, and to the vehicle cellular phone for notifying another person, of a potential component failure.

FIG. 32 is a flow chart of the methods for automatically monitoring a vehicular component in accordance with the invention.

FIG. 37 is a perspective view with certain parts removed of an all mechanical self-contained airbag system for mounting on the side of a vehicle to protect occupants in side impacts.

FIG. 38 is a cross sectional view of the apparatus of FIG. 37 taken along line 38-38.

FIG. 39 is an enlarged fragmentary view of the sensing mass and attached lever arm extending from the D-shaft prior to rotation of the sensing mass incident to a crash as adapted to the all mechanical system of U.S. Pat. No. 4,580,810.

FIG. 40 is a similar view as FIG. 39 showing the sensing mass rotated as a result of a crash.

FIG. 41 is a view of the apparatus shown in FIG. 40 taken along line 41-41 and rotated 90 degrees to the right.

FIG. 53A is a cross-sectional view of the airbag module of FIG. 52 prior to deployment of the airbag.

FIG. 53B is a view of the apparatus of FIG. 53A after the initial stage of deployment where the airbag module has been displaced from the mounting surface to open aspirating ports.

FIG. 53C is a cross-sectional view similar to FIG. 53A with the airbag fully deployed taken along lines 53C-53C of FIG. 52.

FIG. 65A is a detailed sectional view of circle 65A of FIG. 65 showing the inflator squib incorporating a pyrotechnic delay element.

FIG. 65B is a detailed sectional view of an alternate mechanical deployment delay mechanism using the electrical squib to release a firing pin which is propelled into a stab primer by a spring.

FIG. 66 is a perspective view of a ceiling mounted airbag system having exit ports at the ceiling level for gas to flow out of the airbag, a blow-out panel located low in the passenger compartment and a fan exhaust system also located low in the passenger compartment.

FIG. 66A is an enlargement of the blow-out panel of FIG. 66.

FIG. 66B is an enlargement of the exhaust fan of FIG. 66.

FIG. 67 is a perspective view of the combination of an occupant position sensor, diagnostic electronics and power supply and airbag module designed to prevent the deployment of the airbag if the seat is unoccupied.

FIG. 68 is another implementation of the invention incorporating the electronic components into and adjacent the airbag module.

FIGS. 69A, 69B, 69C and 69D are different views of an automotive connector for use with a coaxial electrical bus for a motor vehicle illustrating the teachings of this invention.

FIG. 83 is a perspective view with portions cut away of a vehicle showing the knee bolster airbag in an inflated condition mounted to provide protection for a driver.

FIG. 84 is a perspective view of an airbag and inflator system where the airbag is formed from tubes.

FIG. 85 is a perspective view with portions removed of a vehicle having several deployed film airbags.

FIG. 86 is a view of another preferred embodiment of the invention shown mounted in a manner to provide protection for a front and a rear seat occupant in side impact collisions and to provide protection against impacts to the roof support pillars in angular frontal impacts.

FIG. 86A is a view of the side airbag of FIG. 9 of the side airbag with the airbag removed from the vehicle.

FIG. 87 is a partial view of the interior driver area of a vehicle showing a self-contained airbag module containing the film airbag of this invention in combination with a stored gas inflator.

FIG. 88 is a view looking toward the rear of the airbag module of FIG. 87 with the vehicle removed taken at 88-88 of FIG. 87.

FIG. 88A is a cross sectional view of the airbag module of FIG. 88 taken at 88A-88A.

FIG. 88B is a cross sectional view, with portions cutaway and removed, of the airbag module of FIG. 88 taken at 88B-88B.

FIG. 88C is a cross sectional view of the airbag module of FIG. 88 taken at 88C-88C.

FIG. 88D is a cross sectional view of the airbag module of FIG. 88A taken at 88D-88D.

FIG. 89 is a perspective view of another preferred embodiment of the invention shown mounted in a manner to provide protection for a front and a rear seat occupant in side impact collisions, to provide protection against impacts to the roof support pillars in angular frontal impacts and to offer some additional protection against ejection of the occupant or portions of the occupant.

Figure 90:
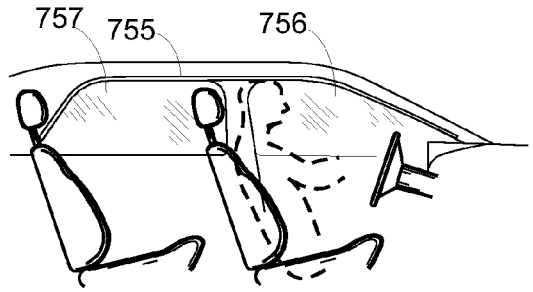

FIG. 90 is a side view of the interior of a motor vehicle provided with another form of safety device in accordance with the invention, before the safety device moves to the operative state.

Figure 91:
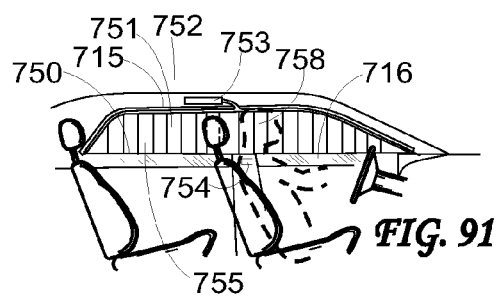

FIG. 91 illustrates the vehicle of FIG. 90 when the safety device is in the operative state.

Figures 92, 92A:
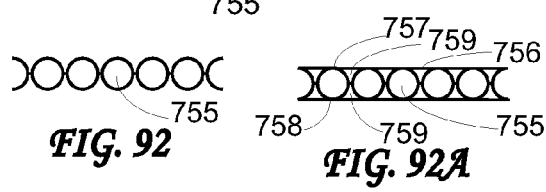

FIG. 92 is a sectional view of one form of safety device as shown in FIGS. 90 and 91 in a plane perpendicular to the vertical direction.

FIG. 92A is a view as in FIG. 92 with additional sheets of material attached to span the cells.

Figure 93A:
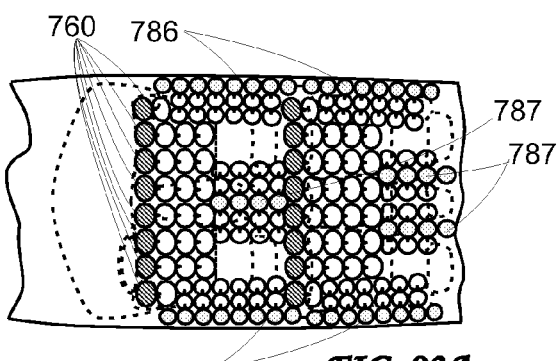
Figure 93:
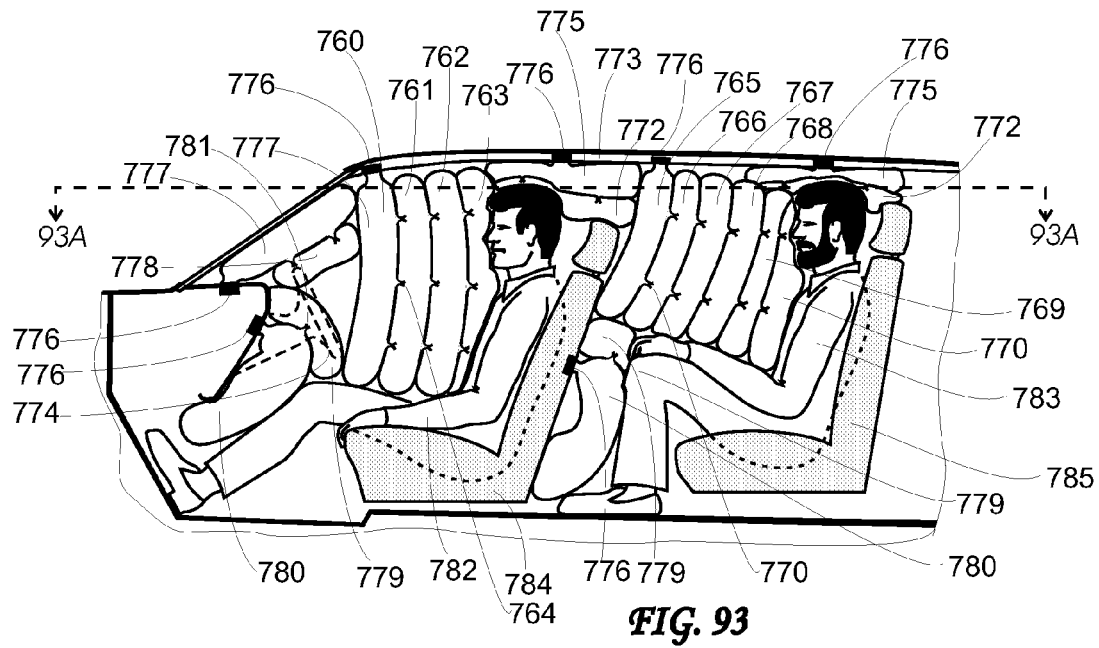

FIG. 93 is a side view of the passenger compartment of a vehicle showing the compartment substantially filled with layers of tubular film airbags some of which are interconnected.

FIG. 93A is a top view of the airbag arrangement of FIG. 93 taken along line 93A-93A.

FIG. 94 is a similar but alternate arrangement of FIG. 93.

FIG. 95 is another alternate arrangement to FIG. 93 using airbags that expand radially from various inflators.

FIG. 96 is a detail of the radial expanding tubular airbags of FIG. 95.

FIG. 96A is an end view of the airbags of FIG. 96 taken along line 96A-96A.

FIG. 97 is a detailed view of a knee bolster arrangement in accordance with the invention.

FIG. 97A illustrates the deployment stages of the knee bolster arrangement of FIG. 97.

FIGS. 98A, 98D, 98F, 98H, 98J and 98L illustrate various common fabric airbag designs that have been converted to film and have additional film layers on each of the two sides of the airbag.

FIGS. 98B, 98C, 98E, 98G, 98I, 98K and 98M are cross-sectional views of FIGS. 98A, 98D, 98F, 98H, 98J and 98L.

FIG. 99 is a perspective view of a self limiting airbag system including a multiplicity of airbags surrounded by a net, most of which has been cutaway and removed, designed to not cause injury to a child in a rear-facing child seat.

FIG. 100 is a partial cutaway perspective view of a driver side airbag made from plastic film having a variable vent in the seam of the airbag.

FIG. 100A is an enlargement of the variable vent of FIG. 100 taken along line 100A-100A of FIG. 100.

Figure 101:
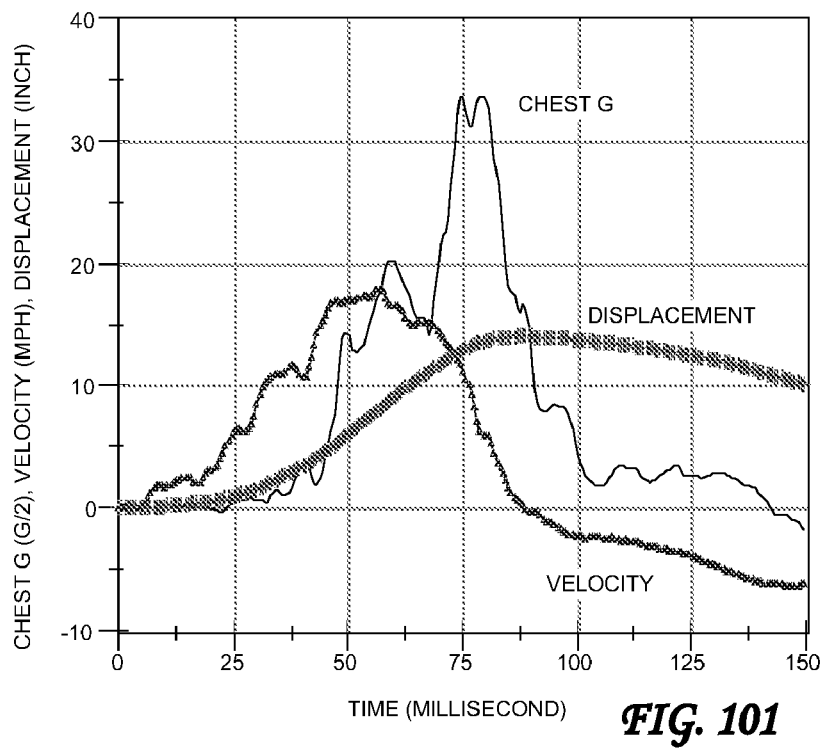

FIG. 101 shows a plot of the chest acceleration of an occupant and the occupant motion using a conventional airbag.

Figure 102:
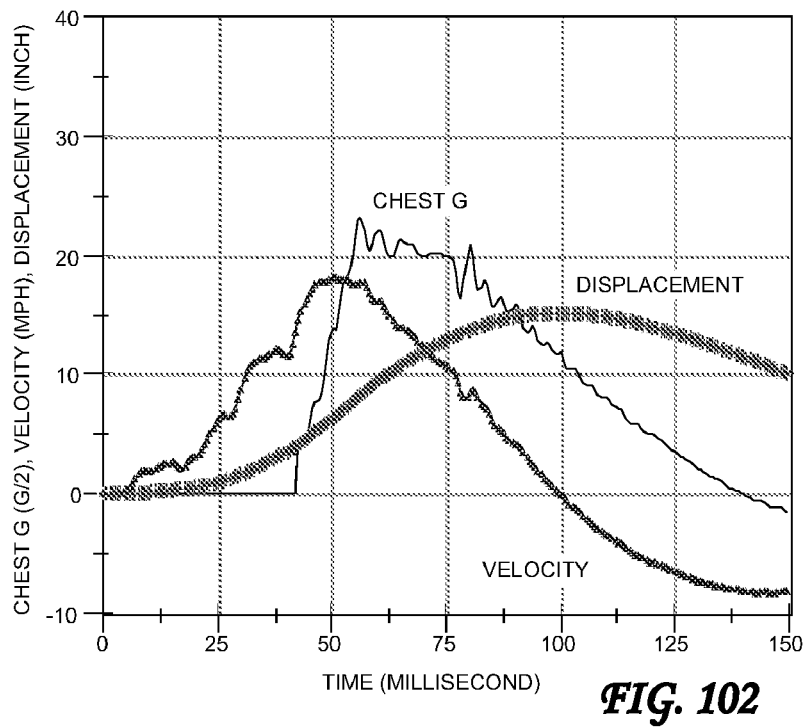

FIG. 102 shows the chest acceleration of an occupant and the resulting occupant motion when the variable orifice of this invention is utilized.

FIG. 103 is a sketch of a first embodiment of a valve in accordance with the invention.

FIG. 103A is an enlarged view of the portion designated 103A in FIG. 103.

FIG. 103B is an alternative actuating device for the embodiment shown in FIG. 103A.

FIG. 104 is a sketch of a second embodiment of a valve in accordance with the invention.

FIG. 104A is a top view of the embodiment shown in FIG. 104.

FIG. 104B is an enlarged view of the portion designated 104B in FIG. 104A.

FIG. 105 is a sketch of a third embodiment of a valve in accordance with the invention.

FIG. 105A is an enlarged view of the portion designated 105A in FIG. 105.

FIG. 106 is a sketch of a fourth embodiment of a valve in accordance with the invention.

FIG. 106A is a partial cross-sectional view of the embodiment shown in FIG. 106.

FIG. 106B is a top view of the embodiment shown in FIG. 106.

FIG. 107 is a sketch of a fifth embodiment of a valve in accordance with the invention.

FIG. 107A is a partial cross-sectional view of the embodiment shown in FIG. 107.

FIG. 107B is a top view of the embodiment shown in FIG. 107.

FIG. 108 is a sketch of a sixth embodiment of a valve in accordance with the invention.

FIG. 108A is a partial cross-sectional view of the embodiment shown in FIG. 108.

FIG. 108B is a top view of the embodiment shown in FIG. 108.

FIG. 109 is a sketch of a seventh embodiment of a valve in accordance with the invention.

FIG. 109A is a partial cross-sectional view of the embodiment shown in FIG. 109.

FIG. 109B is a top view of the embodiment shown in FIG. 109.

FIGS. 110A and 110B are sketches of variations of a valve in accordance with the invention showing the use of a cylinder valve.

Figure 111A:
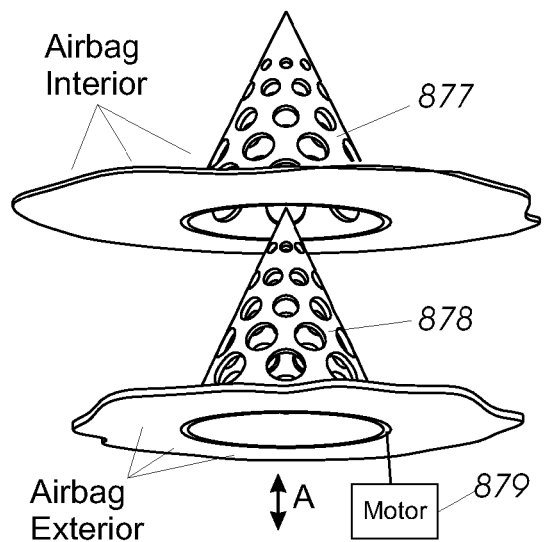
Figure 111B:
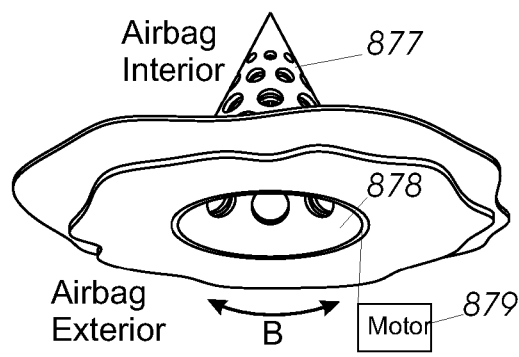

FIGS. 111A and 111B are sketches of variations of a valve in accordance with the invention showing the use of a cone-shaped valve.

Figure 112:
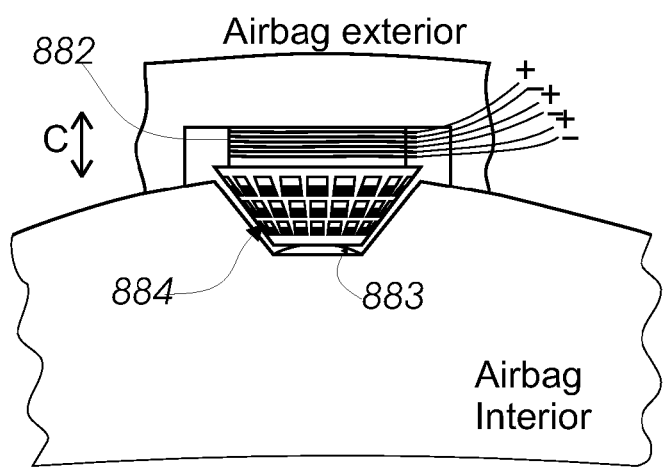

FIG. 112 is an illustration of a discharge valve including stacked drive elements.

FIG. 113 is a partial cross section of a vehicle passenger compartment illustrating a curtain airbag in the folded condition prior to deployment.

FIG. 114 is an enlarged view of airbag module shown in FIG. 113.

FIGS. 115A and 115B are cross-sectional views taken along the line 115-115 in FIG. 114.

Figure 53D:
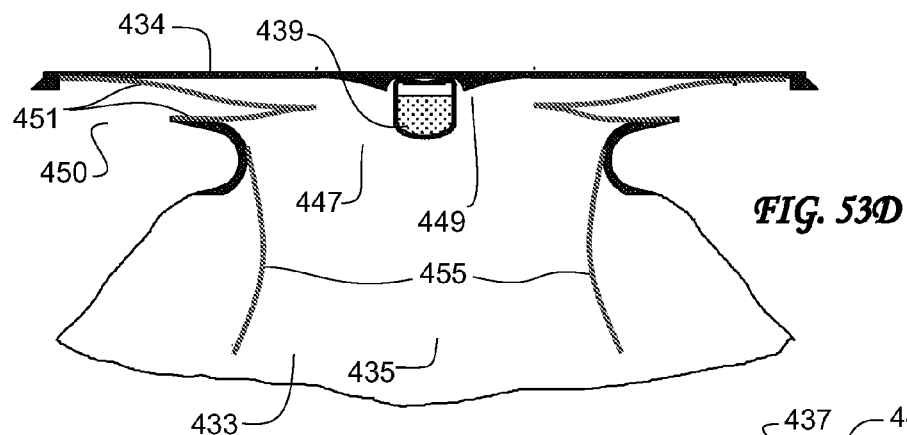
FIG. 53D is a cross-sectional view similar to FIG. 53C after the airbag has deployed showing the substantial closure of the aspirating ports.
Figure 53E:
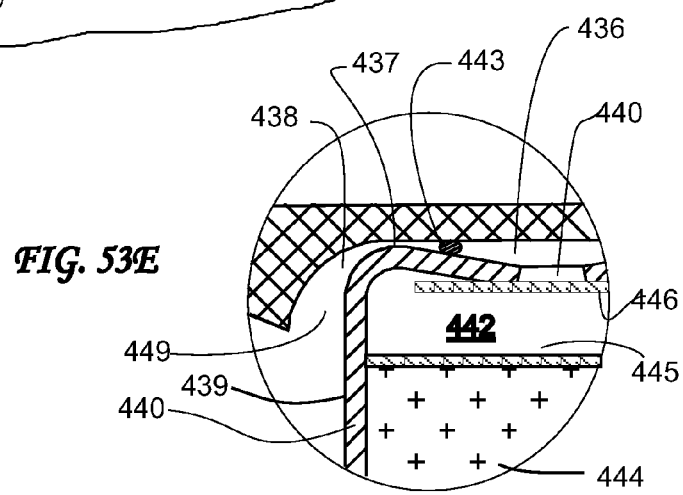
FIG. 53E is an enlarged view of the high pressure gas generator nozzle taken within circle 53E of FIG. 53A.
Figure 53F:
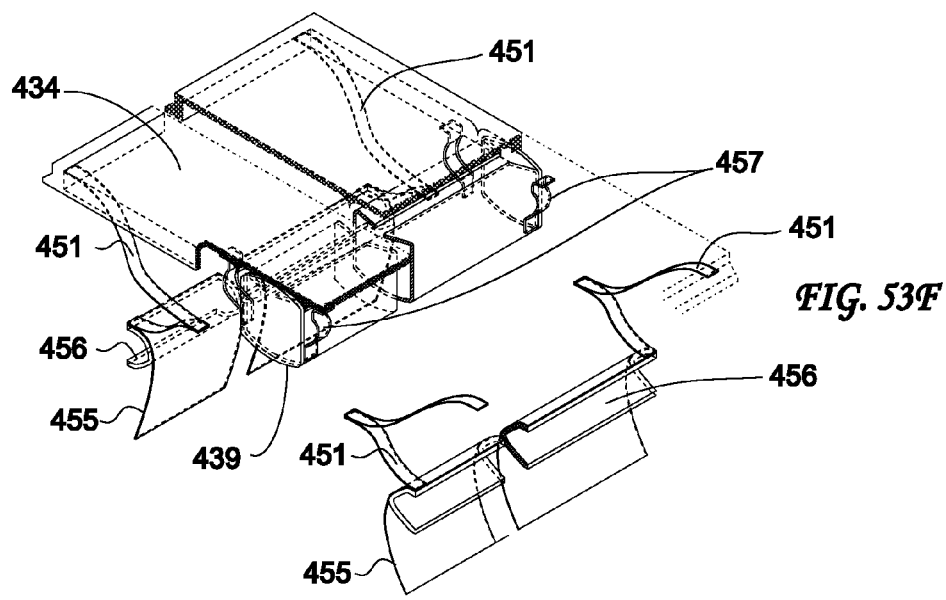
FIG. 53F is a perspective view of the apparatus of FIG. 53A, with the airbag and other parts cut away and removed.
Figure 53G:
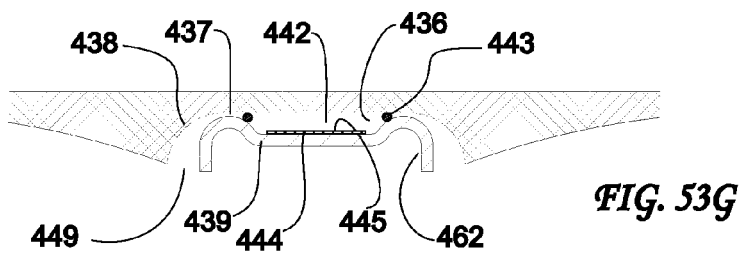
FIG. 53G is a cross-sectional view of the apparatus of FIG. 53A with parts cut away and removed illustrating an alternate configuration of the invention wherein a slow burning propellant in the form of a thin flat sheet is used.
Figure 53I:
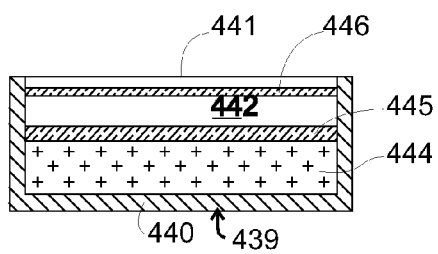
FIG. 53I is a longitudinal cross-sectional view of the inflator module shown in FIG. 53A.
Figure 53H:
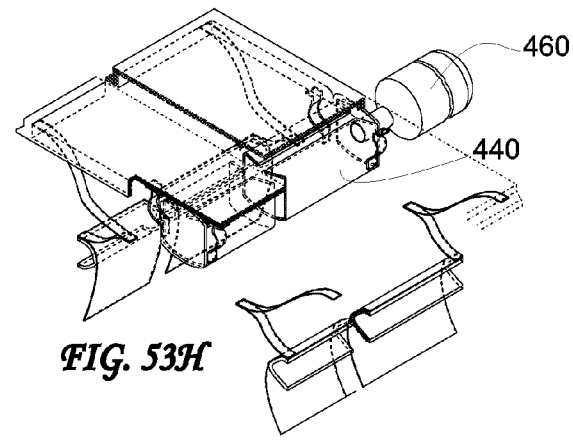
FIG. 53H is a perspective view of the apparatus as shown in FIG. 53F wherein a separate inflator is used in place of the propellant in the tube of FIG. 53A and the tube is used here as a method of dispensing the output from the inflator to the aspirating nozzle design of this invention.

FIG. 116 is an illustration of a side curtain airbag device with an aspirated inflator located on one end in contrast to FIG. 53H where the aspiration takes place along the entire module.

FIG. 116A is an enlarged view of the section designated 116A in FIG. 116.

FIG. 117 shows an alternative elongate inflator for use as a thin distributed inflator for side curtain airbags for mounting on the roof rail.

FIG. 117A is a cross-sectional view taken along the line 117A in FIG. 117.

Figure 118A:
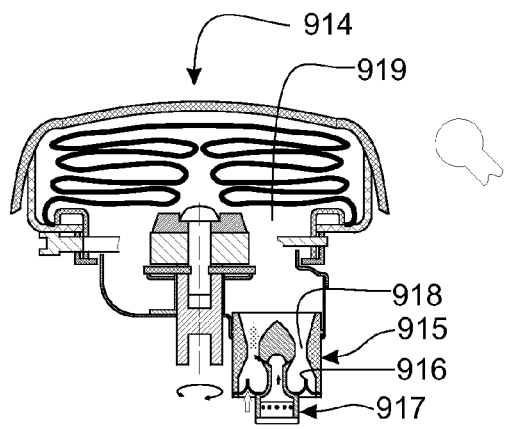
Figure 118B:
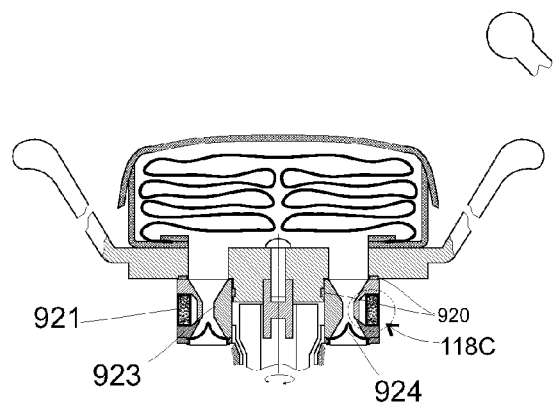
Figure 118C:
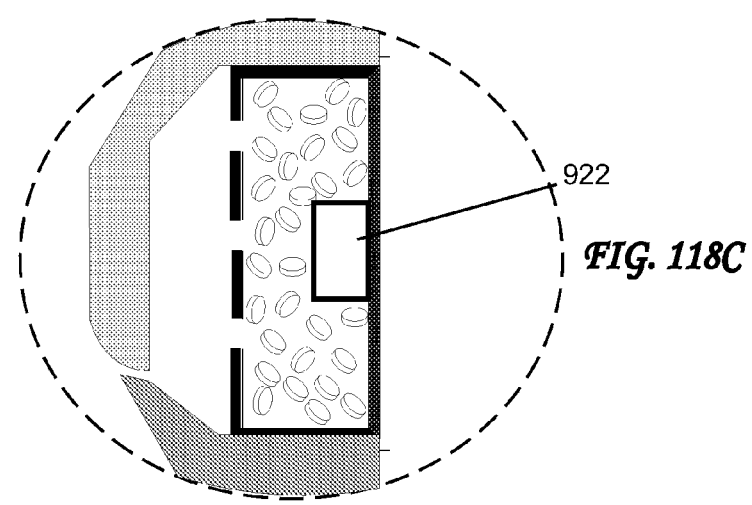

FIGS. 118A and 118B show aspirated driver side steering wheel-mounted aspirated inflators and airbag modules for a non rotating inflator, while FIG. 118C is an enlarged view of the area designated 118C in FIG. 118B.

Figure 119A:
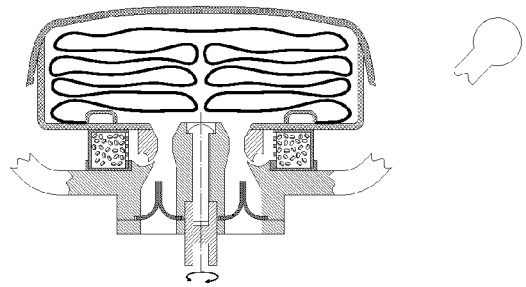
Figure 119B:
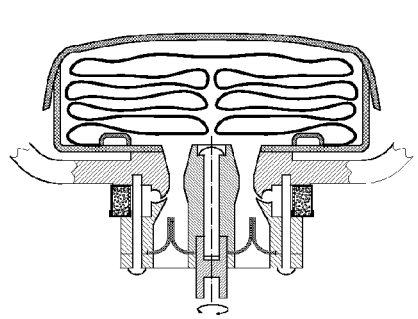

FIGS. 119A and 119B show aspirated driver side steering wheel-mounted aspirated inflators and airbag modules where the inflator rotates with the airbag module.

DETAILED DESCRIPTION OF THE PREFERRED EMBODIMENTS

1 Crash Sensors

1.1 Pattern Recognition Approach to Crash Sensing

Throughout much of the discussion herein, the neural network will be used as an example of a pattern recognition technique or algorithm since the neural network is one of the most developed of such techniques. However, it has limitations that are now being addressed with the development of newer pattern recognition techniques as well as better neural network techniques such as combination or modular neural networks. These limitations involve the difficulty in describing the process used in classifying patterns with the result that there is a fear that a pattern that was not part of the training set might be missed. Also, the training process of the neural network does not guarantee that convergence to the best solution will result. One such example is the local minimum problem wherein the training algorithm converges on a result that is not the best overall or global solution. These problems are being solved with the development of newer pattern recognition techniques such as disclosed in various U.S. patents and technical papers. One invention disclosed herein is the use of pattern recognition techniques including neural networks, regardless of the particular technique, to provide a superior smart airbag system. In particular, genetic algorithms are being applied to aid in selecting the best of many possible choices for the neural network architecture. The use of genetic algorithms helps avoid the local minimum situation mentioned above since several different architectures are tried and the best retained.

The pattern recognition algorithm, which forms an integral part of the crash sensor described herein, can be implemented either as an algorithm using a conventional microprocessor, FPGA or ASIC or through a neural computer. In the first case, the training is accomplished using a neural pattern recognition program and the result is a computer algorithm frequently written in the C computer language, although many other computer languages such as FORTRAN, assembly, Basic, etc. could be used. In the last case, the same neural computer can be used for the training as used on the vehicle. Neural network software for use on a conventional microcomputer is available from several sources such as International Scientific Research, Panama City, Panama. An example of a neural network-based crash sensor algorithm produced by ISR software after being trained on a crash library created by using data supplied by an automobile manufacturer for a particular model vehicle plus additional data created by using the techniques of crash and velocity scaling is:

```
* Neural net for crash sensor. 23 August 94. 50 input nodes,
* 6 hidden nodes (sigmoid transfer function), 1 output node (value 0 or 1).
* Network was trained using back propagation with Logicon Projection.
* Yin(1-50) are raw input values. Xin(1-50) are scaled input values.
* Yin(50) is the sum of the latest 25 accelerations, in tenths of a g,
* Yin(49) is the sum of the previous 25, etc. The time step is
80 microsecond.
logical function nnmtlpn3( Yin, firesum, Yout )
real*4 firesum, Yin(50), Yout
integer i, j
real*4 biashid(6), biasout, fire_criterion, hiddenout(6), NormV, NV(4),
& offset_in(50), offset_out, scale_in(50), scale_out, wgthid(51,6),
& wgtout(6), Xin(51), Xsum
parameter( fire_criterion = 0.0 )
data scale_in/ (omitted) /
data offset_in/ (omitted) /
data scale_out, offset_out / 0.625, 0.5 /
data NV/ 2.0, 7.0, 7.0711002, 50.000458 /
data biashid/ -49.110764, -69.856407, -48.670643,
& -48.36599, -52.745285, -49.013027 /
data biasout/ 0.99345559 /
data wgthid/ (omitted) /
data wgtout/ (omitted) /
NormV = 0.0
do i=1,50
Xin(i) = scale_in(i) * Yin(i) - offset in(i)
NormV = NormV + Xin(i) * Xin(i)
enddo
NormV = NV(1) * NV(2) * NV(3) / ( NV(4) + NormV)
do i=1,50
Xin(i) = NormV * Xin(i)
enddo
Xin(51) = NV(2) - NV(3) * NormV
do i=1,6
Xsum = biashid(i)
do j=1,51
Xsum = Xsum + wgthid(j,i) * Xin(j)
enddo
hiddenout(i) = 1.0 / ( 1.0 + exp( -Xsum ) )
enddo
firesum = biasout
do i=1,6
firesum = firesum + wgtout(i) * hiddenout(i)
enddo
Yout = offset_out + scale_out * tanh(firesum)
if( firesum .GE. fire_criterion ) then
nnmtlpn3 = .TRUE.
else
nnmtlpn3 = .FALSE.
endif
return
end
```

Neural computers on a chip are now available from various chip suppliers. These chips make use of massively parallel architecture and allow all of the input data to be processed simultaneously. The result is that the computation time required for a pattern to be tested changes from the order of milliseconds for the case of the microprocessor-implemented system to the order of tens to hundreds of microseconds for the neural computer. With this computational speed, one neural computer can easily be used for several pattern recognition implementations simultaneously even during the crash event including dynamic out-of-position and crash sensing. A discussion of the structure of such a neural computer can be found on page 382 of *Digital Neural Networks*, by Kung, S. Y., PTR Prentice Hall, Englewood Cliffs, N.J., 1993.

An example of an algorithm produced by such software after being trained on a crash library created by using data supplied by an automobile manufacturer for a particular model vehicle plus additional data created by using the techniques of crash and velocity scaling is illustrated above. In this case, the network was trained to give a value of 1 for triggering the airbag and 0 for not triggering. In the instant case, this value would depend on the type of gas control module that is used and in general would vary continuously from 0 to 1 with the particular value indicative of the action to be taken by the gas control module, such as adding more gas to the airbag.

Examples of neural networks in several forms will be discussed in more detail below in several sections of this application.

1.2 Electronic Crash Sensors

Figure 1:
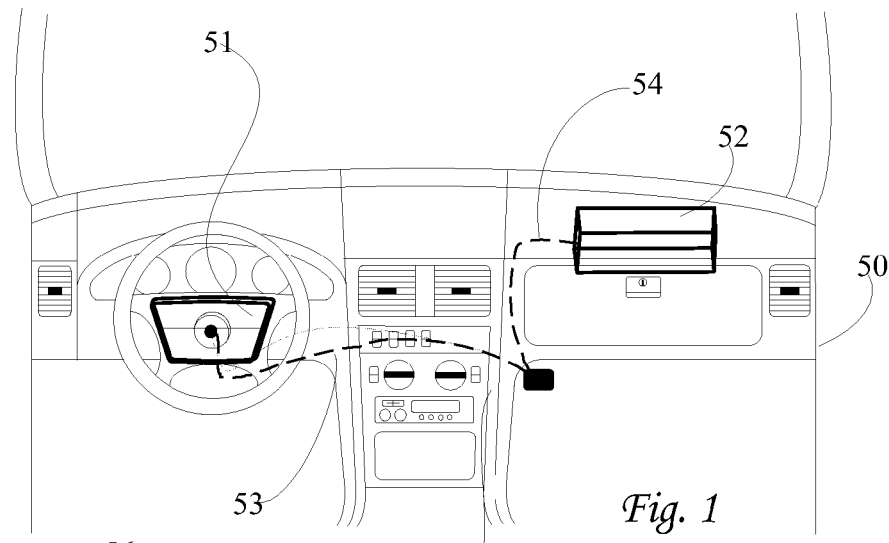
FIG. 1 is a view of the front of the passenger compartment of a motor vehicle, with portions cut away and removed, having dual airbags and a single point crash sensor and crash severity forecaster including an accelerometer and using a pattern recognition technique.

An airbag electronic sensor and diagnostic module (SDM) is typically mounted at a convenient location in the passenger compartment such as the transmission tunnel or firewall. FIG. 1 is a view of the front of a passenger compartment 50 of an automobile with portions cut away and removed, having dual airbags 51, 52 and an SDM 55 containing a non crush zone electronic crash sensor and crash forecasting algorithm, (hereinafter this combination will be referred to as a crash sensor) comprising one to three accelerometers and zero to three gyroscopes 56, one or more analog to digital converters (ADC) 57 and a pattern recognition algorithm contained within a microprocessor 59, all of which may be mounted on a single circuit board and electrically coupled to one another (see FIG. 1A). Alternately, the microprocessor 59 can be a neural computer.

A tri-axial accelerometer is a device that includes three accelerometers and measures accelerations in three orthogonal directions that are typically the longitudinal, lateral and vertical directions, although there are sometimes reasons to use a different orientation. Such a different orientation can be useful to remove some of the bias errors in the accelerometers by, for example, allowing each accelerometer to be partially influenced by gravity. Also, in some applications, the tri-axial accelerometer is intentionally rotated relative to the vehicle to expose different accelerometers to gravity again for accuracy calibration purposes. An alternate method is to electronically test the acceleration sensing elements by exposing them to an electric field and measure their response. Such an accelerometer is called a "testable" accelerometer.

The circuit board of the SDM 55 also optionally contains a capacitor 61 as a backup power supply, other electronic components 58 and various circuitry. The SDM is connected to the airbags 51, 52 with wires 53 and 54 (shown in dotted lines in FIG. 1), although a wireless electrical connection is also a possibility as wireless data transfer has become more reliable. In this embodiment, the pattern recognition technique used is a neural network that analyzes data from one, two or three accelerometers, and optionally up to three gyroscopes, to determine whether the vehicle is experiencing a crash from any direction. Alternately, an IMU may be used. If the neural network determines, e.g., by analysis of a pattern in the signals emanating from the accelerometer(s) 56 and gyroscope(s) 56, that the accident merits deployment of one or more protection or restraint systems, such as a seatbelt retractor, frontal or side airbag, or a movable headrest, it initiates such deployment and thus constitutes in this regard airbag deployment initiation means. It also may determine the settings for an airbag inflation/deflation control module which determines how much gas is to be generated, how fast it is to be generated, how much should be fed into the airbag, how much should be dumped to the atmosphere and/or how much should be permitted to exhaust from the airbag. The particular method and apparatus for controlling the flows of gas into and/or out of the airbag will depend on the particular system design. The controller for any such system will hereinafter be referred to as the gas control module and is illustrated in FIG. 1A schematically as 60.

For frontal impacts, for example, a signal is sent through wires 53 and 54 to initiate deployment of airbags 51 and 52 and to control the gas flow into and/or out of each airbag 51, 52 through the gas control modules (not shown) for each airbag. The ADC 57 is connected to the acceleration sensor, in this case the tri-axial accelerometer 56, and converts an analog signal generated by one or more of the accelerometers 56 representative of the acceleration thereof, and thus the vehicle, into a digital signal. In one embodiment, the ADC 57 may derive the digital signal from the integral of the analog signal. Naturally, many of the components of the printed circuit board can be incorporated into an ASIC as is obvious to those skilled in the art.

The tri-axial accelerometer and/or gyroscopes 56 (or IMU) are mounted by suitable mounting structure to the vehicle and can be mounted in a variety of positions to sense, e.g., frontal impacts, side impacts, rear impacts and/or rollovers. In another embodiment described below, the microprocessor 59 may include a detection system for detecting when the occupant to be protected by the deployable airbags 51, 52 is out-of-position and thereupon to suppress deployment thereof. Also, the detection system may be applied to detect the presence of a rear-facing child seat positioned on a passenger seat and thereupon to suppress deployment of the airbag. In each case, the microprocessor or neural computer 59 performs an analysis on signals received from appropriate sensors and corresponding ADCs. Recent advances in computational theory suggest that a form of computation using analog data rather than digital data may become viable. One example is the use of optical correlators for object detection and identification in the military where the optical signal from a video scene is converted to its Fourier transform using diffraction techniques.

Figure 1A:
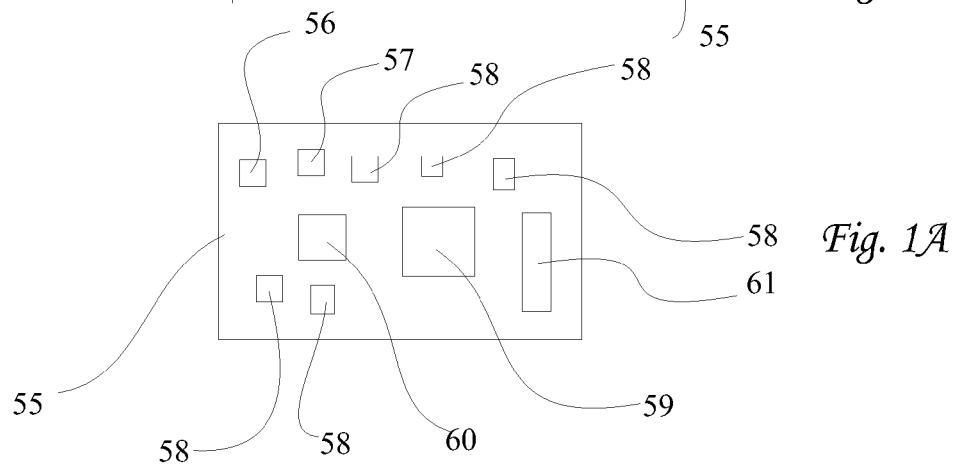
FIG. 1A is an enlarged view of the sensor and diagnostic module shown in FIG. 1.

The pattern recognition crash sensor described and illustrated in FIGS. 1 and 1A is capable of using information from three accelerometers 56, for example, each measuring acceleration from an orthogonal direction. As will be described in more detail below, other information can also be considered by the pattern recognition algorithm such as the position of the occupants, noise, data from anticipatory acoustic, radar, infrared or other electromagnetic sensors, seat position sensors, seatbelt sensors, speed sensors, gyroscopes or any other information present in the vehicle which is relevant. Since the pattern recognition algorithm is trained on data from real crashes and non-crash events, it can handle data from many different information sources and sort out what patterns correspond to airbag-required events in a way that is nearly impossible for an engineer to do. For this reason, a crash sensor based on neural networks, for example, will invariably perform better than one devised by engineers. The theory of neural networks including many examples can be found in several books on the subject including: *Techniques and Application of Neural Networks*, edited by Taylor, M. and Lisboa, P., Ellis Horwood, West Sussex, England, 1993; *Naturally Intelligent Systems*, by Caudill, M. and Butler, C., MIT Press, Cambridge Mass., 1990; J. M. Zaruda, *Introduction to Artificial Neural Systems*, West Publishing Co., N.Y., 1992 and, *Digital Neural Networks*, by Kung, S. Y., PTR Prentice Hall, Englewood Cliffs, N.J., 1993, Eberhart, R., Simpson, P. and Dobbins, R., *Computational Intelligence PC Tools*, Academic Press, Inc., 1996, Orlando, Fla. The neural network pattern recognition technology is one of the most developed of pattern recognition technologies. Newer and more efficient systems are now being developed such as the neural network system which is being developed by Motorola and is described in U.S. Pat. No. 5,390,136 and U.S. Pat. No. 5,517,667. The neural network will be used here to illustrate one example of a pattern recognition technology but it is emphasized that this invention is not limited to neural networks. Rather, the invention may apply any known pattern recognition technology. A brief description of the neural network pattern recognition technology is set forth below.

Figure 2:
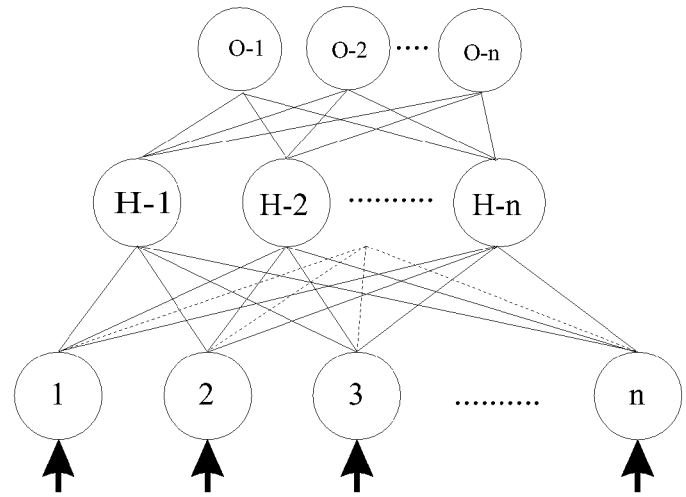
FIG. 2 is a diagram of a neural network used for a crash sensor and crash severity forecaster designed based on the teachings of invention and having more than one output node.

A diagram of one example of a neural network used for a crash sensor designed based on the teachings of this invention is shown in FIG. 2. The process can be programmed to begin when an event occurs which indicates an abnormal situation such as the acceleration in the longitudinal direction, for example, exceeding the acceleration of gravity, or it can take place continuously depending on the demands on the computer system. The digital acceleration values from the ADC 57 may be pre-processed, for example by filtering, and then entered successively into nodes 1, 2, 3, . . . , N (this entry represented by the arrows) and the neural network algorithm compares the pattern of values on nodes 1 through N with patterns for which it has been trained. Each of the input nodes is connected to each of the second layer nodes h-1, . . . , h-n, called the hidden layer, either electrically as in the case of a neural computer, to be described below, or through mathematical functions containing multiplying coefficients called weights, also described in more detail below. The weights are determined during the training phase while creating the neural network as described in detail in the above text references. At each hidden layer node, a summation occurs of the values from each of the input layer nodes, which have been operated on by functions containing the weights, to create a node value. Similarly, the hidden layer nodes are connected to the output layer nodes O-1, O-2, . . . , O-n, which can be only a single node representing the control parameter to be sent to the gas control module, for example. If this value exceeds a certain threshold, the gas control module initiates deployment of the airbag.

During the training phase, an output node value is assigned for every setting of the gas control module corresponding to the desired gas flow for that particular crash as it has occurred at a particular point in time. As the crash progresses and more acceleration values appear on the input nodes, the value of the output node may change. In this manner, as long as the crash is approximately represented in the training set, the gas flow can be varied at each one or two milliseconds depending on the system design to optimally match the quantity of gas in the airbag to the crash as it is occurring. Similarly, if an occupant sensor and a weight sensor are present, that information can additionally be fed into a set of input nodes so that the gas module can optimize the quantity of gas in the airbag taking into account both the crash deceleration and also the position, velocity, size and/or weight of the occupant to optimally deploy the airbag to minimize airbag induced injuries and maximize the protection to the occupant. Details of the manner in which a neural network process operates and is trained are described in above-referenced texts and will not be presented in detail here.

A time step, such as two milliseconds, is selected as the period in which the ADC pre-processes the output from the accelerometers and feeds data to input node 1. Thus, using this time step, at time equal to 2 milliseconds from the start of the process, node 1 contains a value obtained from the ADC and the remaining input nodes have a random value or a value of 0. At time equal 4 milliseconds, the value that was on node 1 is transferred to node 2 (or the node numbering scheme is advanced) and a new value from the ADC is fed into node 1. In a similar manner, data continues to be fed from the ADC to node 1 and the data on node 1 is transferred to node 2 whose previous value was transferred to node 3 etc. The actual transfer of data to different memory locations need not take place but only a redefinition of the location that the neural network should find the data for node 1. For one preferred embodiment of this invention, a total of one hundred input nodes were used representing two hundred milliseconds of acceleration data. At each step, the neural network is evaluated and if the value at the output node exceeds some value such as 0.5, then the airbags are deployed by the remainder of the electronic circuit. In this manner, the system does not need to know when the crash begins, that is, there is no need for a separate sensor to determine the start of the crash or of a particular algorithm operating on the acceleration data to make that determination.

In the example above, one hundred input nodes were used, along with twelve hidden layer nodes and one output layer node. Accelerations from only the longitudinal direction were considered. If other data such as accelerations from the vertical or lateral directions or the output from a number of gyroscopes were also used, then the number of input layer nodes would increase. If the neural network is to be used for sensing rear impacts, or side impacts, 2 or 3 output nodes might be used, one for each gas control module, headrest control module etc. Alternately, combination, modular or even separate neural networks can be used. The theory for determining the complexity of a neural network for a particular application is the subject of many technical papers and will not be presented in detail here. Determining the requisite complexity for the example presented herein can be accomplished by those skilled in the art of neural network design and is discussed briefly below. In another implementation, the integral of the acceleration data is used and it has been found that the number of input nodes can be significantly reduced in this manner.

The neural network described above defines a method of sensing a crash and determining whether to begin inflating a deployable occupant protection device, and at what rate, and comprises:

(a) obtaining one or more acceleration signals from one or more accelerometers mounted on a vehicle;

(b) converting the acceleration signal(s) into a digital time series which may include pre-processing of the data;

(c) entering the digital time series data into the input nodes of a neural network;

(d) performing a mathematical operation on the data from each of the input nodes and inputting the operated-on data into a second series of nodes wherein the operation performed on each of the input node data prior to inputting the operated on value to a second series node is different from that operation performed on some other input node data;

(e) combining the operated-on data from all of the input nodes into each second series node to form a value at each second series node;

(f) performing a mathematical operation on each of the values on the second series of nodes and inputting the operated-on data into an output series of nodes wherein the operation performed on each of the second series node data prior to inputting the operated on value to an output series node is different from that operation performed on some other second series node data;

(g) combining the operated on data from all of the second series nodes into each output series node to form a value at each output series node; and, (h) initiating gas flow into an airbag if the value on one output series node is within a selected range signifying that a crash requiring the deployment of an airbag is underway; and (i) causing the amount of gas flow into or out of the airbag to depend on the value on that one output series node.

The particular neural network described and illustrated above contains a single series of hidden layer nodes. In some network designs, more than one hidden layer is used although only rarely will more than two such layers appear. There are of course many other variations of the neural network architecture illustrated above which appear in the literature.

The implementation of neural networks can have at least two forms, an algorithm programmed on a digital microprocessor or in a neural computer. Neural computer chips are now available and neural computers can be incorporated into ASIC designs. As more advanced pattern recognition techniques are developed, specially designed chips can be expected to be developed for these techniques as well.

FIG. 3 provides the results of a neural network pattern recognition algorithm, as presented in U.S. Pat. No. 5,684, 701 referenced above, for use as a single point crash sensor. The results are presented for a matrix of crashes created according to the velocity and crash scaling techniques presented in the above-referenced papers (1-13). The table contains the results for different impact velocities (vertical column) and different crash durations (horizontal row). The results presented for each combination of impact velocity and crash duration consist of the displacement of an unrestrained occupant at the time that airbag deployment is initiated and 30 milliseconds later. This is presented here as an example of the superb results obtained from the use of a neural network crash sensor that forms a basis of the instant invention. In FIG. 3, the success of the sensor in predicting that the velocity change of the accident will exceed a threshold value is demonstrated. In the instant invention, this capability is extended to where the particular severity of the accident is (indirectly) determined and then used to set the flow of gas into and/or out of the airbag to optimize the airbag system for the occupant and the crash severity.

Airbags have traditionally been designed based on the assumption that 30 milliseconds of deployment time is available before the occupant, as represented by an unbelted dummy corresponding to the average male, has moved five inches. An occupant can be seriously injured or even killed by the deployment of the airbag if he or she is too close to the airbag when it deploys and in fact many people, particularly children and small adults, have now been killed in this manner. It is known that this is particularly serious when the occupant is leaning against the airbag when it deploys which corresponds to about 12 inches of motion for the average male occupant, and it is also known that he will be uninjured by the deploying airbag when he has moved less than 5 inches when the airbag is completely deployed. These dimensions are based on the dummy that represents the average male, the so-called 50% male dummy, sitting in the mid-seating position.

The threshold for significant injury is thus somewhere in between these two points and thus for the purposes of this table, two benchmarks have been selected as being approximations of the threshold of significant injury. These benchmarks are, based on the motion of an unrestrained occupant, (i) if the occupant has already moved 5 inches at the time that deployment is initiated, and (ii) if the occupant has moved 12 inches by the time that the airbag is fully deployed. Both benchmarks really mean that the occupant will be significantly interacting with the airbag as it is deploying. Other benchmarks could of course be used; however, it is believed that these two benchmarks are reasonable lacking a significant number of test results to demonstrate otherwise, at least for the 50% male dummy.

The tables shown in FIGS. 3 and 4, therefore, provide data as to the displacement of the occupant relative to the airbag at the time that deployment is initiated and 30 milliseconds later. If the first number is greater than 5 inches or the second number greater than 12 inches, it is assumed that there is a risk of significant injury and thus the sensor has failed to trigger the airbag in time. For these cases, the cell in the table has been shaded. As can be seen in FIG. 3, which represents the neural network crash sensor designed according to the teachings of this invention, none of the cells are shaded so the performance of the sensor is considered excellent.

The table shown in FIG. 4 represents a model of a single point crash sensor used on several production vehicle models in use today. In fact, it was designed to be optimized for the crashes shown in the table. As shown in FIG. 4, the sensor fails to provide timely airbag deployment in a significant percentage of the crashes represented in the table. Since that sensor was developed, several manufacturers have developed crash sensor algorithms by trial and error that probably perform better than that which would provide the results shown in FIG. 4. It is not possible to ascertain the success of these improved sensors since the algorithms are considered proprietary. Note, the figures used including the 50% male, 30 milliseconds and travel distances of 5 and 12 inches are assumptions and simplifications that are not necessary once occupant sensors are installed in vehicles.

One additional feature, which results from the use of the neural network crash sensor of this invention, is that at the time the decision is made to deploy the airbag and even for as long afterward as the sensor is allowed to run, in the above example, 200 milliseconds of crash data is stored in the network input nodes. This provides a sort of "black box" which can be used later to accurately determine the severity of the crash as well as the position of the occupant at the time of the crash. If some intermediate occupant positions are desired, they could be stored on a separate non-volatile memory.

Above, the sensing of frontal impacts has been discussed using a neural network derived algorithm. A similar system can be derived for rear and side impacts especially if an anticipatory sensor is available as will be discussed below. An IMU located at a single location in a vehicle can do an excellent job of monitoring the motions of the vehicle that could lead to accidents including pre-crash braking, excessive yaw or pitching or roll which could lead to a rollover event. If the vehicle also has a GPS system, then the differential motion of the vehicle over a period of one second as measured by the GPS can be used to calibrate the IMU eliminating all significant errors. This is done using a Kalman filter. If a DGPS system is also available along with an accurate map, then the vehicle will also know its precise position within centimeters. This however is not necessary for calibrating and thereby significantly improving the accuracy of the IMU and thus the vehicle motion can be known approximately 100 times better than systems that do not use such a GPS-calibrated IMU. This greatly enhances the ability of vehicle systems to avoid skidding, rollover and other out-of-control situations that frequently lead to accidents, injuries and death. This combination of an inexpensive perhaps MEMS-based IMU with GPS and a Kalman filter has previously not been applied to a vehicle for safety and vehicle control purposes although the concept has been used with a DGPS system for farm tractors for precision farming.

With an accurate IMU, as mentioned above, the weight of a variably loaded vehicle can be determined and sent by telematics to a weigh station thereby eliminating the need for the vehicle to stop and be weighed.

Such an accurate IMU can also be used to determine the inertial properties of a variably loaded vehicle such as a truck or trailer. In this case, the IMU output can be analyzed by appropriate equations of a neural network, and with assumed statistical road properties plus perhaps some calibration for a particular vehicle, to give the center of mass of the vehicle as well as its load and moments of inertia. With this knowledge plus even a crude digital map, a driver can be forewarned that he might wish to slow down due to an upcoming curve. If telematics are added, then the road properties can be automatically accumulated at an appropriate off-vehicle location and the nature of the road under all weather conditions can be made available to trucks traveling the road to minimize the chance of accidents. This information plus the output of the IMU can significantly reduce truck accidents. The information can also be made available to passing automobiles to warn them of impending potential problems. Similarly, if a vehicle is not behaving appropriately based on the known road geometry, for example if the driver is wandering off the road, traveling at an excessive speed for conditions or generally driving in an unsafe manner, the off-vehicle site can be made aware of the fact and remedial action taken.

There are many ways to utilize one or more IMUs to improve vehicle safety and in particular to prevent rollovers, out-of-control skidding, jack-knifing etc. In a simple implementation, a single IMU is placed at an appropriate location such as the roof of a truck or trailer and used to monitor the motion over time of the truck or trailer. Based on the assumption that the road introduces certain statistically determinable disturbances into the vehicle, such monitoring over time can give a good idea of the mass of the vehicle, the load distribution and its moments of inertia. It can also give some idea as to the coefficient of friction on the tires against the roadway. If there is also one or more IMUs located on the vehicle axle or other appropriate location that moves with the wheels, then a driving function of disturbances to the vehicle can also be known leading to a very accurate determination of the parameters listed above especially if both a front and rear axle are so equipped. This need not be prohibitively expensive as IMUs are expected to break the $100 per unit level in the next few years.

As mentioned above, if accurate maps of information from other vehicles are available, the IMUs on the axles may not be necessary as the driving function would be available from such sources. Over the life of the vehicle, it would undoubtedly be driven empty and full to capacity so that if an adaptive neural network is available, the system can gradually be trained to quickly determine the vehicle's inertial properties when the load or load distribution is changed. It can also be trained to recognize some potentially dangerous situations such as loads that have become lost resulting in cargo that shifts during travel.

If GPS is not available, then a terrain map can also be used to provide some corrections to the IMU. By following the motion of the vehicle compared with the known geometry of the road, a crude deviation can be determined and used to correct IMU errors. For example, if the beginning and end of a stretch of a road is known and compared with the integrated output of the IMU, then corrections to the IMU can be made.

The MEMS gyroscopes used in a typical IMU are usually vibrating tuning forks or similar objects. Another technology developed by the Sciras Company of Anaheim, Calif., (The µSCIRAS multisensor, a Coriolis Vibratory Gyro and Accelerometer IMU) makes use of a vibrating accelerometer and shows promise of making a low cost gyroscope with improved accuracy. A preferred IMU is described in U.S. Pat. No. 471,125. One disclosed embodiment of a side impact crash sensor for a vehicle in accordance with the invention comprises a housing, a mass within the housing movable relative to the housing in response to accelerations of the housing, and structure responsive to the motion of the mass upon acceleration of the housing in excess of a predetermined threshold value for controlling an occupant protection apparatus. The housing is mounted by an appropriate mechanism in such a position and a direction as to sense an impact into a side of the vehicle. The sensor may be an electronic sensor arranged to generate a signal representative of the movement of the mass and optionally comprise a microprocessor and an algorithm for determining whether the movement over time of the mass as processed by the algorithm results in a calculated value that is in excess of the threshold value based on the signal. In the alternative, the mass may constitute part of an accelerometer, i.e., a micro-machined acceleration sensing mass. The accelerometer could include a piezo-electric element for generating a signal representative of the movement of the mass.

An embodiment of a side impact airbag system for a vehicle in accordance with an invention herein comprises an airbag housing defining an interior space, one or more inflatable airbags arranged in the interior space of the system housing such that when inflating, the airbag(s) is/are expelled from the airbag housing into the passenger compartment (along the side of the passenger compartment), and an inflator mechanism for inflating the airbag(s). The inflator mechanism may comprise an inflator housing containing propellant. The airbag system also includes a crash sensor as described above for controlling inflation of the airbag(s) via the inflator mechanism upon a determination of a crash requiring inflation thereof, e.g., a crash into the side of the vehicle along which the airbag(s) is/are situated. The crash sensor may thus comprise a sensor housing arranged within the airbag housing, external of the airbag housing, proximate to the airbag housing and/or mounted on the airbag housing, and a sensing mass arranged in the sensor housing to move relative to the sensor housing in response to accelerations of the sensor housing resulting from, e.g., the crash into the side of the vehicle. Upon movement of the sensing mass in excess of a threshold value, the crash sensor controls the inflator to inflate the airbag(s). The threshold value may be the maximum motion of the sensing mass required to determine that a crash requiring deployment of the airbag(s) is taking place.

The crash sensor of this embodiment, or as a separate sensor of another embodiment, may be an electronic sensor and the movement of the sensing mass may be monitored. The electronic sensor generates a signal representative of the movement of the sensing mass that may be monitored and recorded over time. The electronic sensor may also include a microprocessor and an algorithm for determining whether the movement over time of the sensing mass as processed by the algorithm results in a calculated value that is in excess of the threshold value based on the signal.

In some embodiments, the crash sensor also includes an accelerometer, the sensing mass constituting part of the accelerometer. For example, the sensing mass may be a micro-machined acceleration sensing mass in which case, the electronic sensor includes a micro-processor for determining whether the movement of the sensing mass over time results in an algorithmic determined value which is in excess of the threshold value based on the signal. In the alternative, the accelerometer includes a piezo-electric element for generating a signal representative of the movement of the sensing mass, in which case, the electronic sensor includes a microprocessor for determining whether the movement of the sensing mass over time results in an algorithmic determined value which is in excess of the threshold value based on the signal.

1.3 Crash Severity Prediction

In the particular implementation described above, the neural network could be trained using crash data from approximately 25 crash and non-crash events. In addition, the techniques of velocity and crash scaling, as described in the above-referenced technical papers, were used to create a large library of crashes representing many events not staged by the automobile manufacturer. The resulting library, it is believed, represents the vast majority of crash events that occur in real world accidents for the majority of automobiles. Thus, the neural network algorithm comes close to the goal of a universal electronic sensor usable on most if not all automobiles as further described in U.S. Pat. No. 5,684,701. The results of this algorithm as reported in the '701 patent for a matrix of crashes created by the above-mentioned velocity and crash scaling technique appears in FIGS. 7 and 8 of that patent (FIGS. 3 and 4 herein). An explanation of the meaning of the numbers in the table can be found in reference 2 above.

The '701 patent describes the dramatic improvement achievable through the use of pattern recognition techniques for determining whether the airbag should be deployed. Such a determination is really a forecasting that the eventual velocity change of the vehicle will be above an amount, such as about 12 mph, which requires airbag deployment. The instant invention extends this concept to indirectly predict what the eventual velocity change will in fact be when the occupant, represented by an unrestrained mass, impacts the airbag. Furthermore, it does so not just at the time that the deployment decision is required but also, in the preferred implementation, at all later times until adding or removing additional gas from the airbag will have no significant injury reducing effect. The neural network can be trained to predict or extrapolate this velocity but even that is not entirely sufficient. What is needed is to determine the flow rate of gas into and/or out of the airbag to optimize injury reduction which depends not only on the prediction or extrapolation of the velocity change at a particular point in time but must take into account the prediction that was made at an earlier point when the decision was made to inject a given amount of gas into the airbag. Also, the timing of when the velocity change will occur is a necessary parameter since gas is usually not only flowing into but out of the airbag and both flows must be taken into account. It is thus unlikely that an algorithm, which will perform well in all real world crashes, can be mathematically derived.

The neural network solves the problem by considering all of the acceleration up to the current point in the crash and therefore knows how much gas has been put into the airbag and how much has flowed out. It can be seen that even if this problem could be solved mathematically for all crashes, the mathematical approach becomes hopeless as soon as the occupant properties are added.

Once a pattern recognition computer system is implemented in a vehicle, the same system can be used for many other pattern recognition functions such as the airbag system diagnostic. Testing that the pattern of the airbag system during the diagnostic test on vehicle startup, as represented by the proper resistances appearing across the wires to the various system components, for example, is an easy task for a pattern recognition system. The system can thus do all of the functions of the conventional SDM, sensing and diagnostics, as well as many others.

1.4 Crush Zone Mounted Sensors

So far electronic sensors mounted in the passenger compartment for sensing crashes have been considered. It has also been pointed out that there is insufficient information in the passenger compartment to sense all crashes in time. The best place to sense a crash is where it is happening, that is, where the vehicle is crushing and in this section, crush zone sensing will be introduced.

Referring now to FIGS. 5-17, a crush zone mounted sensor constructed in accordance with the teachings of at least one invention herein for use in sensing frontal impacts is shown generally at 70 in FIG. 5. The sensor 70 comprises a unitary, tubular member having two vertical portions 84 and 85, a lower horizontal portion 86, two upper horizontal portions 87 and 88 and a rearward projecting portion 89. The sensor 70 is closed at an end 71 of horizontal portion 88, e.g., by welding, as described below and a header/connector 72 is attached to the sensor 70 at the end of portion 89.

The sensor 70 is mounted to the front of the vehicle as shown in FIG. 7 and is constructed of a tube 74 and a centrally located rod 73 as shown in FIG. 6, which is substantially coextensive with the tube 74 but normally not in contact therewith. The sensor 70 functions (for example by initiating airbag deployment) when it is bent at any position along the tube 74 with the exception of bent sections or bends 96 which join the vertical portions 84, 85 to the upper horizontal portions 87, 88, respectively, and where plastic spacers 75 prevent the rod 73 from contacting the tube 74.

When the sensor 70 is bent during a crash, the rod 73, which is made of an electrically conductive material and thus electrically conducting, approaches and potentially contacts the tube 74, which is also made of an electrically conductive material and thus electrically conducting. In addition to using the fact that when the rod 73 contacts the tube 74, an accident of sufficient severity as to require airbag deployment has occurred, there are other methods of using the rod-in-tube construction to sense crashes. One approach, for example, is to use appropriate circuitry to induce an electromagnetic wave in the tube 74 relative to the rod 73 with a wavelength what is approximately equivalent to the length of the tube 74. The wave reflects off of the end of the tube 74, which is connected to the rod 73 though an impedance device, typically a resistor.

If the impedance between the tube 74 and rod 73 changes along its length such as would happen if the tube 74 were bent or crushed, a reflection from the lower impedance point also occurs and by comparing the phase with the wave reflected off of the end of the tube 74, the location of the lower impedance point can be determined. By comparing the magnitudes of the intermediate reflected waves over time, the rate of change in the impedance can be determined and an estimate of the crush velocity obtained. Alternately, the time that the initial intermediate reflection first occurred can be noted and the time when the tube 74 contacts the rod 73 can also be noted and the difference divided into the deflection required to cause rod-to-tube contact at that particular location providing a measure of the crush velocity.

If this crush velocity is above the threshold for airbag deployment as determined by a processor (not shown) which is coupled to the header/connector 72 (and in a circuit with the rod 73 and tube 74), the airbag coupled to the processor can be deployed. If the sensor 70 is mounted far forward in the crush zone, then it will provide an early measurement of the crash velocity providing an earlier deployment decision than prior art velocity change sensors that are located on the crush zone boundary.

The shape of the sensor 70 shown in FIG. 5 or its rod-in-tube construction is not limiting and is shown for illustration purposes only. For the same vehicle shown in FIG. 7, other shapes of sensors may be used and for a vehicle with a different front end, the sensor may take any form sufficient to enable it to perform the desired functions, as described herein.

The rod 73 is maintained in a central location within the tube 74 as illustrated in FIG. 6 by means of the substantially cylindrical spacers 75 that are placed at each of the bends 96 in the tube 74 and, in one preferred embodiment, in the center of the lower horizontal portion 86 as shown in FIG. 6. The spacers 75 are made from an electrically non-conductive material, such as plastic or other suitable flexible material such as rubber, thus preventing the completion of the electric circuit through the spacers 75.

Although in the preferred embodiment shown in FIG. 5, spacers 75 are only placed in the bends 96 and at the center of the horizontal portion 86, in other embodiments, spacers 75 can be placed arbitrarily along the length of the sensor 70 in order to adjust the sensitivity of the sensor 70 to particular crash events. The effect of the spacers 75 is dramatic. The deflection required to cause electrical contact in the sensor at the center of the lower horizontal portion 86 is approximately 0.1 inches if the spacer 75 is not present, and greater than 1 inch if the spacer 75 is present.

Also, the tubular form of the sensor 70 is only a preferred embodiment, and it may have other cross-sectional forms, e.g., rectangular, oval or polygonal, depending on the particular need while the spacers 75 similarly are constructed to substantially conform to the interior shape of the sensor 70. The variable positioning of the spacers 75 provides the advantage of the selective sensitivity of the sensor 70 to crashes in specific areas along the length of the sensor 70. As shown, the spacers 75 extend circumferentially about the rod 73 only at discrete locations in the tube 74 so that entire circumferential portions of the rod 73 are spaced from the tube 74. When a coaxial cable is used as described below, spacers are not required as the entire space between the center and outer conductors is filled with dielectric material.

Although spacers 75 are shown to prevent electrical engagement of the rod 73 and the tube 74, other spacing mechanism may also be provided to achieve the same function.

The crush velocity sensor of this invention is shown mounted on a vehicle in FIG. 7 where a substantial portion of the vehicle has been removed to better illustrate how the sensor 70 is mounted. In the configuration in FIG. 7, the rearward portion 89 of the sensor 70 has been eliminated and the sensor 70 extends only toward the outside of the vehicle. The vehicle structure shown consists of an upper radiator support 81, two vertical radiator supports 82 and a lower radiator support 83. The two vertical radiator supports 82 and the lower radiator support 83 are attached to rails 90 which are the structures of the vehicle that support the front end.

A bumper structure 80 (of a particular vehicle) but not the bumper plastic cover is also illustrated in FIG. 7. The crush velocity sensor 70 in accordance with the invention is attached to the upper radiator support 81 by attachment structure, e.g., conventional hardware 76 and 77, and to the lower radiator support 83 by attachment structure, e.g., conventional hardware 78 and 79. Hardware elements 76, 77, 78, 79 are clamps having two holes for enabling a screw or nail to connect the clamps to the radiator supports. Obviously, any attachment structure is suitable for these purposes. Note that this arrangement is the furthermost to the rear of the vehicle that such a frontal impact sensor can be located. Generally, it will be located more forward in the crush zone.

Figures 7A, 7B, 8:
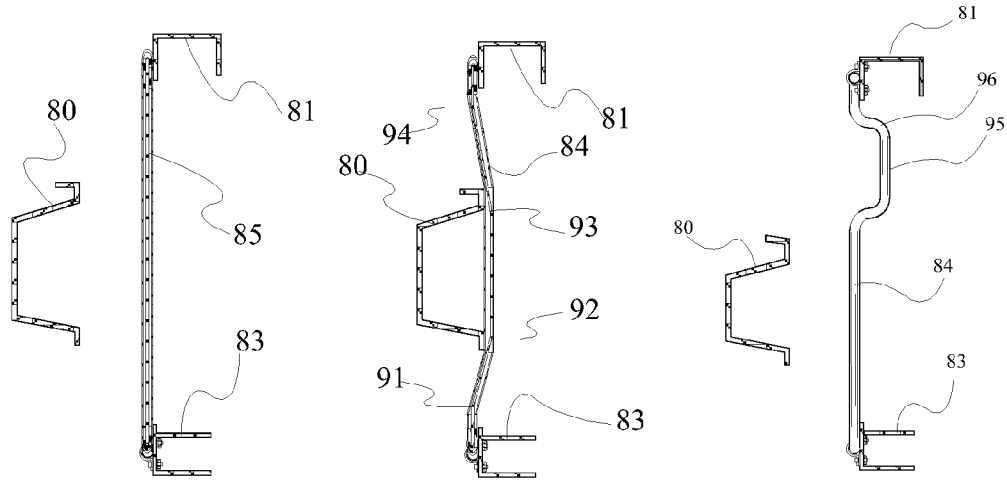
FIG. 7A is a view of a vertical segment of the sensor shown in FIG. 7 taken along line 7A-7A in a condition before being impacted by the vehicle bumper during a crash.
FIG. 7B is the same view of the sensor shown in FIG. 7A after being impacted by the vehicle bumper during a crash.
FIG. 8 is a partial view of an alternate configuration of a vertical portion of the sensor of FIG. 7 showing it displaced rearward to reduce its sensitivity to impacts above the bumper.

During a frontal impact with either a barrier or another vehicle, for example, bumper structure 80 is displaced toward the rear of the vehicle relative to the radiator supports 81, 82, 83 of the vehicle to a position where it impacts the vertical portions 84 and 85 of the crush sensor 70, which are mounted so as to be spaced away by attachments 76-79 and thereby not in contact with the vehicle. This sequence is illustrated in FIGS. 7A and 7B which are views taken along lines 7A-7A of FIG. 7. Upon impact with sensor vertical portion 85, bumper structure 80 causes the rod and tube assembly of sensor 70, and at least vertical portions 84, 85, to bend which in turn causes the rod 73 to move relatively closer to the inside of the tube 74, at locations 91, 92, 93, and 94, which can be measured by the change in impedance as is known to those skilled in the art. This is known as time domain reflectometry.

By measuring this change in impedance over time, an estimate of the crash velocity can be made. Alternately, by timing the interval from the first change in impedance until contact between the rod 73 and tube 74, the velocity can be determined and if above a threshold, the airbag can be deployed. Although in this case four contacts are made between the rod 73 and the tube 74, they will not occur simultaneously and thus the crush velocity can be determined based on the first occurrence. In this manner, any crash that causes the bumper structure 80 to be displaced toward the rear of the vehicle will permit the crash velocity to be determined.

A key advantage of the sensor in accordance with this invention is that it operates on bending. During a crash, the impact to a particular point in or on the vehicle cannot be guaranteed but the fact that a line across the front, side or rear of the vehicle will not remain straight can almost assuredly be guaranteed. Therefore, a sensor that is long and narrow and responds to bending will be highly reliable in permitting the crash velocity to be determined even in the most unusual crashes.

The sensor 70 in accordance with the invention can be designed to cover a significant distance across the vehicle as well as along both sides back almost to the B-pillar that increases the probability that it will be struck by crushed material and bent as the crush zone propagates in the vehicle during a crash. At the same time, the sensor 70 can be small so that it can be located in a position to sense the fact that one part of the vehicle has moved relative to some other part or that the structure on which the sensor 70 is mounted has deformed. In this regard, sensor 70 may be positioned at the rear of the crush zone of the vehicle but for reflectometry measurements it is most appropriately positioned as far forward in the vehicle as practical.

The particular implementation of the rod-in-tube is for illustration purposes only and many other technologies exist that permit the velocity change of a portion of an elongate sensor due to a crash to be determined and thereby the local velocity change of a part of a vehicle. Such alternate technologies include the use of distributed piezoelectric materials to measure local crush, and distributed accelerometers that are attached by rigid structures or arms that transfer the acceleration to accelerometers.

Not all crashes involve the bumper and in a survey of crashed vehicles (see SAE Paper No. 930650 (8)), as many as about 30% of the surveyed vehicles were involved in crashes where the bumper was not primarily involved. A typical crash of this type involves a vehicle that is braking and therefore pitching forward which lowers the front bumper and raises the rear bumper. If this first vehicle is struck in the rear by another, second vehicle which is similarly pitching, the second striking vehicle can impact the first struck vehicle with the front bumper of the second striking vehicle riding underneath the rear bumper of the first struck vehicle. In this case, the bumper of the first struck vehicle will impact the grill and radiator of the second striking vehicle and displace the vertical portions 84 and 85 of the crush switch sensor in accordance with this invention. As such, the crash velocity can be determined and the airbag deployed. The under-ride problem is compounded by the recent increase in the number of SUVs and pickup trucks which tend to have higher bumpers.

When the bumper structure 80 is involved in an accident, it generally maintains its structural shape until it begins impacting the radiator and other vehicular structures behind the radiator. This is after it has impacted the sensor 70. Since the bumper structure 80 has not yet deformed when it strikes the sensor 70, the sensor 70 senses the crush of the vehicle equivalent to the distance between the rear of the bumper structure 80 and the sensor 70, plus the amount of sensor deflection required to deform the sensor 70 and change its properties such as its impedance.

If the bumper structure 80 is not primarily involved in the accident, the amount of penetration into the vehicle required to activate the sensor 70, measured from the front of the bumper structure 80, will be greater by the amount of the thickness of the bumper structure 80. In this manner, the sensor system requires greater penetration into the vehicle in bumper underride crashes. This results in a longer sensing time which is desired when the sensor 70 is acting as a switch since such crashes are softer than those crashes which involve the bumper and therefore there is more time available before deployment of the airbag is required. On the other hand, for crash velocity sensors, it is desirable that the sensor be as far forward as practical since the sensor functions by measuring the velocity of the crash and not the crush. Sensor 70 can be designed to act in both capacities, as a velocity measuring device and as a crush measuring device, at the expense of somewhat later triggering.

In some cases, it is necessary to further desensitize the sensor to bumper underride type crashes to make the sensor less sensitive to deer impacts, for example. Every year in the U.S. there are more than 300,000 impacts with deer and in most cases, airbag deployment is not needed. Some currently used sensor systems, however, can cause the airbag to deploy on deer impacts. When impacted at high speeds, the crash pulse in the non-crush zone can be similar to the crash pulse from a barrier crash up to the time that the decision must be made to deploy the airbag. In such cases, electronic sensors operating on the non-crush zone crash pulse will determine that the airbag deployment is required. Currently used crush zone sensors may be mounted above the bumper and project outward from brackets attached to the upper radiator support. These sensors are impacted by a deer even at lower speeds and experience a velocity change sufficient to cause deployment of the airbag.

Crush velocity sensors in accordance with this invention, however, can be desensitized in a manner such as shown in FIG. 8 so as to render it insensitive to deer impacts (or impacts with other large animals). In this case, a section designated at 95, of at least the vertical portion 84 of the sensor 70, has been displaced rearward to render it less sensitive to deer impacts. Section 95 is substantially U-shaped. Vertical portion 84 and horizontal portion 86 can also be constructed with a rearwardly displaced portion to thereby enable adjustment of the degree of sensitivity of the sensor 70.

Figure 9:
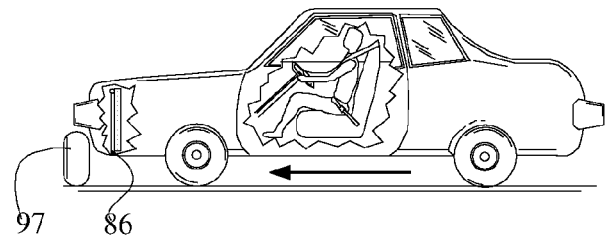
FIG. 9 is a view of a vehicle taken from the side, with certain portions removed, which is about to impact a low pole which misses the bumper, illustrating the ability of the sensor to respond to this type of crash.

Approximately 2% of frontal crashes involve impacts to the vehicle below the bumper. In a typical case, a vehicle impacts with a large stone, tree stump or short or low pole that miss the bumper. This type of accident is expected to become more common since in order to make vehicles more aerodynamic, vehicle hoods have been made lower and the radiators have also been lowered until as much as one-third of the radiator now projects below the lower edge of the bumper. An impact with a short pole or curb 97 such as shown in FIG. 9 where the pole 97 interacts with the lower portion of the radiator, can result in an airbag-required crash which will not be properly sensed by some sensor technologies, e.g., ball-in-tube based crush zone sensors. These crush zone sensors are typically mounted above the bumper and therefore would not be in the crush zone for this kind of a crash causing them to trigger on the non-crush zone crash pulse resulting in a late deployment of the airbag.

The preferred embodiment of the crush switch sensor of this invention shown in FIG. 9, on the other hand, stretches across the front of the vehicle and will trigger thereby causing the airbag to deploy in time for these crashes.

About the most common of all real-world airbag crashes involve impacts with poles. Pole impacts are some of the most difficult crashes to sense properly with current airbag sensor technology. Poles that can require airbag deployment vary in diameter from as little as about 4 inches to greater than about 24 inches. They involve such objects as fence posts, light poles, trees and telephone poles that are the most common obstacles found along the sides of roads. An impact into a pole at any position along the front of the vehicle can result in a serious accident requiring deployment of the airbag. The stiffness of the vehicle, however, varies significantly from one part of the front to the other. For most vehicles, the center front is the softest part of the vehicle, and the rails are the stiffest. In a typical accident, the bumper will buckle around a pole resulting in a soft crash pulse until the pole penetrates sufficiently into the vehicle that it begins to engage major structural members or the engine at which time, the pulse becomes very stiff. This type of crash pulse is particularly difficult for non-crush zone sensors to sense properly.

Pole crashes are typically staged by automobile manufacturers during their airbag development programs, but they are limited in scope. They typically involve large poles that are one foot or more in diameter and are usually run at high speeds. It has been found, however, that thin poles at low speeds are much more difficult to enable proper sensing for airbag deployment than thick poles at high speeds. They are also much more common in the real world. Non-crush zone sensors have a particularly difficult time in sensing pole crashes especially those involving thin poles at low velocities, since the crash pulse is very soft until it is too late to initiate airbag deployment. Conventional crush zone sensors, such as the ball-in-tube sensors, function properly as long as the sensor is located in-line with the impact point of the pole. When this is not the case, and especially when the impact speed is low, these sensors can fail.

A particular case, for example, involved a vehicle that has three ball-in-tube sensors mounted in the crush zone, one center-mounted and one on each side approximately in line with the rails. This vehicle impacted a pole at approximately 15 miles per hour at a point midway between the front center and side sensors. An examination of the vehicle showed that there was no crush at either of the sensor locations. In this case, the sensors triggered the airbag late based on the non-crush zone crash pulse as described in U.S. Pat. No. 4,900,880. Before the airbag deployed, the occupant had already impacted with the steering wheel and although conscious after the accident, later died from internal injuries.

The crush velocity disclosed here, in the embodiment illustrated in FIG. 7, would have measured the crash velocity and caused the airbag to deploy in time for this and all other pole impacts since it stretches substantially across the entire front of the vehicle, i.e., from one side of the vehicle to the opposite side of the vehicle. Of course, the sensor 70 may be designed to stretch across only a portion of the front of the vehicle in which case, it would be beneficial but not required to use multiple sensors. The sensor 70 could also be designed to stretch across a portion of or all of the rear of the vehicle or along a portion of or the entire side of the vehicle (as discussed below).

In a small but significant percentage of automobile crashes (less than about 2%), the point of impact is outside of the main vehicle supporting structure, that is typically the rails. In a common accident, a vehicle impacts a pole at approximately the location of the headlights at a slight angle and the pole penetrates into the vehicle with little resistance until it encounters the front wheel structure at which point the vehicle rapidly stops. This crash cannot be properly sensed by most, if not all, conventional airbag sensor system in use today. Electronic non-crush zone mounted sensors will either trigger late or not at all due to the very soft nature of this crash up to the point where the pole impacts the wheel structure, which is too late.

Since conventional crush zone sensors are usually mounted inside of the rail structure, they are not in the crush zone for this crash, which is usually exterior of the rail structure. They also, therefore, would either not trigger or trigger late. The crush sensor as shown FIG. 7 projects only slightly beyond the rail structure and therefore could also miss this type of crash. The extension of the upper horizontal portions 87 and 88, however, will permit the crush sensing sensor to sense this type of crash. These extensions would trigger the deployment of the airbag in this pole crash and other airbag desired crashes outside of the rail structure. This crash is a soft crash and therefore there will be substantial penetration before the sensor must trigger. The upper horizontal portions 87 and 88 therefore could be angled toward the rear in the vehicle to adjust the penetration required for the sensor to trigger. Alternately, the crush velocity sensor of this embodiment of the invention can extend along the entire side on the vehicle almost to the B-pillar and thus can sense this crash. A crush switch sensor, on the other hand, would be too sensitive if placed adjacent the side of the vehicle. By measuring the crash velocity, as is done in the sensor of this embodiment of the invention, this is not a problem and the sensor can be placed as close as practical to the exterior surfaces of the vehicle.

In order for current technology crush zone sensors to sense crashes outside of the rails in time, additional sensors would have to be placed outboard of the rails. As mentioned above, even three sensors are insufficient to catch all pole crashes to the front of the vehicle, such as the low pole crash described above, and when bumper override crashes are considered, additional sensors are required. A primary advantage of the crush or crush velocity sensors of these embodiments of the invention is that a single sensor can be used to sense crashes to all portions of the front and most portions of the sides of the vehicle. To achieve the equivalent coverage using conventional sensors would require at least five and probably more sensors. The manufacturing cost of a sensor described in this embodiment of the invention is about equivalent to the manufacturing cost of a single ball-in-tube crush zone sensor. Therefore, in addition to the substantial performance advantage, there is also a substantial cost advantage in using the sensor described herein.

In addition, a significant cost in a sensor system is the cost of the wires to connect each sensor to the remainder of the airbag system. It is typical for a wire and connector assembly plus the cost of insulation to be as much as half of the cost of the sensor itself. In sensors described herein, a single wire assembly is all that is required to connect the sensor to the airbag system. It would also be possible to wirelessly connect the sensor assembly to the airbag system. With conventional crush zone sensors, a separate wire assembly is needed for each sensor. Finally, in order to minimize the possibility of the conventional crush zone sensor from rotating during angle crashes, for example, the mounting structure, typically the upper radiator support, is frequently strengthened to provide a more rigid mounting structure for the sensor. This modification to the vehicle structure is not required for sensors described herein and therefore additional cost savings result. To be able to measure the velocity change of the crash, additional electronics are required that will increase the cost of the sensor of this embodiment of the invention compared to a pure crush switch crash sensor.

Figure 10:
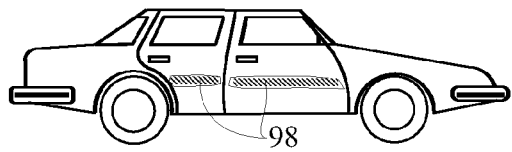
FIG. 10 is a side view of another preferred embodiment of the sensor in accordance with the invention shown mounted on a vehicle in a position to sense side impacts, with portions of the vehicle removed to permit viewing of the sensor.

As discussed above, and in several of the cited references on sensing side impacts, crush sensing alone is not the best technical solution for sensing side impacts. In spite of this fact, Volvo has marketed a side impact airbag protection system where the sensor is a crush sensing sensor, although it is a point sensor and not a rod-in-tube geometry. In the event that other automobile manufacturers choose this approach, the rod-in-tube crush sensor described herein can be used as shown in FIG. 10 which is a side view of the sensor of this invention shown mounted on a vehicle to sense side impacts. One advantage of the rod-in-tube sensor is that it can cover a large area of potential crash sites at little additional cost. Thus, a single sensor can stretch along the entire door in whatever shape desired, e.g., linearly as shown at 98 in a position substantially parallel to the door panel. Thus, the sensor 98 would measure the crush velocity upon impact at any location along the door. This solves a potential problem with the Volvo system that requires that the crash take place at a particular location for the airbag to be deployed.

In addition, sensors could extend across the side panels of the vehicle and not only across the doors. Such a sensor can also be used for rear impacts.

The use of a rod-in-tube sensor for side impacts as well as one for frontal impacts is particularly attractive since it can be easily attached to the same diagnostic module. Thus, the same Diagnostic and Energy Reserve Module (DERM) can be used for frontal, side and even rear impacts. A particularly economical system results if these sensors are used for the entire vehicle permitting a simple electronic diagnostic system to be used, in contrast to the complicated microprocessor-based systems now in use. Thus, superior protection for the entire vehicle for crashes from any direction can be obtained at a substantial cost reduction over currently used electronic systems.

Some of the objections for use of a crush sensing sensor for side impact are overcome by the use of the sensor to measure the crash velocity rather than pure crush. A pure crush sensor is prone to inadvertent triggering since the amount of crush in side impacts cannot be used as a measure of impact velocity due to the short triggering time requirement. Use of the sensor of this embodiment of the invention in conjunction with an electronic sensor for side impacts will be discussed in detail below.

The application of the sensor of this embodiment of the invention for rear impacts is in theory and practice similar to that for frontal impacts. In contrast to frontal impacts, there is not yet universal agreement as to the velocity change at which the deployment of a headrest-mounted airbag is needed. Many whiplash injuries occur at very low velocity changes, as low as about 5 mph. The replacement cost for such an airbag will be substantially less than for frontal impact airbags, consequently the deployment velocity could be made lower. On the other hand, if the headrest is properly positioned, only high velocity impacts would require airbag deployment. It is important to keep in mind that whiplash injuries are the most expensive group of automobile injuries even though they are usually not life-threatening. Any airbag in the headrest can cause more injury than help due to the proximity of the occupant's head to the headrest.

Thus, it is conceivable that the threshold velocity can be determined as a function of the position of the headrest. The position of the headrest may be determined by a sensor system and then a processor coupled to the sensor system and to the rear impact sensor would factor in the position of the headrest when determining an appropriate threshold velocity above which the airbag should be deployed.

The choice of the marginal deployment velocity significantly impacts the location of the rod-in-tube crush switch sensor but has much less effect on the crush velocity sensor of this invention. Also, the rear end sections of automobiles differ substantially in their structure, stiffness, and suitable sensor mounting locations. In some vehicles, the optimal sensor mounting location will be in the trunk lid. In others, especially if low velocity impacts are to be sensed, a location behind the bumper is appropriate. In many vehicles, the proper location for a crush switch sensor is in the middle of the trunk volume, an impractical place to mount any sensor. For the crush velocity sensor of this embodiment of the invention, on the other hand, this is not a problem and the sensor can be mounted at a more convenient rearward location.

Figure 11:
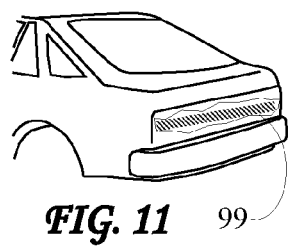
FIG. 11 is a rear view of another preferred embodiment of the sensor in accordance with the invention shown mounted on a vehicle in a position to sense rear impacts with portions of the vehicle removed to permit viewing of the sensor.

Due to this wide variability in sensor strategies and resulting sensor locations and geometries, FIG. 11 illustrates a general sensor 99 arbitrarily mounted to the rear of the vehicle to sense rear impacts, and as shown, in a position extending across substantially the entire width of the rear of the vehicle. Portions of the vehicle are removed to permit viewing of the sensor 99. The determination of the proper mounting position and sensor design follows the same strategy illustrated above and in the cited references. Other sensor designs such as the ball-in-tube or spring mass sensors such as the rolemite can be used for sensing rear impacts and the sensing or rear impacts is not limited to the particular designs disclosed herein.

The environment experienced by a sensor mounted in the front of the radiator on a vehicle is one of the most severe in the automobile. In addition to the extremes of temperature encountered between winter in Alaska and summer in the Arizona desert, this location is impacted by hail, stones, dust, dirt, salt water, radiator coolant, steam cleaner and occasionally even battery acid. This sensor must be capable of surviving any combination of these environments for the useful life of the car that is typically considered to be in excess of ten years. It is important, therefore, that this sensor be hermetically sealed. A great deal of effort has been put into the ball-in-tube crush zone sensors to seal them from these environmental influences. Nevertheless, sensors that have been on vehicles have been dissembled and found to contain moisture. Although moisture would not have as detrimental effect to the rod-in-tube sensor described here as it does to ball-in-tube sensors, the sensor has nevertheless been designed to be truly hermetically sealed as described below.

Figure 12:
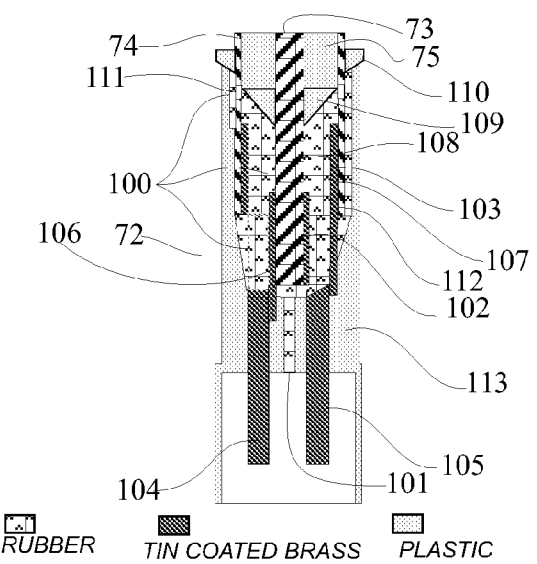
FIG. 12 is a cutaway view of the header/connector assembly of FIG. 5 taken along line 12-12 illustrating the construction details and in particular the method of sealing the sensor.

FIG. 12 is a cross sectional view of the header/connector assembly 72 shown mounted on the tube 74 and rod 73. One of the spacers 75 is used to position the rod 73 inside the tube 74 as described above. The primary seal for this sensor 70 is injected and cured in place and is urethane or a silicone rubber compound 100.

Current ball-in-tube crush zone sensors are attached to the vehicle wire harness and, thus to the remainder of the airbag system, by means of a pigtail which is a wire assembly emanating from the sensor at one end and having a connector at the other end. It is believed that the environment in front of the radiator is too severe for connectors, therefore connectors integral with the sensor have not been considered. This pigtail is one of the most expensive parts of the standard ball-in-tube crush zone sensor. Substantial cost savings result if the connector could be made integral with the sensor. This has been accomplished in the crush switch sensor of the current design as shown in FIGS. 5, 7 and 12.

The sealing technique used for the header/connector is to form a rubber mold within the housing and to pump a rubbery material such as urethane or silicone rubber, or similar compound, 100 into the cavity. This is accomplished in such a manner that the air is displaced and forced to flow through various clearances between the parts in much the same manner as air is forced out of a plastic injection mold when the liquid plastic is forced in under pressure. The rubber compound 100 is injected through hole 101 in the bottom of the connector portion of the assembly and flows upward as the air flows out through holes or slots 11 in tube 74 and finally out of the assembly through the clearance between the tube 74 and a plastic dam 110. The plastic dam 110 is a part that fits snugly to the tube 74 and also against a plastic header body 113 of the header/connector assembly 72. These snug fits permit the air to flow while offering a substantial resistance to the flow of the rubber 100. In this manner and through the proper geometric shaping of the various parts, all but a few minute air bubbles are effectively removed and the rubber 100 thereby attaches and seals to all of the relevant surfaces.

A second dam 109 is also used to limit the passage of the rubber into the main body of the sensor 70. The spacers 75 typically contain a groove to permit the passage of grease, as will be explained below, and the dam 109 effectively seals this area and prevents passage of the rubber. Since the grease is typically pumped into the sensor 70 after the header/connector assembly 72 is assembled, this last spacer 75 adjacent to the header/connector assembly 72 need not have the groove and thus the dam 109 and spacer 75 can be made as one part if desired.

The seal is thus made by the steps of:

a) assembling the header/connector assembly 72 to the rod-in-tube assembly 73/74 creating at least one enclosed cavity therein having at least one inlet port 101 for injecting a rubber compound and at least one narrow passage for air to escape (the clearance between tube 74 and dam 110), this passage being sufficiently narrow as to permit only a small amount of rubber compound to flow out of the assembly during the filling process, but large enough to permit air to easily flow out of the assembly;

b) injecting an uncured rubber compound through the inlet port(s) in such a manner that the at least one narrow passage remains open during the injection process until the cavity is substantially filled permitting air within the cavity to be displaced by the rubber compound; and c) curing the rubber compound.

Usually a room-temperature curing rubber compound is used and thus the curing process comprises storing the assembly until the curing is complete. In many cases, the temperature of the assembly is elevated to accelerate the curing process and in others, the rubber is exposed to ultra violet light to affect the cure.

Tests were run on this system whereby the assembly was held at about −40 degrees Celsius for more than twelve hours and then immersed into boiling water and then into near freezing water containing a penetrating die. After tens of cycles, the test units were cut open to search for the penetration of the die that would indicate a failure of the seal. None was found. In contrast, a commercially available ball-in-tube sensor failed on the first cycle. This test is more severe than any sensor is likely to experience in the field and therefore proves the viability of the sealing system.

A preferred plastic material used for the header/connector is 30% glass-filled polyester although other plastic materials would work as well. Standard crush zone sensor connectors are frequently made from unfilled NYLON® and this would also be suitable for the header/connector design used in the sensor of this invention. Although unfilled NYLON® has a high coefficient of thermal expansion, the urethane or silicone rubber has even a higher one and therefore the seals between the NYLON® and metal parts will remain intact.

The lower portion of the header body 310 of header/connector assembly 72 shown in FIG. 12, is in the form of a mating connector which attaches to the wire harness connector provided by the automobile manufacturer. Connector pins 104 and 105 are extensions of the header pins 102 and 103, which are connected to the rod 73 and tube 74, respectively, and are designed to mate with the appropriate connector, not shown in detail. Connector pins 104 and 105 are made of an electrically conductive material. Upon completion of the circuit via contact between the rod 73 and the tube 74 upon a crash, current flows through the connector pins 104, 105, header pins 102, 103 and rod 73 and tube 74. The header pins 102, 103 are formed from, e.g., sheet brass, in such a manner that they surround the rod 73 and tube 74 and are electrically connected thereto. This is accomplished in the case of the tube 74, for example, by solder-coating the end 112 of the tube 74. A mating portion 107 of the header pin 103 fits snugly inside the tube 74 and, through induction heating, is soldered to the tube 74. Similarly, mating portion 106 of header pin 102 surrounds the rod 73 that has been soldered-coated at its end 108.

The header pins 102 and 103 are first formed from, e.g., tin-plated brass material, into the proper shape and then placed in a mold in an insert molding operation to form the header/connector assembly 72. Note that a reflection will come from the different impedance in the connector but it will be at a known position and can be ignored. This is believed to be a ground-breaking use of an integral connector for a crush zone mounted sensor.

Spacers 75, in addition to their use in a straight portion of the rod and tube assembly as shown in FIG. 6, are also placed in each of the bends 96. A partial cutaway view of a typical bend 96 is shown in FIG. 13. During assembly the spacers 75 are placed on the rod 73 and the rod 73 is inserted into a straight tube 74 with the spacers 75 located at each position where the tube 74 will be bent. The tube 74 is then bent at spacer locations using conventional tubing benders and the rod 73 is also forced to bend by virtue of the spacer 75. The spacers 75 are formed from extruded plastic tubing and are slightly smaller in diameter than the tube 74. The internal diameter of the spacer 75, however, is such as to require a press fit onto the rod 73. Thus, the spacers 75 are held firmly on the rod 73 as the rod 73 is inserted into the tube 74. Spacers 75 used in the bends are typically about 3 inches long when used with a 0.5 inch tube and a 1.0 inch bend radius. Typically a substantially thinner tube is used sometimes as small as ⅛ inch in diameter.

In a typical large tube assembly, the tube outside diameter is approximately 0.5 inch and the wall thickness approximately 0.035 inches and in a small tube assembly, the outside diameter is approximately 0.25 inches and the wall thickness is about 0.02 inches. The large tube design is used when there is no convenient structure to mount the sensor against and it is vulnerable to abuse, while the thin or small tube design is used when it can be mounted nearly flush against the radiator support, for example, or in a protected location such as inside of the vehicle door.

The end 71 of the sensor 70, which does not have the header/connector 72, is welded closed as shown in FIG. 14. An impedance such as a resistor 117 is placed across the contacts in the sensor 70 to create the reflection at the end on the sensor 70. This is accomplished as shown in FIG. 14 by attaching a resistor 117 to an end 114 of rod 73 and to an end 115 of the tube 74. The end 115 is formed by squeezing the tube 74 in the appropriate set of dies which gradually taper and flatten the tube 74, squeezing the end of resistor 117 and closing off the tube 74 with a straight line seal. The end of this seal, 116, is then TIG welded using conventional equipment to assure a hermetic seal.

FIG. 15 is a view of the sensor of FIG. 5, with half of the tube 74 and rod 73 removed but showing complete spacers 75, taken along lines 12-12 and showing the location of all of the spacers 75 and the rod 73 and tube 74.

A typical length of the span between spacers 75 for the vertical portions 84 and 85 of FIG. 5 is approximately 10-15 inches. In this configuration, the rod 73 will actually deflect and contact the tube 74 during minor accidents and therefore in a preferred embodiment of the design, the tube 74 is filled with a damping material which is typically a viscous liquid or grease which has been formulated to operate over the required temperature range of from about −40° C. to about 125° C. This grease should have approximately the same dielectric constant as the plastic spacers 75 to minimize extraneous echoes. For the purposes of this disclosure, the term grease will be used to include all flowable materials having a viscosity between about 100 and about 100 million centipoises. This would include, therefore, all silicone and petroleum and other natural and synthetic oils and greases in this viscosity range.

This grease 118 is shown in FIG. 16 where half of the tube 74 has been removed to show the grease 118 filling substantially the entire tube 74. Small voids 119 are intentionally placed in the grease 118 to allow for differential expansion between the grease 118 and the tube 74 due to variations in temperature. When grease 118 is used, small channels, not shown, are provided in the spacers 75 to permit the grease to flow past the spacers 75 as the sensor 70 is pumped full of the grease 118.

The sensor described and illustrated above is designed to catch all impacts to the vehicle regardless of where they occur providing the sensors are properly located. For frontal and rear impacts, the severity of the crash required to cause sensor triggering is determined by the amount of crush of the vehicle at each location which is necessary to cause the sensor to experience a measurable and timely velocity change. The amount of crush necessary to transmit this velocity change to relative motion of the rod in the tube at any location can be varied arbitrarily by the distance the sensor is located from the front or rear of the vehicle, by the location and characteristics of spacers in the sensor and/or by the location and characteristics of the supports that are used, as discussed above.

Steel has been used for the materials for the rod 73 and tube 74 for a preferred embodiment described herein. The tube 74 is in an annealed state to promote easy forming to the required shape and to promote deformation during the crash. The rod 73, on the other hand, is typically hardened so as to maintain its spring temper and promote good positioning with the tube 74 when the assembly is bent. The outside of the sensor 70 is coated with a protective coating to prevent it from rusting during the estimated 10 year life of the vehicle. The interior surfaces are coated with grease to prevent corrosion in those cases where the entire sensor in not filled with grease. Other materials such as aluminum, brass or even plastic with an electrically conductive surface coating could be used for the rod and tube.

The rod and tube described above, for the large tube design, have been designed to require approximately fifty to one hundred pounds of force in order to cause the sensor to significantly bend. This is to minimize the chance of inadvertent deployment during routine vehicle maintenance. For cases where the sensor is in a protected location, the small tube design typically uses about a 0.25 inch diameter tube with about a 0.0625 inch diameter rod.

Once the crush velocity sensor of the present design bends significantly to where the rod 73 contacts the tube 74, it remains latched in the conductive state for the duration of the crash. This important feature guarantees overlap between the triggering of the crush zone sensor and the passenger compartment-mounted arming sensor when used for frontal and rear impacts.

The sensor described and illustrated herein can use an impedance such as a resistor. In contrast to many sensor designs, monitoring of the entire functioning of the sensor continuously occurs with the crush velocity sensor of this invention. The driving and control electronics can continuously transmit waves into the sensor and monitor the reflections that are returned. Thus, if there is a broken connection for example, the system will not get the expected return and can signal to the airbag system to display a fault.

The tube of the sensor described herein can be electrically grounded to the vehicle. In some applications, it may be desirable not to ground the outside of the tube in which case, the tube might be surrounded by an insulating plastic tube. The use of a grounded outer tube has the advantage of providing shielding from electro-magnetic radiation for the rod and thus minimizing the chance of an inadvertent signal reaching the electronic sensor, for example, as the vehicle passes through strong electro-magnetic fields.

A primary advantage of the sensor described herein is its coaxial design that permits arbitrarily shaping of the sensor to adapt the sensor to a particular vehicle and to a particular place on that vehicle. There are, of course, other designs that could also be arbitrarily shaped including, but not limited to, tubes having a square, elliptical or triangular cross-section. All of these and similar geometries are considered tubes for the purpose of this invention. Similarly, the rod can take on a variety of shapes without departing from the teachings of this invention. In particular, the rod can also be a tube which has advantages in minimizing the effects of vibration. The rod need not be round and can be triangular, elliptical, square or even ribbon-shaped. All of these geometries are considered rods for the purposes of this invention.

Another key feature of this invention is that, when the sensor is properly mounted on the vehicle, plastic deformation of the tube generally occurs prior to triggering of the sensor and always occurs in a crash where the deployment of the airbag is required. This results in the sensor latching closed during the crash but it also prevents it from being reused on the same or another vehicle. In an alternate configuration, the dimensions of the rod and tube and the material properties are chosen so that the sensor can be caused to trigger with sufficient force without causing plastic deformation. This usually permits a more accurate estimation of the crash velocity.

The use of grease to dampen the motion of one or more of the parts of a crash sensor has been disclosed herein. Other crash sensor designs, and particularly crush switch sensor designs, could also make use of a grease to surround and dampen the motion of one or more of the internal parts of the sensor.

The hermetic sealing system disclosed herein has permitted use of an integral header/connector thus eliminating the need for the pigtail and substantially reducing the cost of airbag sensors for frontal mounting in the "splash zone". Now that this system has been disclosed, other applications of this system to other types of crash sensors will become obvious to those skilled in the art.

In another implementation, the crash velocity can be determined through the use of two crush switch crash sensors. If two sensors of the type disclosed above are mounted on a vehicle with one closer to the front than the other, then, during a crash, the forwardmost sensor will trigger first followed by the second, more rearward sensor. If the spacing between the sensors is known, an estimate of the crash velocity can be obtained by measuring the time between switch closures. In this manner, the use of two switches can be used to determine the crash velocity.

This concept can be further improved if the phase measurement system of this invention is added. In this case, therefore, the location of the contact will be determined in each crush switch and then the velocity determined as discussed above. This is another method of obtaining both the velocity change and the location of the impact and is perhaps more accurate that the single sensor system. This concept can be applied using other technologies where the impact with a sensor can be determined. If the sensor contains distributed piezoelectric material, for example, an impact will send a voltage spike to the evaluation circuitry.

For cases where actuation by bending of the sensor is not required and the sensor can be configured to reliably be impacted during the crash, a coaxial cable design is appropriate. In this case, a cable is selected which will deform under a 10 to 500 pound load in a manner such that the impedance change that occurs during the deformation can be measured. Since in most cases, the resisting deformation force is small compared with the crush forces of an accident, an appropriately mounted cable should provide an accurate measurement of the crash velocity. Such a sensor can be configured such that a single sensor will sense crashes from near the B-pillar on the driver side, across the entire front of the vehicle to near the B-pillar on the passenger side as shown as 121 in FIG. 17. The sensor would thus have a substantially U-shaped portion and would extend substantially completely across the front doors between longitudinal edges of the doors.

In one embodiment, an electronic control module 122 including a processor is mounted in the passenger door and feeds electromagnetic waves, generated by an electromagnetic wave generator, having a wavelength on the same order as the length of the coaxial cable into cable 121. A similar sensor can also be used for the rear doors as shown at 120, and would thus extend substantially completely across the rear doors between longitudinal edges of the doors. This device acts like a time domain reflectometer. That is, the magnitude and location of any changes in impedance are measured. A change in impedance can be related to the magnitude of the crush of the cable and thus by successive measurements of the change in impedance, the crush velocity can be determined by a processor, possibly embodied in the control module 122. In this case, the outside conductor of the coaxial cable is grounded and the interior conductor acts as an antenna. The cable is terminated in the driver door with an impedance-matching resistor to complete the assembly.

The use of a coaxial cable and time domain reflectometry was discussed above. Another possible method is to use light and a fiber optic cable. In one implementation, Abacus Optical Mechanics of Oxnard, Calif., has demonstrated how a fiber optic cable as it is distorted can restrict the passage of light and that this effect can be used to measure acceleration, pressure etc. If this device is fed with modulated light, then the location of the disturbance along the fiber can be determined.

Another embodiment of the invention uses parallel strips of conductive material and is sometimes referred to as a tape switch sensor and is described in detail in the above-referenced patents and therefore will not be repeated herein.

Knowledge of the location of the impact, e.g., as detected using the coaxial cable sensor described above, can be used to enhance and improve the effectiveness of an occupant restraint system. For example, if an algorithm is used to control the deployment and operation of occupant restraint devices, the algorithm can be designed to consider the location of the impact, e.g., by factoring in the location of the impact when determining which airbags to deploy and the inflation of those airbags. In some crashes, it might be the case that only the side airbags are deployed if the crash location is along the side of the vehicle. On the other hand, it might be the case that only the front airbags are deployed if the crash location is in the front of the vehicle. Of course, both the front and side airbags could be deployed if such deployment is warranted by the impact location.

In order to prevent seismic sensors, such as the ball-in-tube or accelerometer-based sensors, from rotating in a crash, it has become common to increase the strength of the radiator support or other structure on which the sensor is mounted. The sensor mounting bracket, however, must then permit the sensor to move relative to this structure, complicating the bracket design, or this structure must be weakly attached to the remainder of the vehicle so that the whole assembly will move in the crash. This added structural strength adds weight to the vehicle and is not needed for the sensors described herein. It is even desirable for the sensors described herein to be mounted on weaker structural members in order to enhance the chance for the structure to deform, especially in soft crashes. The use of the rod-in-tube, coaxial cable, tape switch or other elongate sensor disclosed herein, therefore, results in a weight saving for the vehicle that is very important with the increasingly stringent fuel economy standards mandated by the U.S. Government.

Operation of the crush zone crash sensor of this invention, as well as all others, can be critically affected by the material which is located between the sensor and the front of the vehicle and the geometry of this material as it crushes and comes back to strike the sensor. Sensors of the present invention are considerably more tolerant to variations in the geometry of this material for two reasons. Considering the compression mode, the length of the sensor can be increased so that the probability of it being impacted is very high.

Alternately, in the bending mode, the sensor can be attached to two portions of the vehicle that are likely to experience relative motion during the crash. In this latter case, the two portions of the vehicle effectively become extensions of the sensor. In some cases, the radiator support structure is designed so that it will always deform at a particular location with the result that the sensor can be quite short since the entire radiator structure becomes an extension of the sensor. In other cases, such a location is not readily available and the sensor must be made longer to guarantee that it will be bent or compressed in a crash by crushed material coming from areas further forward in the vehicle.

The use of crush initiators is becoming increasingly common in vehicle design. These usually take the form of a hole, wrinkle, notch or bend intentionally placed in a structural member to cause the member to bend in a particular manner during a crash. As the sensor of the present invention is adapted to a particular vehicle, the use of crush initiators to control the manner in which the member, on which the sensor is mounted, bends will result in a shorter and more reliable sensor. Additional, usually minor, design modifications can also be used to permit the sensor to be mounted in protected locations so as to minimize the chance of sensor damage during vehicle maintenance.

The force required to cause sensor closure is an important design parameter of the sensor of this invention. In one typical design configuration, a 20 pound force on the sensor is required to move the front contact strip toward the rear member sufficiently to permit a velocity to be measured. This force is sufficient so that it is unlikely for the sensor to inadvertently provide a velocity indication sufficient to cause airbag deployment during vehicle maintenance, stone and some animal impacts and yet, this force is quite low compared to the forces typically experienced during even marginal crashes.

The angle required to cause sensor closure is also an important parameter of the sensor of this invention. In one typical design configuration, a 15 degree bend angle of the sensor is required to move the front contact strip toward the rear member sufficiently to cause a false velocity reading indicative of a crash in the bending mode. This angle is sufficient so that it is unlikely for the sensor to inadvertently close during vehicle maintenance, stone and some animal impacts and yet, this angle is quite low compared to the relative displacements and the angles that will occur in a sensor mounted on two locations which typically move relative to each other in even marginal crashes.

In one preferred embodiment of the invention, an elongate sensor such as a coaxial cable stretches from the driver side door near the B-pillar through the A-pillar, across the front of the vehicle and into the passenger side door. A signal having a frequency on the order of about 10 megahertz is imposed on the cable, which frequency is selected so that approximately the cable is approximately one wavelength long (thus the frequency could vary depending on the length of the cable). The cable is terminated at the far end with a known resistance. Under normal operation, the wave travels down the cable and reflects off of the end and returns in phase with the transmitted pulse. If, however, the cable is compressed along its length a reflected wave will be returned that is out of phase with the transmitted wave.

By comparing the phase of the reflected wave with the transmitted wave, the location of the compression can be determined and by comparing the magnitude of the reflection, the amount of compression can be determined. By measuring the amount of compression over time, the velocity of compression can be found. Thus, the location of the impact and the crush velocity (which can be considered a function of the velocity of compression) can both be determined by this sensor for both side and frontal impacts. A similar sensor could be designed for use in sensing side and rear impacts.

More generally, a crash sensor arrangement for determining whether the crash involving the vehicle requires deployment of the occupant restraint device comprises an elongate sensor arranged in the crush zone to provide a variable impedance as a function of a change in velocity of the crush zone and a processor for measuring the impedance of the sensor or a part thereof at a plurality of times to determine changes in the impedance of the sensor or part thereof. The processor provides a crash signal for consideration in the deployment of the occupant restraint device based on the determined changes in impedance of the sensor or part thereof. The sensor can have a U-shaped portion extending along both sides of the vehicle and across a front of the vehicle, and thus substantially completely between opposed longitudinal edges of a door of the vehicle.

In the embodiment wherein the sensor comprises a coaxial cable, an electromagnetic wave generator generates electromagnetic waves and feeds the waves into the cable and the processor is preferably embodied in an electronic control module coupled to the electromagnetic wave generator. The electromagnetic wave generator preferably feeds electromagnetic waves into the cable having a wavelength on the same order as a length of the cable. In the alternative, the sensor can comprise parallel strips of conductive material spaced apart from one another in the absence of deformation of the crush zone and arranged to contact one another during deformation of the crush zone. The contact strips are positioned so as to be compressed during deformation of the crush zone whereby such compression causes changes in impedance of the sensor.

Another method of determining the deflection of the periphery of a vehicle that can be used as a crash sensor is to use the bend sensor principles as reported in 06497430 mass profiling system. Such devices can be placed on or inside of the vehicle skin and measure the relative deflection of a portion of the vehicle during a crash.

1.5 Side Impact Sensor Systems

FIGS. 37 and 38 show an all-mechanical self-contained airbag system for mounting on the side of a vehicle to protect occupants in side impacts in accordance with the invention which is designated generally as 320. The airbag system 320 contains one or more inflatable airbags 322, an inflator assembly 323, a mounting plate 343 for mounting the airbag system 320 on the side of the vehicle and a sensor assembly 334 mounted to the inflator assembly 323. The sensor assembly 334 contains a rotatable, substantially planar sensing mass 335 and a cantilevered biasing spring 336 which performs the dual purposes of biasing the sensing mass 335 toward its at rest position shown in FIG. 38 and also providing the energy to the firing pin 337 required to initiate a stab primer 325 as further described below. The sensing mass 335 contains a firing pin spring-retaining portion 338 that restrains the firing pin 337 during the sensing time and releases it when the sensing mass 335 has rotated through the sensing angle. The retaining portion 338 is an L-shaped descending part formed on a planar surface of the sensing mass 335 and defines a cavity for retaining an end of the spring 336.

As shown in FIG. 37, the mounting plate 343 constitutes a housing for the airbag system 320, i.e., it has a bottom wall and flanged side walls extending from edges of the bottom wall which define an interior space in which the airbag(s) 322 and a portion of the inflator assembly 323 are arranged. The bottom wall is substantially flat and has a substantially circular aperture. The inflator assembly 323 is positioned in the aperture so that a portion thereof extends on either side of the bottom wall (FIG. 38). Also as shown in FIG. 38, the housing of the inflator assembly 323 includes a flange that abuts against the bottom wall of mounting plate 343 around the aperture. As will be appreciated by those skilled in the art, the flanged side walls of the mounting plate 343 are positioned around a panel on the side of the vehicle, e.g., a blow-out panel in the side door, so that the airbag(s) 322 when inflating will be expelled from the interior space defined by the mounting plate 343 into the passenger compartment of the vehicle. The mounting plate 343 may thus be mounted to a frame of the side door by attaching the flanged side walls to the frame or attaching another portion of the mounting plate to the frame. The actual manner in which the mounting plate 343 is mounted in the side door, or on the side of the vehicle, is not critical so long as the mounting plate 343 is positioned to allow the airbag(s) 322 to be expelled from the interior space into the passenger compartment. Mounted as such, the sensor assembly 334 will be most proximate the exterior of the vehicle with the airbag 322 most proximate the passenger compartment of the vehicle.

The sensing mass 335 is connected to the housing 321 of sensor assembly 334 through a hinge 339 at one end whereby the opposed end is unrestrained so that the sensing mass 335 rotates about the hinge 339. In view of the mounting of the airbag system 320 on the side of the vehicle, hinge 339 defines a rotation axis which is perpendicular to the longitudinal direction of travel of the vehicle (x) as well as perpendicular to a direction (y) transverse to the longitudinal direction of travel of the vehicle, i.e., it is a vertical axis (z).

The sensor housing 321 includes opposed housing wall portions 340 and 341, a top cover 342 and a bottom cover 364 which is connected to, mounted on or the same part as a top cover 324 of the inflator assembly 323. The sensor housing 321 is filled with air and sealed (when appropriately mounted to the inflator assembly 323 whereby a small orifice 330 in bottom cover 346 is closed by the inflator assembly 323) so as to maintain a constant air density regardless of the ambient temperature or pressure. The sensor housing walls 340, 341 and sensing mass 335 are preferably molded along with the hinge 339 in a single insert molding operation to provide a careful control of the dimensions of the parts and particularly of a clearance 345 between the walls 340, 341 and the sensing mass 335 for the reasons described below.

The inflator assembly 323 comprises a stab primer 325, igniter mix 333 associated with the stab primer 325, one or more propellant chambers 326 containing propellant 327 and a series of cooling and filtering screens 328. In the particular design shown in FIGS. 37 and 38, the stab primer 325 has been placed inside of an igniter housing portion 329 of the housing of the inflator assembly 323, the housing of the inflator assembly being formed by opposed housing sections 324 and 332. Housing sections 324 and 332 cooperate to define a substantially cylindrical housing for the inflator assembly 323. Housing section 324 is coupled to the sensor housing 321. Exit orifices 331 are provided in the housing section 332 to allow the gas generated by the burning propellant 327 to flow into the airbag 322 to inflate the same. A small orifice 330 has been left open in the bottom cover 346 of the housing 321 of the sensor assembly 334, as well as the housing section 324, to allow the firing pin 337 to enter into the interior of the inflator assembly 323 and cause initiation of the stab primer 325. The stab primer 325 is from a family of the most sensitive stab primers requiring less than 25 in-oz of energy for activation. The standard M55 military detonator is a member of this class and has been manufactured in very large quantities during war time. For the purposes of this disclosure, the term primer will be used to represent both primers and detonators. The small orifice 330 will permit some gas to enter the sensor housing 321 during the time that the propellant 327 is burning and inflating the airbag 322 but since its area is less than 1% of the area of the exit orifices 331 through which the generated gas enters the airbag 322, less than 5% of the generated gas will pass into the sensor. Naturally, a larger orifice could be used but in all cases the amount of gas which passes into the sensor housing 321 will be less than 10% of the total gas generated. Since this gas will be hot, however, it will destroy the sensor assembly 334 and leak into the door. In another implementation discussed below, a through bulkhead initiation system is used to prevent any gas from passing into the sensor assembly from the inflator assembly.

During operation of the device, sensing mass 335 rotates relative to sensor housing 321 in the direction of the arrow (FIG. 38) under the influence of the acceleration with its motion being retarded by the biasing spring 336 and the gas pressure forces. Upon a sufficient rotation, biasing spring 336 is released from the retaining portion 338 of the sensing mass 335 and moves toward the inflator assembly 323 and the firing pin 337 formed in connection with the biasing spring 336 moves to impact stab primer 325 which burns and ignites the igniter mix 333. The igniter mix, which is typically composed of boron and potassium nitrate, then ignites the propellant 327 that burns and generates gas. The gas then flows through exit orifices 331 into the inflatable bag 322, inflating the bag.

In the embodiment shown in FIGS. 37 and 38, the stab primer 325 has been located in the center of the inflator housing. This is the conventional location for electrical primers in most driver side inflator designs. The sensor is placed adjacent and in line with the inflator permitting the use of conventional inflator designs which minimize the size, complexity and weight of the inflator. The sensing mass 335 is approximately of square shape and the sensor housing 321 is made circular to mate with the inflator design.

In the particular design shown in FIGS. 37 and 38, a burning propellant inflator design was illustrated. Naturally, other propellant technologies such as a stored gas or hybrid (a combination of stored gas and propellant) could have been used without departing from the teachings of this invention.

It will be appreciated by those skilled in the art that since the airbag system 320 is designed to activate in side impacts, the sensing mass 335 is arranged for movement in a direction perpendicular to the sides of the vehicle, i.e., perpendicular to the longitudinal direction of travel of the vehicle, or in a pivoting movement about a vertical pivot axis. In this manner, the acceleration of the sensor housing 321 inward into the passenger compartment (that is, acceleration in a lateral direction or lateral acceleration since the passenger compartment is inward from the sensor housing relative to the side of the vehicle in the illustrated embodiment) resulting from a crash into the side of the vehicle, will cause the sensing mass 335 to move or pivot outward toward the impacting object thereby releasing its hold on the biasing spring 336.

FIG. 39 shows a fragmentary view of a sensing mass 352 and an attached lever arm 353 extending from a D-shaft 354 prior to rotation of the sensing mass incident to a crash as adapted to the all-mechanical system of Thuen, U.S. Pat. No. 4,580,810. This figure corresponds to FIG. 6 of the Thuen patent and shows the improved sensing mass design. FIG. 40 shows the same view as FIG. 39 with the sensing mass rotated, under the torque from spring 355 acting on ball 359, into the actuating position where it has released the firing pin to initiate deployment of the airbag. FIG. 40 corresponds to FIG. 7 in the '810 patent. FIG. 41 is a view taken along line 41-41 of FIG. 40 and shows the shape of the sensing mass 352. Sensing mass 352 is retained in sensor housing 350, by cover 351, and rotates with D-shaft 354. This rotation is facilitated by pivots 357, which form part of the D-shaft, and pivot plates 356. In this manner, the sensing mass 352 is hinged to the sensor housing 350 permitting only rotational motion and rendering the sensor insensitive to the effects of cross-axis accelerations. In this embodiment, sensing mass 352, lever arm 353, ball 359, pin 358 and the D-shaft 354 are all made as one part that reduces the cost of the assembly. Naturally, they could be made as separate parts and assembled. When D-shaft 354 rotates through a sufficient angle, it releases firing pin 349 in the same manner as shown in FIGS. 8 and 9 of the '810 patent. The motion of the sensing mass 352 is undamped since the clearance between the sensing mass 352 and sensor housing 350 is sufficiently large so as to minimize the flow resistance of the air as the mass rotates. Naturally, in another implementation, the mass could be redesigned to have its motion damped by the flow of a gas in the manner shown in FIGS. 37 and 38 above. Also, two sensor systems of the type disclosed in FIGS. 39-41 can be used in the all-mechanical system in a similar way as shown in the '810 patent.

Figure 42:
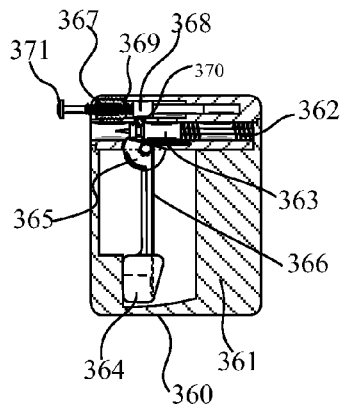
FIG. 42 is a cross-sectional view of a sensor for use in an all mechanical system where the sensor is mounted outside of the inflator housing, shown in an unarmed or safe position prior to assembly with an inflator.
Figure 43:
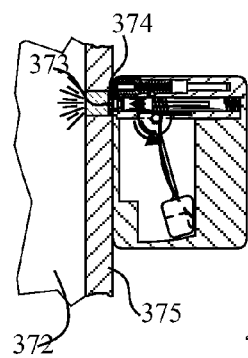
FIG. 43 is a cross-sectional view of the sensor of FIG. 42 shown mounted on an inflator, shown in a fragmentary view, after it has triggered in response to a vehicle crash.

The all-mechanical system as depicted in FIGS. 39-41 requires that a special inflator be designed to accommodate the sensor within its housing. There has already been a substantial investment in tooling and production facilities for electrically actuated inflators by several inflator manufacturers. Also, substantial reliability statistics have been accumulated on these inflator designs through the hundreds of millions of miles that airbag equipped vehicles have traveled. It is desirable to build on this base with new systems that can be done using the sensor designs of this invention as depicted in FIGS. 42 and 43. This sensor design is adapted to be attached to a standard electrical inflator design where a stab primer 373 is used in place of the electrically actuated squib normally used.

The sensor-initiator is shown generally as 360 in FIG. 42. In a similar manner as described above, sensing mass 364 rotates in sensor housing 361 during a crash against the force provided by a cantilevered biasing spring 366 until a D-shaft 365 has rotated sufficiently to release a firing pin 363. Once released, firing pin 363 is propelled by firing pin spring 362 and impacts primer 373 to initiate deployment of the airbag. A washer containing an orifice 374 is provided in the top of primer 373 to minimize the leakage of inflator gases from the inflator 372 while the propellant is burning (FIG. 43). In this manner, the sensor does not have to be constructed of strong materials as discussed in the above referenced patent.

In one configuration of a self-contained system, the sensor assembly and the airbag and inflator assembly are kept separate until mounted onto the vehicle. In this case, the sensor is mounted using an appropriate apparatus (not shown) to the steering wheel after the wheel is mounted to the vehicle. Then, the airbag module is assembled to the steering wheel. In this case, the sensor is armed after it has been installed onto the vehicle through the use of arming screw 367. The inflator is only brought into contact with the sensor after the sensor has been mounted onto the vehicle, thus minimizing the chance of an inadvertent actuation prior to installation. To arm the sensor, arming screw 367 is rotated after the sensor is mounted onto the steering wheel causing it to move downward in its housing 369. This removes the retaining cylinder 368 from blocking the motion of locking ball 370 that removes a lock on the firing pin. As long as ball 370 remains locking the firing pin 363, rotation of the mass 364 will not release the firing pin and the sensor is unarmed. Additional apparatus, not shown, can be used to prevent the assembly and disassembly of the sensor from the steering wheel unless the arming screw 367 is in the unarmed position. Also, interference between the head 371 of the arming screw 367 and the surface 375 of the inflator 372 prevents assembly of the inflator and airbag module to the steering wheel until the sensor has been armed. Thus, in this very simple manner, an inexpensive all-mechanical airbag system can be made using standard inflator designs with minor modifications.

Figure 44:
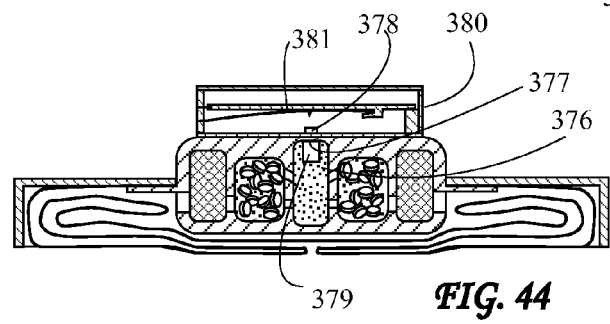
FIG. 44 is a cross-sectional view of a through bulkhead initiation system adapted to a mechanical self-contained airbag system.
Figure 45A:
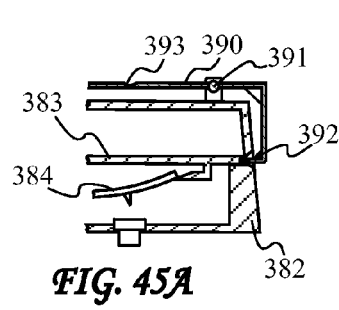
FIG. 45A is a blowup with certain parts removed showing a portion of the sensor shown in FIG. 45 in the unarmed position.

In FIGS. 37 and 38, the stab primer was shown as part of the inflator assembly, i.e., contained within the housing of the inflator assembly defined by housing portions 324, 332. On the other hand, in FIG. 44. a cross section view of a through bulkhead initiation system adapted to a mechanical self-contained airbag system is illustrated. In this case, the stab primer 378 is instead part of a sensor assembly 380, i.e., arranged in the sensor housing on the bottom cover thereof if present, and when the stab primer 378 is initiated by a firing pin 381 formed in conjunction with a cantilevered, biasing spring (as in the embodiment shown in FIGS. 37 and 38), it creates a shock on one side of an inflator housing wall 377 which is transmitted through the wall and interacts with a shock sensitive pyrotechnic mix 379 which has been placed into a cavity 376 in the igniter mix. Inflator housing wall 377 is alongside the bottom cover of the sensor housing, but in the alternative, the inflator housing wall may be the same as the bottom cover of the sensor housing. This through-bulkhead initiation system and the particular pyrotechnic mix formulation is well known to ordinance engineers where it has been applied to military devices. Such a system has not been used, however, in airbag systems. In this manner, a hole is not opened between the sensor assembly and the inflator assembly and the gas is prevented from leaking into the sensor assembly.

Figure 45:
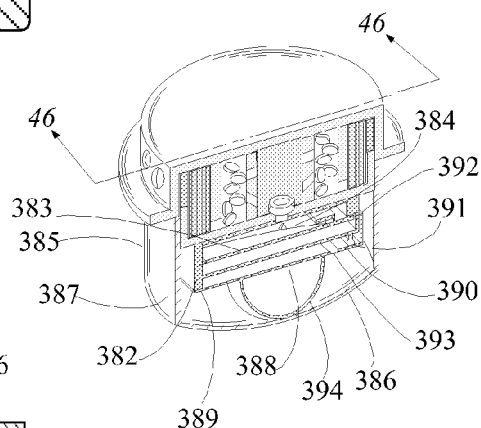
FIG. 45 is a perspective view of a mechanical self-contained airbag system using a crush sensing arming system, shown in the state before a crash occurs.
Figure 46:
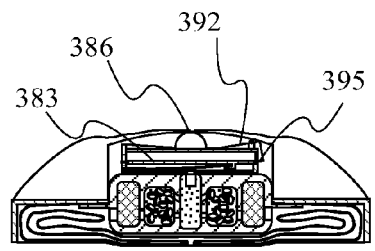
FIG. 46 is a cross-sectional view of the apparatus of FIG. 45 taken along line 46-46 showing the crush sensing arming system after it has been activated by vehicle crush but before the sensing mass of the discriminating sensor has begun to move.
Figure 46A:
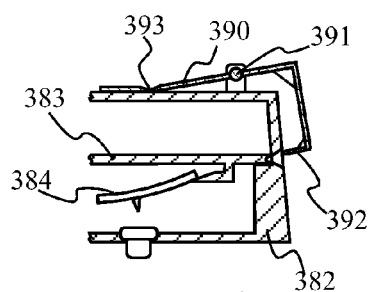
FIG. 46A is a blowup with certain parts removed showing a portion of the sensor shown in FIG. 46 in the armed position.
Figure 47:
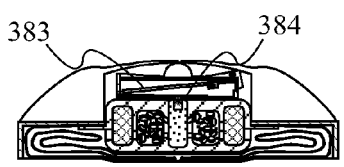
FIG. 47 is a cross-sectional view of the apparatus of FIG. 46, also taken along line 46-46, showing the crush sensing arming system after it has been activated by vehicle crush and showing the sensing mass of the discriminating sensor after it has moved and released the firing pin, triggering the inflation of the airbag.
Figure 47A:
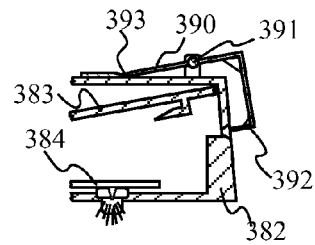
FIG. 47A is a blowup with certain parts removed showing portion of the sensor shown in FIG. 47 in the fired position.

In FIG. 45, a perspective view of a mechanical self-contained airbag system using a crush sensing arming system designated generally as 385 is shown in the state before a crash occurs. In this embodiment, the sensor is armed when the vehicle door skin, or side skin, is crushed to where it impacts a curved impact plate, not shown, which then impacts a sensor can 387 surrounding the sensor assembly and displaces an outer cover 386 thereof relative to a sensor housing 382. Sensor can 387 has a tubular wall arranged partially alongside a housing section of the inflator assembly to thereby define a closed space between the outer cover 386 and an outer surface of the inflator assembly in which the sensor assembly is positioned. The sensor crush-sensing outer cover 386 has a slight arcuate shape so that it oil-cans downward pressing on lever 388 through a hemi-spherical pusher member 394. Lever 388 is hingedly mounted at one end thereof to enable it to rotate about its attachment point 389 to the sensor housing 382 and causes lever 390 to also rotate about its pivot point 391 on the sensor housing 382 by virtue of hinge 393. An end 392 of lever 390 extends through an aperture 395 in a wall of the sensor housing 382 and serves to restrain the sensing mass 383 from any movement (FIG. 46). The rotation of lever 390 causes the end 392 of lever 390 to pull out of the sensor housing 382 where it was detenting the sensing mass 383 and preventing the sensing mass 383 from rotating to the degree necessary to release a firing pin spring 384. The sensing mass 383 is then free to move and release the firing pin spring 384 causing the firing pin spring 384 to ignite the stab primer in the inflator assembly, either by contact therewith or by pressure against the inflator assembly housing (see above) causing inflation of the airbag (FIG. 47A). Thus, until the sensor experiences a crushing force from the crash, the airbag system cannot deploy. The sensing mass 383, firing pin spring 384, inflator assembly and airbag may have the same structure as described above with reference to FIGS. 37 and 38. Other features of any of the disclosed embodiments not inconsistent with the embodiments shown in FIGS. 45-47 may also be incorporated therein.

Levers 388 and 390 are joined together by hinge 393 and can be made from a single piece of material. In this case, the hinge would be formed either by a coining or stamping operation or by a milling operation. Naturally, the two levers need not be joined together.

This provides a sensor system that requires the occurrence of two environments that are always present in a crash, crush and velocity change. The crush sensing outer cover 386 is designed to respond and arm the sensor when impacted from any reasonable direction by an impact plate (not shown)

which is likely to occur in a crash. For many vehicles, the crush may not reach the sensor at the time that deployment is required. In the case where two systems are used on each side of the vehicle, for example, and an impact occurs at the A-pillar, the rear seat system may not experience crush in time. The arming system shown in FIG. 45 could still be used where the arming would occur when the system is mounted onto the vehicle instead of when the crash occurs. In this case, the curved impact plate would not be necessary and the deflection of the sensor cover would occur either during the mounting process or by a separate operation after the system is mounted.

FIG. 46 is a cross section view of the apparatus of FIG. 45 taken along lines 46-46 showing the crush sensing outer cover 386 and lever system after end 392 has moved out of aperture 395 as a result of crush of the vehicle but before the sensing mass 383 of the discriminating sensor has begun to move. FIG. 47 is a similar view of the apparatus of FIG. 46 but shows the sensing mass 383 of the discriminating sensor after it has moved and released firing pin 381, triggering the inflation of the airbag.

The motion of the sensing mass 383 is damped by the requirement that air must flow between the sensing mass and the housing in the manner described in more detail in the '253 patent referenced above. Naturally, other damping methods such as magnetic damping could also be used.

In the case of FIG. 45, the sensor is entirely surrounded by a metal can 387 that is formed by a drawing process. The sensor can 387 is attached to the inflator assembly; more particularly, the sensor can 387 is attached to one or more housing sections thereof. The attachment of the sensor can 387 to the inflator assembly or housing section(s) thereof is achieved using structural adhesive such as a urethane or epoxy compound. In this manner, the sensor is hermetically sealed.

The term hermetic seal as used herein means a seal which will not permit the passage of any significant amount of moisture or other contaminants into the interior of the self-contained airbag module and further will not permit the passage of gas into or out of the sensor housing of sufficient quantity as to change the gas density by more than about 5% at any time over the life of the vehicle. Each vehicle manufacturer has an accelerated life test that can be used along with appropriate sensor testing equipment to test the sensor seals according to this definition. Typical O-ring seals are not hermetic by this definition however properly designed plastic and metal welded seals and epoxy and urethane seals are hermetic.

Figure 48:
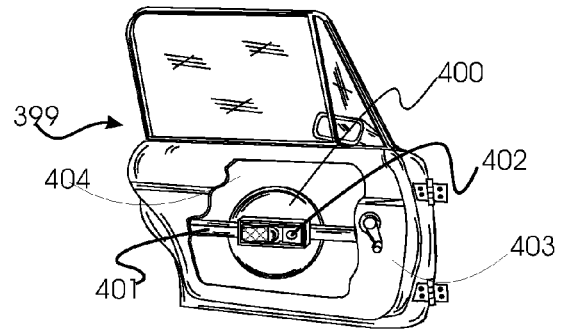
FIG. 48 is a perspective view of a side impact airbag system illustrating the placement of the airbag vents in the door panel and the exhausting of the inflator gases into the vehicle door and also showing the use of a pusher plate to adjust for the mismatch between the point of impact of an intruding vehicle and the sensor of a self-contained side impact airbag system.

FIG. 48 is a perspective view of a side impact airbag system illustrating the placement of the airbag vents in the door panel and the exhausting of the inflator gases into the vehicle door 399 and also showing the use of a pusher plate 400 to adjust for the mismatch between the point of impact of an intruding vehicle (or other object) and the sensor of a self-contained side impact airbag system 402. The pusher plate 400 is shown attached to the main structural door beam 401 in this illustration but other mounting systems are also possible. The airbag system 402 is shown between the inner panel 403 and the outer panel 404 of the door 399.

The pusher plate 400 is dimensioned and installed in the door 399 so that during a side impact to any portion of the side of the vehicle which is likely to cause intrusion into the passenger compartment and contact an occupant, the pusher plate will remain in a substantially undistorted form until it has impacted with the sensor causing the sensor to begin deployment of the airbag. In this implementation, a non-sodium azide propellant, such as nitro-cellulose, is used and the gas is exhausted into the door though a pair of orifices. The airbag system 402 may be any of those disclosed herein. As shown in FIG. 48, the pusher plate 400 may be circular.

Figure 49:
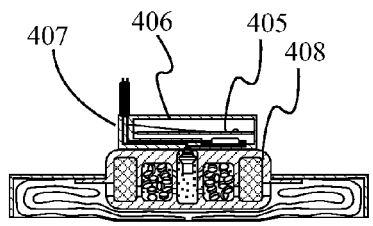
FIG. 49 is a cross-sectional view of a self-contained side impact airbag system using an electro-mechanical sensor.

FIG. 49 is a cross-sectional view of a self-contained side impact airbag system using an electro-mechanical sensor. An electro-mechanical sensor is one in which the sensing is accomplished through the motion of a sensing mass from a first at-rest position to a second activating position at which point an event happens which typically involves the closing of a switch by mechanical or magnetic means. In the embodiment shown in FIG. 49, biasing spring contact 405 is caused to engage contact 406 arranged on top cover when the sensor experiences a crash as described above, i.e., acceleration of the sensor housing above a predetermined threshold value which results in movement of the sensing mass until the biasing contact 405 contacts the other contact 406. Specifically, the biasing spring contact 405 is positioned in a position (e.g., bearing against the sensing mass in the sensor housing) so that it is moved during a crash along with movement of the sensing mass (in the upward direction in FIG. 49) to thereby bring the biasing spring contact 405 into contact with contact 406. An electrical circuit is thereby completed causing ignition of the primer or squib and thereafter the igniter mix and propellant. As shown in FIG. 49, the structure of the sensor housing 407, inflator assembly 408, the mounting plate and sensing mass may be as described above in appropriate part.

The implementation of FIG. 49 is a preferred location for the self-contained airbag module of this invention. Naturally, some of the teachings of this invention can be practiced without necessitating a self-contained module. For some implementations, for example, it is desirable to place the airbag module at some other location than the vehicle door. One such location, for example, is the vehicle seat. For this implementation, the crash sensor in general cannot be co-located with the airbag module. Therefore, it can be mounted on the side of the vehicle or elsewhere as long as there is a sufficiently strong member connecting the crash sensor to the vehicle side such that there is little or no plastic deformation between the sensor and the side of the vehicle. Thus, the sensor experiences essentially the same crash signal as experienced by the side of the vehicle. Through this technique, the sensor acts as if it were mounted on the side of the vehicle and yet the wiring does not have to go through the door and through the hinge pillar to the airbag module. In this way, the sensor can be mounted remote from the vehicle side and yet perform as if it were located on the vehicle side which is accomplished by using an extension of the sensor, which can be a structural member of the vehicle.

Figure 50:
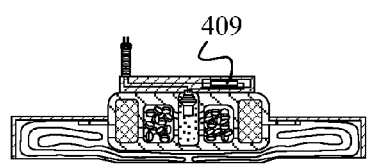
FIG. 50 is a cross-sectional view of a self-contained side impact airbag system using an electronic sensor.

FIG. 50 is a cross-sectional view of a self-contained side impact airbag system using an electronic sensor that generates a signal representative of the movement of a sensing mass. Unless otherwise stated or inconsistent with the following description of an airbag system with an electronic sensor, the airbag system with an electronic sensor may include the features of the airbag system described above and below. An electronic sensor is one in which the motion of the sensing mass is typically continuously monitored with the signal electronically amplified with the output fed into an electronic circuit which is usually a micro-processor. Electronic sensors typically use accelerometers that usually make use of strain gage or piezo-electric elements shown here as 409. The piezo-electric element generates a signal representative of the movement of the sensing mass. Modern accelerometers are sometimes micro-machined silicon and combined with other elements on an electronic chip. In electro-mechanical sensors, the motion of the sensing mass is typically measured in millimeters and is much larger than the motion of the sensing mass in electronic sensors where the motion is frequently measured in microns or portions of a micron. The signal representative of the motion of the sensing mass is recorded over time and an algorithm in the micro-processor may be designed to determine whether the movement over time of the sensing mass results in a calculated value which is in excess of the threshold value based on the signal. The sensing mass may constitute part of the accelerometer, e.g., the sensing mass is a micro-machined acceleration sensing mass. In this case, the microprocessor determines whether the movement of the sensing mass over time results in an algorithmic determined value that is in excess of the threshold value based on the signal.

In embodiments using an electronic sensor, the inflator may include a primer which is part of an electronic circuit including the accelerometer such that upon movement over time of the sensing mass results in a calculated value in excess of the threshold value, the electronic circuit is completed thereby causing ignition of the primer.

When the term electrical as used herein it is meant to include both electro-mechanical and electronic systems.

Figure 51:
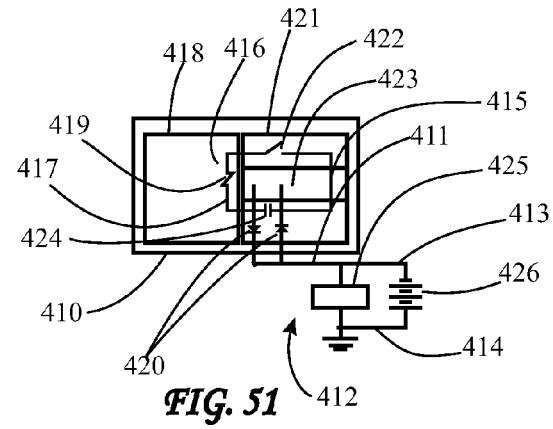
FIG. 51 is a schematic of the electric circuit of an electro-mechanical or electronic self-contained side impact airbag system.

FIG. 51 is a schematic of the electric circuit of an electro-mechanical or electronic side impact airbag system. The self-contained module implementation shown generally at 410 contains a sensor assembly 421 and an airbag and inflator assembly 418. The sensor assembly 421 contains a sensor 422, a diagnostic module 423, an energy storage capacitor 424, and a pair of diodes 420 to prevent accidental discharge of the capacitor if a wire becomes shorted. The module is electrically connected to a diagnostic monitoring circuit 425 by wire 411 and to the vehicle battery 426 by wire 413. It is also connected to the vehicle ground by wire 412. The sensor, diagnostic and capacitor power supplies are connected to the squib by wires 415 through 417.

In a basic configuration, the diagnostic monitoring circuit 425 checks that there is sufficient voltage on the capacitor to initiate the inflator in the event of an accident, for example, and either of wires 411, 412, 413 or 414 are severed. In this case, the diagnostic internal to the self-contained module would not be necessary. In more sophisticated cases, the diagnostic module 423 could check that the squib resistance is within tolerance, that the sensor calibration is correct (through self testing) and that the arming sensor has not inadvertently closed. It could also be used to record that the arming sensor, discriminating sensor and airbag deployment all occurred in the proper sequence and record this and other information for future investigative purposes, e.g., in a "black box". In the event of a malfunction, the diagnostic unit could send a signal to the monitoring circuitry that may be no more than an indication that the capacitor was not at full charge.

A substantial improvement in the reliability of the system may be achieved by placing the diagnostic module and backup power supply within the self-contained airbag system particularly in the case of side impacts where the impact can take place at any location over a wide area. An impact into a narrow pole at the hinge pillar, for example, might be sufficient to sever the wire from the airbag module to the vehicle power source before the sensor has detected the accident.

Most of the advantages of placing the sensor, diagnostic and backup power supply within the self-contained module can of course be obtained if one or more of these components are placed in a second module in close proximity to the self-contained module. For the purposes of electro-mechanical or electronic self-contained modules, therefore, as used herein, the terms "self-contained module" or "self-contained airbag system" will include those cases where one or more of the components including the sensor, diagnostic and backup power supply are separate from the airbag module but in close proximity to it. For example, in the case of steering wheel mounted systems, the sensor and backup power supply would be mounted on the steering wheel and in the case of side impact door mounted systems, they would be mounted within the door or seat. In conventional electrical or electronic systems, on the other hand, the sensor, diagnostic module and backup power supply are mounted remote from the airbag module in a convenient location typically centrally in the passenger compartment such as on the tunnel, under the seat or in the instrument panel.

With the placement of the backup power supply in the self-contained module, greater wiring freedom is permitted. For example, in some cases for steering wheel mounted systems, the power can be obtained through the standard horn slip ring system eliminating the requirement of the ribbon coil now used on all conventional driver airbag systems. For side impact installations, the power to charge the backup power supply could come from any convenient source such as the power window or door lock circuits. The very low resistance and thus high quality circuits and connectors now used in airbag systems are not required since even an intermittent or high resistance power source would be sufficient to charge the capacitor and the existence of the charge is diagnosed as described above.

Herein, the terms capacitor, power supply and backup power supply have been used interchangeably. Also, other energy storage devices such as a rechargeable battery could be used instead of a capacitor. For the purposes of this disclosure and the appended claims, therefore, the word capacitor will be used to mean any device capable of storing electrical energy for the purposes of supplying energy to initiate an inflator. Initiation of an inflator will mean any process by which the filling of an airbag with gas is started. The inflator may be either pure pyrotechnic, stored gas or hybrid or any other device which provides gas to inflate an airbag.

As discussed above, FIG. 25 is a side view showing the preferred mounting of two self-contained airbag modules 212 and 213 on the side on a two door vehicle. Module 212 is mounted inside of a door, whereby the sensor housing of module 212 is most proximate the exterior of the vehicle, while module 213 is mounted between the inner and outer side panels at a location other than the door, in this case, to protect a rear seated occupant. Each of the modules has its own sensor and, in the case of electrical self-contained systems, its own capacitor power supply and diagnostic circuit. Any of the airbag systems disclosed herein may be mounted either inside a door or between inner and outer side panels of the vehicle at a location other than the door and for non self-contained systems, the sensor can be mounted anywhere provided there is a sufficiently strong link to the vehicle side so that the sensor is accelerated at a magnitude similar to the vehicle side crush zone during the first few milliseconds of the crash. In view of the mounting of module 213 between inner and outer panels of the vehicle at a location other than the door, the inner and outer panels are thus fixed relative to the vehicle frame and the module 213 is also thus fixed relative to the frame. By contrast, the module 212 mounted inside the door is moved whenever the door is opened or closed.

Although several preferred embodiments are illustrated and described above, there are possible combinations using other geometries, materials and different dimensions for the components that can perform the same function. For example, the biasing spring need not be the same as the biasing spring in the case of the implementation shown in FIG. 37 and a magnet might be used in place of a biasing spring for several of the mechanical cases illustrated. Therefore, this invention is not limited to the above embodiments and should be determined by the claims.

1.6 Anticipatory Sensing

FIG. 18 illustrates a side impact anticipatory sensor system, shown here including transducers 130-138 which can be situated in different locations on one side of the vehicle, using the same or a different computer system or processor as discussed above, and coupled thereto by suitable means (the other side of the vehicle can be provided with the same arrangement). These transducers can be optical or infrared imagers such as two or three dimensional CMOS or CCD cameras, line cameras, laser radar (lidar or ladar) devices, ultrasonic sensors, radar devices etc. These transducers can provide the data to permit the identification of an object that is about to impact the vehicle at that side as well as its velocity and point of impact. An estimate can then be made of the object's weight and therefore the severity of the pending accident. This provides the information for the initial inflation of the side airbag before the accident begins. If additional information is provided from the occupant sensors, the deployment of the side airbag can be tailored to the occupant and the crash in a similar manner as described above.

FIG. 18 also illustrates additional inputs that, in some applications, provide useful information in determining whether a side airbag should be deployed, for example. These include inputs from a front-mounted crash sensor 139 mounted on the vehicle radiator 140, an engine speed sensor 166, and a wheel speed sensor 141 as used in an antilock braking system sensor.

The use of anticipatory sensing, as described above and in U.S. Pat. No. 6,343,810 can be used in a Phase 4 Smart Airbag system. This can be done with the anticipatory sensor acting in concert with or in place of the accelerometer-based neural network crash sensor described above. In a preferred embodiment, both sensors are used with the anticipatory sensor forecasting the crash severity before the collision occurs and one or more accelerometer based sensors confirm that forecast. The mass of the impacting object, for example, can be anticipated and confirmed.

Collision avoidance systems currently under development use radar or laser radar to locate objects such as other vehicles that are in a potential path of the subject vehicle. In some systems, a symbol can be projected onto the windshield in a heads-up display signifying that some object is within a possible collision space with the subject vehicle. No attempt at present is made to determine what that object is and to display an image of the object. Neural network pattern recognition systems, as well as other pattern recognition systems, have that capability and future collision avoidance systems may need this capability. The same pattern recognition computer system that is proposed here for sensing crashes can also be used for collision avoidance pattern recognition as well as anticipatory sensing.

If a camera-based system is used for anticipatory sensing, an accurate image can be obtained of the bullet object and a neural network-based classifier can identify what the object is. Unless stereo or other 3D camera systems are used, it is difficult to obtain the velocity and range on the bullet object from the camera image alone unless range gating is used as disclosed in U.S. patent application Ser. No. 11/034,325. On the other hand, if a scanning laser ranging system is used, the image quality is poor if a single scan line is used and improves with more scan lines but at the expense of increasing cost and complexity. A 6 sided polygon-based rotating mirror scanner can provide 6 lines of scan and cover 60 degrees which is sufficient for frontal or rear impacts but probably not for side impacts where at least a 90 degree or 120 degree scan is preferred. Fortunately, a neural network can usually accurately identify an object from a few scan lines especially considering that the relative motion of the vehicle permits the system to really obtain more lines that the scanner produces in a single revolution. An alternate system is to use a modulated laser or other light source in a diverging beam mode and to either modulate the light and determine the nearest object and assume that it is a reflection from the bullet object or to use a Kerr or Pokel cell or equivalent as a range gating light valve to permit an image of the bullet object to be acquired along with its range. In the latter case, the Doppler shift can be used to determine the velocity of the bullet object (see the '325 application).

Figure 19:
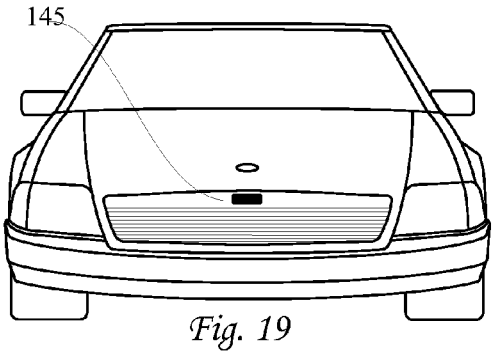
FIG. 19 is a frontal view of an automobile showing the location of an electromagnetic wave crash anticipatory or avoidance sensor which uses the same pattern recognition computer system as the crash sensor.

FIG. 19 is a front view of an automobile showing the location of an electromagnetic wave anticipatory or collision avoidance sensor 145 which can use the same neural computer system as the crash sensor discussed above and thus is coupled thereto. Previously, radar and laser radar systems have been developed for collision avoidance systems. It is noteworthy that no such systems have been fielded on a production vehicle due to significant problems that remain to be solved. An alternate technology uses infrared electromagnetic waves and a receiver and processing system which both analyzes the image prior to illumination from the vehicle and after illumination to achieve more information. The image is then digitized and fed into a neural network for analysis.

Once an anticipatory sensor is in place, the data can also be combined with data from acceleration sensors and occupant sensors fed into the neural network system for the smart airbag. Even prior to the smart airbag system, pre-crash data can be combined with acceleration data and the acceleration data used to confirm the conclusions of the pre-crash sensor(s) with regard to mass of the striking object and the location of the impact. Thus, the data from the anticipatory sensor can be incorporated as soon as it is available to improve the airbag system.

As mentioned elsewhere herein and in other patents of the current assignee, anticipatory sensors can also be used to identify the object that may be involved in a rear impact. In this manner, the driver would know if he or she is about to run over something as the vehicle is being operated in reverse and also what the object is. Thus, an image of that object can be made available on any convenient display, such as a heads-up display to the vehicle operator. This provides a clear view of objects in the rear of the vehicle that may sometimes be difficult to see in a video image. Anticipatory sensors are useful when a vehicle is about to be impacted from the rear by another vehicle. Both the identity and the velocity can be determined and the seatbelts pretensioned, seats and headrests adjusted etc. to prepare the occupant(s) for the impact.

Anticipatory sensors are most applicable for side impacts as discussed above but of course can be effectively used for frontal and rear impacts. Another feature that becomes available is the possibility of using the seatbelt or another small, positioning airbag that would be inflated prior to the curtain airbag to prevent the head of the occupant from being trapped between the window frame and the curtain airbag. If an IMU, or equivalent sensor system, is available, then the motion of an occupant's head can be projected and again action taken to prevent head entrapment. If occupant sensors are also present that can visually or ultrasonically, for example, track the occupant's head then, coupled with appropriate acceleration sensors, the curtain airbag deployment timing can be made such that the occupant's head is not trapped. As mentioned above, a seatbelt pretensioner can also be designed to provide a force on the occupant to prevent entrapment.

Appendix 2 of the parent '623 application contains a technical report of frontal anticipatory sensing development.

1.7 Rollover Sensing

As mentioned above (see FIG. 2 and the tri-axial accelerometer and/or gyroscopes 56 (or IMU)), the event of a vehicle rollover can be sensed and forecasted early in the process through the use of the satellite accelerometers and/or the use of gyroscopes in particular an IMU. Additionally, if a plurality of GPS antennas are mounted spread apart on the vehicle the vehicle attitude can be determined from the phases of the carrier signals from the GPS satellites. Outputs from these sensors can be fed into a microprocessor where either a deterministic algorithm based on the equations of motion of the vehicle or a pattern recognition algorithm can be used to process the data and predict the probability of rollover of the vehicle. This process can be made more accurate if map information is available indicating the shape of the roadway on which the vehicle is traveling. Furthermore, vertical accelerometers can provide information as to inertial properties of the vehicle which can be particularly important for trucks where the loading can vary.

1.8 Rear Impact Sensing

A preferred method for rear impact sensing as discussed herein is to use anticipatory sensors such as ultrasonic backup sensors. However, sensors that measure the crash after the crash has begun can also be used as also disclosed herein. These can include the rod-in-tube crush sensor or other crush measuring sensors, a ball-in-tube velocity change sensor or other velocity change sensors, a swinging flapper inertially damped sensor, an electronic sensor based on accelerometers or any other principles or any other crash sensor. The sensor can be mounted in the crush zone or out of the crush zone in the passenger compartment, for example. A preferred non-crush zone mounted sensor is to use an IMU as discussed herein.

1.9 Sensor Combinations

If the passenger compartment discriminating sensor is of the electronic type, the triggering threshold can be changed based on the crush velocity as measured by the sensor of this invention in the crush zone. Passenger compartment sensors sometimes trigger late on soft long duration frontal crashes even though the velocity change is significantly higher than the desired deployment threshold (see, e.g., reference 4). In such a case, the fact that the crush velocity sensor has determined that a crash velocity requiring an airbag is occurring can be used to modify the velocity change required for the electronic passenger compartment-mounted sensor to trigger. Thus, in one case, the passenger compartment sensor can prevent the deployment of the air bag when the velocity change is too low as in the animal impact situation discussed above and in the second case, the crush zone sensor can cause the discriminating sensor to trigger faster in a soft crash and minimize the chance of a late triggering condition where the occupant is out-of-position and in danger of being injured by the deploying air bag.

Figure 20:
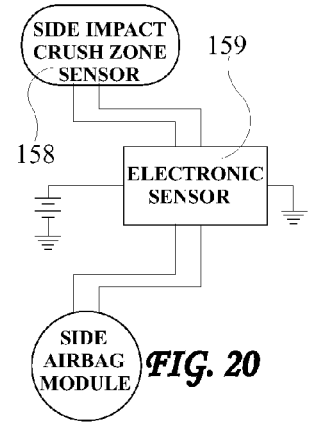
FIG. 20 is a circuit schematic showing a side mounted velocity sensor used with a non-crush zone mounted sensor.

FIG. 20 shows schematically such a circuit applied to side impacts where an electronic sensor 159 triggers deployment of the side airbag resident in a side airbag module and crush velocity sensor 158 is used as input to the electronic sensor 159. The electronic sensor could be mounted in the passenger compartment but designed with a very low threshold. Its purpose is to verify that a crash is in progress to guard against a hammer blow to the sensor setting off the airbag. In this case, the current carrying capacity of the crush sensor 158 can be much less and thinner wires can be used to connect it to the electronic sensor 159.

In one scenario, the electronic sensor may be monitoring an event in progress when suddenly the crush sensor 158 signals that the vehicle has crushed with a high velocity where the sensor is mounted. The electronic sensor 159 now uses this information along with the acceleration signal that it has been monitoring to determine the severity of the crash. The crush velocity sensor 158 informs the electronic sensor 159 that a crash of a certain velocity is in progress and the electronic sensor 159, which may comprise an accelerometer and a microprocessor with a crash analysis algorithm, determines the severity of the crash based on the acceleration signal and the crush velocity.

If the acceleration signal is present but the crush sensor 158 fails to record that a crash is in progress, then the electronic sensor 159 knows that the acceleration signal is from either a non-crash event or from a crash to some part of the vehicle, such as in front of the A-pillar or behind the C-pillar where deployment of the airbag is not warranted. The A-pillar is the forwardmost roof support member on which the front doors are hinged and the C-pillar is the rearmost roof support pillar usually at or behind the rear seat.

Knowledge of the impact location, as detected using the coaxial cable sensor described above, can be used to alter the interpretation of the acceleration signal provided by the passenger compartment sensor, if such is deemed beneficial. This may provide an advantage in that a decision to deploy an occupant restraint device is made earlier than normally would be the case if the location of the impact location were not considered in the control of the occupant restraint devices.

If the passenger compartment discriminating sensor is of the electronic type, the triggering threshold can be changed based on the condition of the sensor in the crush zone. Passenger compartment sensors sometimes trigger late on soft long duration crashes even though the velocity change is significantly higher than the desired deployment threshold. See for example, SAE Paper No. 900548 (reference 4). In such a case, the fact that the crush velocity change sensor in the crush zone indicates that deployment of an airbag is required can be used to modify the velocity change, or other parameters, required for the electronic sensor in the passenger compartment to trigger. Thus, in one case, the passenger compartment sensor can prevent the deployment of the airbag when the velocity change is too low as in the animal impact and in the second case, the crush zone sensor can cause the passenger compartment sensor to trigger faster in a soft crash and minimize the chance of a late triggering condition where the occupant is out-of-position and in danger of being injured by the deploying airbag.

Figure 21:
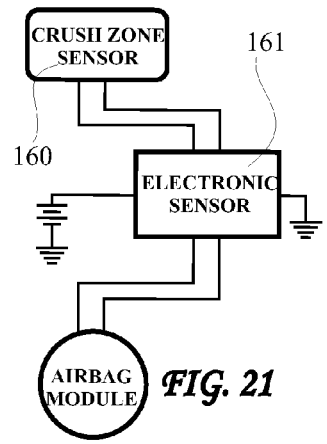
FIG. 21 is a circuit schematic showing a forward mounted sensor used as an input to an electronic sensor.

FIG. 21 shows schematically such a circuit where an electronic sensor 161 triggers deployment of the airbag and crush zone velocity sensor 160 is used as input to the electronic sensor 161. In this case, the current carrying capacity of the crush zone sensor 160 can be much less and thinner wires can be used to connect it to the electronic sensor 161. In one scenario, the electronic sensor 161 may be monitoring a crash in progress when suddenly the front crush zone sensor 160 signals that the vehicle crush zone is experiencing a high velocity change. The electronic sensor 161 now realizes that this is a soft, deep penetration crash that requires an airbag according to a modified algorithm. The conditions for deploying the airbag can be modified based on this crush velocity information. In this manner, the combined system can be much smarter than either sensor acting alone. A low speed offset pole or car-to-car underride crash are common real world examples where the electronic sensor 161 in the passenger compartment might trigger late without the information provided by the forward-mounted crush zone sensor 160.

The crush zone sensor 160 can detect a reaction of the crush zone to the crash, e.g., crush of the crush zone, a velocity change of the crush zone or acceleration of the crush zone. That is, sensor 160 does not necessarily have to be one of the crush sensors disclosed above (or another sensor which triggers based on crush of the crush zone of the vehicle) but rather, can be designed to trigger based on other reactions of the crush zone to a crash, including the velocity change of the crush zone and the acceleration of the crush zone, as well as functions thereof (and combinations of any such reactions).

Figure 21A:
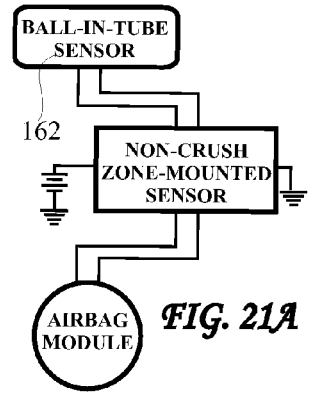
FIG. 21A is a circuit schematic showing a forward mounted ball-in-tube sensor used as an input to a crash sensor mounted outside of the crush zone.
Figure 21B:
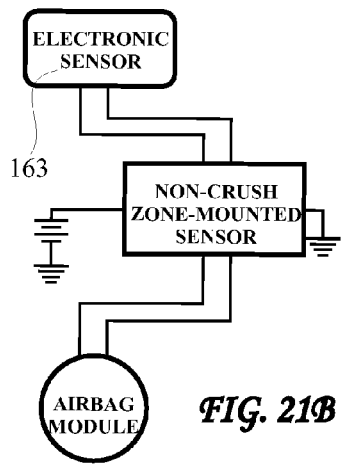
FIG. 21B is a circuit schematic showing a forward mounted electronic sensor used as an input to a crash sensor mounted outside of the crush zone.
Figure 21C:
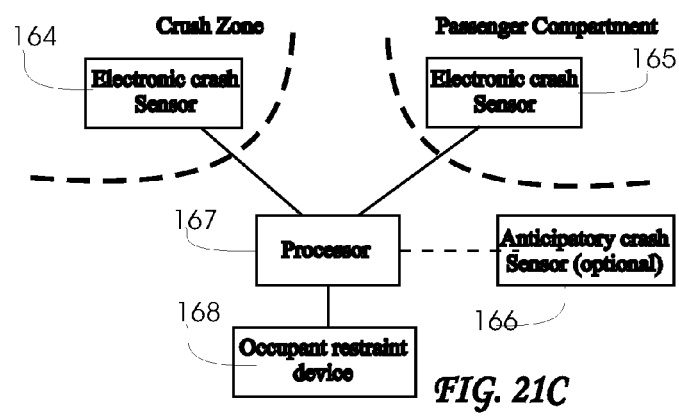
FIG. 21C is a schematic of an electronic crash sensor arrangement including a crush-zone mounted crash sensor and a non-crush-zone mounted crash sensor.

FIG. 21A shows a schematic circuit of an arrangement in accordance with the invention with a ball-in-tube sensor 162 as the crush zone sensor and FIG. 21B shows a schematic circuit of an arrangement in accordance with the invention with an electronic sensor 163 as the crush zone sensor Referring now to FIGS. 21C and 21D, in keeping with the same theme discussed with reference to FIGS. 21, 21A and 21B, an electronic crash sensor arrangement in accordance with the invention may include a first electronic crash sensor 164 mounted in the crush zone and a second electronic crash sensor 165 mounted outside of the crush zone, for example in or around the passenger compartment. It may optionally include one or more anticipatory sensors 166. A processor 167 is coupled to the crash sensors 164, 165 to receive signals therefrom indicative of measurements obtained by the crash sensors 164, 165. One or more occupant restraint devices 168 is coupled to the processor 167 and controlled thereby. The crash sensors 164, 165 are thus coupled together indirectly via the processor 167 or may be coupled together directly, i.e., via a common bus.

Each crash sensor 164, 165 provides measurements or data readings to the processor 167 which then determines whether the conditions for deploying any of the occupant restraint devices 168 are satisfied and if so, initiates deployment of one or more of the occupant restraint devices 168. The conditions for deployment may be satisfied by the measurements from only one crash sensor, e.g., a high velocity crash with only minimal crush of the vehicle or a low velocity crash with significant crush of the vehicle, or from both crash sensors (or all three crash sensors when an anticipatory crash sensor 166 is provided or two of the three crash sensors when an anticipatory crash sensor 166 is provided).

In addition, it is possible to relate the deployment conditions of the non-crush-zone mounted sensor 165 to the measurements from the crush zone. In such an embodiment, the reaction of the crush zone to a crash is measured via the electronic crash sensor 164 (step 169 in FIG. 21D) and another reaction of the vehicle to a crash, other than crush, is measured by the second electronic crash sensor 165 (step 170). The measurements may be spaced in time or simultaneous. Thereafter, at step 171, a determination is made, e.g., by processor 167, whether there is a reaction in the crush zone, i.e., crush of the vehicle or a portion thereof. If so, an algorithm or parameters of the deployment may be modified at step 172. Thereafter, a determination is made by the processor 167 whether any of the conditions for deployment of the occupant restraint device 168 are satisfied (step 173), either the predetermined conditions or modified conditions.

If so, a control signal is generated and sent to deploy one or more of the occupant restraint devices to initiate deployment of the same (step 174). If not, then the crash sensors 164, 165 would continue to measure the reaction of the vehicle or portions thereof, i.e., a feedback loop to steps 169 and 170.

Figure 70:
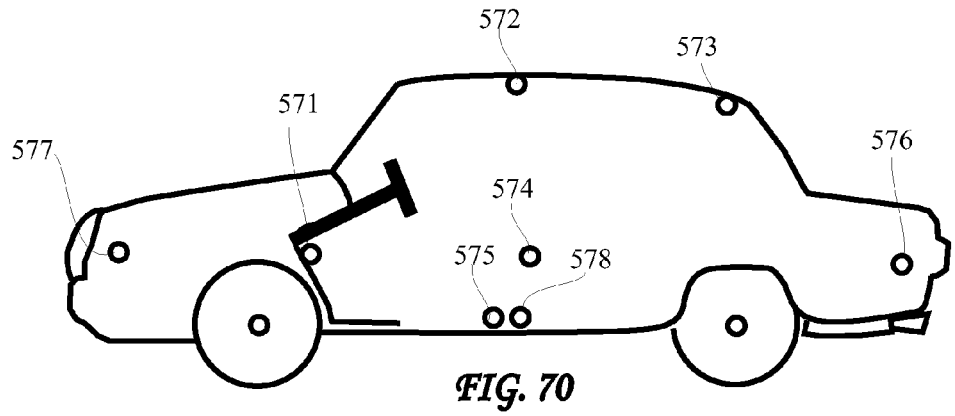
FIG. 70 is a schematic of a vehicle with several accelerometers and/or gyroscopes at preferred locations in the vehicle.

FIG. 70 illustrates the placement of a variety of sensors, primarily accelerometers and/or gyroscopes, which can be used to diagnose the state of the vehicle itself. Sensor 571 can measure the acceleration of the firewall or instrument panel and is located thereon generally midway between the two sides of the vehicle. Sensor 572 can be located in the headliner or attached to the vehicle roof above the side door. Typically, there will be two such sensors one on either side of the vehicle. Sensor 573 is shown in a typical mounting location midway between the sides of the vehicle attached to or near the vehicle roof above the rear window. Sensor 576 is shown in a typical mounting location in the vehicle trunk adjacent the rear of the vehicle. One, two or three such sensors can be used depending on the application. If three such sensors are use one would be adjacent each side of vehicle and one in the center. Sensor 574 is shown in a typical mounting location in the vehicle door and sensor 575 is shown in a typical mounting location on the sill or floor below the door. Finally, sensor 577, which can be also multiple sensors, is shown in a typical mounting location forward in the crush zone of the vehicle. If three such sensors are used, one would be adjacent each vehicle side and one in the center.

In general, sensors 571-577 measure a physical property of the location at which they are mounted. For example, the physical property would be the acceleration of the mounting location if the sensor is an accelerometer and would be angular inclination if the sensor is a gyroscope. Another way of looking at would be to consider that sensors 571-577 provide a measurement of the state of the sensor, such as its velocity, acceleration, angular orientation or temperature, or a state of the location at which the sensor is mounted. Thus, measurements related to the state of the sensor would include measurements of the acceleration of the sensor, measurements of the temperature of the mounting location as well as changes in the state of the sensor and rates of changes of the state of the sensor. However, any described use or function of the sensors 571-577 above is merely exemplary and is not intended to limit the form of the sensor or its function.

Each of the sensors 571-577 may be single axis, double axis or triaxial accelerometers and/or gyroscopes typically of the MEMS type. These sensors 571-577 can either be wired to the central control module or processor directly wherein they would receive power and transmit information, or they could be connected onto the vehicle bus or, in some cases, using RFID technology, the sensors can be wireless and would receive their power through RF from one or more interrogators located in the vehicle. In this case, the interrogators can be connected either to the vehicle bus or directly to control module. Alternately, an inductive or capacitive power and information transfer system can be used.

One particular implementation will now be described. In this case, each of the sensors 571-577 is a single or dual axis accelerometer. They are made using silicon micromachined technology such as disclosed in U.S. Pat. No. 5,121,180 and U.S. Pat. No. 5,894,090. These are only representative patents of these devices and there exist more than 100 other relevant U.S. patents describing this technology. Commercially available MEMS gyroscopes such as from Systron Doner have accuracies of approximately one degree per second. In contrast, optical gyroscopes typically have accuracies of approximately one degree per hour. Unfortunately, the optical gyroscopes are prohibitively expensive for automotive applications. On the other hand, typical MEMS gyroscopes are not sufficiently accurate for many control applications.

The angular rate function can be obtained through placing accelerometers at two separated, non-co-located points in a vehicle and using the differential acceleration to obtain an indication of angular motion and angular acceleration. From the variety of accelerometers shown on FIG. 70, it can be readily appreciated that not only will all accelerations of key parts of the vehicle be determined, but the pitch, yaw and roll angular rates can also be determined based on the accuracy of the accelerometers. By this method, low cost systems can be developed which, although not as accurate as the optical gyroscopes, are considerably more accurate than conventional MEMS gyroscopes.

Instead of using two accelerometers at separate locations on the vehicle, a single conformal MEMS-IDT gyroscope may be used. Such a conformal MEMS-IDT gyroscope is described in a paper by V. K. Varadan, "Conformal MEMS-IDT Gyroscopes and Their Comparison With Fiber Optic Gyro". The MEMS-IDT gyroscope is based on the principle of surface acoustic wave (SAW) standing waves on a piezoelectric substrate. A surface acoustic wave resonator is used to create standing waves inside a cavity and the particles at the anti-nodes of the standing waves experience large amplitude of vibrations, which serves as the reference vibrating motion for the gyroscope. Arrays of metallic dots are positioned at the anti-node locations so that the effect of Coriolis force due to rotation will acoustically amplify the magnitude of the waves. Unlike other MEMS gyroscopes, the MEMS-IDT gyroscope has a planar configuration with no suspended resonating mechanical structures.

Accelerometers and gyroscopes based on SAWs have been reported in the literature mentioned herein. Some such SAW devices can be interrogated wirelessly and require no source of power other than the received RF frequency. Such devices, therefore, can be placed in a variety of locations within or on a vehicle and through a proper interrogator can be wirelessly interrogated to obtain acceleration and angular rate information from various locations. For example, a plurality of such devices can be distributed around the periphery of a vehicle to sense the deformation velocity or angular rate of a portion of the periphery of the vehicle giving an early crash signal.

The system of FIG. 70 using dual axis accelerometers therefore provides a complete diagnostic system of the vehicle itself and its dynamic motion. Such a system is far more accurate than any system currently available in the automotive market. This system provides very accurate crash discrimination since the exact location of the crash can be determined and, coupled with knowledge of the force deflection characteristics of the vehicle at the accident impact site, an accurate determination of the crash severity and thus the need for occupant restraint deployment can be made. Similarly, the tendency of a vehicle to roll over can be predicted in advance and signals sent to the vehicle steering, braking and throttle systems to attempt to ameliorate the rollover situation or prevent it. In the event that it cannot be prevented, the deployment side curtain airbags can be initiated in a timely manner.

Similarly, the tendency of the vehicle to the slide or skid can be considerably more accurately determined and again the steering, braking and throttle systems commanded to minimize the unstable vehicle behavior.

Thus, through the sample deployment of inexpensive accelerometers and MEMS gyroscopes, particularly MEMS-IDT gyroscopes, at a variety of locations in the vehicle, significant improvements are made in the vehicle stability control, crash sensing, rollover sensing, and resulting occupant protection technologies.

Finally, as mentioned above, the combination of the outputs from these accelerometer sensors and the output of strain gage weight sensors in a vehicle seat, or in or on a support structure of the seat, can be used to make an accurate assessment of the occupancy of the seat and differentiate between animate and inanimate occupants as well as determining where in the seat the occupants are sitting. This can be done by observing the acceleration signals from the sensors of FIG. 70 and simultaneously the dynamic strain gage measurements from the seat-mounted strain gages. The accelerometers provide the input function to the seat and the strain gages measure the reaction of the occupying item to the vehicle acceleration and thereby provide a method of determining dynamically the mass and other inertial properties of the occupying item and its location. This is particularly important during occupant position sensing during a crash event. By combining the outputs of the accelerometers and the strain gages and appropriately processing the same, the mass and weight of an object occupying the seat can be determined as well as the gross motion of such an object so that an assessment can be made as to whether the object is a life form such as a human being.

For this embodiment, sensor 578 represents one or more strain gage weight sensors mounted on the seat or in connection with the seat or its support structure. Suitable mounting locations and forms of weight sensors are discussed in the current assignee's U.S. Pat. No. 6,242,701 and contemplated for use in this invention as well. The mass or weight of the occupying item of the seat can thus be measured based on the dynamic measurement of the strain gages with optional consideration of the measurements of accelerometers on the vehicle, which are represented by any of sensors 571-577.

1.10 Safety Bus

The vehicle safety bus is described in U.S. Pat. No. 6,533,316 and U.S. Pat. No. 6,733,036 and can be used with any or all of the sensors, sensor systems, airbag systems and safety systems disclosed herein.

2 Inflators 2.1 Elongate Airbag Module 2.1.1 Ceiling-Mounted

Figure 52:
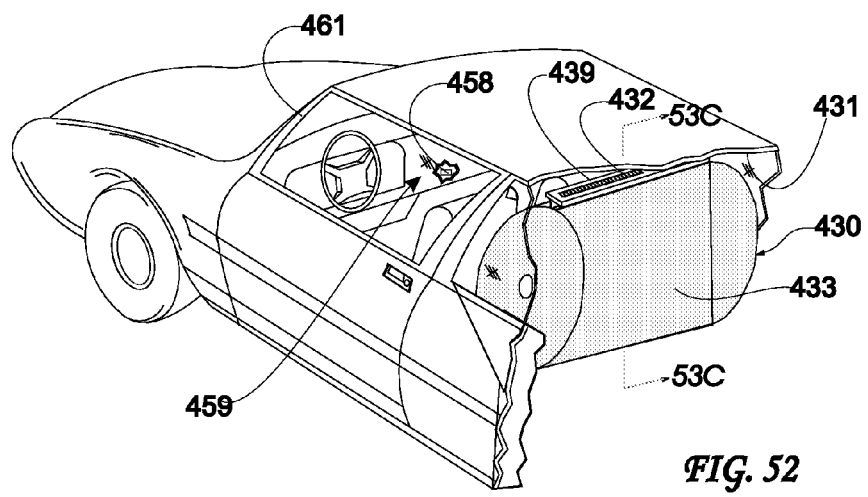
FIG. 52 is a perspective view, with certain parts removed, of a preferred implementation of the airbag module in accordance with the invention shown mounted on a ceiling of a vehicle passenger compartment for deployment to protect rear seat occupants.

An airbag module constructed in accordance with the teachings of the invention and adapted for mounting, e.g., on a ceiling 431 in a passenger compartment 459 of a motor vehicle to protect rear seat occupants in collisions and particularly frontal collisions, is shown generally at 430 in FIG. 52. Airbag module 430 is elongate and includes an inflator module 439 and an airbag 433 (which may be made substantially of plastic film but could also be made of other material) which is coupled to the inflator module 439. Airbag module 430 is attached to a mounting surface of the vehicle which, in the illustrated embodiment, is a middle region of the ceiling 431 by fastening members 432. The airbag module 430, or at least the airbag 433 housed therein, is dimensioned so that it extends across substantially the entire distance between the side windows. Airbag module 430, and more particularly the inflator module 439, is also coupled to a sensor and diagnostic module 458 which receives input data and determines if an accident involving the vehicle is of such severity as to require deployment of the airbag 433. If so, the sensor and diagnostic module 458 sends a signal to the inflator module 439 to start the process of deploying the airbag, i.e., by initiating the burning of a propellant housed within a gas generator portion of the inflator module 439 as described in more detail below. Airbag module 430 may also be attached to the ceiling of the vehicle in a position to deploy the airbag between the dashboard and any front-seated occupants.

FIG. 53A is a cross-sectional view of the airbag module 430 prior to inflation of the airbag 433. As shown in FIG. 53A, the airbag module 430 includes a protective cover 452 which partially defines a housing of the airbag module 430 and as such, encloses the airbag 433 and an interior portion of the airbag module 430 and prevents contaminated particles from entering the interior of the airbag module 430. Shortly after the inflator module 439 is directed to initiate burning of the propellant, the protective cover 452 is released as a direct result of the burning propellant and the folded airbag 433 begins to inflate using a combination of gases from both the gas generator portion of the inflator module 439 and, through aspiration, from the passenger compartment 459 of the vehicle.

The term "airbag" as used herein means either the case where the airbag module 430 contains a single airbag, as in most conventional designs, or where the airbag module 430 contains a plurality of airbags, possibly one inside another or several airbags inside a limiting net having a smaller volume than the volume of the airbags (see U.S. Pat. No. 5,505,485 and U.S. Pat. No. 5,653,464), or where the airbag module 430 contains a single airbag having a plurality of compartments which deploy in concert to protect an occupant. The term "inflator" as used herein means the gas generator plus all other parts required to deliver gas to the airbag including the aspiration system if present. The term "gas generator", on the other hand, refers only to the propellant, its housing and all other parts required to generate gas. In non-aspirated implementations, the inflator and the gas generator are the same. The terms "propellant" and "gas generator" are used sometimes herein as equivalents. The term "cover" as used herein means any type of covering for enclosing an interior portion of the airbag module 430, or at least for overlying the airbag 433 per se, to protect the same and may even constitute a simple covering on an outermost region of the airbag 433. Thus, it will be appreciated by those skilled in the art that the cover may be the material which forms the outer peripheral surface of the passenger compartment, e.g., fabric, without deviating from the objects of the invention. Alternatively, the covering may actually be a surface of the airbag itself coated to appear like a cover.

FIG. 53B is a view of the airbag module 430 of FIG. 53A after the initial stage of airbag inflation where the initial gas from the gas generator has generated sufficient pressure within the interior of the airbag module 430 to force the release of the cover 452. FIG. 53C shows the airbag 433 in its inflated condition and is a view taken along lines 53C-53C of FIG. 52. The cover 452 may also be released by other means such as a pyrotechnic system.

In the embodiment illustrated in FIGS. 53A, 53B and 53C, airbag module 430 is substantially elongate and inflator module 439 comprises an elongate gas generator made from an approximately rectangular-cross-section housing, such as a tube 440, with at least one opening 441 therein for outflow of gas generated thereby. Tube 440 has an arcuate, longitudinally extending bottom wall 448, adjoining longitudinally extending side wall, lateral end walls and a top wall (more clearly visible in FIG. 53I) which together define a reaction chamber.

A propellant 444 in the form of an elongate block of solid material is affixed to the inner surface of the walls of tube 440 in a significant portion of the interior of tube 440. The block of propellant 444 completely overlies the bottom wall 448 and rises along the side and lateral end walls but does not reach the top of these walls as shown in FIG. 53A. Thus, not all of the reaction chamber is filled with propellant 444. The propellant 444 is thus arranged along substantially the entire length of the bottom wall 448 and side walls.

The surface of the propellant 444 not engaging or in contact with a wall of the tube 440 is preferably coated with a layer of pyrotechnic igniter mix 445 such as a coating made from nitrocellulose and BKNO3, or other suitable materials, to aid in starting burning of the propellant 444. In these embodiments, the propellant is entirely enclosed by the walls of the tube 440 and the layer or coating of the igniter mix 445. This layer of igniter mix 445 also serves to seal the propellant 444 from the environment, i.e., the atmosphere. If the material of the igniter mix 445 is made at least partially from nitrocellulose or another appropriate sealant, then another seal to isolate the propellant 444 from the atmosphere is not required and the propellant 444 is effectively hermetically sealed.

A screen member 446 is also positioned within tube 440 in a position spaced from the layer of igniter mix 445 covering the propellant 444 and adjacent to the opening(s) 441 to prevent any particulate matter from leaving the tube 440. Opening 441 is situated in a top wall of the tube 440 opposite the bottom wall 448. A chamber 442 is thus defined between the screen member 446 and the layer of igniter mix 445, which chamber 442 is only a portion of the entire reaction chamber defined by the walls of the tube 440. Although any screen member 446 will inherently provide some initial cooling of the gas from the propellant 444, this is simply an ancillary benefit. On the other hand, for cases where the selected propellant 444 is known to burn at too high a temperature, the screen member 446 can be made thicker so as to also serve as a heat sink, i.e., its size can be regulated to affect the temperature of the gases generated by the burning propellant 444 and expelled from the gas generator 439.

Upon receiving a signal from the sensor and diagnostic module 458, an electronic module (not shown) ignites a squib at one end of the inflator module 433 (FIG. 52) which ignites the igniter mix 445 which in turn ignites the propellant 444. The propellant 444 burns in a direction from the surfaces coated by the igniter mix 445 toward wall 448 (FIG. 53A), which is opposed to the wall of the tube 440 having the opening(s) 441 until the propellant 444 is totally consumed. It will be appreciated by those skilled in the art that the size of the tube 440 can be regulated, i.e., elongated or widened, depending on the propellant used and ideally minimized based on appropriate selection of the propellant and the required gas output parameters of the gas generator, without deviating from the scope of the invention.

It will also be appreciated by those skilled in the art that the igniter mix 445 is substantially coextensive with the propellant 444 in a longitudinal direction, i.e., exposed portions of the propellant 444 are covered by the igniter mix 445 so that they are inherently coextensive. As such, upon ignition of the igniter mix 445, the propellant 444 begins to burn across its entire length. This is beneficial as the pressure generated by the gas may be substantially uniform provided the propellant 444 is uniformly distributed and homogeneous. Other geometries for the igniter mix are possible without deviating from the invention.

The airbag module 430 can also include, external of the tube 440 and in fluid communication with the opening(s) 441, a mixing chamber 447 in which the gas from the gas generator 439 resulting from burning of the propellant 444 and gas from the passenger compartment 459, e.g., air, entering through an aspiration nozzle or inlet ports or inlet slits 450 are combined, and from which the combined gases are delivered to the airbag 433 through a port or nozzle, i.e., converging-diverging nozzle 435 (FIGS. 53B and 53C).

The airbag module 430 also comprises elongate U-shaped nozzle walls 456 (which define the nozzle 435 therebetween), a base 434 which is mounted to the ceiling 431, or other mounting surface, by the fastening members 432 (FIG. 52) and support springs 451. The gas generator 439 is attached to base 434 by brackets 457 described in more detail below (FIG. 53F). Each of the nozzle walls 456 has two leg portions 456a1, 456a2 extending from opposite end regions of a base portion 1456b. At least one of the springs 451, two in the illustrated embodiment, is attached to leg portion 456a1 of each nozzle wall 456 and, as shown in FIG. 53A, prior to airbag inflation they are maintained in a compressed state so that the walls 456 are proximate to the base 434, i.e., the aspiration inlet ports 450 are substantially closed. Attached to the base portion 456b of each nozzle wall 456 is a spring shield 455 which supports and protects the material of the airbag 433 during the initial inflation period, as shown in FIG. 53B, prior to the start of the aspiration when the gases are hot, keeping the airbag 433 from blocking the inlet to the inflator module 439 from the passenger compartment 459. Prior to inflation of the airbag 433, the spring shields 455 exert pressure against the folded airbag 433 to force the same against the cover 452. During inflation, the spring shields 455 are designed to be forced outward by the expulsion of gases from the gas generator 439 and help start the airbag deployment process since the cover 452 no longer acts to restrain the airbag 430, and then the support shields 455 form the converging and diverging portions of the low pressure part of the aspiration nozzle 435. Ends of the airbag 433 are connected to leg portions 456a2. This process uses the high pressure gas from the inflator to initiate deployment of the airbag prior to the start of the aspiration process. In this manner, the initial force needed to release the cover and start the airbag deployment is provided by the initial burning of the propellant. In some cases, two propellant formulations are used. A first rapidly burning mixture to provide an initial high pressure for cover release and initial deployment, followed by a slower burning propellant for inflating the airbag with aspirated air.

In view of this construction, the airbag 433 is not circular but rather is elongate as shown in FIG. 52. Some of the advantages of this non-circular airbag 433 are its ease of manufacture from flat plastic film sheets as described in U.S. Pat. No. 5,653,464 and its ease in parallel folding the airbag into the module 430. In this regard, in view of the elongated shape of the airbag 433, it can be folded lengthwise in the airbag module 430.

In operation, shortly after the propellant 444 has been ignited by the igniter mix 445 and the cover 452 has been released, high pressure gas begins to flow through screen 446, through opening(s) 441 and out through a converging-diverging nozzle 436, 437, 438, also referred to as a convergent-divergent nozzle. The nozzle 436, 437, 438 extends along the longitudinal sides of the inflator module 439. This nozzle has the effect of causing a jet of the combustion gases to achieve a high supersonic velocity and low pressure and to spread to rapidly fill the mixing chamber 447 formed by an outer wall of tube 440, nozzle walls 456 and spring shields 455. This causes a low pressure to occur in the mixing chamber 447 causing substantial amounts of gas to flow through aspirator inlet ports 450, which are opened by the expansion of springs 451 forcing nozzle walls 456 to move away from base 434 as shown, e.g., in FIGS. 53B and 53C. The converging portion 436 of the nozzle is constructed so that its cross-sectional area gradually decreases until throat 437. After throat 437, the cross-sectional area of the diverging portion 438 of the nozzle gradually increases toward exit 449. Thus, after the throat 437, there is a significant continuation of the nozzle to provide for the diverging portion 438. An approximate analysis of an aspirating system similar to that of this invention appears in Appendix 1 of the parent '623 application.

The pressure then begins to build in the mixing chamber 447 until sufficient pressure is obtained to finish expelling the cover 452 causing springs 451 to expand even more, support shields 455 to be opened to fully open the nozzle 435 and airbag 433 to be further deployed. Prior to release, the cover 452 is retained by a catch 453. Upon pressurization of the mixing chamber during airbag deployment, a tab 454 on cover 452 is pulled from under catch 453 releasing the cover. Since the pressure builds at the end of the module which is initially ignited by the squib, not shown, the tab 454 is initially released at that end and then is rapidly pulled out from under catch 453 progressing to the end furthest away from the squib. This process can be facilitated by removal of either the tab 454 or catch 453 at the squib end of the airbag module 430. In this manner, the cover 452 is easily released yet retains the airbag 433 during normal vehicle operation. One important feature of the invention is that since the flow out of the high-pressure nozzle is supersonic, the pressure rise needed to further expel the cover 452 will not affect the flow through the nozzle. This is true as long as the flow remains supersonic which, in the preferred design, is set to permit a ten-fold pressure rise to expel the cover 452 over that which should be required. Since relatively little pressure is required to expel the cover 452, if an object is loading the cover 452 in one location in the longitudinal direction of the tube 440, the pressure will be released by flowing out to the sides of the obstruction, i.e., at other longitudinal locations. This design is unique in that the pressure buildup never reaches the point that it will cause injury to an out-of-position occupant. Even if the entire cover 452 is restrained, which is virtually impossible, the cover 452 will release the gas to the sides.

Although the airbag 433 is stored in a compact arrangement as shown in FIG. 53A, when it deploys, the aspiration inlet ports 450 and the converging-diverging nozzle 435 become quite large especially when compared with the size of the high pressure nozzle 436, 437, 438. It is because of this geometry that very high aspiration pumping ratios are achievable in the invention compared to the prior art. Representative dimensions for the high-pressure nozzle are about 0.054 inches for the converging portion 436 of the nozzle, about 0.0057 inches for the minimum opening or throat 437, to about 0.1 inches at the exit 449 of the nozzle in the diverging portion 438. Representative dimensions for the aspirating nozzle on the other hand are about 1 inch at the inlet ports 450, about 2 inches at the minimum double clearance, i.e., the minimum distance between spring shields 455. The length of the mixing portion of the nozzle is about 2 inches for the illustrated design. It is the ratio of the minimum high pressure gas jet thickness, here about 0.0057 to the length on the mixing channel, here about 2 inches, which is only made possible by the design disclosed herein where the gas jet is very long and thin. The dimensions provided here are illustrative only and the actual dimensions will vary according to the particular application and the particular gas generator used.

FIG. 53D shows the state of the airbag module 430 when the propellant 444 has completed its burning cycle and the pressure has dropped in the module 430 and the springs 451 are acting to move the walls 456 in a direction toward the base 434, i.e., toward their initial position in which the inlet port 450 are substantially closed. The springs 451 do not return the walls 456 completely to their initial position but rather maintain a sufficient opening between base 434 and walls 456 to permit the gases to vent from the airbag 433 as it is loaded by an occupant, i.e., so that gases will flow in an opposite direction through inlet port 450 than the direction of gas flow during inflation of the airbag 433. Springs 451 are typically made from flat strips of spring steel.

In the nozzle, the gas flow initially converges to a very thin cross section that in one preferred design is about 0.005 inches. It then expands becoming supersonic and emerges from the high-pressure nozzle as a sheet canted or slanted at an angle with respect to the incoming aspirated air. As shown in FIG. 53C, the gas from the gas generator 439 flows in a direction F2 whereas the gas from the passenger compartment 459 flows from the aspirating inlet ports 450 in a direction F1 that is at an angle α to the direction F2. This interaction between the two planar flows at an angle promotes efficient mixing of the two gas flows as the flow downstream and into the airbag. In most cases, the angles of the two flows can be adjusted in the design to assure this efficient mixing. In some cases, additional measures are implemented such as varying the directions of the combined flows to further promote mixing before the gas mixture enters the airbag 433. The design illustrated in the figures provides ample space for the gas flows to mix after their initial impact.

In accordance with the invention, the length of the gas generator 439 is measured in a horizontal or longitudinal direction perpendicular to the direction of the flow of the gas and is the longest dimension of the device. The length of the nozzle 436, 437, 438, on the other hand, is measured in the direction of the gas flow and perpendicular to the length of the gas generator 439. A distinctive feature of the inflator module of this invention is that its length is much longer that its width or thickness and the length of the mixing chamber is much longer than the minimum thickness of the high pressure jet. It is this ratio which governs the completeness of the mixing of the gases generated by the propellant 444 and the gases from the passenger compartment 459 which in turn governs the pumping ratio and thereby permits the large pumping ratios achieved here in contrast to the constructions disclosed in prior art patents discussed above. This is achieved by using a very long and thin jet of high pressure gas which is achieved by the elongate airbag module 430 disclosed herein. It is known in the art that the volume of gas flowing from a gas generator is proportional to the cross-sectional area of the jet times its length, but the ability of the jet to mix rapidly with the aspirating air is determined by the surface area of the jet. By using the thin linear geometry disclosed herein, the ratio of surface area to cross section area is maximized which in turn maximizes the amount of air which can be pumped and thus the pumping ratio. Other geometries can achieve high pumping ratios only by increasing the mixing length. In most implementations, however, this is not practical since there is insufficient space in the vehicle. This is the main reason that current inflators are limited to pumping ratios of substantially less than 1:1. In the case described above, the ratio of the mixing length to the minimum jet diameter is greater than 200:1. In most cases, in the implementation of this invention this ratio will exceed 100:1 and in all cases 50:1. Similarly, the ratio of the length of the gas generator 439 to the minimum thickness of the gas jet in the case described in FIG. 52 and FIGS. 53A-53F is greater than 4000:1. In most cases, this ratio will be greater than 1000:1 and preferably it will be greater than 100:1.

Referring now to FIG. 53F, it can be seen that the nozzle walls 456 are solid and extend in the longitudinal direction of the tube 440. Similarly, spring shields 455 are connected to the walls 456 over substantially the entire length of the walls 456. However, springs 451 are thin members which are connected only at discrete locations to the walls 456 such that upon release of the springs 451 during airbag inflation, gas from the passenger compartment 459 can flow around and between the springs 451 into the mixing chamber 447. Although two springs 451 are shown, it is of course possible to have a single spring or more than two springs. Further, it is important to note that the length of the gas generator 439 does not have to be the same as the length of the nozzle walls and the module 430.

Further, it is a known property or characteristic of propellants, e.g., propellant 444 situated in the tube 440, that their burn rate is dependent on the surrounding pressure, in this case the pressure in chamber 442 in the tube 440. The gas flow rate out of chamber 442 depends on the flow resistance through the opening(s) 441 and the clearance at the throat 437 between the outer wall of the tube 440 and the base 434. In FIG. 53F, this clearance is nominally set by supporting brackets 457 which are connected to the tube 440 at one end region and to the base 434 at an opposite end region. The brackets 457 are designed to hold the tube 440 at a certain distance from base 434. These brackets 457 can be designed to operate in three different ways: (i) as a fixed support, (ii) as a flexible support, or (iii) as a support which changes with temperature. In general, brackets 457 serve to fix the minimum clearance at throat 437 between the gas generator 439 as a unit and the support base 434.

If brackets 457 operate as fixed supports, then the inflator will have a response which varies with temperature as is the case with all conventional inflator designs. This greatly increases the total amount of propellant which is required as discussed below.

If support brackets 457 are made elastic or flexible, supports 443 are arranged in the converging portion 436 of the nozzle defined by the tube 440 and the support base 434 (FIG. 53E). The brackets 457 then spring-load the tube 440 against the supports 443 so that the tube 440 can lift off of supports 443 when the pressure is sufficient to overcome the spring force of supports which act in the compression direction to keep tube 440 close to the base 434. In this case, the clearance at throat 437 between the tube 440 and base 434 increases, which reduces the flow restriction which in turn reduces the pressure within chamber 442 resulting in a nearly constant propellant burn rate and thus an inflator which operates relatively independent of temperature. The supports 443 are in the form of projections which are arranged at a plurality of spaced apart discrete locations between the base 434 and the gas generator tube 440 and fix the minimum clearance for the case where the support brackets 457 are elastic or flexible.

Alternately, the brackets 457 can be made from strips of bi-metallic material and, through a proper choice of materials and geometry, the brackets 457 will deform over temperature to vary the clearance at throat 437 also with the ambient temperature in order to increase the clearance at throat 437 with temperature thus reducing the flow resistance and reducing the pressure in chamber 442 with temperature providing partial compensation for the variation in the combustion rate of the gas generated as a function of temperature.

Although in the preferred implementations of the invention described above, the propellant is placed within the tube 440, in some cases it is desirable to place the gas generator in another location and to use the tube geometry described above to distribute the gas to the high-pressure nozzle. Thus, it will be appreciated by those skilled in the art that it is not required to generate gas within the inflator housing tube per se but it is possible to generate the gas in an auxiliary structure and direct the generated gas into the tube which then merely distributes the gas. Such an embodiment is illustrated schematically in FIG. 53H where an inflator 460 is illustrated in a position connected to tube 440 by a conduit through which gas generated in inflator 480 would be conducted into the tube 440. The inflator 460 is shown here for illustrative purposes only and is not meant to indicate the actual size or location of the inflator. If a conventional inflator were used, it would be considerably larger than inflator 460. Such an inflator 460 could be placed adjacent to, or in the vicinity of, the tube 440 or at a more remote location with the gas being transmitted to tube 440 through any type of conduit or tube. Such an arrangement is particularly useful when the selected propellant does not burn cleanly and the effluent must be filtered. Although the inflator now feeds gas to the tube from one end, the remainder of the operation of the module is the same as described above.

An alternate approach is illustrated in FIG. 116 which shows a side curtain airbag device 910 with an aspirated inflator 911 located on one end in contrast to FIG. 53H where the aspiration takes place along the entire module. This aspirated inflator is designed as a pyrotechnic gas generator; however, a stored gas system is also quite viable. With an aspiration ratio of 5 (assignee's scientists have achieved aspiration ratios of 7 experimentally and 10 theoretically—see Appendix 3 of the parent '623 application) a 10 liter bag would require about 200 ml of compressed gas stored at 20 atmospheres assuming that a desired pressure in the airbag is about 2 atmospheres absolute. A stored gas system of course has an advantage of being clean and cool. A release system is known in the blow down wind tunnel art whereby a small electric spark across a sectored plastic or combined metal and plastic, for example, membrane instantly opens such a stored gas container without producing shrapnel. The need for relatively cool gas for the side curtain airbag is well known since the airbag should remain inflated for 5-7 seconds. Thus, even if a pyrotechnic inflator is used, an aspiration system will reduce the average temperature to meet this requirement. Thus both systems produce relatively cool gas in a very simple and effective manner requiring substantially less space and at a significant cost reduction.

An alternate version of the elongate inflator as disclosed herein for use as a thin distributed aspirated inflator 913 for side curtain airbags 912 for mounting on the roof rail, for example, is illustrated in FIG. 117. In this case, the inflator can be made from either metal or plastic and can be manufactured by an extrusion process. In either case, the inflator is extremely flexible making it especially easy to conform to a curved mounting location such as the roof rail. The elongate aspirated inflator disclosed in FIGS. 53A-53I of course has this flexibility property. A more recent patent, U.S. Pat. No. 6,755,438, also describes a flexible inflator but not based on aspiration principles.

A key advantage of the plastic or metal inflator shown in FIG. 117 is that it lends itself to accommodate a variety of airbag system designs for different vehicles. The inflator can be easily cut into any length to fit a particular vehicle model thus greatly reducing tooling costs. U.S. Pat. No. 6,595,546 attempts to accomplish this in a complicated manner through attaching modular inflators together.

The gas generator in an inflator burns for a few milliseconds and in an aspirated inflator the amount of propellant required is 5 to 10 times less than in conventional inflators. Also the surface area for heat dissipation is significantly larger in an elongated aspirated inflator. Finally, since somewhat toxic propellants can now be used which leave very little residue and since cooling screens in many cases are not required, the amount of heat that remains in a gas generator for an aspirated inflator, and now also for many other inflator designs, is considerably less in comparison to the heat transfer area and thus plastic becomes a viable material for inflator construction. A preferred plastic is a glass or mineral-filled polycarbonate.

As mentioned elsewhere, the use of aspirated inflators on the side curtain, for example, provides several occupant protection advantages. If the occupant is in the path of the deploying airbag and interacts with it, the pressure within the airbag will increase which will also reduce the aspiration ratio and thus automatically adjust to the occupant without injuring him or her. Secondly, since gas from the passenger compartment is used to inflate the airbags, the total pressure increase within the vehicle is substantially reduced allowing many airbags to be deployed at the same time. In many accidents, for example, it is desirable to deploy both frontal driver and passenger airbags as well as side curtain airbags. In fact, there is some advantage in doing this routinely for all accidents that require either a side or frontal airbag.

Referring now to FIG. 53I, the housing 440 of the inflator module 439 is elongate and FIG. 53I shows a cross-sectional view in the longitudinal direction through the approximate center of the housing 440. Thus, opening 441 is shown and is elongate as is housing 440. Further, it can be seen that the igniter mix 445 is arranged over the propellant 444 to seal the propellant 444 from the atmosphere, as noted above, and thus, the igniter mix 445 is present along the entire length of the propellant 444. In other words, the igniter mix 445 is substantially coextensive with the propellant 444. One advantage provided by the presence of igniter mix 445 over the propellant 444 is that the propellant 444 will burn at all locations along its length at the same time. Gas will this be released over the entire length of the inflator module 439 and thus over the entire length of the airbag 433. This will enable the airbag 433 to be inflated evenly across its length.

In contrast to the use of igniter mix coextensive with propellant, some inflators have the igniter positioned at the ends of the propellant so that the propellant burns from its ends. Examples of such constructions include Grace et al. (U.S. Pat. No. 6,062,143), Hamilton (U.S. Pat. No. 4,696,705) and Goetz et al. (U.S. Pat. No. 4,698,107). Using such inflators to inflate an airbag, gas would be released in directions from the ends toward the center and inflation of the airbag could be uneven, depending for example, on the manner in which the gas is subsequently directed and the shape of the airbag.

As should now be evident, the aspirated inflator of the present invention has significant advantages over other aspirated inflators currently used in conventional airbag systems. In particular, large openings are provided in the form of the inlet ports 450 on either side of the aspirating nozzles. These ports 450 permit the flow of gas from the passenger compartment 459 into the aspirating nozzle through ports 450 with a short, low flow resistance, flow path. Once the cover 452 is removed from the airbag system and initial airbag deployment has begun, the module pops open and the inlet ports 450 are open to allow the entrance of the passenger compartment gas. The outlet passage from the inflator passes through a converging-diverging nozzle as described above which causes a smooth developed supersonic flow pattern in the emerging gas. The gas leaves the nozzle 436, 437, 438 at exit 449 and enters the mixing chamber 447 at a position near the throat of the aspirating nozzle 435 defined by walls 456 and shields 455 after which the aspirating nozzle 435 diverges, see FIGS. 53C and 53D, to create the minimum pressure at the throat to aid in drawing in the maximum amount of gas from the passenger compartment 459 through inlet ports 450. Using this design, total pumping ratios of up to 10:1 of passenger compartment-to-generated gas result and instantaneous ratios of up to 20:1 have been proven feasible.

The deployment of the airbag 433 is timed so that, as shown in FIG. 53D, after the airbag 433 is fully inflated and the gas generator 439 has stopped generating gas, i.e., all of the propellant 444 has been burned, the occupant begins to press against the deployed and inflated airbag 433. As a result of the impact of the occupant against the inflated airbag 433, the gas in the airbag 433 begins to flow back through the nozzle 435 defined by spring shields 455 and walls 456 and back out into the passenger compartment 459 through the aspiration inlet ports 450, which thus function as outlet ports at this juncture. Accordingly, the pressure or amount of gas in the airbag 433 is controlled based on the occupant or the occupant's position, i.e., based on the interaction of the occupant with the airbag 433, gas begins to flow out of the airbag 433. In view of absence of gas flow from the gas generator 120, the nozzle 435 defined by spring shields 455 and walls 456 is smaller than during the flow of gas from the gas generator 439 and, the support springs 451 pull walls 456 closer to the base 434 thereby reducing the size of aspiration inlet ports 450. By this method and design, the flow resistance of the aspiration inlet ports 450 for this return flow will, by design of the support springs 451, be optimum regardless of the particular propellant used or the particular airbag geometry. Other geometries and structures are possible which, for example, entirely close off the exhaust ports after the gas generation has stopped and only open when the pressure within the airbag increases above a designed value.

Thus, after the propellant 444 in the tube 440 has finished burning, as a result of a pressure difference between the area proximate and within the gas generator 439 and the interior of the airbag 433, the gas inside the airbag 433 will be caused to flow back through the aspiration inlet ports 450, in a direction opposite to that during inflation of the airbag 433, gradually exhausting the gas from the airbag 433. This only happens, however, when the pressure in the gas generator 439 drops, which is indicative of the end of the burning process. In this manner, the gases produced by the gas generator 439 are always cooled by the aspirated air through inlet ports 450 and there is no need for cooling screens inside the gas generator 439.

If an occupant interacts with the airbag 433 during its initial inflation phase before the cover 452 is expelled in one preferred design, the pressure in the chamber 447 will rise, the flow of gas into the airbag 433 in preparation for deployment will be stopped, and gas from the gas generator 439 will flow out through aspiration inlet ports 450. This also constitutes control of the pressure or amount of gas in the airbag 433 based on the occupant or the occupant's position, i.e., based on the interaction of the occupant with the airbag 433, the pressure and amount of gas in the airbag will be changed and probably reduced. This construction prevents injury to an occupant who is loading the cover 452, i.e., resting against the same, prior to inflation of the airbag 433 in the manner described above. In current airbag module designs, if an occupant loads the airbag cover or casing, the pressure will continue to build up behind the cover until thousands of pounds of force are available to force the cover open and thereby injure or kill the "out-of-position" occupant. In another preferred design, the aspiration inlet ports are not uncovered until after the cover is released and the airbag is partially deployed. Since the total motion of the module surface is still small compared with conventional airbag modules, the injury sustained by the occupant is minimized.

An additional advantage to using the aspirating ports 450 as the exhaust ports for an "out-of-position" occupant is that gas does not start flowing out of the airbag 433 until the gas generator 439 stops producing gas. In contrast, in current airbag module designs, the gas begins flowing out of the airbag immediately as the airbag is being inflated. The design that is described herein, therefore, conserves inflator gas and permits the use of a smaller amount of propellant in the inflator. The combination of this effect and pressure compensation effect described above can reduce the amount of propellant required to inflate the airbag by a factor of two or more, thus again substantially reducing the size and cost of the inflator and the quantity of toxic gases which are exhausted into the passenger compartment and widening the class of propellants available for use with airbags. The total compartment pressure rise which results from the deployment of multiple airbags is also substantially reduced. However, even if a significant amount of toxic gas is exhausted into the passenger compartment during deployment of the airbag, the sensor and diagnostic module 458 may be coupled to a number of different arrangements for reducing the concentration of toxic gas in the passenger compartment resulting from the deployment of multiple airbags or unconventionally large airbags (which aspect is discussed in greater detail below). Thus, the airbag module 430 described above may be implemented in a comprehensive airbag system in connection with a toxic gas reducing arrangement.

As discussed above, in some situations with conventional inflators, but not with the inflator of this invention, the occupant may be so out-of-position as to be already leaning against the airbag module when the sensor and diagnostic module signals that the airbag should be deployed. This is a particularly serious situation since deceleration of the vehicle may cause the occupant to exert a significant force against the airbag cover preventing it from opening. The inflator module will begin producing gas and if the flow out of the inflator module is resisted, the pressure in the inflator module will increase, even exceeding about 1000 psi if necessary, until the resistance is overcome and the cover opens. This can result in very large forces against the head or chest of the occupant and result in serious injury or even death.

Several inflator designers and manufacturers are experimenting with variable output inflators where the gas flow from the inflator is reduced. However, this will not solve this problem but only delay the pressure buildup for a few milliseconds with the same eventual catastrophic results. The design used herein eliminates this problem since even though the occupant may load one portion of the cover 452 at one location in the longitudinal direction of the cover 452 preventing it from opening by the release of latch 453, and even if he were able to entirely block the removal of the cover 452, the build-up of gas in the module 430 will cause a slight bulge in the cover 452 causing it to pop free of the base 434 and the gas will begin flowing out through inlet ports 450 as soon as the pressure exceeds a design value which is significantly below that required to oppose the force of an occupant leaning against the airbag module cover 452. However, for many of the preferred mounting locations of the airbag module 430 of this invention, such as on the ceiling of the vehicle, it is very difficult for the occupant to get into a position where he/she is against the module cover 452. Also, note that for some applications, some additional motion of the cover 452 is permitted in order to permit an initial airbag deployment before aspiration begins.

In conventional airbag module designs, the cover is cut open during the deployment process. The expulsion method used here has the advantage of simplicity since no cutting of material is necessary and it also permits a rapid opening of the aspiration inlet ports which is important to the inflator design disclosed herein. If properly designed, the cover release mechanism requires little force to release the cover and yet is very difficult to detach from outside the module. Thus, the cover is released before significant pressures occur in the module, reducing the danger of deployment-induced injuries to the occupants.

Figure 54A:
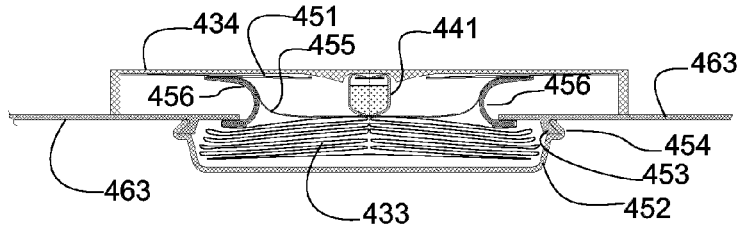
FIG. 54A is a cross-sectional view of an alternate embodiment of the airbag module in accordance with the invention where sufficient space is available for the aspirating ports without requiring movement of the module toward the occupant.
Figure 54B:
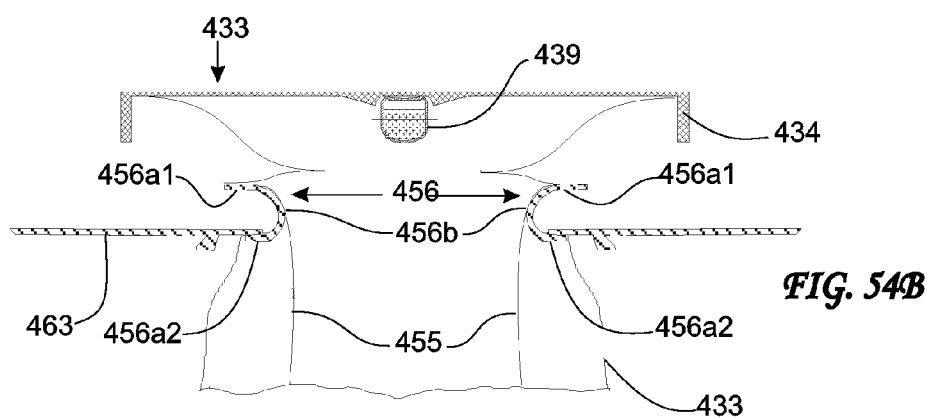
FIG. 54B is a cross-sectional view of the embodiment of FIG. 54A with the airbag deployed.

Another preferred embodiment of the invention in which there is sufficient space for the formation of aspirating channels behind the mounting surface on which the airbag module is mounted is illustrated in FIGS. 54A and 54B. Aside from the direction of movement of the airbag module 430 to open aspirating channels, the operation of this embodiment is essentially the same as the embodiment discussed above. However, in contrast to the embodiment in FIGS. 53A-53H, in this case, the gas generator 439 and base 434 are displaceable and are moved away from a mounting surface 463 in one direction during airbag deployment whereas the airbag 433 is deployed in an opposite direction. To enable this relative movement of the gas generator 439 and base 434 relative to the fixed mounting surface 463, the leg portion 456a2 of each of the walls 456 is attached to the mounting surface 463. As shown in FIG. 54A, the base 434 is mounted in engagement with the mounting surface 463 on one side thereof, which is the side to which the walls 456 extend. On the opposite side of the mounting surface 463, the latches 453 are mounted so that the cover 452 is detachably connected to the mounting surface 463 by tabs 454 engaging with the latches 453. Thus, in this embodiment, instead of connecting the base 434 to, e.g., the ceiling of the vehicle as in FIG. 52, the walls 456 are connected to the mounting location, such as the instrument panel or knee bolster structure, of the vehicle and would not be substantially displaced during deployment of the airbag 433. In this context, the instrument panel of the vehicle is defined so as to include the knee bolster area of the vehicle from which airbags used as knee bolsters would be deployed.

In an alternative embodiment, the inflator module 433 can be mounted in a position with the aspirating ports 450 open provided there is sufficient space available and thus, this invention is not limited to the preferred embodiments whereby the inflator module 433 expands on deployment.

Figure 55:
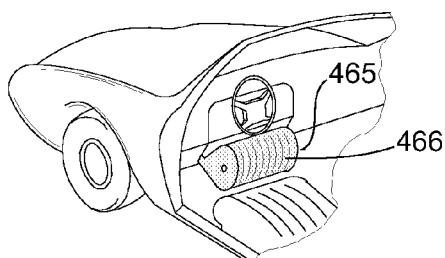
FIG. 55 is a perspective view of a preferred embodiment of the airbag module in accordance with the invention used for knee protection shown in the deployed condition.

One particular application for the design of FIG. 54A is for use as a knee protection airbag as shown in FIG. 55. FIG. 55 illustrates a preferred embodiment of the present invention used as a knee protection device for the driver and front passenger occupants. The airbag module is shown deployed generally at 465 in FIG. 55 and includes an airbag 466. The airbag 466 is designed to interact with the driver's knees, not shown, and with the body of an occupant who may be lying down, also not shown. In this manner, the airbag 466 protects not only the knees of the driver from injury but also protects a child lying on the front seat, for example.

Knee airbags have previously been commercially used only as part of the front passenger airbag system where they have been inside of and in conjunction with the passenger airbag and inflated by the passenger airbag inflator. Current front passenger airbag systems are all mid or high-mount systems where it is no longer convenient to mount a knee airbag inside of the passenger airbag or to use the same inflator. The exemplifying embodiment shown in FIG. 55 uses a separate airbag system with its own inflator. This is made practical by the low cost efficient airbag module design disclosed herein. The airbag module 465 for controlling inflation of the knee airbag 466 may have any of the constructions disclosed herein.

Figure 56:
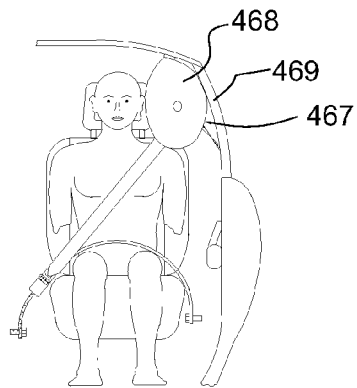
FIG. 56 is a view of another preferred embodiment of the invention shown mounted in a manner to provide head protection for a front and a rear seat occupant in side impact collisions and to provide protection against impacts to the roof support pillars in angular frontal impacts.

FIG. 56 illustrates another possible mounting location for the airbag module, shown generally at 467, in accordance with the invention and including a deployable airbag 468. In this embodiment, the airbag 468, also called a curtain airbag, will be deployed from the ceiling in the event of a side impact of sufficient severity that an occupant's head would otherwise be injured. This implementation is significant since the airbag for the front and rear seats are combined, i.e., the airbag deploys along substantially the entire side of the vehicle alongside both the front seat and the rear seat, which results in significantly greater protection in side impacts when the windows are broken. The airbags are less likely to project outside of the windows if they are restrained by the B-pillar 469 and other vehicle structures such as the A-pillar 461 as shown in FIG. 52. This support is achieved since the module extends forward almost to the windshield and is mounted adjacent to but somewhat away from the side of the vehicle. When the airbag deploys, therefore, it is partially restrained by the A-pillar further aiding the retention of the occupant's head within the vehicle. As noted above, airbag 468 may comprise a number of airbags controlled to deploy simultaneously by means of a common inflator system and the airbag module 467 for controlling inflation of the side airbag 468 may have any of the constructions disclosed herein.

2.1.2 Steer by Wire

The steering wheel and steering column are among the most dangerous objects in the automobile. Even with airbags and seatbelts many people are still injured and killed by an impact with a steering wheel rim, spokes or hub, or by the airbag as it is deployed from the steering wheel hub. The steering column also significantly interferes with the operation of many knee bolster designs causing significant leg and knee injuries. With today's technology, neither the steering wheel nor steering column are necessary and only bring harm to drivers. A substantial educational program is necessary to wean people away from the false feeling of security of a substantial steering wheel and steering column. However, if it can be shown to the population that a vehicle with a servo electronic steering system (called steer-by-wire) is considerably safer, then the battle can be won. Such a system is common in commercial aircraft although a steering wheel is still usually used.

Figure 58:
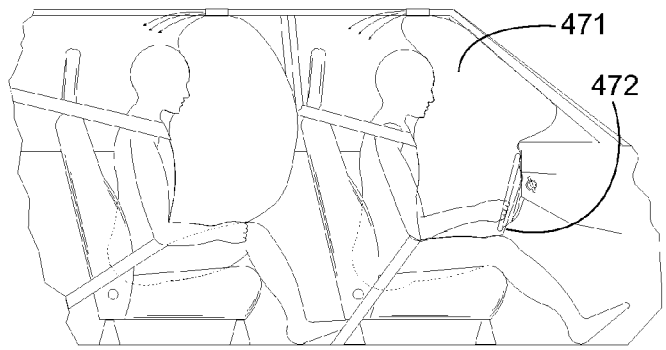
FIG. 58 is a view as in FIG. 57 showing the flow of the inflator gases into the passenger compartment when occupants begin loading the airbag.
Figure 57:
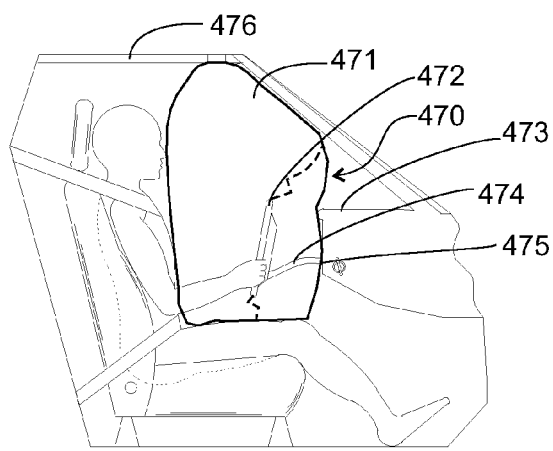
FIG. 57 illustrates still another preferred embodiment of the invention used to provide protection for all front seat occupants in a vehicle which incorporates servo power steering.

One implementation of a driver protection airbag system which is deployed from the ceiling 476 coupled with a steer-by-wire system is illustrated at 470 in FIG. 57 which is a partial cutaway view of a driver in an automobile. The conventional steering wheel and column have been eliminated from this vehicle and a thinner, lighter steering wheel 472, which projects from an instrument panel 473, is provided instead. The steering wheel 472 is attached to a deformable column 474 which is supported by the instrument panel 473. In the event of an accident, the steering column 474 easily bends at the connection point 475 with the instrument panel 473 and permits the steering wheel 472 to be displaced or to be rotated out of the way, i.e., to make room for the deploying airbag as illustrated in FIG. 58. In this embodiment, a single airbag 471 is deployed downward from the ceiling 476 to protect all occupants in the front seat of the vehicle, and thus is elongate extending substantially across the entire width of the passenger compartment of the vehicle.

If some energy absorption is desired, the steering wheel support 474 can be made in the form of an elastica spring which has the property that it will provide a nearly constant force versus deflection relationship which can be designed to aid the energy absorption of the airbag. The steering wheel and support in FIG. 57 is shown with the airbag wrapped around which somewhat reduces the energy absorption effects of the airbag. Other implementations are to pull the steering wheel into the instrument panel space using pyrotechnics, a mechanical linkage (as in the Pro-Con-Tem system) or to release the support so that the airbag itself moves the steering wheel out of the way. If alternate steering systems can be sold to the public, the steering wheel and support can be eliminated entirely and replaced by a device mounted onto or between the seats or on the floor, for example. Even steering mechanisms mounted to the door or ceiling are possible. Many other steering systems which do not interfere with the airbag will now be evident to those skilled in the art. One might be to have the steering wheel collapse at a constant acceleration.

FIG. 58 illustrates the positions of front and rear seat airbags as well as of the steering wheel and steering support after the airbags have deployed and the occupants have begun moving forward. Deployment of the front and rear seat airbags may be controlled to occur simultaneously.

2.1.3 Rear of Seat Mounted

Figure 59:
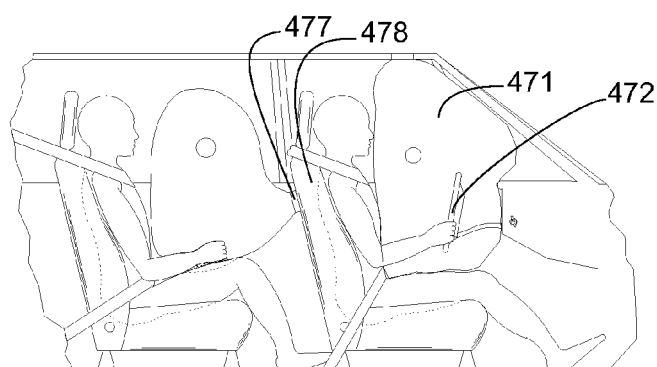
FIG. 59 shows the application of a preferred implementation of the invention for mounting on the rear of front seats to provide protection for rear seat occupants.

FIG. 59 illustrates another implementation of the airbag module of this invention in which the module 477 is mounted to the rear of the front seats 478 of the vehicle and is designed for those cases where a ceiling-mounted system is not desired or practical. In this case, two airbag modules 477 are provided, one in the back of each of the front seats 478. A single airbag can be used for vehicles with bench seats.

A primary advantage of the linear, elongated module disclosed herein is that it can be mounted on the surface of the ceiling, instrument panel, seat back, or other appropriate surface. In some cases, the module is literally attached to the mounting surface while more commonly it is recessed so that the surface of the module is approximately flush with the surrounding surfaces prior to deployment. In most cases, however, the depth of penetration into the mounting surface will be small and less than $\frac{1}{5}$ of the module length and in most cases less than $\frac{1}{10}$ of the module length. For the purposes of this disclosure, therefore, mounting on a surface will mean mounting so that the penetration into the surface will be less than $\frac{1}{5}$ of the module length.

2.2 Aspirated Inflator

2.2.1 Plastic Inflator

A preferred material for the gas generator housing of this invention is steel in order to withstand the pressure and temperature from the burning propellant. It is possible to make the inflator housing from a high temperature plastic, however, the propellant tube in this case will be considerably thicker. Plastic can be used in the inflator of this invention since the propellants generally used burn completely in a very short time period and do not leave a hot residue. Thus, there is little time for the heat to penetrate into the plastic housing. For this same reason, the inflator of this invention can be mounted adjacent to combustible materials without fear of starting a fire.

In the preferred embodiment of the airbag module of this invention illustrated in FIGS. 52 and 53A, the length of the module was approximately the same as the length of the airbag. This permits the airbag, especially if made of film, to be easily rolled or folded with the portions of the airbag which project beyond the module easily accommodated without the special endwise folding required in conventional inflators. This results in a uniform geometry and symmetry for the airbag module and permits the module to be easily made in any convenient length. Additionally, the long, thin design permits the module to be bent somewhat so as to conform to the surface of the location where it is mounted. This geometry also permits the airbag to unfold much more easily and in considerably less time than with conventional designs. Thus, the airbag system of this invention can be deployed in less time with less force and thus with less danger of deployment induced injuries than with conventional designs.

In a particular example used in this application, the cover is mechanically pushed off by the expansion of the airbag, or the displacement of the module, progressively from one end to the other much like a zipper. In other applications it may be required to pyrotechnically cut or eject the cover which would require separate pyrotechnic devices. Also, in the examples illustrated herein, the module cover has been pushed off and removed from the module. Although this is the preferred method, other designs could remove the cover by cutting an opening in the material which covers the module. In such cases, the existence of the module could be completely hidden through the use of a seamless covering and only cut open when it is required for deployment of the airbag. For the purposes herein, therefore, removal of the cover will include any method by which an opening is provided to permit the airbag to deploy.

2.2.2 Variable Burn Rate

The propellant and gas generator assembly has been shown with an approximate rectangular cross section so that once the propellant begins burning the surface area neither decreases or increases as the inflator propellant is consumed. In some cases, it may be desirable to vary the burn rate of the propellant by changing the surface area which is burning. If the cross section area of the inflator, and thus of the propellant, were made triangular, for example, with a wider base and narrower top, the rate of gas generation would increase as the propellant burns. Conversely, if the base of the propellant were narrower than the top, the opposite would occur and the propellant will begin burning fast and slow down with time. The shape of the inflator housing can be infinitely varied to achieve any reasonable variation in propellant burn rate with time desired. For complicated shapes, it is necessary to cast the propellant in place in the tube which also helps the propellant to adhere to the surfaces of the gas generator housing.

2.2.3 Liquid Propellant

U.S. Pat. No. 5,060,973 discloses the use of a liquid propellant. Central to this patent is the method of injecting the liquid from its container into a combustion chamber. A liquid propellant has an important advantage that many such propellants, and the particular one disclosed in this patent, burn without producing solid particles which could clog the high pressure nozzle or burn holes in a film airbag. The purpose of the injection system is to control the burning rate of the fuel. In solid fuel inflators, this is done by shaping the surface of the propellant as discussed above.

The burning surface can also be controlled in the geometry of the inflator in accordance with the present invention by increasing the viscosity of the liquid through an emulsifying process or, alternately, by placing a solid matrix within the tube which is non-combustible such as one made from glass fibers. These fibers therefore serve to hold the liquid propellant in a position where the burning surface area is known and thus the burning rate controlled. Other methods of controlling the liquid burn rate without resorting to an injection system will now become apparent to those skilled in the art.

In addition, the liquid propellant can be used in a separate inflator housing such as discussed with reference to FIG. 53H. This invention is not limited to the use of liquid or solid propellants but also contemplates the use of stored gas, hot gas, hybrid or other designs.

2.2.4 Propellant Considerations

As mentioned above, several propellants, including nitrocellulose, nitroguanidine, and other double base and triple base formulations and tetrazol, now become candidates for use in vehicles with more than one airbag module. One of the primary advantages of this invention is that the gases produced can be breathed for a short time by occupants without causing injury. The time period would of course depend on the vehicle and the method chosen for exhausting the toxic gas from the passenger compartment. All such propellants that fall into this class, that is propellants that can be safely breathed only for short periods of time, are referred to here as toxic airbag propellants. Other propellants of course exist which are so toxic that they would never be considered as candidates for airbag inflators. This class of propellants is not even considered here and therefore falls outside the class of toxic airbag propellants as used herein. Toxic, as applied to a gas for the purposes herein, generally means non-breathable for more than a few minutes without causing harm to humans.

2.2.5 Cover Considerations

Figure 60:
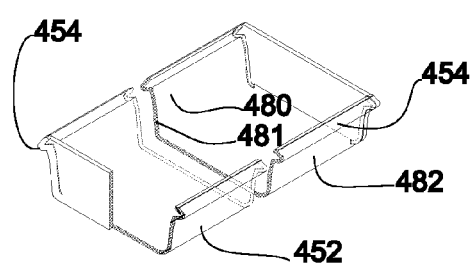
FIG. 60 is a perspective view of a typical module cover design as used with the embodiment of FIGS. 53A-53I.

A perspective view of a preferred cover design is shown generally as 452 in FIG. 60. It comprises a semi-rigid molded plastic backing material 480 covered with a foam 481 and skin 482 or other combinations of materials to be compatible with the vehicle roof liner, instrument panel or other mounting location. Tabs 454 are placed in the cover to interlock with corresponding catches 453 on the module housing base. When pressure builds beneath the airbag, it causes the airbag to bulge pulling tabs 454 out of engagement with catches 453 in the progressive manner as described above. The cover 452 is then free to move and will in general be projected downward by the deploying airbag. It has a low density, however, and will not cause injury even if it impacts an occupant.

In the example shown in FIG. 60, the cover 452 can be attached to the airbag by an adhesive or other suitable means. When the airbag deploys, the cover 452 adheres to the airbag on the side away from the occupant thereby generally preventing interaction between the occupant and the cover 452.

With the development of the film airbag as described in the patents referenced above, and the inflator design described herein, a very thin airbag module is possible which can be made in any length. Typically, the module length will exceed about 10 to 20 times the width or thickness of the module, and in all cases at least about 5 times. The length of the gas generator will typically be about 40 to 80 times its thickness and in all cases at least about 10 times. This shape permits the module to be easily mounted in many locations and to be bent or curved to match the interior shape of the vehicle. For example, one could be positioned so as to conform to the ceiling to protect rear seat occupants. Another one could stretch the length of the car on each side to protect both front and rear occupants from head injuries in side impacts. A similar system can be used for a deployable knee bolster, and eventually a single module can be used for both the passenger and driver in frontal impacts when used in conjunction with a servo electronic steer-by-wire system, for example. With the economies described above, airbags of this type are inexpensive compared to current airbag systems offering comparable, or inferior, protection.

The airbags described herein would be easily and inexpensively replaceable. They would require only a single connection to the vehicle safety system. Although the bags themselves would not be reusable, in some cases the airbag covers could be.

The designs illustrated herein are simple and, because of their small cross-section, can be easily mounted to conform to interior vehicle surfaces. They are very efficient, in some cases requiring less than ⅕ of the amount of propellant that is required by competitive conventional systems. The particular designs are also easily manufactured. Since they use less propellant, the noise and problems with high pressures when multiple airbags are deployed are greatly reduced. They also offer protection in cases such as the sleeping child which has previously not been available. These designs as disclosed herein, therefore, provide all of the objects and advantages sought.

Furthermore, several different airbags are shown for protecting occupants of the vehicle, i.e., the rear airbag 430 shown in FIG. 52, the knee airbag 466 shown in FIG. 55, the side airbag 468 shown in FIG. 56 and the front seat airbag 471 shown in FIG. 57. Simultaneous deployment of any combination of or even all of these airbags may be initiated by the sensor and diagnostic module 458 upon determining that a crash requiring deployment of such airbag(s) is required.

Thus, the sensor and diagnostic module 458 may determine that deployment of only the front airbag 471, knee airbag 466 and the side airbag 468 are desired, for example in the case of a frontal crash, or possibly only the side and rear seat airbags 468, 430 in the event of a side impact. Accordingly, sensor and diagnostic module 458 may be designed to detect frontal impacts requiring deployment of airbags as well as side impacts requiring deployment of airbags and rear impacts requiring deployment of airbags.

In the following, a vehicle having multiple airbags, preferably arranged in connection with any one of the constructions of the airbag module described above (but which arrangement is not essential to the invention), is described in conjunction with toxic gas reducing arrangements which serve to reduce the concentration of toxic gas in the passenger compartment during or after deployment of the airbags. These toxic gas reducing arrangements may of course also be used even for vehicle with only a single airbag.

Figure 61:
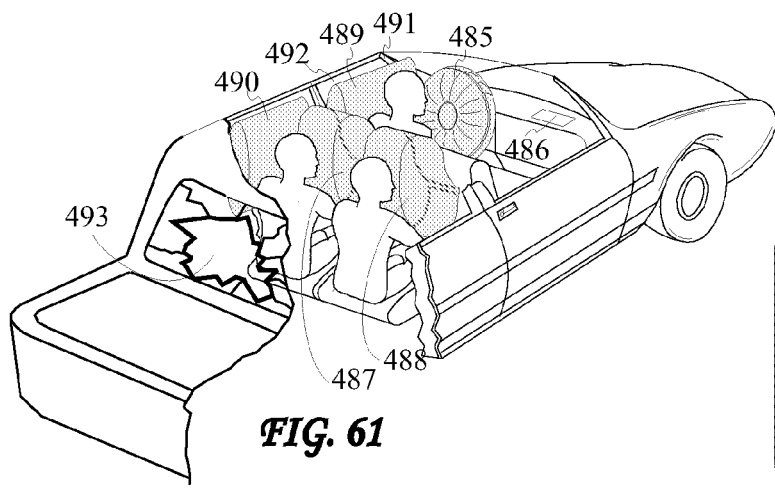
FIG. 61 is a perspective view with portions removed of a vehicle having several deployed airbags and a broken rear window.

A perspective view of a vehicle having several deployed airbags for both front and side protection is shown in FIG. 61. The vehicle includes frontal protection airbags 485, 486, 487, 488 and side/head protection airbags 489, 490, each of which is coupled to an airbag module (not shown) whereby each module may include one or more airbags as well as a gas generator for inflating the airbag(s), the airbag(s) being attached to and in fluid communication with the gas generator, and an initiator for initiating the gas generator in response to a crash of the vehicle. A rear window 493 of the vehicle has been broken or ejected for the reasons and in the manner described below. The driver side frontal airbag 485 has been deployed as well as the ceiling-mounted side head protection airbag 489. In this case, the sensing system for controlling the deployment of the airbags, not shown but which is coupled to all of the airbag modules, detected that the crash had an angular component which might have resulted in head injuries to the occupant from impacts with an A-pillar 491 or a side window 492 of the vehicle, so the sensing system determined that deployment of the side head protection airbags 489 and 490 was warranted, along with deployment of the frontal protection airbags 485, 487 and 488. The front passenger seat was unoccupied, which was detected by the occupant position sensor, not shown, and therefore the corresponding frontal protection airbag 486 and left side protection airbags (not shown) were not deployed. Since both rear seats were occupied, the appropriate rear seat protection airbags 487, 488 and 490 were deployed. It is thus possible to selectively control or determine which airbags of a plurality of airbags, e.g., side/head protection airbags, frontal protection airbags, in a passenger compartment of a vehicle should be deployed depending on the crash conditions to thereby avoid unnecessary airbag deployment. Although the sensing system which determines which airbags require deployment is not shown, this system may include or be connected to occupant sensing means for sensing which seats are occupied.

2.2.6 Driver Side Aspirated Inflator Airbag Module

Aspirated driver side steering wheel mounted aspirated inflators and airbag modules are illustrated in FIGS. 118A and 118B, for a non rotating inflator, and FIGS. 119A and 119B for a more conventional design where the inflator rotates with the airbag module. Both cases can solve the "punch out" problem wherein when a person in leaning against the airbag the pressure builds in a conventional driver airbag until sufficient force is available to push the driver away from the airbag allowing the cover to open. In the designs of FIGS. 118A-119B, the maximum force that is applied to open the cover is controlled and when the cover meets a resistance, such as provided by an out-of-position occupant, the airbag does not deploy and the propellant gasses are exhausted through the aspiration valve eliminating the need for complicated control systems such as disclosed in U.S. Pat. No. 6,206,408.

In FIG. 118A, a sectioned view of the airbag module is shown generally at 914. An aspirated inflator assembly 915 contains a small pyrotechnic gas generator 917 which provides the high pressure gas flow to induce air from the passenger compartment to flow through the valve 916 and nozzle 918 into the airbag 919.

In FIG. 118B, the propellant 921 is distributed symmetrically around the outer wall of the inflator. Naturally, it could also be placed elsewhere such as the inner wall. The principle of operation is essentially the same. Felt pads or bearings 920 are also used to enable the aspirated inflator assembly to remain in a stationary position relative to the rotating steering column and steering wheel. The propellant 921 is ignited by any technique known to those skilled in the art, e.g., typically an initiator 922 is arranged alongside or within the propellant 921 and initiated by a signal from a control unit (not shown) that monitor crash conditions of the vehicle (the initiator 922 being coupled to the control unit via a wire) (see FIG. 118C). In use, a crash sensor would determine the existence of a crash condition involving the vehicle for which deployment of airbag 919 is desired, the control unit would receive a signal indicative of the determined crash condition and generate and send a signal through a wire to the initiator 922 to cause ignition of the initiator 922 which in turn leads to ignition of the propellant 921. The igniting propellant 921 generates gas that flows into the nozzle 923 and draws air from the passenger compartment into the nozzle 923 through the valve 924 (see FIG. 118B). The mixed flow of air is then directed out the outlet of the nozzle 924 into the conduit that extends between the inflator assembly and the opening into the airbag 919, this conduit also extending from the rear side of the steering wheel on which the inflator assembly is arranged to the front side of the steering wheel on which the airbag 919 is arranged.

In FIGS. 119A and 119B, two versions are illustrated for the case where the inflator is attached to and rotates with the steering wheel.

2.2.7 Enhanced Aspirated Inflator

Appendix 3 of the parent '623 application contains a brief discussion of the use of vortex flow control methods to further improve the performance of an aspirated inflator. This will provide the basis of future patent applications.

2.3 Controlling Amount of Gas in the Airbag 2.3.1 Production of Gas

Let us consider again FIGS. 53A-53G. In general, the burn rate of propellants increases with ambient temperature and also with pressure, the so-called pressure exponent. This is expressed in the following equation:

$$W = kP^n$$

where: W=the mass flow rate, k=a constant that depends on the propellant properties and burn surface area and n=pressure exponent.

The pressure exponent can be determined by the slope of a line drawn on a log-log plot of burn rate versus pressure from experiments for the particular propellant species and formulation. The pressure exponent for propellants such as sodium azide is approximately 0.4 or less. Recently propellants have been developed having a higher pressure exponent above 0.4.

The flow out of a restrictor in the inflator generally follows the orifice equation for supersonic gas flow $$W = Ak(P/r)^{0.5}$$

where: W=the mass flow rate, P=The pressure in the inflator, A=The cross section area of the restrictor, K=the orifice coefficient for the device, and r=The density of the gas in the inflator.

The techniques described here (first reported in U.S. Pat. No. 5,772,238) are used to control the pressure in chamber 442 to offset the often uncontrollable changes in ambient temperature. By keeping the pressure in chamber 442 relatively constant through the techniques described above, or even decreasing the pressure in chamber 442 with temperature, the propellant burn rate is kept approximately constant. This serves to reduce the variation in the inflator gas output as a function of temperature. At cold temperatures, when the propellant tends to burn slowly, the clearance at throat 437 will be reduced and the pressure will build up increasing the propellant burn rate (as governed by the burn rate equation above) until the flow of gas out of chamber 442 (which is governed by the orifice equation above) is sufficient to relieve the pressure. Similarly, at high temperatures, when the propellant tends to burn at a higher rate, the pressure will be relieved reducing the pressure and slowing down the burn rate. In this manner, the invention provides a self-correcting system for providing a substantially constant propellant burn rate, based on adjustment in pressure in the chamber 442, regardless of the ambient temperature. This principle can also be used to vary the inflator burn rate as a function of time, the severity of the crash and/or the vehicle occupancy.

Conventional inflators, which do not have this pressure adjusting mechanism, produce higher gas flow rates at high ambient temperature than at low temperature since the resistance to the gas flow rate out of the inflator ports is constant. Therefore, a greater gas generating capacity is required at cold temperatures than at high temperatures and the inflators must be designed with sufficient propellant to handle the cold temperature case. Thus, a larger quantity of propellant is needed for conventional inflators by as much as a factor of two than would be the case in the inflator described above.

A further advantage of the elastic pressure adjustment system described above is that since the inflator nozzle 436, 437, 438 opens as a function of the pressure in the chamber 442, it would not be possible for the inflator module 439 to explode in a fire which can be a problem in conventional designs. Thus, in general, a device called a "match" or auto-igniter which is used in conventional inflators to start the propellant burning in the case where the vehicle is on fire, for example, is not required for the gas generator described herein particularly when the elastic brackets 457 are used. It is also in general not required since the total amount of propellant used is small and it is distributed along a significant length. Thus, the confinement pressures required for the propellant to detonate do not occur in this design rendering this design inherently safer than the design of conventional inflators.

The principles of flow control out of an inflator to achieve a desired propellant burn rate can be applied to all inflator designs for use in temperature compensation as well as the general flow control for the desired inflation amount and rate of an airbag. It is not limited to aspirated inflators nor to the particular airbag module designs described herein. The flow restrictor can have any shape and is not limited to the geometries of the embodiments disclosed herein. The variation in flow rate can be a constant, or any other time varying function as selected by the controller described below. This control is accomplished in general without the need to monitor the inflator gas production or flow properties directly as disclosed in U.S. Pat. No. 6,314,889, for example, and in the variable case, the controller can effect the area of the exhaust orifice(s) in any of a variety of methods such as through an electrical actuator. Such an actuator can control a valve opening, the pivot point of a spring-loaded obstruction that at least partially obstructs the flow out of an inflator, the force opposing the opening of an exit port of an inflator and/or the area of the exit port directly, for example, according to the desires of the inflator designer. Even an array of MEMS micro valves can be an option allowing simple and direct control by the controller or actuator. Once the principle of varying the gas production rate as taught herein and in assignee's pioneering patents is known, the use of this principle becomes obvious to those skilled in the art as evidenced by U.S. Pat. No. 6,314,889.

Different propellants have different rates of combustion which has a significant effect on the geometry of the gas generator. For propellants with slow burn rates, the ratio of the burning surface width to the thickness of the solid propellant will have to increase. For slow burning propellants, therefore, the width of the tube 440 in a direction parallel to the igniter mix 445 may be much larger than the thickness of propellant 444. In other cases, the width of the tube 440 might become significantly less than the thickness of the propellant 444. This design therefore can accommodate a wide variety of propellant chemistries, and particularly those which produce small amounts of toxic gas which have previously been unusable, and therefore design is not limited to any particular propellant.

In particular, FIG. 53G illustrates a case where a very slow burning propellant 444 is used and thus a wide thin geometry has been chosen for the inflator module 439. In this case, a tube is not used and the inflator module comprises the propellant 444 which is attached by an adhesive to a piece of formed metal 462 or other similar member positioned to define a constricting nozzle with the base. This geometry has the significant advantage of simplicity as can be readily seen in the illustration. It has another advantage in that propellants having slow burn rates can be used which previously could not be used. Slow burn rate propellants require very thin structures with a large surface area. If such propellants are formed into tablets as is conventionally done in conventional inflators, they would lack sufficient structural strength and be prone to breakage. If the tablets break, the surface area is increased and the propellant burns faster. This would be an uncontrollable property of these tablets such that the burn rate of various inflators depends on how many tablets break. Since this is unacceptable, there is a practical lower limit for the burn rates for propellants used in conventional inflator designs. This, therefore, restricts those classes of propellants which can be used. This restriction does not apply to the present invention since the propellant 444 is supported by metal piece 462 and therefore can be made very thin without fear of breaking. The metal piece 462 is also provided with appropriate curved sections to define a converging-diverging nozzle 436, 437, 438 with the support base 434. Also in this embodiment, a layer of igniter mix 445 may be coated onto the propellant 444.

2.3.2 Control Module

Smart airbags are covered in detail below and this disclosure, which originally appeared in U.S. Pat. No. 5,772,238, will not be repeated here. However, some elaboration is desirable on the control module disclosed therein. Although since that patent did not cover particular methods of controlling the flow into the airbag as discussed above, any method for controlling such an inflow is contemplated herein and in the '238 patent. In particular, the control of the rate of gas production by an inflator as well as the control of the percentage of gas that goes into a particular airbag (an inflator can inflate more than one airbag), or the aspiration ratio for aspirated airbags by any method is contemplated herein. Also, as discussed below and elsewhere herein, the parameters that are used to effectuate such control through the control module include, among others, the output of any crash sensors (including anticipatory crash sensors), any occupant sensors that determine what is present in the vehicle, its size and/or weight, and where it is located. All possible technologies that can be used are contemplated including, for example, ultrasonic, optical, electromagnetic wave or electric field spatial sensors, bladder, strain gage or any other weight sensor, or any sensors that physically monitor the motion of the occupant such as seatbelt load or acceleration sensors or accelerometers or other sensors that physically monitor the acceleration, velocity or position or an occupant such as accelerometers that directly measure the acceleration or position of an occupant or the pressure in an airbag that interacts an occupant or the tension in a seatbelt being used by an occupant. The control module generally contains a microprocessor which receives inputs from one or more of the above listed sensors and through an appropriate algorithm, which can be based on or use a neural network, determines the desired gas flow into or out of a particular airbag or group of airbags. The particular method of effectuating this control depends on which of the many structures and methods is/are chosen by the system designer and to delineate in detail all such combinations would require volumes. The particular designs are therefore left to those that are skilled in the art of each of the particular structures or methods chosen. Generally, sensors that directly measure the gas pressure, flow or temperature as it leaves the inflator as is disclosed in U.S. Pat. No. 6,314,889 would generally not be used based on the difficulty of making such measurements reliably. Rather, the result of the flow into the airbag is the preferred approach. This result can be measured by monitoring the motion of the occupant through any of the occupant sensors listed above and/or by monitoring the pressure and/or volume of the airbag itself. A preferred approach is to monitor the acceleration imparted to the occupant by the airbag.

One method of controlling the amount of gas in an airbag is to control the aspiration ratio. Aspiration ratios of as high as 7 have been experimentally achieved by the assignee's scientists. The aspiration of gas from the passenger compartment into an airbag allows the temperature and the quantity of the gas in the inflator to be controlled. The aspiration ratio of a particular inflator can also be controlled by controlling the position of the valves that allow the gas to flow into the aspirator from the passenger compartment and which close at the end of the inflation process, by diverting some of the inflator high temperature and pressure gas from going through the aspirator, or by many other methods that will not become obvious to those skilled in the art.

The controller described herein can operate in any of several modes. It can receive information continuously from various sensors and continuously adjust the flow into or out of one or more airbags, for example. Alternately, it can process the various sensors and set a schedule for the flow into and/or out of the airbag at the beginning of the process and then not modify it afterward. The latter approach of course would be less accurate but result in a less expensive processor and control module circuitry. In either case, intelligence can be included in the algorithm covering, for example, the relationship between the orifice area and the gas flow rate out of the inflator thus simplifying the control process. In one example, a model of the entire system can reside in the processor and the effect of any sensor input can then be determined and the flow adjusted appropriately. Alternately or additionally, a neural network can be used and the correlation between the desired gas flows and the sensor inputs determined experimentally. Of course, any combination of the above methods also can be used.

2.3.3 Control of Gas Outflow

Control of the outflow of gas from one or more airbags can be accomplished by varying the opening of an exhaust port in the airbag or the inflator as desired. Controllable valves or vents within an airbag are discussed in section 3.8 below. The outflow can also be controlled as part of an aspirated inflator through control of the opening of the aspirating ports, for example.

2.4 Exhausting Inflator Gas 2.4.1 Removing Window

As described above and in U.S. Pat. No. 5,505,485, a desirable inflator for use in this airbag system is of the non-sodium azide highly aspirated type and the most desirable airbags are made from plastic films. It is contemplated that the inflators of the '485 patent may be used in accordance with the invention. By using such inflators, the pressure rise in the passenger compartment resulting from deployment of the airbag is kept to a minimum. If the pressure rise is still excessive, it is easily vented by the removal of the glass from the rear window 493 by suitable means as described below. In this case, even though multiple toxic inflators are used, the concentration of toxic gas in the vehicle is quickly reduced as a result of the absence of the window 493 and the fact that the inflator gases are hotter than the ambient temperature and thus rise to the ceiling and then flow out of the broken window 493.

Obviously, although the rear window 493 was chosen for removal, any of the side windows could also have been chosen or even a sunroof if one is present, and even though a single window was chosen, multiple windows could also be removed or forcibly broken. In some cases described below, the glass in the window will be broken and in others it will be ejected. If the window is made from tempered glass, it will break into small harmless pieces that will be ejected from the vehicle due to the higher pressure within the vehicle.

The airbag systems shown in FIG. 61 provide protection of the occupant against impacts with various vehicle structural members such as the A-pillar, B-pillar and C-pillar (see the definitions above). Federal law now requires protection from impacts with these pillars, which is difficult to achieve due to the limited space available for padding, and therefore the law is weak and not very effective. A side impact airbag such as 489 coming down from the ceiling can offer excellent protection from impacts with these pillars. For this reason, it will be desirable in many cases to deploy the side airbags when the frontal impact airbag is deployed since a significant number of occupants are still being injured in frontal impacts, even though the airbag deployed, by impacts with the A-pillar and the B-pillar.

The airbag systems shown in FIG. 61 include airbags coming out of the steering wheel, the ceiling and the back of the front seat. It is obvious though that airbag modules can be mounted at other locations in the passenger compartment such as the lower instrument panel for knee protection or the ceiling for driver protection or rear passenger protection, as described above.

Figure 62A:
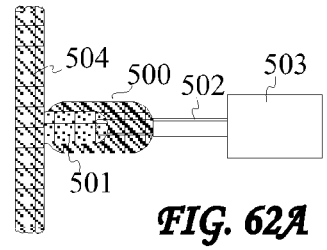
FIG. 62A is a fragmented partially schematic cross-sectional view of a pyrotechnic window breaking mechanism used in accordance with the present invention.
Figure 62B:
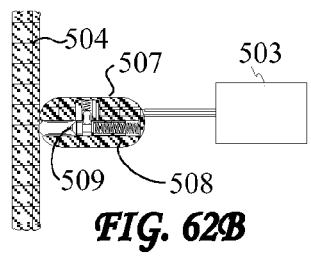
FIG. 62B is a fragmented partially schematic cross-sectional view of an electromechanical window breaking mechanism used in accordance with the present invention.
Figure 62C:
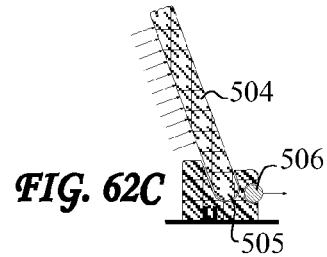
FIG. 62C is a fragmented cross-sectional view of a window release mechanism in accordance with the present invention which permits the window to be ejected from the vehicle if the pressure in the vehicle exceeds a design value.

FIGS. 62A, 62B and 62C illustrate various methods by which the glass in a window can be removed, in order to provide for a reduction in the pressure generated in the passenger compartment by the deployment of airbags as well to enable the exhaust of toxic gases therefrom. In FIG. 62A, a fragmented partially schematic cross sectional view of a pyrotechnic window breaking mechanism is illustrated generally at 500. It comprises a wire 502 leading from a vehicle crash sensor system shown schematically at 503 and an electric squib, primer or detonator 501 which is housed in a housing and is positioned against a portion of window glass 504. When the sensor system 503 determines that the vehicle is experiencing a crash, for which deployment of an airbag is warranted, it sends a signal to the airbag module, not shown, and a separate circuit also carries a current or other electronic signal to the window breaking squib 501 through wire 502. When the squib 501 is ignited a small but strong shock impulse is transmitted to the glass surface which is sufficient to shatter the window 504. As noted above, the squib represents the entire class of electrically initiated pyrotechnic devices capable of releasing sufficient energy to cause a vehicle window to break. Some such devices, for example, use a heated bridge wire while others use a semiconductor bridge or a laser initiation system.

In FIG. 62B, an electromechanical window breaking mechanism is illustrated generally at 507 and comprises a housing abutting against a portion of window glass 504. In this embodiment, a current or other signal from the vehicle crash sensor system 503 releases a spring-loaded impacting plunger 508 arranged in the housing and having a hardened sharp tip 509 similar to a machinist's center punch. When the tip 509 travels through a release aperture in the housing and impacts the glass 504, it causes the glass 504 to shatter. An alternative to the electrical release of the plunger 508 would be to use a mechanical sensor which responds to the crash itself. It is well known that a spring-loaded center punch if impinged onto a window of an automobile will shatter the glass. Their use by vandals and thieves for this purpose is why their sale to the general public is not permitted, in at least one state.

Another method for removing the glass from a window is illustrated in FIG. 62C that is a fragmented cross sectional view of a window release mechanism where the window is completely ejected from the vehicle when the pressure in the vehicle exceeds a predetermined design value. This value is selected such that the window can only be ejected if more than two airbags are deployed. In this case, pressure on the surface of the glass 504 creates a force along edges 505 of the glass which is normally positioned within a mounting structure and retained therein by a gasket 506. When that force exceeds the retaining force of the mounting gasket 506, the window is released and is ejected by the gas pressure within the vehicle.

An alternate method to enable removal of glass during deployment of more than one airbag as a result of excessive pressure generated within the passenger compartment by deploying airbags is to design the temper in the glass so that if the glass is stressed by internal vehicle pressure above a predetermined amount, the outer surface of the window would be placed into tension at which point it shatters. The breaking of a vehicle window is not a serious condition and in fact it almost always happens in side impact accidents where an airbag is desired. In other implementations, not shown, the force created by the pressure on the entire window or door surface is used to deform all or part of a mechanism to the point that a spring-loaded impacting pin is released to shatter the window in a similar manner as described above. Other methods will now be obvious to those skilled in the art.

As discussed above, in addition to providing a release for the excessive pressure associated with the deployment of multiple airbags, a prime reason for creating a large opening in the vehicle in the event of an accident, is to permit the use of propellants other than sodium azide whereby toxic gases produced by these propellants would be exhausted from the passenger compartment through the broken or removed window. If the passenger compartment of the vehicle is vented, vis-à-vis the aperture created by the shattered or removed glass, nitrocellulose, nitroguanidine, and other double and triple base formulations, tetrazol (see U.S. Pat. No. 4,909,549 to Poole et al.) or similar propellants can be used for all of the inflators in the airbag system in view of the fact that the passenger compartment is no longer sealed and any toxic gases would be vented out of the passenger compartment. This is not done now because of the excessive amount of carbon dioxide, and other contaminants, which are produced and the requirement that the gas in the passenger compartment be breathable for some set period such as one hour. If one of the above propellants is used in conjunction with a glass shattering or removal system, the size and weight of an inflator could be reduced by a factor of two or more and, if efficient aspirating systems are also used, an additional factor of about four can be achieved resulting in an inflator which is about one eighth the size of conventional inflators.

2.4.2 Exhaust Airbag from Vehicle

Figure 63:
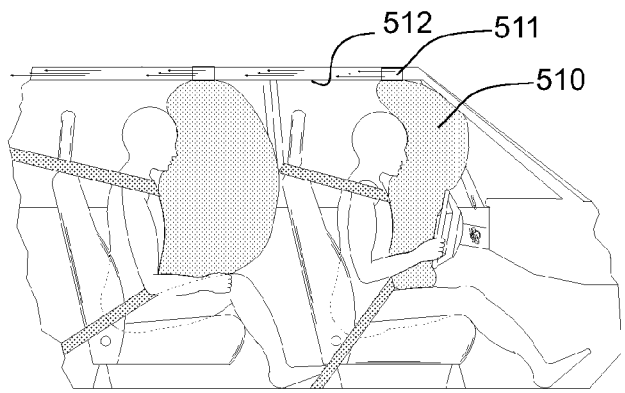
FIG. 63 is a fragmented view of a vehicle with the side removed with two inflated airbags showing the airbag gases being exhausted into the ceiling of the vehicle.

An alternate method of eliminating the buildup of toxic gas in the passenger compartment is to exhaust one or more of the airbags out of the vehicle as shown in one example in FIG. 63. In this embodiment, the gas in ceiling-mounted airbag 510 is exhausted into a vent 511 located in a ceiling 512 of the vehicle. Vent 511 leads outside of the vehicle and thus as the airbag 510 deflates, the gas does not enter the vehicle passenger compartment where it would be breathed by the occupants. This technique could be used by other airbags which are mounted in the door or instrument panel. There has been a reluctance to use this technique for the front passenger frontal impact protection airbag since this would require that a hole be placed in the firewall partially defeating the very purpose of the firewall which is to prevent fumes or even flames from the engine compartment from entering the passenger compartment. This would not be a problem for the ceiling or door-mounted airbags.

As mentioned above, when multiple airbags are deployed in a crash, the sound pressure level becomes excessive to the point that injuries to human ear drums can result. To minimize such injuries, airbag system designers have resorted to staging the deployment of the driver and passenger airbags so that the peak deployment noise pressure is reduced. These systems have the delay circuitry as part of the sensor and diagnostic circuitry that complicates the design of this circuitry and increases its cost and reduces the reliability of the system. An alternate and much simpler system is disclosed in FIG. 65A which is a detailed cross sectional view showing the inflator squib incorporating a pyrotechnic delay element.

Figure 65:
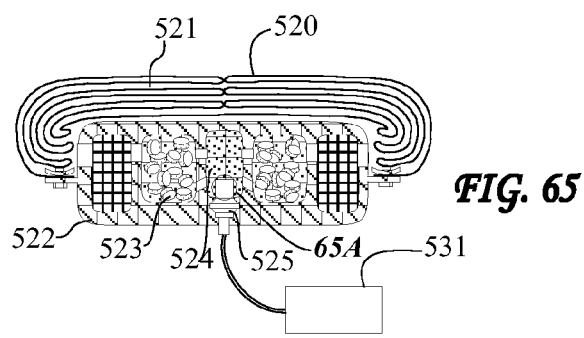
FIG. 65 is a cross-sectional view of an airbag module showing an airbag and inflator with the inflator sectioned to show the propellant, initiator and squib assembly, and with the sensor and diagnostic circuitry shown schematically.

FIG. 65 shows an airbag module 521 having one airbag 520 connected therewith, although it is of course possible to have a plurality of airbags connected to a single module, and the module is connected to sensor and diagnostic circuitry, shown schematically at 531, which sends current or a signal to all of the airbag modules connected thereto which are to be deployed in a particular crash. As shown in FIG. 65, module 520 comprises the airbag 521 and an inflator assembly 522 coupled thereto. The inflator assembly 522 comprises a chamber housing a propellant 523, an initiator 524 coupled through passages in the inflator assembly to the propellant 523 and a squib assembly 525 engaging with the initiator 524. The squib assembly 525 is connected to the sensor and diagnostic circuitry 531 which will determine activation of the squib assembly 525 and thus ignition of the propellant 523 to generate gas for inflating the airbag 520. The squib assembly 525 is shown in an expanded view in FIG. 65A taken within the circle labeled 65A in FIG. 65. The squib assembly 525 comprises a burn-wire electrically initiated squib 526 and a pyrotechnic delay element 527 adjacent thereto. The squib 526 is spaced and isolated from the initiator 524 by the delay element 527 thereby avoiding premature initiation. The delay element 527 is capable of providing any desired delay from fractions of a millisecond to several milliseconds and is sometimes made from a coiled tube containing a propellant or other pyrotechnic material. Such delay devices are well known to those skilled in the art of designing pyrotechnic delays primarily for military uses.

An alternate mechanical method can be used since pyrotechnic delay elements yielding a few millisecond delay are expensive. One embodiment is illustrated in FIG. 65B which shows a delay producing device where the electric squib assembly 525 causes the ignition of a burn-wire electrically initiated squib 526 which upon ignition releases a firing pin 528. The firing pin 528 is then propelled by a spring 529 through a passage in the squib assembly 525 into a stab primer 530 which initiates deployment of the airbag, by means of the activation of the initiator 524. The length of travel and the mass of the firing pin 528 can be adjusted to provide the required delay. In the normal position, the squib 526 retains the firing pin 528 against the expansion force of the spring 529.

The use of aspiration, where the gas to inflate the airbag is substantially obtained from the passenger compartment itself, is also desirable in order to reduce pressure and the amount of toxic gas within the passenger compartment of the vehicle. Aspiration systems are currently in use for passenger side frontal impact airbag systems, but the aspiration ratios are quite low. Typically, only about 30% or less of the gas used to inflate the airbag comes from the passenger compartment with the remainder coming from the burning propellant. This percentage can be greatly increased by the careful design of the aspirating nozzle to where as much as about 90% or more of the gas comes from the passenger compartment as discussed above. The use of high aspiration ratios also permits the use of hotter gases from the gas generator since the vehicle passenger compartment air is used to dilute and thus cool the inflator gases. Thus, in general, the gas from the inflator does not need to be cooled and cooling screens are not needed. Cool gas is also desirable for side thorax and especially head protection airbags due to the need to keep them inflated for rollover protection.

If an airbag is attached to the vehicle ceiling and the inlet from the passenger compartment into the inflator takes the form of a narrow but long slit running along the length of the inflator, then an efficient design for the nozzle is possible as disclosed herein. In this case, the ports that are used for the gas flow from the passenger compartment to enter the airbag can also be used as the exit orifices for the gas to flow out of the airbag during the crash. An additional advantage results in this case in that the inflator gases are exhausted high in the passenger compartment of the vehicle making it even more likely that they will flow out of the vehicle through the window which has been broken open or removed for that purpose.

This is illustrated in FIG. 66 which is a perspective view of a ceiling-mounted airbag system having exit ports at the ceiling level for gas to flow out of the airbag. In FIG. 66, a long thin airbag module 535 is positioned in the vehicle ceiling as described herein. When the occupant presses against an airbag 535 during the crash, pressure builds within the airbag 535 causing the gas within the airbag to flow back through the module opening 536 and into the passenger compartment 537 at the ceiling level. Since the exiting gas is hot, it flows out of the rear window, not shown, which has been broken or removed, and thus out of the passenger compartment and into the atmosphere. By using the aspirating nozzle as an exit orifice, it is unnecessary to place vent holes within the airbag itself. This is particularly an advantage when film airbags are used.

2.4.3 Blow Out Panel

In some implementations, either due to the geometry of the vehicle, the inability to achieve high aspiration ratios, or the necessity to cool the inflator gases, breaking of one or more windows may not be sufficient to remove enough of the toxic gases to pass the required breath ability tests. The main toxic gas will be carbon dioxide which as it cools will settle in the lower parts of the vehicle. If an occupant, because of unconsciousness or for some other reason, has his mouth below the window level, he may be forced to breath an excessive amount of the toxic gas and be injured. For these cases, it is necessary to create an air passage lower in the vehicle than the possible locations of the occupant's mouth. One implementation is illustrated in FIG. 66 which is a partial view of the interior of a vehicle showing a blowout panel located in a low position in the passenger compartment.

As shown in FIG. 66, and in more detail in FIG. 66A, a hole 538 has been pyrotechnically opened in a location below the seat by shattering a frangible seal in cover 539 by means of a squib 540. The squib 540 is connected to and initiated by the same sensor and diagnostic circuitry which is used as discussed above for breaking the glass in a window. Many other techniques exist for creating an air passage low in the vehicle. In some cases, for example, it might even be desirable to blow open a vehicle door perhaps 10 seconds after the accident, which may be achieved by appropriate door opening mechanisms (represented schematically in FIG. 66 as 541). This has the added advantage of helping to provide egress for injured occupants.

2.4.4 Exhaust Fan

In rare cases, the ventilation provided by breaking a window even with the addition of a hole in the lower part of the passenger compartment is insufficient to remove the toxic gas in time to prevent any danger of injury to the occupants. When this occurs, a small electrically or pyrotechnically driven fan can be mounted in an opening 542 as shown in FIGS. 66 and 66B. This fan shown at 543 in FIG. 66B which is a partial perspective view of the fan assembly of FIG. 66. In the event of an accident which requires deployment of more than one airbag, a fan 543 powered by the vehicle's electrical system through wires 544 is turned on for a period of time to pull gas from the lower part of the vehicle forcing it to flow through doors 545. Alternately, the fan 543 can be powered by its own power supply comprising a battery or capacitor, or even by a pyrotechnic device.

If the total number of airbags deployed in an accident can be reduced, then the above disclosed methods of removing the toxic gas may not be required. Therefore, in another preferred embodiment of this invention, each airbag has an associated occupant position sensor to assure that there is an occupant present at a particular seating position before the airbags associated with that seating position are deployed. Generally, there would be no reason to deploy an airbag if the seat is unoccupied. More sophisticated versions of occupant position sensors can also determine out-of-position occupants, the presence of a rear facing child seat and children laying on the seat.

In a refinement of this embodiment, more of the electronics associated with the airbag system is decentralized and housed within or closely adjacent to each airbag module. Each module has its own electronic package containing a power supply and diagnostic and sometimes also the occupant sensor electronics. One sensor system is still used to initiate deployment of all airbags associated with the frontal impact. To avoid the detrimental noise effects of all airbags deploying at the same time, each module sometimes has its own, preferably pyrotechnic, delay as discussed above. The modules for the rear seat, for example, can have a several millisecond firing delay compared to the module for the driver, and the front passenger module can have a lesser delay. Each of the modules sometimes also has its own occupant position sensor and associated electronics. In this configuration, there is a minimum reliance on the transmission of power and data to and from the vehicle electrical system which is the least reliable part of the airbag system, especially during a crash. Once each of the modules receives a signal from the crash sensor system, it is on its own and no longer needs either power or information from the other parts of the system. The main diagnostics for a module can also reside within the module which transmits either a ready or a fault signal to the main monitoring circuit which now needs only to turn on a warning light if any of the modules either fails to transmit a ready signal or sends a fault signal.

3 Airbags

3.1 Plastic Film Airbags

A fundamental problem with the use of plastic films for airbags is that when a single conventional plastic film is used and a tear is (inadvertently) introduced into the film, the tear typically propagates easily and the airbag fails catastrophically upon deployment. As noted above, this invention is concerned with various methods of eliminating this problem and thus permitting the use of films for airbags with the resulting substantial cost and space savings as well as a significant reduction in injuries to occupants. The reduction in occupant injury arises from the fact that the film is much lighter than fabric in a conventional airbag and it is the mass of the airbag traveling at a high velocity which typically injures the out-of-position occupant. Also, since the packaged airbag is considerably smaller than conventional airbags, the module is also smaller and the total force exerted on the occupant by the opening of the deployment door is also smaller further reducing the injuries to severely out-of-position occupants caused by the initial stages of the airbag deployment. Finally, in some preferred implementations of this invention, the airbag is mounted onto the ceiling of the vehicle making it very difficult for an occupant to get into a position as to be injured by the opening of the deployment door. Ceiling mounting of conventional fabric airbags is less practical due their excessive size. Ceiling mounting of full protection film airbags, on the other hand, is practical based on the use of the materials and, the reinforcements disclosed here.

One method of solving the tear problem is to use two film airbags or two airbag layers, one inside the other, where the airbags or layers are attached to each other with an adhesive which is strong enough to hold the two airbags or layers closely together but not sufficiently strong to permit a tear in one airbag or layer to propagate to the other. If a tear is initiated in the outer airbag or layer, for example, and the material cannot support significant tensile stresses in the material close to the tear, the inner airbag or layer must accommodate the increased tensile stress until it can be transferred to the outer layer at some distance from the tear. If the tear is caused by a small hole, this increased stress in the inner bag may only occur for a few hole diameters away from the hole. If the inner airbag is also made from an elastomer and the outer airbag layer is made from a less elastic material, the outer material can cause the airbag to take on a particular, desired shape and the inner airbag is used to provide the tear resistance.

In a preferred embodiment, five layers make up the film that is used to construct the airbag. The inner layer is a high tensile strength plastic such as NYLON® and the two outer layers are elastomeric and also capable of being heat sealed together. The three layers are joined together using an adhesive layer between each adjacent pair of layers resulting in a total of five layers. In addition to blunting the propagation of a crack, the elastomeric layers allow the airbag to be formed by heat sealing the elastic layers together. Additional layers can be added if particular properties are desired. Additional layers may also be used at particular locations where added strength is desired, such as at the seams. Although five layers are described, a preferred embodiment is to use three layers by eliminating one elastic and one adhesive layer. Also, in many cases, the elastic and inelastic layers can be thermally bonded together eliminating the need for the adhesive layer.

The problem which arises with a two airbag system with one airbag inside of and attached to the other, when both film layers have high elastic moduli and the cause of the tear in one airbag also causes a tear in the second airbag, is solved if one of the materials used for the two airbags has a low modulus of elasticity, such a thermoplastic elastomer. In this case, even though a tear starts in both airbags at the same time and place, the tear will not propagate in the thermoplastic elastomer and thus it will also be arrested in the high modulus material a short distance from the tear initiation point.

Figure 71:
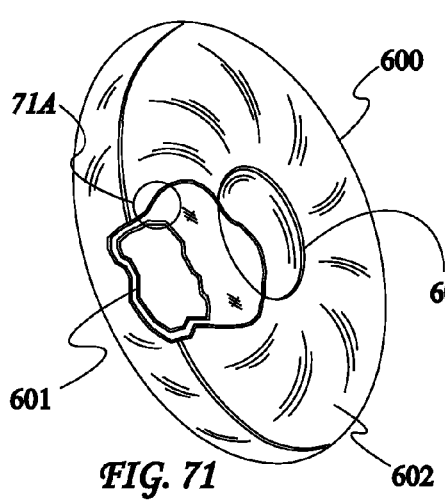
FIG. 71 is a perspective view with portions cut away and removed of a film airbag wherein the film is comprised of at least two layers of material which have been joined together by a process such as co-extrusion or successive casting or coating.

An example of a two layer airbag construction is illustrated in FIG. 71 which is a perspective view with portions cut away and removed of a film airbag made from two layers or sheets of plastic film material, which are preferably substantially coextensive with one another. Frequently, a third adhesive layer is used if the first and second layers cannot be joined together.

Some of the constructions discussed below contain various materials for reinforcing films. Although not yet available, a promising product for this purpose is carbon nanotubes. These materials are 100 times stronger than steel and have one sixth the weight. Such nanotubes have been demonstrated at Rice University, The University of Texas and Trinity College in Dublin, Ireland.

The phenomenon of crack blunting is discussed in some detail in C.-Y. Hui, A. Jagota, S. J. Bennison and J. D. Londono "Crack blunting and the strength of soft elastic solids", Proc. R. Soc. London, A(2003) 459, 1489-1516. The invention herein makes use of crack blunting to arrest the propagation of a crack (or tear) by the use of elastic layers on one or both sides of the more rigid film, typically NYLON®. The NYLON® prevents the stretching of the elastic films and the elastic films serve to both seal the pieces of plastic film to make an airbag and to blunt the propagation of cracks or tears.

Figure 72:
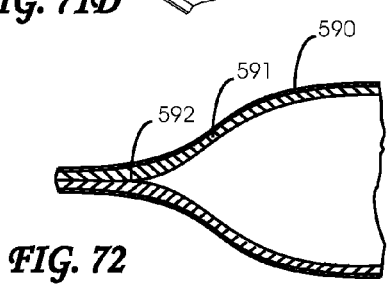
FIG. 72 illustrates a section of a seam area of an airbag showing the deformation of the elastic sealing film layer.

As discussed above and elsewhere herein, the combination of two layers of film wherein one layer comprises a high tensile strength material, such as biaxially oriented Nylon®, and the other generally thicker layer comprises an elastic material, such as polyurethane or a thermoplastic elastomer, not only provides the high strength plus blunting property but also permits the stress concentrations in the seams to be substantially reduced. This is illustrated in FIG. 72 where 590 illustrates an airbag including a high tensile strength layer 590 of NYLON®, for example, 591 an elastic layer of polyurethane, for example, and the joint 592 illustrates the expansion of the elastic layer 591 signifying the redistribution of the stresses in the joint 592. This stress distribution takes place both along the seam (i.e., into the plane of the drawing) and into the joint 592 (i.e., from right to left in the drawing). By this process, the maximum stress can be moved from the joint 592 to the material away from the joint 592 where the strength of the high tensile strength material in layer 590 limits the pressure that the airbag can withstand. By thereby reducing or eliminating the stress concentrations in the joints 592 and/or seams, the thickness and thus the weight of the material making up the airbag is reduced. This permits an airbag to be constructed with interconnected compartments formed by joining portions of sheet material together, e.g., by heat sealing or vulcanization, to form the desired shape for occupant protection while minimizing stress concentrations and thus minimizing the weight of the airbag.

Appendix 1 (of U.S. patent application Ser. No. 10/817, 379) provides a finite element analysis for a production side curtain airbag as used on the AGM Saturn vehicle. The stresses calculated in the seams are shown to require a NYLON® film thickness of about 0.3 mm or about 0.012 inches to withstand a gage pressure of about 2.8 kg/cm$^2$. Through the use of the elastic film techniques described herein, this thickness can be dramatically reduced to about 0.004 inches or lower.

As mentioned above, U.S. Pat. No. 5,811,506 (Slagel) describes a thermoplastic, elastomeric polyurethane for use in making vehicular airbags. Slagel does not mention the possibility of this material for use in a laminated film airbag. The elasticity of this material and the fact that it can be cast or otherwise made into a thin film renders this an attractive candidate for this application especially due to its high temperature resistance and other properties. Such a laminated film airbag would be considerably thinner and have a lighter weight than the polyurethane material by itself which would have to be quite thick to avoid becoming a balloon.

Another technique which can be used in some situations where particular geometries are desired is to selectively deposit or laminate metal foil onto particular sections or locations of the airbag. Such a foil not only greatly reduces gas permeation or leakage through the material but it also adds local stiffness or tensile strength to a particular area of the airbag. This can be used, for example, to reinforce the airbag seams or joints. The most common material for this purpose is aluminum; however, other metals can also be used. Selective addition of metal foil can also be used to control the shape of the airbag. For some applications, one layer of the entire airbag can be foil.

Other additives can be used in conjunction with the film airbags according with this invention including, e.g., aluminum tribydrate or antimony trioxide for flame proofing, BPS by Morton Thiokol for mildew prevention and TINUVUN 765 by Ciba Geigy for ozone resistance.

3.2 Driver Side Airbag

Figure 71A:
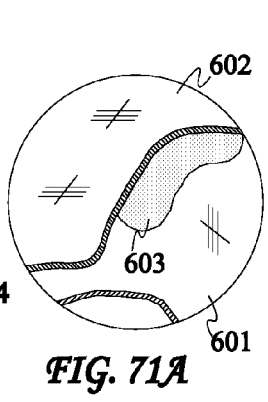
FIG. 71A is an enlarged view of the inner film airbag layer and outer film airbag layer taken within circle 71A of FIG. 71.

In FIG. 71, the driver airbag is shown in the inflated condition generally at 600 with one film layer 601 lying inside a second film layer 602. The film layers 601, 602, or sheets of film laminated or otherwise attached together, are non-perforated and are also referred to as airbags or layers herein since they constitute the same. FIG. 71A is an enlarged view of the material of the inner layer 601 and outer layer 602 taken within circle 71A of FIG. 71. When manufactured, the film of the inner layer 601 may be made from a thermoplastic elastomer such as polyurethane, for example, as shown in FIG. 71A, and the outer layer 602 may be made from a more rigid material such as NYLON® or polyester. The two film layers 601, 602 are held together along their adjacent regions by adhesive such as an adhesive 603 applied in a manner sufficient to provide adherence of the two film layers 601, 602 together, as is known in the art.

In FIG. 71, a driver side airbag 600 is illustrated where the bag is formed from two flat pieces of material 601, 602 and a center cylindrical piece 604 all of which are joined together using heat sealing with appropriate reinforcement at the heat sealed joints. Heat sealing entails the application of heat to one or both of the surfaces to be joined. In most implementations, the center cylindrical piece 604 is not required as taught in U.S. Pat. No. 5,653,464 mentioned above.

The example of FIG. 71 is meant to be illustrative of a general technique to minimize the propagation of tears in a composite film airbag. In an actual airbag construction, the process can be repeated several times to create a composite airbag composed of several layers, each adjacent pair of layers optionally joined together with adhesive.

The materials used for the various film layers can be the same or different and are generally made from NYLON®, polyethylene or polyester, for the high modulus component and from polyurethane, polyester elastomer such as HYTREL™ or other thermoplastic elastomers for the low modulus component, although other materials could also be used. The use of different materials for the different layers has the advantage that tear propagation and strength properties can complement each other. For example, a material which is very strong but tears easily can be used in conjunction with a weaker material which requires a greater elongation before the tear propagates or where the tear does not propagate at all as with blunting materials. Alternately, for those cases where self-shaping is not necessary, all layers can be made from thermoplastic elastomers which expand upon inflation and do not maintain any set shape.

In the implementation of FIG. 71, the adhesive 603 has been applied in a uniform coating between the film layers. In some cases, it is preferable to place the adhesive in a pattern so as to permit a tear to propagate a small distance before the stress is transferred between layers. This permits the stress concentration points to move a small distance away from each other in the two films and further reduces the chance that a catastrophic failure will result. Thus, by selecting the pattern of the application of the adhesive 603 and/or the location(s) of application of the adhesive 603, it is possible to control the propagation of a tear in the composite airbag 600.

Figure 71B:
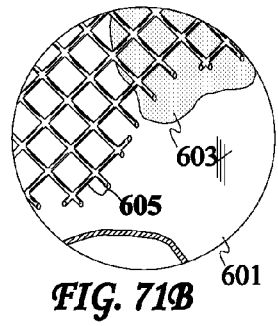
FIG. 71B is an enlarged view of the material of the inner film airbag and outer film airbag taken within circle 71A of FIG. 71 but showing an alternate configuration where the outer airbag layer has been replaced by a net.

FIG. 71B illustrates an alternate configuration of a composite airbag where the outermost airbag 602 has been replaced by a net 605. There may be additional film layers beneath the inner layer 601 in this embodiment. A "net" is defined for the purposes of this application as an interlaced or intercrossed network of material, e.g., strips of material which cross one another. The interlacing may be generated, e.g., by weaving discrete elongate strips of material together or by molding, casting, progressive coating or a similar process in which case the material is molded into the network to provide an intercrossed structure upon formation. Additionally, the net 605 may be formed integrally with the film material in which case it appears as a substantial change in material thickness from the net 605 and film portions of the material to the only film portions of the material. The strips of material may be joined at the intersection points in the event that discrete material strips are woven together. In the illustrated embodiment, the material strips which constitute the net 605 are oriented in two directions perpendicular to one another. However, it is within the scope of the invention to have a net comprising material strips oriented in two, non-perpendicular directions (at an angle to one another though) or three or more directions so long as the material strips are interlaced with each other to form the net. Additionally, the net pattern can vary from one portion of the airbag to another with the particular location and orientation determined by analysis to minimize stress concentrations, eliminate wrinkles and folds, or for some other purpose. Also, it is understood that the net has openings surrounded by material having a thickness and width substantially smaller than the openings.

The net 605 may be an integral part of the inner airbag 601 or it can be attached by an adhesive 603, or by another method such as heat sealing, to the inner airbag 601 or it can be left unattached to the inner airbag 601 but nevertheless attached to the housing of the airbag system. In this case, the stress in the inner airbag 601 is transferred to the net 605 which is designed to carry the main stress of the composite airbag and the film of the inner airbag 601 is used mainly to seal and prevent the gas from escaping. Since there is very little stress in the film layer constituting the inner airbag 601, a tear will in general not propagate at all unless there is a failure in the net 605. The net 605 in this illustration has a mesh structure with approximately square openings of about 0.25 inches. This dimension will vary from design to design. The adhesive 603 also serves the useful purpose of minimizing the chance that the net 605 will snag buttons or other objects which may be worn by an occupant. The design illustrated in FIG. 71B shows the net 603 on the outside of the inner airbag 601. Alternately, the net 605 may be in the inside, internal to the inner airbag 601, especially if it is created by variations in thickness of one continuous material.

Figure 71C:
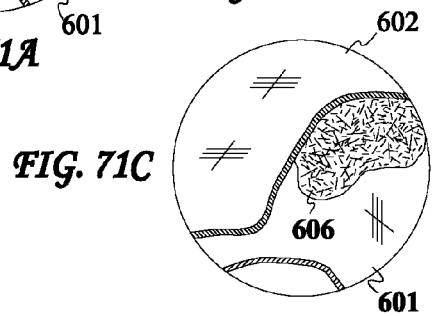
FIG. 71C is an enlarged view of the material of the inner film airbag layer and outer film airbag layer taken within circle 71A of FIG. 1 but showing an alternate configuration where fibers of an elastomer are incorporated into an adhesive layer between the two film layers.

In one embodiment, the net 605 is attached to the housing of the inner airbag 601 and is designed to enclose a smaller volume than the volume of the inner airbag 601. In this manner, the inner airbag 601 will be restrained by the net 605 against expansion beyond the volumetric capacity of the net 605. In this manner, stresses are minimized in the film permitting very thin films to be used, and moreover, a film having a higher elastic modulus can be used. Many other variations are possible. In one alternative embodiment, for example, the net 605 is placed between two layers of film so that the outer surface of the composite airbag is smooth, i.e., since the film layer is generally smooth. In another embodiment shown in FIG. 71C, fibers 606 of an elastomer, or other suitable material, are randomly placed and sealed between two film layers 601, 602 (possibly in conjunction with the adhesive). In this embodiment, the fibers 606 act to prevent propagation of tears in much the same manner as a net. The net 605 may also be constructed from fibers.

Figure 71D:
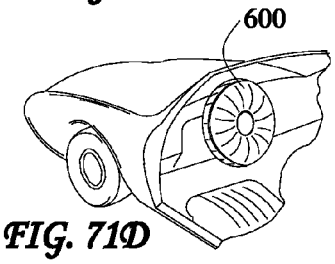
FIG. 71D is a perspective view with portions cut away of a vehicle showing the driver airbag of FIG. 71 mounted on the steering wheel and inflated.

The driver airbag 600 of FIG. 71 is shown mounted on a vehicle by a conventional mounting structure (not shown) in the driver side position and inflated in FIG. 71D.

It is understood that the airbag 600 is arranged prior to deployment in a module or more specifically in a housing of the module and further that the interior of the airbag 600 is adapted to be in fluid communication with an inflator or inflator system for inflating the airbag, e.g., a gas generation or gas production device. Thus, the inflator is coupled in some manner to the housing. Also, the module includes an initiator or initiation system for initiating the gas generation or production device in response to a crash of the vehicle. This structure is for the most part not shown in the drawings but may be included in connection with all of the airbag concepts disclosed herein.

Figure 73:
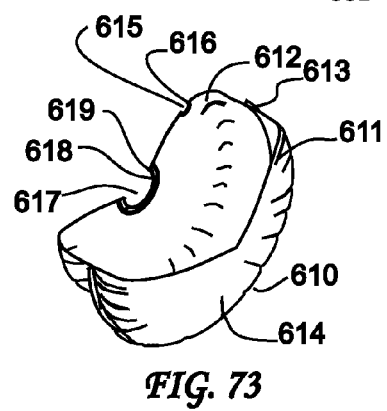
FIG. 73 is a partial cutaway perspective view of a driver side airbag made from plastic film.

An airbag made from plastic film is illustrated in FIG. 73 which is a partial cutaway perspective view of a driver side airbag 610 made from film. This film airbag 610 is constructed from two flat disks or sheets of film material 611 and 360 which are sealed together by heat welding or an adhesive to form a seam 613. A hole 617 is provided in one of the sheets 612 for attachment to an inflator (not shown). The hole 617 can be reinforced with a ring of plastic material 619 and holes

618 are provided in the ring 619 for attachment to the inflator. A vent hole 615 is also provided in the sheet 612 and it can be surrounded by a reinforcing plastic disk 616. Since this airbag 610 is formed from flat plastic sheets 611 and 612, an unequal stress distribution occurs causing the customary wrinkles and folds 614.

Several different plastic materials are used to make plastic films for balloons as discussed in U.S. Pat. No. 5,188,558, U.S. Pat. No. 5,248,275, U.S. Pat. No. 5,279,873 and U.S. Pat. No. 5,295,892. These films are sufficiently inelastic that when two flat disks of film are joined together at their circumferences and then inflated, they automatically attain a flat ellipsoidal shape. This is the same principle used herein to make a film airbag, although the particular film materials selected are different since the material for an airbag has the additional requirement that it cannot fail during deployment when punctured.

When the distinction is made herein between an "inelastic" film airbag and an elastic airbag, this difference in properties is manifested in the ability of the untethered elastic airbag to respond to the pressure forces by becoming approximately spherical with nearly equal thickness and diameter while the inelastic film airbag retains an approximate ellipsoidal shape, or other non-spherical shape in accordance with the design of the inelastic film airbag, with a significant difference between the thickness and diameter of the airbag.

An analysis of the film airbag shown in FIG. 73 shows that the ratio of the thickness to the diameter is approximately 0.6. This ratio can be increased by using films having greater elasticity. A completely elastic film, rubber for example, will form an approximate sphere when inflated. This ratio can also be either increased or decrease by a variety of geometric techniques some of which are discussed below. The surprising fact, however, is that without resorting to complicated tethering involving stitching, stress concentrations, added pieces of reinforcing material, and manufacturing complexity, the airbag made from inelastic film automatically provides nearly the desired shape for driver airbags upon deployment (i.e., the roughly circular shape commonly associated with driver side airbags). Note that this airbag still has a less than optimum stress distribution which will be addressed below.

Figure 74A:
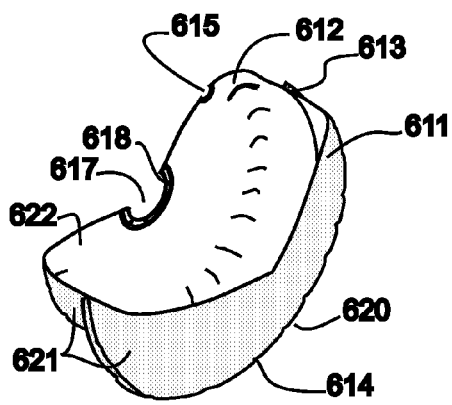
FIG. 74A is a partial cutaway perspective view of an inflated driver side airbag made from plastic film and a fabric to produce a hybrid airbag.

Although there are many advantages in making the airbag entirely from film, there is unfortunately reluctance on the part of the automobile manufacturers to make such a change in airbag design until the reliability of film airbags can be satisfactorily demonstrated. To bridge this gap, an interim design using a lamination of film and fabric is desirable. Such a design is illustrated in FIG. 74A which is a partial cutaway perspective view of a driver side airbag made from film 622 laminated with fabric 621 to produce a hybrid airbag 620. The remaining reference numbers represent similar parts as in the embodiment shown in FIG. 73. In all other aspects, the hybrid airbag 620 acts as a film airbag. The inelastic nature of the film 622 causes the hybrid airbag 620 to form a proper shape for a driver airbag. The fabric 621, on the other hand, presents the appearance of a conventional airbag when viewed from the outside. Aside from the lamination process, the fabric 621 may be attached to the film 622 directly by suitable adhesives, such that there are only two material layers, or by heat sealing or any other convenient attachment and bonding method. Note, this is not to be confused with a neoprene or silicone rubber coated conventional driver side airbag where the coating does not significantly modify the properties of the fabric.

Figure 74B:
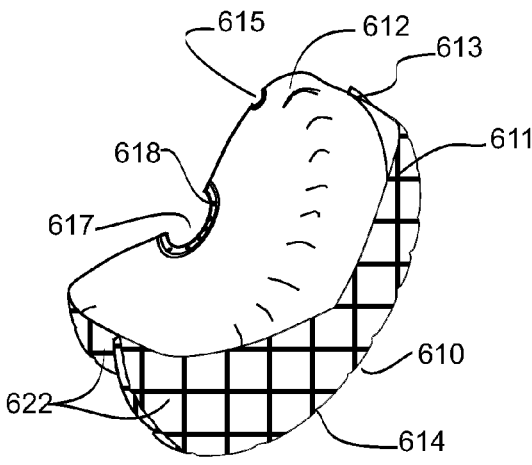
FIG. 74B is a partial cutaway perspective view of an inflated driver side airbag made from plastic film and a net to produce a hybrid airbag.

Analysis, as described in the above-referenced U.S. Pat. No. 5,505,485, has shown that a net is much stronger per unit weight than a fabric for resisting tears. This is illustrated in FIG. 74B which is a partial cutaway perspective view of a driver side airbag 610 made from film 612 and a net 622, which is preferably laminated to the film 612 or formed from the same material as the film 612 and is integral with it, to produce a hybrid airbag. The analysis of this system is presented in the '485 patent and therefore will not be reproduced here. The reference numerals designating the element in FIG. 74B correspond to the same elements as in FIG. 74A.

Figures 74C, 74D:
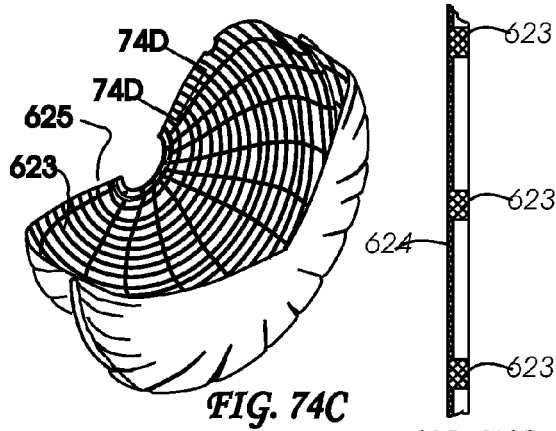
FIG. 74C is a partial cutaway perspective view of an inflated driver side airbag made from plastic film having a variable thickness reinforcement in a polar symmetric pattern with the pattern on the inside of the airbag leaving a smooth exterior.
FIG. 74D is an enlarged cross sectional view of the material of the film airbag taken at 74D-74D of FIG. 74C showing the thickness variation within the film material.

For axisymmetric airbag designs such as shown in FIGS. 74A-74D, a more efficient reinforcement geometry is to place the reinforcements in a pattern of circular rings 623 and ribs 625 (FIG. 74C). A cross-sectional view of the material taken along line 74D-74D in FIG. 74C is shown in FIG. 74D. In this case, the reinforcement has been made by a progressive coating process from a thermoplastic elastomeric material such as polyurethane. In this case, the reinforcing rings and ribs 623, 625 are many times thicker than the spanning thin film portions 624 and the reinforcing ribs 625 have a variable spacing from complete contact at the center or polar region to several centimeters at the equator. The reinforcements may comprise the laminated net as discussed above. Since the rings and ribs 623, 625 are formed in connection with the inner surface of the airbag 610, the outer surface of the airbag 610 maintains its generally smooth surface.

In this regard, it should be stated that plastic manufacturing equipment exists today which is capable of performing this progressive coating process, i.e., forming a multi-layer plastic sheet (also referred to as a material sheet) from a plurality of different plastic layers. One such method is to provide a mold having the inverse form of the predetermined pattern and apply the specific plastic materials in individual layers into the mold, all but the initial layer being applied onto a preexisting layer. The mold has depressions having a depth deeper than the remaining portions of the mold which will constitute the thicker regions, the thinner portions of the mold constituting the spanning regions between the thicker regions. Also, it is possible and desirable to apply a larger amount of the thermoplastic elastomer in the depressions in the mold so that the thicker regions will provide a reinforcement effect. In certain situations, it is foreseeable that only the thermoplastic elastomer can be coated into the depressions whereas a plastic material which will form an inelastic film layer is coated onto the spanning regions between the depressions as well as in the depressions in order to obtain an integral bond to the thermoplastic elastomer. The mold can have the form of the polar symmetric pattern shown in FIG. 74C.

Figure 75A:
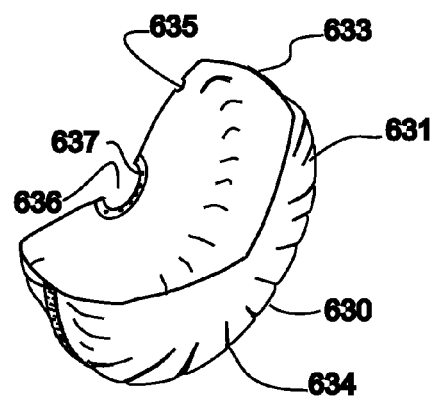
FIG. 75A is a partial cutaway perspective view of an inflated driver side airbag made from plastic film using a blow molding process.

The film airbag designs illustrated thus far were constructed from flat plastic sheets which have been sealed by heat welding, adhesive or otherwise. An alternate method to fabricate an airbag is to use a molding process to form an airbag 630 as illustrated in FIG. 75A which is a partial cutaway perspective view of a driver side airbag made from film using blow molding (a known manufacturing process). Blow molding permits some thickness variation to be designed into the product, as does casting and progressive coating methods molding (other known manufacturing processes). In particular, a thicker annular zone 633 is provided on the circumference of the airbag 630 to give additional rigidity to the airbag 630 in this area. Additionally, the material surrounding the inflator attachment hole 636 has been made thicker removing the necessity for a separate reinforcement ring of material. Holes 637 are again provided, usually through a secondary operation, for attachment of the airbag 630 to the inflator.

The vent hole 635 is formed by a secondary process and reinforced, or, alternately, provision is made in the inflator for the gases to exhaust therethrough, thereby removing the need for the hole 635 in the bag material itself. Since this design has not been stress optimized, the customary wrinkles and folds 634 also appear. The vent hole 635 might also be a variable-sized or adjustable vent hole to achieve the benefits of such as known to those skilled in the art.

Figure 75C:
FIG. 75C is a cutaway view of an inflated driver side airbag made from plastic film showing a method of decreasing the ratio of thickness to effective diameter.
Figure 75B:
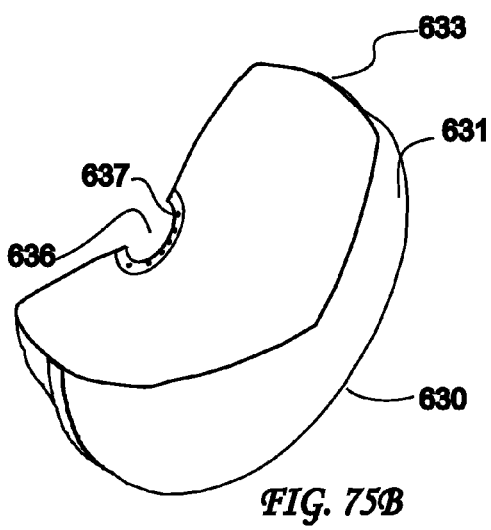
FIG. 75B is a partial cutaway perspective view of an inflated driver side airbag made from plastic film using a blow molding process so that the airbag design has been partially optimized using finite element airbag model where the wrinkles have been eliminated and where the stresses within the film are more uniform.

One advantage of the use of the blow molding process to manufacture airbags is that the airbag need not be made from flat sheets. Through careful analysis, using a finite element program for example, the airbag can be designed to substantially eliminate the wrinkles and folds seen in the earlier implementations. Such a design is illustrated in FIG. 75B which is a partial cutaway perspective view of a driver side airbag made from film using a blow molding process where the airbag design has been partially optimized using a finite element airbag model. This design has a further advantage in that the stresses in the material are now more uniform permitting the airbag to be manufactured from thinner material.

Figure 75D:
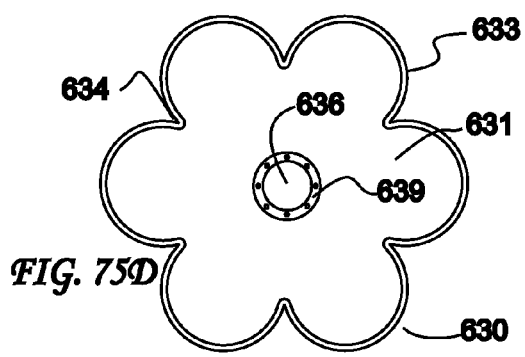
FIG. 75D is a view of a driver side airbag of FIG. 75C as viewed along line 75D-75D.

In some vehicles, and where the decision has been made not to impact the driver with the airbag (for example if a hybrid airbag is used), the inflated airbag comes too close to the driver if the ratio of thickness to diameter is 0.6. In these applications, it is necessary to decrease this ratio to 0.5 or less. For this ratio, thickness means the dimension of the inflated airbag measured coaxial with the steering column, assuming the airbag is mounted in connection with the steering column, and diameter, or average or effective diameter, is the average diameter measured in a plane perpendicular to the thickness. This ratio can be obtained without resorting to tethers in the design as illustrated in FIG. 75C which is a side view of a driver side airbag made from film where the ratio of thickness to effective diameter decreases. FIG. 75D is a view of the airbag of FIG. 75C taken along line 75D-75D. This airbag 630 can be manufactured from two sheets of material 631 and 632 which are joined together, e.g., by a sealing substrate, to form seal 633. Inflator attachment hole 636 can be reinforced with a ring of plastic material 360 as described above. Many circumferential geometries can be used to accomplish this reduction in thickness to diameter ratio, or even to increase this ratio if desired. The case illustrated in FIG. 75C and FIG. 75D is one preferred example of the use of a finite element design method for an airbag.

Some vehicles have a very steep steering column angle. Direct mounting of an airbag module on the steering wheel will therefore not provide good protection to the driver. One approach to solve this problem can be accomplished by using a softer wheel rim or column, which adjusts its angle when pressed by the occupant. However, in some cases this can have just the opposite effect. If a non-rotating driver side airbag is used, the airbag can be arranged to deploy at a different angle from the steering wheel without modifying the steering column while the airbag can be inflated in a direction appropriate for driver protection. Another advantage of using a non-rotating driver side airbag module is that the angle of the sensor axis is independent of the steering column angle for self-contained airbag modules.

In a high-speed vehicle crash, the steering column may collapse or shift due to the severe crush of the front end of the vehicle. The collapse of the steering column can affect the performance of an airbag if the bag is installed on the steering column. One steering system proposed herein purposely induces a large stroking of the steering column when the driver side airbag is activated. This stroking or "disappearing" column, creates a large space in the driver side compartment and therefore allows the use of a relatively large airbag to achieve better protection. In both of the above cases, an airbag module not rotating with the steering wheel is the better choice to accomplish occupant protection.

Recently, there are some developments in steering design, such as "steering by wire", to eliminate the steering column or the mechanical mechanism connecting the steering column to the front wheels. The rotation of the steering wheel is converted into a signal which controls the turning of front wheels by actuators adjacent to the wheels. As steer-by-wire is commercialized, it will be advantageous to use the invention herein of a non-rotating driver side airbag module, which does not have to be supported by a steering column.

To provide better viewing to the instrumentation panel for the driver, it is also beneficial to arrange a driver side airbag module so that it does not obstruct this view. A non-rotating driver side airbag can be either arranged to be out of the central portion of the steering wheel or completely out of the steering wheel to avoid this inconvenience.

Figure 76:
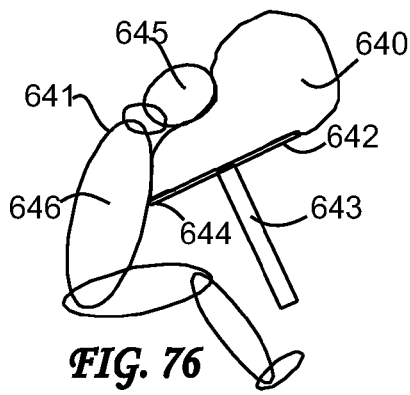
FIG. 76 shows a deployed airbag, supported on the steering wheel of a vehicle with a steep steering column, in contact with an occupant.

An inflated airbag 640 interacting with an occupant driver 641 is shown in FIG. 76. Airbag 640 is installed in and deployed from steering wheel 642. The steering column 643 has a steep column angle placing the lower rim 644 of the steering wheel close to the driver 641. When the driver 641 moves forward after a crash, the driver's head 645 and the upper torso 646 make contact with the airbag 640 and the steering wheel 642. The airbag 640 is then deformed and pushed by the occupant 641 so that the airbag 640 does not form a cushion between the upper torso 646 and the steering wheel 642 even though the occupant's driver's head 645 is in full contact with the airbag 640.

Figure 77:
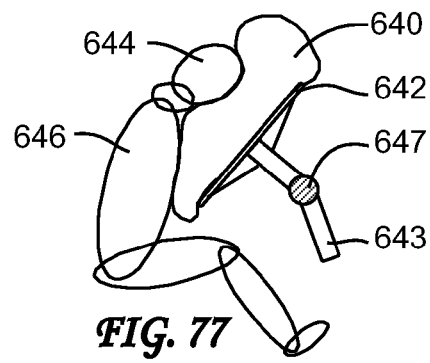
FIG. 77 shows an inflated airbag and a steering wheel, self-aligned with an occupant.

A modified column 648 is illustrated in FIG. 77, which is equipped with a joint 647 between a lower part 648A of the steering column 648 connected to the vehicle and an upper part 648B of the steering column 648 connected to the steering wheel 642. Joint 647 allows the steering wheel 642 and the inflated airbag 640 to have a variable angle relative to the lower part 648A of the steering wheel 648 and thus an adjustable angle to the driver 641. Appropriate rotation of the joint 647 enables the inflated airbag 640 to align with the head 645 and upper torso 646 of the driver 641. The protection offered by the steering column 648 including the airbag 640 system in FIG. 77 is an improvement over the system in FIG. 76 since the airbag 640 is in a better orientation to cushion the occupant driver 641 and penetration of the lower rim 644 of the steering wheel 642 is avoided. The concept of a self-aligned driver side airbag can also be accomplished by rotating the steering wheel 642 or utilizing a soft rim for the steering wheel 642.

Construction of the joint 647 may involve use of a pivot hinge having two parts pivotable relative to one another with one part being attached to the lower part 648A of the steering column 648 and the other part being attached to the upper part 648B of the steering column 648. Alternatively, one of the lower and upper parts 648A, 648B can be formed with a projecting member and the other part formed with a fork-shaped member and a pivot pin connects the projecting member and fork-shaped member. Other ways to construct joint 647 will be apparent to those skilled in the art in view of the disclosure herein and are encompassed by the description of joint 647.

Figure 78:
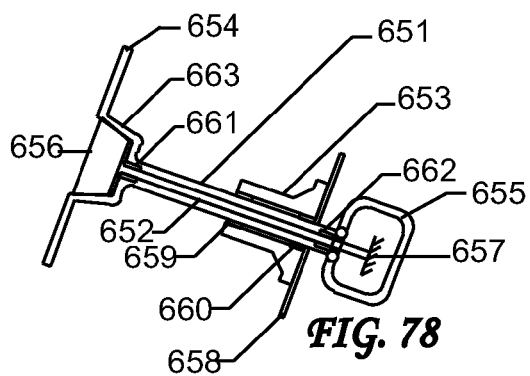
FIG. 78 shows a driver side airbag module supported by a steering column, but not attached to the steering wheel.

Pivotal movement of the upper part 648B of the steering column 648 and thus the steering wheel 642 and airbag 640 mounted in connection therewith may be realized manually by the driver or automatically by an actuating mechanism. The actuating mechanism can be designed to cooperate with an occupant position and/or monitoring system to receive the detected position and/or morphology of the driver 641 and then adjust the steering wheel 642 to a position within a range of optimum positions for a driver in that position and/or with that morphology. To allow for situations in which the driver manually changes the position of the steering wheel 642 outside of the range, the actuating mechanism can be designed to cooperate with a crash sensor system to receive a signal indicative of an impending or actual crash and then automatically adjust the position of the upper part 648B of the steering column 648. In this manner, even if the driver has the steering wheel 642 set in a position during regular driving in which it will adversely affect airbag deployment, the actuating mechanism causes the steering wheel 642 to be re-positioned during the crash A design with an airbag and an inflator on the steering column is illustrated in FIG. 78. The steering column can comprise an outer shaft 651, an inner shaft 652, and a supporting bracket 653. Outer shaft 651 can be coupled with the steering wheel 654 at one end region and extended to the engine compartment at the other end region to drive the steering mechanism 655 which causes turning of the tire(s) of the vehicle. The inner shaft 652 can be coupled with the inflator and airbag module 656 at one end region while the other end region can be attached to a stationary part 657 of the vehicle chassis in the engine compartment, for example. The supporting bracket 653 can be fixed to the firewall 658 for support. Bearings 659 and 660 can be placed between the bracket 653 and the outer shaft 651 to rotatably support the outer shaft 651 on the bracket 653 and bearings 661 and 662 can be placed between the outer shaft 651 and the inner shaft 652 and can be used for rotatably supporting the outer shaft 651 on the inner shaft 652. The outer and inner shafts 651, 652 may be tubular and concentric to one another.

Inner shaft 652 is stationary, not rotating with the steering wheel 654, therefore the airbag in airbag module 656 can be designed in an arbitrary shape and orientation. For example, a large airbag can be designed to provide the optimal protection of the driver. A less rigid steering wheel or column can also reduce the force exerted on the driver and allow the airbag to align with the driver. For example, the curved portion 663 of the steering wheel 654 can be designed to be flexible or to move away when the force on the rim of the steering wheel 654 exceeds a certain level. This force can be measured by appropriate measurement devices or sensors and a processor used to determine when the curved portion 663 of the steering wheel 654 should be moved away.

Steering wheel 654 can have a central cavity in which the inflator and airbag module 656 is situated. This central cavity may be centered about a rotation axis of the steering wheel 654.

Although module 656 is referred to as an inflator and airbag module, it is conceivable that only the airbag is arranged in the steering wheel 654, i.e., in the cavity defined thereby, while the inflator portion is arranged at another location and the inflation gas is directed into the airbag, e.g., the inflator is arranged on the dashboard and inflating gas directed into the airbag via a passage in the inner shaft 652.

Figure 79:
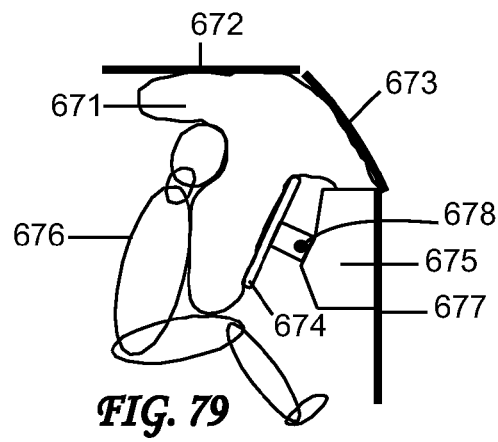
FIG. 79 illustrates an inflated driver side airbag installed on the dashboard of a vehicle.

A driver side restraint system, which is installed on or in the dashboard 675 of a vehicle is depicted in FIG. 79. The inflated airbag 671 fills the space between the ceiling of the passenger compartment 672, the windshield 673, the steering wheel 674, the dashboard 675, and the occupant driver 676. The airbag 671 is of such a geometry that the occupant driver 676 is surrounded by air cushion after the airbag 671 is fully inflated. An additional improvement can be provided if the steering wheel 674 and column strokes and sinks toward the dashboard 675 increasing the space between the occupant driver 676 and the steering wheel 674. The stroking movement of the steering wheel 674 and column can be initiated by the restraint system crash sensor. One approach is to use a mechanism where pins 678 lock the column and the steering wheel 674. As soon as the sensor triggers to initiate the airbag 671, the pins can be released and the steering wheel 674 and the column can then move towards the firewall 677. Other mechanisms for enabling movement of the steering wheel 674, i.e., the steering column to sink toward the dashboard 675, can be used in the invention.

Figure 80:
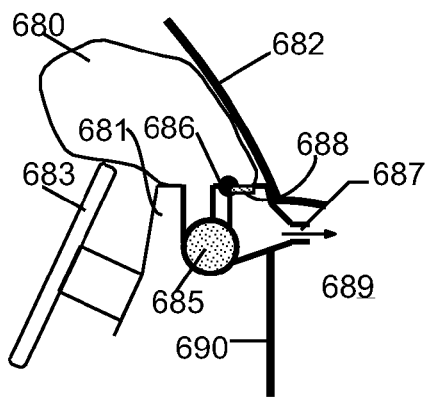
FIG. 80 shows an airbag system installed on the dashboard of a vehicle with a vent hole to the engine compartment.

An airbag 680 installed on the dashboard 681 of a vehicle is illustrated in FIG. 80. The airbag 680 is partially deployed between the windshield 682 and the steering wheel 683 and the dashboard 681. The inflator 685 provides gas to unfold and inflate the airbag 680. A torsional spring 686, or other mechanism, can be used to control the opening of a valve 687, which controls the flow of gas out of vent hole 688 of the airbag 680. When the pressure inside the airbag 680 is lower than a desired pressure, the valve 687 can close retaining the gas within the airbag 680. When the pressure inside the airbag 680 exceeds a design level, the valve 687 opens and releases gas from the airbag 680 into the engine compartment 689, which is separated from the passenger compartment by firewall 690. Although only a single vent hole 688 and associated valve 687 are shown, multiple vent holes and/or valves can be provided.

Figure 81A:
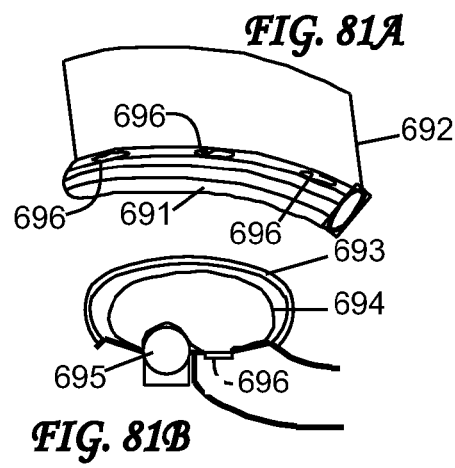
FIGS. 81A and 81B show a tubular inflatable system mounted on the dashboard of a vehicle.
Figure 81B:

A distributed inflator and airbag module 691 along the dashboard of a vehicle below the windshield 692 is illustrated in FIG. 81A. FIG. 81B illustrates a side view of the inflator and airbag module 691, which shows the module cover 693, the folded airbag 694, the inflator 695 and the vent hole 696 covering an opening in the airbag 694. The long tubular inflator 695, which has multiple ports along the module 691, can evenly and quickly generate gas to inflate the airbag 694. Multiple vent holes 696 are shown in FIG. 81A, located near the bottom of the windshield 692. These vent holes 696, since they cover openings in the airbag 694, can direct, or allow the flow of, the exhaust gases from the airbag 694 into the engine compartment. More specifically, vent holes 696 can be used regulate the gas flow from the airbag 694 to the engine compartment so that the inflated airbag 694 can be matched to the occupant and the severity of the crash.

Airbag 694 may be attached to the dashboard so that the periphery of the opening in the airbag 694 associated with each vent hole 696 is aligned with the vent hole 696.

Drive-by-wire is being considered for automobiles. Such a system will permit a significant reduction in the mass and cost of the steering wheel and steering column assembly. However, if the airbag is still deployed from the steering wheel, the strength and thus weight of the airbag will have to be largely maintained. Thus, a preferable arrangement is to cause the steering wheel and column to move out of the way and have the airbag for the driver deploy from the dashboard or the ceiling as discussed elsewhere herein. Such an airbag can be multi-chambered so as to better capture and hold the driver occupant in position during the crash.

3.3 Passenger Side Airbag

Figure 82:
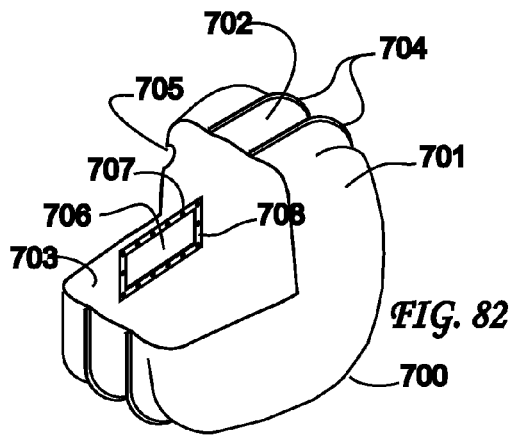
FIG. 82 is a partial cutaway perspective view of a passenger side airbag made from plastic film.

The discussion above has been limited for the most part to the driver side airbag which is attached to the vehicle steering wheel or otherwise arranged in connection therewith. This technology is also applicable to a passenger side airbag, which is generally attached to the instrument panel, as illustrated in FIG. 82 which is a partial cutaway perspective view of a passenger side airbag 700 made from three pieces or sheets of flat film 701, 702 and 703 which have joined seams 704 between adjacent pieces of film 701, 702, 703. The passenger side airbag, as well as rear seat airbags and side impact airbags, generally have a different shape than the driver side airbag but the same inventive aspects described above with respect to the driver side airbag could also be used in connection with passenger side airbags, rear seat airbags and side impact airbags. Although illustrated as being constructed from a plurality of sheets of plastic film, the passenger side airbag 700 can also be made by blow molding or other similar molding process, i.e., as one unitary sheet. Also, for many vehicles, the film sheet 702 is unnecessary and will not be used thereby permitting the airbag to once again be manufactured from only two flat sheets. The inflator attachment hole 706 is now typically rectangular in shape and can be reinforced by a rectangular reinforcement plastic ring 708 having inflator-mounting holes 707. A vent hole 705 can also be provided to vent gases from the deploying airbag 700. The vent hole 705 might be a variable-sized or adjustable vent hole to achieve the benefits of such as known to those skilled in the art.

Another class of airbags that should be mentioned are side impact airbags that deploy from the vehicle seat or door. These also can be made from plastic film according to the teachings of this invention.

3.4 Inflatable Knee Bolster-Knee Airbag

Figure 64:
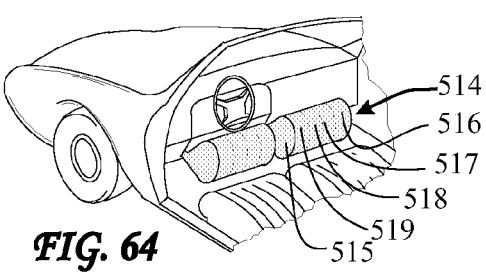
FIG. 64 is a perspective view of two knee restraint airbags of a size sufficient to support the driver's knees.

An example of a knee airbag is illustrated in FIG. 64 which is a perspective view of a knee restraint airbag illustrating the support of the driver's knees and also for a sleeping occupant lying on the passenger seat of the vehicle (not shown). The knee support airbag shown generally at 514 comprises a film airbag 515 which is composed of several smaller airbags 516, 517, 518, and 519 as disclosed above. Alternately, the knee airbag can be made from a single film airbag as disclosed in U.S. Pat. No. 5,653,464 referenced above. The knee support airbag can be much larger than airbags previously used for this purpose and, as a result, offers some protection for an occupant, not shown, who is lying asleep on the vehicle seat prior to the accident.

With the development of the film airbag and the inflator design above, a very thin airbag module becomes possible as disclosed in U.S. Pat. No. 5,505,485. Such a module can be made in any length permitting it to be used at many locations within the vehicle. For example, one could be positioned on the ceiling to protect rear seat occupants. Another one would stretch the length of the car on each side to protect both front and rear occupants from head injuries in side impacts. A module of this design lends itself for use as a deployable knee restraint as shown in FIG. 64. Eventually, especially when drive-by-wire systems are implemented and the steering wheel and column are redesigned or eliminated, such an airbag system will be mounted on the ceiling and used for the protection of all of the front seat passengers and driver in frontal impacts. With the economies described above, airbags of this type will be very inexpensive, perhaps one-fifth the cost of current airbag modules offering similar protection.

Figure 83:
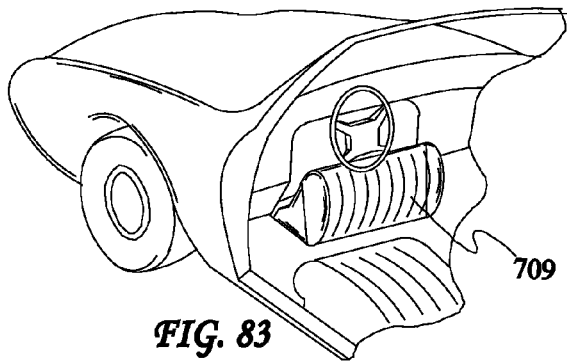

In FIG. 83, a knee protection airbag for the front driver is shown generally at 709 (and is also referred to as a knee bolster herein). Since the knee airbag 709 fills the entire space between the knees and the instrument panel and since the instrument panel is now located at a substantial distance from the occupant's knees, there is substantially more deflection or stroke provided for absorbing the energy of the occupant. Submarining is still prevented by inflating the knee airbag 709 to a higher pressure, typically in excess of 1 bar and sometimes in excess of 2 bars gage, and applying the force to the occupant knees before he or she has moved significantly. Since the distance of deployment of the knee airbag 709 can be designed large enough to be limited only by the interaction with an occupant or some other object, the knee airbag 709 can be designed so that it will inflate until it fills the void below the upper airbag, not illustrated in this figure. The knee protection airbag 709 can take the form of a fabric or any of the composite airbags disclosed above, e.g., include a plastic film layer and an overlying net, or two or more plastic film layers, usually at least one is inelastic to provide the shape of the knee bolster and at least one is elastic to control the propagation of a tear. The knee bolster airbag can also be deployed using as aspirated inflator or other method permitting the airbag to be self-limiting or self-adjusting so as to fill the space between the knees of the occupant and the vehicle structure. In FIG. 83, the width of the cells is typically less than the width of the knee of an occupant. In this manner, the capturing of the knees of the occupant to prevent them from sliding off of the knee airbag 709 is enhanced.

In preferred designs presented herein and below, the knee airbag 709 is deployed as a cellular airbag with the cells, frequently in the form of tubes, interconnected during inflation and, in most cases, individual valves in each chamber close to limit the flow of gas out of the chamber during the accident. In this manner, the occupant is held in position and prevented from submarining. A composite film is one preferred material, however, fabric can also be used with some increased injury risk. The cellular or tubular airbags designs described herein are also sometimes referred as compartmentalized airbags.

Normally, the knee bolster airbag will not have vents. It will be deployed to its design pressure and remain deployed for the duration of the accident. For some applications, a vent hole will be used to limit the peak force on the knees of the occupant. As an alternate to providing a fixed vent hole as illustrated in the previous examples, a variable vent hole can be provided as shown in FIGS. 100 and 100A (discussed below). Alternately, this variable vent function can be incorporated within the inflator as described in U.S. Pat. No. 5,772,238.

Typically, inflatable knee bolster installations comprise an inflatable airbag sandwiched between a rigid or semi-rigid load distributing impact surface and a reaction surface. When the inflator is triggered, the airbag expands to move the impact surface a predetermined distance to an active position. This position may be determined by tethers between the reaction and impact surfaces. These installations comprise numerous parts, bits and pieces and require careful installation. In contrast, in a preferred knee bolster described herein, there is no rigid load distributing surface but rather, the knee bolster conforms to the shape of the knees of the occupant. Tethers in general are not required or used as the shaping properties of inelastic films are utilized to achieve the desired airbag shape. Finally, preferred designs herein are not composed of numerous parts and in general do not require careful installation. One significant problem with the use of load distribution plates as is commonly done in the art is that no provision is made to capture the knees and thus, especially if the crash is an angular impact or if the occupant is sitting on an angle with respect to the knee bolster or has his or her legs crossed, there is a tendency for the knees to slip sideways off of the knee bolster defeating the purpose of the system. In the multi-cellular knee bolster disclosed herein, the cells expand until they envelop the occupant's knees, capturing them and preventing them from moving sideways. Once each cell is filled to a design pressure, a one-way valve closes and flow out of the cell is prevented for the duration of the crash. This design is especially effective when used with an anticipatory sensor as the knees can be captured prior to occupant movement relative to the passenger compartment caused by the crash. A signal from the anticipatory sensor would initiate an inflator to inflate the knee bolster prior to or simultaneous with the crash.

An improvement to this design, not illustrated, is to surround the airbags with a net or other envelope that can slide on the surface of the airbag cells until they are completely inflated. Then, when the occupant begins loading the airbag cells during the crash, displacement of the knees not only compresses the cells that are directly in line with the knees but also the adjacent cells thus providing a significant increase to the available effective piston area to support the knees in much the same way that a load distribution plate functions. Such a net or envelope effectively distributes the load over a number of cells thus limiting the required initial pressure within the airbag cells. Other methods of accomplishing this load distribution include the addition of somewhat flexible stiffeners into the surface of the airbag where it contacts the knees, again with the goal of causing a load on one cell to be partially transferred to the adjacent cells.

In a preferred design, as discussed below, the cellular airbags inflate so as to engulf the occupant by substantially filling up all of the space between the occupant and the walls of the passenger compartment freezing the occupant in his or her pre-crash position and preventing the occupant from ever obtaining a significant velocity relative to the passenger compartment. This will limit the acceleration on the occupant to below about 15-20 Gs for a severe 30 MPH barrier crash. This retains the femur loads well below the requirements of FMVSS-208 and can essentially eliminate all significant injury to the occupant in such a crash. This, of course, assumes that the vehicle passenger compartment is effectively designed to minimize intrusion, for example.

In most of the preferred designs disclosed herein, the surface that impacts the occupant is a soft plastic film and inflicts little if any injury upon impact with the occupant. Even the fabric versions when used as a knee bolster, for example, can be considered a soft surface compared with the load distribution plates or members that impact the knees of the occupant in conventional inflatable knee bolster designs. This soft impact is further enhanced when an anticipatory sensor is used and the airbags are deployed prior to the accident as the deployment velocity can be substantially reduced.

In a conventional airbag module, when the inflator is initiated, gas pressure begins to rise in the airbag which begins to press on the deployment door. When sufficient force is present, the door breaks open along certain well-defined weakened seams permitting the airbag to emerge from its compartment. The pressure in the airbag when the door opens, about 10 to 20 psi, is appropriate for propelling the airbag outward toward the occupant, the velocity of which is limited by the mass of the airbag. In the case of a film airbag, this mass is substantially less, perhaps by as much as a factor of three or more, causing it to deploy at a much higher velocity if subjected to these high pressures. This will place unnecessary stresses in the material and the rapid movement of the airbag past the deployment door could induce abrasion and tearing of the film by the deployment door. A film airbag, therefore, must be initially deployed at a substantially lower pressure. However, conventional deployment doors require a higher pressure to open. This problem is discussed in detail in the above-referenced patents and patent applications where, in one implementation, a pyrotechnic system is used to cut open the door according to the teachings of Barnes et al. (U.S. Pat. No. 5,390,950).

There are of course many ways of making inflatable knee restraints using chambered airbags, such as illustrated in U.S. Pat. No. 6,685,217, without deviating from the teachings of this invention.

3.5 Ceiling Deployed Airbags

Airbags disclosed herein and in the assignee's prior patents are believed to be the first examples of multi-chambered airbags that are deployed from the ceiling and the first examples of the use of tubular or cellular airbags. These designs should become more widely used as protection is sought for other situations such as preventing occupants from impacting with each other and when developments in drive-by-wire are implemented. In the former case, airbags will be interposed between seating positions and in the latter case, steering wheel assemblies will become weaker and unable to support the loads imposed by airbags. In some cases, in additional to support from the ceiling, these airbags will sometimes be attached to other surfaces in the vehicle such as the A, B and C pillars in much the way that some curtain airbags now receive such support.

Figure 84:
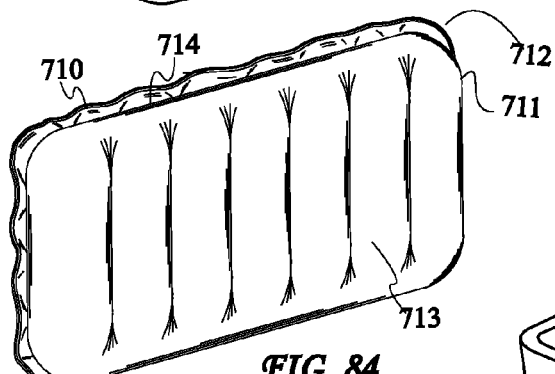

One method of forming a film airbag is illustrated generally at 710 in FIG. 84. In this implementation, the airbag is formed from two flat sheets or layers of film material 711, 712 which have been sealed, e.g., by heat or adhesive, at joints 714 to form long tubular shaped mini-airbags 713 (also referred to herein as compartments or cells) in much the same way that an air mattress is formed. In FIG. 84, a single layer of mini-airbags 713 is shown. It should be understood that the mini-airbags 713 are interconnected to one another to allow the inflating gas to pass through all of the interior volume of the airbag 710. Also, the joints 714 are formed by joining together selected, opposed parts of the sheets of film material 711, 712 along parallel lines whereby the mini-airbags 713 are thus substantially straight and adjacent one another. In other implementations, two or more layers could be used. Also, although a tubular pattern has been illustrated, other patterns are also possible such as concentric circles, waffle-shaped or one made from rectangles, or one made from a combination of these geometries or others. The film airbag 710 may be used as either a side airbag extending substantially along the entire side of the vehicle, an airbag disposed down the center of the vehicle between the right and left seating positions or as a rear seat airbag extending from one side of the vehicle to the other behind the front seat (see FIG. 85) and may or may not include any of the venting arrangements described herein.

Figure 85:
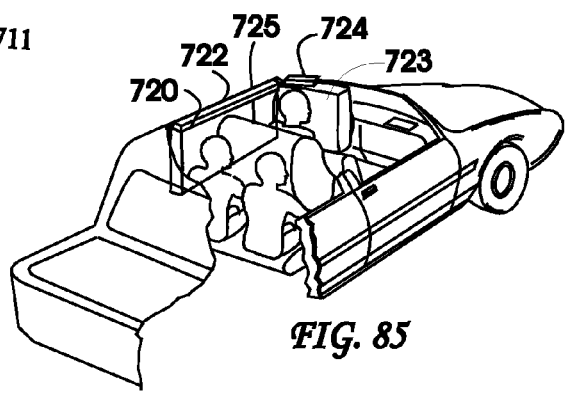

FIG. 85 is a perspective view with portions removed of a vehicle having several deployed film airbags. Specifically, a single film airbag having several interconnected sections, not shown, spans the left side of the vehicle and is deployed downward before being filled so that it fits between the front seat and the vehicle side upon inflation (an airbag spanning the right side of the vehicle can of course be provided). This provides substantial support for the airbag and helps prevent the occupant from being ejected from the vehicle even when the side window glass has broken. A system which also purports to prevent ejection is described in Bark (U.S. Pat. No. 5,322,322 and U.S. Pat. No. 5,480,181). The Bark system uses a small diameter tubular airbag stretching diagonally across the door window. Such a device lacks the energy absorbing advantages of a vented airbag however vents are usually not desired for rollover protecting airbags. In fact, the device can act as a spring and can cause the head of the occupant to rebound and actually experience a higher velocity change than that of the vehicle. This can cause severe neck injury in high velocity crashes. The airbag of Bark '322 also is designed to protect primarily the head of the occupant, offering little protection for the other body parts. In contrast to the completely sealed airbag of Bark, a film airbag of the present invention can have energy absorbing vents and thus dampens the motion of the occupant's head and other body parts upon impact with the film airbag. Note that the desirability of vents typically goes away when anticipatory sensors are used as discussed elsewhere herein.

The airbag of Bark '322 covers the entire vehicle opening and receives support from the vehicle structure, e.g., it extends from one side of the B-pillar to the other so that the B-pillar supports the airbag 720. In contrast to the tube of Bark, the support for a preferred embodiment of the invention disclosed herein in some cases may not require complicated mounting apparatus going around the vehicle door and down the A-pillar but is only mounted to or in the ceiling above the side door(s). Also, by giving support to the entire body and adjusting the pressure between the body parts, the airbag of the present invention minimizes the force on the neck of the occupant and thus minimizes neck injuries.

3.5.1 Side Curtain Airbags

In FIG. 85, a single side protection airbag for the driver side is illustrated at 720. A single front airbag spans the front seat for protection in frontal impacts and is illustrated at 723 with the ceiling mounted inflator at 724. A single airbag is also used for protection of each of the rear seat occupants in frontal impacts and is illustrated at 725. With respect to the positioning of the side airbag 720, the airbag 720 is contained within a housing 722 which can be position entirely above the window of the side doors, i.e., no portion of it extends down the A-pillar or the B-pillar of the vehicle (as in Bark '322). The side airbag housing 722 thus includes a mounting structure (not shown) for mounting it above the window to the ceiling of the vehicle and such that it extends across both side doors (when present in a four-door vehicle) and thus protects the occupants sitting on that side of the vehicle from impacting against the windows in the side doors. To ensure adequate protection for the occupants from side impacts, as well as frontal impacts and roll-overs which would result in sideward movement of the occupants against the side doors, the airbag housing 722 is constructed so that the airbag 720 is initially projected in a downward direction from the ceiling prior to inflation and extends at least substantially along the entire side of the ceiling. This initial projection may be designed as a property of the module 722 which houses the airbag 720, e.g., by appropriate construction and design of the module and its components such as the dimensioning the module's deployment door and deployment mechanism.

Although a variety of airbag designs can be used as the side impact protection airbag, one preferred implementation is when the airbag includes first and second attached non-perforated sheets of film and a tear propagation arresting mechanism arranged in connection with each of the film sheets for arresting the propagation of a tear therein. A net may also be used as described above. The net would constrict or tension the airbag if it were to be designed to retain an interior volume less than the volume of the airbag (as discussed above).

The airbag can include a venting device (e.g., a venting aperture as shown in FIGS. 74A and 74B) arranged in connection with the airbag for venting the airbag after inflation thereof. In certain embodiments, the airbag is arranged to extend at least along a front portion of the ceiling such that the airbag upon inflation is interposed between a passenger in the front seat of the vehicle and the dashboard (this aspect being discussed below with respect to FIG. 89).

Figure 86:
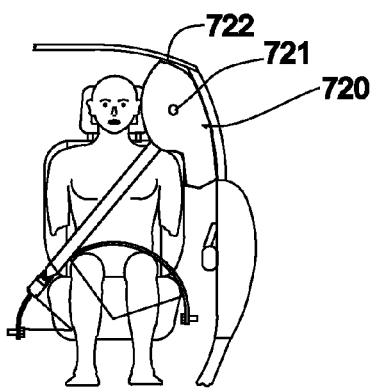

FIG. 86 is a view looking toward the rear of the vehicle of the deployed side protection airbag of FIG. 85. An airbag vent is illustrated as a fixed opening 721. Other venting designs are possible including venting through the airbag inflator as disclosed in the above-referenced patents and patent applications as well as the variable vent described below with reference to FIGS. 100 and 100A or even no vent for rollover protection.

The upper edge of the airbag is connected to an inflator 722 and that the airbag 720 covers the height of the window in the door in this implementation.

Figure 86A:
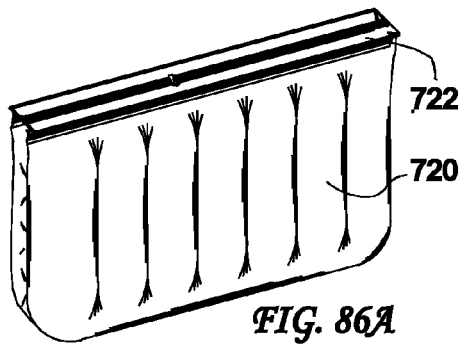

FIG. 86A is a view of a side airbag similar to the one of FIG. 86 although with a different preferred shape, with the airbag 720 removed from the vehicle. The parallel compartments or cells can be seen. This aspect is discussed below with reference to FIGS. 94-96.

3.5.2 Frontal Curtain Airbags

FIGS. 87 and 88-88D illustrate the teachings of this invention applied in a manner similar to the airbag system of Ohm in U.S. Pat. No. 5,322,326. The airbag of Ohm is a small limited protection system designed for the aftermarket. It uses a small compressed gas inflator and an unvented thin airbag which prevents the occupant from contacting with the steering wheel but acts as a spring causing the occupants head to rebound from the airbag with a high velocity. The system of FIG. 87 improves the performance of and greatly simplifies the Ohm design by incorporating the sensor and compressed gas inflator into the same mounting assembly which contains the airbag. The system is illustrated generally at 730 in FIG. 87 where the mounting of the system in the vehicle is similar to that of Ohm.

In FIG. 88, the module assembly is illustrated from a view looking toward the rear of the airbag module of FIG. 87 with the vehicle removed, taken at 88-88 of FIG. 87. The module 730 incorporates a mounting plate 731, a high pressure small diameter tube constituting an inflator 733 and containing endcaps 734 which are illustrated here as having a partial spherical surface but may also be made from flat circular plates. The mounting plate 731 is attached to the vehicle using screws, not illustrated, through mounting holes 735. An arming pin 729 is illustrated and is used as described below.

FIG. 88A is a cross sectional view of the airbag module of FIG. 88 taken at 88A-88A and illustrates the inflator initiation system of this invention. The inflator 733 is illustrated as a cylindrical tube, although other cross sectional shapes can be used, which contains a hole 730 therein into which is welded by weld 732 to an initiation assembly 737. This assembly 737 has a rupture disk 738 welded into one end. A rupture pin 739 is positioned adjacent rupture disk 738 which will be propelled to impact the rupture disk 738 in the event of an accident as described below. When disk 738 is impacted by pin 739, it fails thereby opening essentially all of the orifice covered by disk 738 permitting the high pressure gas which is in a tube of the inflator 733 to flow out of the tube 733 into cavity 740 of initiator assembly 737 and then through holes 741 into cavity 742. Cavity 742 is sealed by the airbag 736 which now deploys due to the pressure from the gas in cavity 742.

When the vehicle experiences a crash of sufficient severity to require deployment of the airbag 736, sensing mass 743, shown in phantom, begins moving to the left in the drawing toward the front of the vehicle. Sensing mass 743 is attached to shaft 744 which in turn is attached to D-shaft 745 (see FIG. 88C). As mass 743 moves toward the front of the vehicle, D-shaft 745 is caused to rotate. Firing pin 747 is held and prevented from moving by edge 746 of D-shaft 745. However, when D-shaft 745 rotates sufficiently, edge 746 rotates out of the path of firing pin 747 which is then propelled by spring 748 causing the firing pin point to impact with primer 749 causing primer 749 to produce high pressure gas which propels pin 739 to impact disk 738 releasing the gas from inflator tube 733 inflating the airbag 736 as described above. The sensor 743, 744, D-shaft 745 and primer mechanism 747, 748, 749 are similar to mechanisms described in U.S. Pat. No. 5,842,716.

FIG. 88B is a cross sectional view, with portions cutaway and removed, of the airbag module 730 of FIG. 88 taken at 88B-88B and illustrates the arming pin 729 which is removed after the module 730 is mounted onto the vehicle. If the module 730 were to be dropped accidentally without this arming pin 729, the sensor could interpret the acceleration from an impact with the floor, for example, as if it were a crash and deploy the airbag 736. The arming system prevents this from happening by preventing the sensing mass 743 from rotating until the arming pin 729 is removed.

Figure 89:
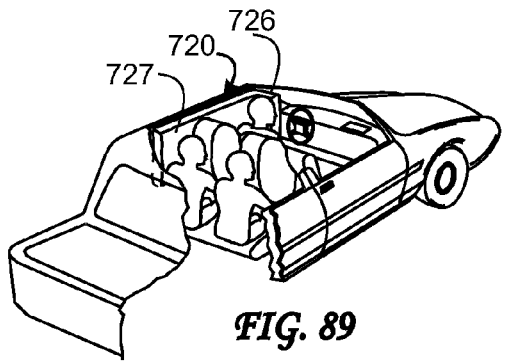

FIG. 89 is a perspective view of another preferred embodiment of the airbag of this invention 720 shown mounted in a manner to provide protection for a front and a rear seat occupant in side impact collisions and to provide protection against impacts to the roof support pillars in angular frontal impacts and to offer some additional protection against ejection of the occupant.

More particularly, in this embodiment, an airbag system for protecting at least the front-seated occupant comprises a single integral airbag 720 having a frontal portion 726 sized and shaped for deploying in front of the front-seated occupant and a side portion 727 sized and shaped for deploying to the side of the front-seated occupant. In this manner, airbag 720 wraps around the front-seated occupant during deployment for continuous front to side coverage. An inflator (not shown) is provided for inflating the single integral airbag with gas. As shown, the side portion 727 may be sized and shaped to deploy along an entire side of the vehicle, the side portion 727 is longer than the frontal portion 726 and the frontal portion 726 and side portion 727 are generally oriented at a 90 degree angle relative to each other. As with the other side curtain airbags discussed in connection with FIGS. 85, 86, 86A and 89, the airbag 720 may be housed in the ceiling. Also, as noted throughout this application, airbag 720 may comprise one or more sheets of film and the tear propagation arresting structure or a net may be provided to tension or constrict the deployment of the airbag 720. The construction can also comprise straight or curved interconnected cells or tubular structures.

FIGS. 90 and 91 illustrate another embodiment of the invention intended to provide protection from side impacts and rollover accidents not only for a person in the front seat of a motor vehicle such as a motor car, but also for a person in the rear seat of the vehicle which is similar to that shown in FIGS. 85, 86 and 86A.

Referring to FIG. 90, the housing 715 is provided over both the front door 716 and the rear door 750. The airbag or other type of inflatable element 751 is shown in the inflated state in FIG. 91. The inflatable element 751 has its top edge 752 secured to a part of the housing 715 or ceiling of the passenger compartment that extends above the doors 716, 750 of the motor vehicle (see, e.g., FIG. 86A). The design of the inflatable element is similar to that shown in FIG. 84 or 86A, with the inflatable element including a plurality of parallel cells or compartments 752, which when inflated are substantially cylindrical. A gas generator 750 is provided which is connected to the inflatable element 751 in such a way that when the gas generator 750 is activated by a sensor 751 to supply gas to the cells 752. Sensor 751 may be separate as shown or formed integrally with the gas generator 750, or which is otherwise associated with the gas generator 750, and responds to a crash condition requiring deployment of the inflatable element 751 to activate the gas generator 750. Thus, as the inflatable element 751 inflates, the cells 752 inflate in a downward direction until the inflatable element 751 extends across the windows in the doors 716, 750 of the motor vehicle (see FIG. 86). As the inflatable element 751 inflates, the length of the lower edge thereof decreases by as much as 30% as a consequence of the inflation of the cells 752. This reduction in the length of the lower edge ensures that the inflated element 751 is retained in position as illustrated in FIG. 91 after it has been inflated. Although shown as parallel tubes, other geometries are of course possible such as illustrated in FIGS. 98A-98L.

The inflatable element 751 described above incorporates a plurality of parallel substantially vertical, substantially cylindrical cells 752. The inflatable element 751 may be made of interwoven sections of a material such as film or other material such as woven fabric. Such a interweaving of material comprises a first layer that defines the front of the inflatable element 751, i.e., the part that is visible in FIGS. 90 and 91, and a second layer that defines the back part, i.e., the part that is adjacent the window in FIGS. 90 and 91, whereby selected parts of the first region and the second region are interwoven to define links in the form of lines where the front part and the back part of the inflatable element are secured together. A technique for making an inflatable element of inter-woven sections of material is described in International Patent Publication No. WO 90/09295.

The tubes or cells 752 can be further joined together as illustrated in FIG. 92A by any method such as through the use of an additional sheet of material 753 which joins the front and back edges 754 and 755 of the adjacent cells 752 in order to render the inflatable element 751 more resistant to impacts from parts of the body of an occupant. The additional chambers 756 formed between the additional sheet of material 753 and the front and back edges of the cells 752 can either be pressurized at the same pressure as the tubes or cells 752 or they can be left exposed to the atmosphere, as is preferred. Although illustrated as joining adjacent cells of the inflatable element 751, they can alternatively be arranged to join non-adjacent cells. Although the cells are illustrated as parallel tubes, any geometry of chambers, cells or tubes can benefit from this improvement including those as illustrated in FIGS. 98A-98L.

FIG. 92 is a cross section showing the nature of the cells 752 of the inflatable element 751 of FIGS. 90 and 91. It can be seen that the cells 752 are immediately adjacent to each other and are only separated by narrow regions where the section of material, e.g., film, forming the front part of the inflatable element 751 has been woven or otherwise attached by heat sealing or adhesive with the section of material forming the back part of the inflated element.

Also, as noted throughout this application, inflatable element 751 may have any of the disclosed airbag constructions. For example, inflatable element 751 may comprise one or more sheets of film and the tear propagation arresting mechanism or a net may be provided to tension or constrict the deployment of the inflatable element 751. The film surface facing the occupant need not be the same as the film facing the side window, for example. In order to prevent broken glass, for example, from cutting the airbag, a thicker film, a lamination of a film and a fabric or a film and a net can be used.

There are of course many ways of making ceiling-mounted frontal protection airbags using chambers without departing from the teachings of this invention such as disclosed in published patent applications WO03093069, 20030234523 and 20030218319. Such airbags can be made from tubular sections or sections of other shapes and the amount of deployment of such airbags can be determined by occupant sensors as disclosed in other patents assigned to the assignee of this patent. Such airbags can be flat as disclosed herein or other shapes.

3.5.3 Other Compartmentalized Airbags

As mentioned above, anticipatory crash sensors based on pattern recognition technology are disclosed in several of assignee's patents and pending patent applications. The technology now exists based on research by the assignee to permit the identification and relative velocity determination to be made for virtually any airbag-required accident prior to the accident occurring. This achievement now allows airbags to be reliably deployed prior to the accident. The implications of this are significant. Prior to this achievement, the airbag system had to wait until an accident started before a determination could be made whether to deploy one or more of the airbags. The result is that the occupants, especially if unbelted, would frequently achieve a significant velocity relative to the vehicle passenger compartment before the airbags began to interact with the occupant and reduce his or her relative velocity. This would frequently subject the occupant to high accelerations, in some cases in excess of 40 Gs, and in many cases resulted in serious injury or death to the occupant especially if he or she is unrestrained by a seatbelt or airbag. On the other hand, a vehicle typically undergoes less than a maximum of 20 Gs during even the most severe crashes. Most occupants can withstand 20 Gs with little or no injury. Thus, as taught herein, if the accident severity could be forecast prior to impact and the vehicle filled with plastic film airbags that freeze the occupants in their pre-crash positions, then many lives will be saved and many injuries will be avoided.

One scenario is to use a camera, or radar-based or terahertz-based anticipatory sensor to estimate velocity and profile of impacting object. From the profile or image, an identification of the class of impacting object can be made and a determination made of where the object will likely strike the vehicle. Knowing the stiffness of the engagement part of the vehicle allows a calculation of the mass of the impacting object based on an assumption of the stiffness impacting object. Since the impacting velocity is known and the acceleration of the vehicle can be determined, we know the impacting mass and therefore we know the severity or ultimate velocity change of the accident. From this, the average chest acceleration that can be used to just bring the occupant to the velocity of the passenger compartment during the crash can be calculated and therefore the parameters of the airbag system can be set to provide that optimum chest acceleration. By putting an accelerometer on the airbag surface that contacts the occupant, the actual chest acceleration can be measured and the vent size can be adjusted to maintain the calculated optimum value. With this system, neither crush zone or occupant sensors are required, thus simplifying and reducing the cost of the system and providing optimum results even without initiating the airbag prior to the start of the crash.

There is of course a concern that if the airbags are inflated too early, the driver may lose control of the vehicle and the accident would be more severe than in the absence of such early inflation. To put this into perspective, experiments and calculations show that a reasonable maximum time period to inflate enough airbags to entirely fill a normal sedan is less than 200 ms. To protect the occupants of such a vehicle by filling the vehicle with airbags before the accident would require initiating deployment of the airbags about 200 ms prior to the accident which corresponds to a distance of vehicle travel of approximately 15 feet for the case where two vehicles are approaching each other with a closing velocity of about 60 MPH. It is unlikely that any action taken by the driver during that period would change the outcome of the accident and when the sensor signals that the airbags should be deployed, a control system can take control of the vehicle and prevent any unstable motions.

FIG. 93 illustrates one preferred method of substantially filling the passenger compartment with airbags. Primary airbag 760 along with secondary airbags 761, 762, and 763 prior to inflation are attached to one or more aspirated inflators 776 and stored, for example, within the headliner or ceiling of the vehicle. When the anticipatory or other crash sensor, not shown, determines that deployment is necessary, primary airbag 760 deploys first and then secondary airbags 761-763 deploy from gas that flows through airbag 760 and through one-way valves 764. Inflation continues until pressure builds inside the airbags 760-763 indicating that they have substantially filled the available volume. This pressure buildup reduces and eventually stops the aspiration and the remainder of the gas from the gas generator flows either into the airbags 760-763 to increase their pressure or into the passenger compartment. Since the pumping ratio of the aspirated inflators 776 is typically above 4, approximately 75% of the gas in the airbags 760-763 comes from the passenger compartment thus minimizing the pressure increase in the passenger compartment and injuries to the ears of the occupants. This also permits the substantial filling of the passenger compartment without the risk of breaking windows or popping doors open. If additional pressure relief is required then it can be achieved, for example, by practicing the teachings of U.S. Pat. No. 6,179,326.

In a similar manner, primary airbag 765 inflates filling secondary airbags 766-770 through one-way valves 771. Additionally, airbags 775 mounted above the heads of occupants along with secondary airbags 772 can be inflated using associated inflators 776 to protect the heads of the occupants from impact with the vehicle roof or headliner. If occupant sensors are present in the vehicle, then when the rear seat(s) is (are) unoccupied, deployment of the rear-seat located airbags can be suppressed.

The knees and lower extremities of the occupants can be protected by knee airbags 780 and secondary airbags 779 in a similar manner. The design of these airbags will depend on whether there is a steering wheel 774 present and the design of the steering wheel 774. In some cases, for example, a primarily airbag may deploy from the steering wheel 774 while in other cases, when drive-by-wire is implemented, a mechanism may be present to move the steering wheel 774 out of the way permitting the secondary airbag(s) 779 to be deployed in conjunction with the knee airbag 780. The knee airbag deployment will be discussed in more detail below.

FIG. 93A illustrates a view from the top of the vehicle with the roof removed taken along line 93A-93A in FIG. 93 with the vehicle unoccupied. As can be seen, primary airbag 760, for example, is actually a row of tubular structures similar to that shown in FIG. 84. Additionally, curtain airbags 786 are present only in this implementation and they also comprise several rows of tubes designed to contact the occupants and hold them away from contacting the sides of the vehicle. Airbags 787 are also advantageously provided down the center of the vehicle to further restrain the occupants and prevent adjacent occupants from impacting each other.

In the preferred design, support for the airbags relies of substantially filling the vehicle and therefore loads are transferred to the walls of the vehicle passenger compartment. In many cases, this ideal cannot be completely achieved and straps of tethers will be required to maintain the airbags in their preferred locations. Again, this will depend of the design and implementation of this invention to a particular vehicle.

The particular designs of FIGS. 93 and 93A are for illustrative purposes only and the particular method of substantially filling a portion of the passenger compartment with airbags will depend substantially on the vehicle design.

An alternate design is illustrated in FIG. 94 where a cellular airbag 790 deploys from the steering wheel in a somewhat conventional manner and additional lateral tubes 791 deploy between the occupant and the windshield. These airbags also provide added support for the steering wheel airbag for those cases where drive-by-wire has been implemented and the heavy structural steering wheel and column has been replaced by a lighter structure.

FIG. 95 illustrates an example wherein cellular tubular airbags made from thin plastic film, for example, expand is a flower pattern to engage the occupants and receive support from the walls, ceiling etc. of the passenger compartment. The airbags deform and interact with each other and the occupants to conform to the available space and to freeze the occupants in their pre-crash positions. Airbags 792 come from the ceiling for upper body protection. Airbags 793 deploy from the upper instrument panel for upper body protection and airbags 794 deploy for lower body protection. Airbags 795 protect the knees and lower extremities and airbags 796 protect the rear seated occupants. Finally, airbags 797 again provide protection for the tops of the heads of the occupants. Although not shown in this drawing, additional airbags may be provided to prevent the lateral movement of the occupants such as curtain and center-mounted airbags. Again, the intent is to fill as much of the vehicle passenger compartment surrounding the occupant as possible. If occupant sensors are present and the absence of a rear-seated occupant, for example, can be detected, then the rear seat airbags need not be deployed.

FIGS. 96 and 96A illustrate an example of a flower-type airbag design. The inflator 800, preferably an aspirated inflator, discharges into a common distribution volume or manifold, which can be made from the plastic film, which distributes the gas to the cells or tubes 802 of the airbag assembly through one-way valves 804, formed in the sheet of the tubes 802, in a manner similar to the tubular airbags of FIG. 93. An envelope 803 of plastic film is provided to contain the tubes 802. Alternately, the tubes 802 can be connected together along their adjacent edges and the envelope 803 eliminated.

FIGS. 97 and 97A illustrate an example of a knee bolster airbag 805 and its inflation sequence. Only four tubes are illustrated although frequently, a larger number will be used. The inflation gas comes from the inflator, not shown, into a manifold 807 which distributes the gas into the tubes 806 through one-way valves 808 formed in the material of the airbag 805. During inflation, the airbag 805 unrolls in a manner similar to a Chinese whistle.

In some of the implementations illustrated here, the airbags do not have vent holes. At the end of the crash, the gas in the airbags should be allowed to exhaust, which generally will occur through the inflator housing. Vents in the airbags for the purpose of dissipating the kinetic energy of the occupants can, in many cases, be eliminated since the philosophy is to freeze the occupant before he or she has achieved significant velocity relative to the passenger compartment. In other words, there will be no "second collision", the term used to describe the injury producing impact of the occupant with the walls of the passenger compartment. The occupants will, in general, experience the same average deceleration as the vehicle which in a 30 mph barrier crash is significantly less than 20 Gs.

Figure 98A:
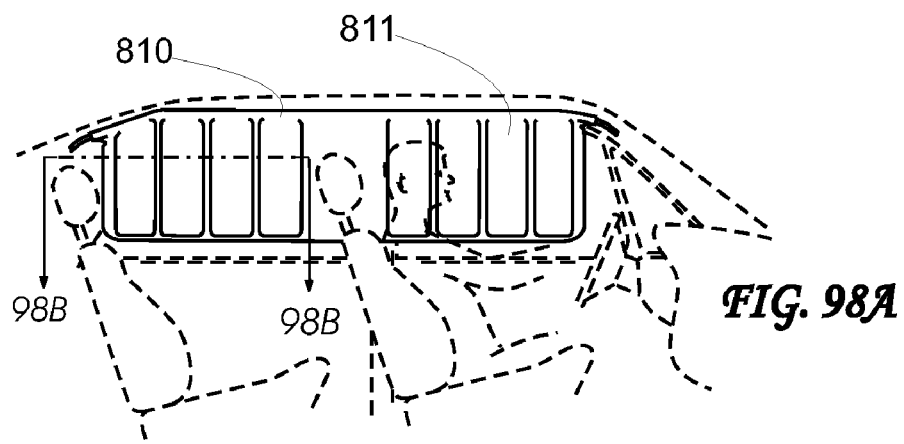
Figure 98B:
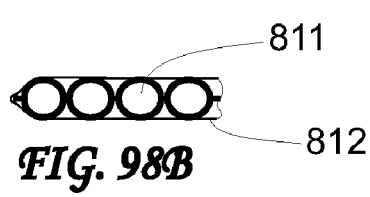
Figure 98C:
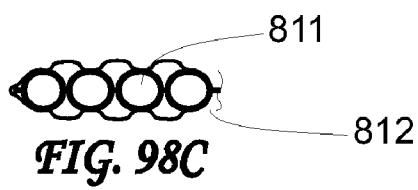

FIGS. 98A, 98D, 98F, 98H, 98J and 98L illustrate six related prior art curtain airbag designs that have been modified according to teachings of this invention to include the use of an envelope or a material sheet that spans the cells or tubes that make up the curtain airbag. The curtain airbag of FIG. 98A, designated 810, is a design based on parallel vertical tubes 811 and can be made from fabric or plastic film. Sheets of fabric or film material 812 are attached to the outer edges of tubes 811 so as to span from one tube to the adjacent tubes as illustrates in FIG. 98B which is a view of FIG. 98A taken along line 98B-98B. The volumes created between the tubes 811, i.e., cells, can be pressurized as illustrated in FIG. 98C or left exposed to the atmosphere as illustrated in FIG. 98B. The particular geometry that the cells will acquire is shown simplified here. In reality, the cell geometry will depend on the relative lengths of the various material sections, the thickness of the material and the relative inflation pressures of each cell. Care must be exercised in the design to assure that resulting airbag will fold properly into the storage area. The presence of the envelope of spanning sheets renders the curtain airbag 810 significantly more resistant to deformation on impact from the head of the occupant, for example. This improves the ability of the airbag to retain the occupant's head within the vehicle during a side impact or rollover. The main function of the curtain airbag 810 is to prevent this partial ejection which is the major cause of injury and death in side impact and rollover accidents. Although the envelope or spanning sheets 812 add additional material to the airbag 810, the added stiffness created actually permits the use of thinner materials for the entire airbag 810 and thus reduces the total weight and hence the cost of the airbag 810.

Figure 98D:
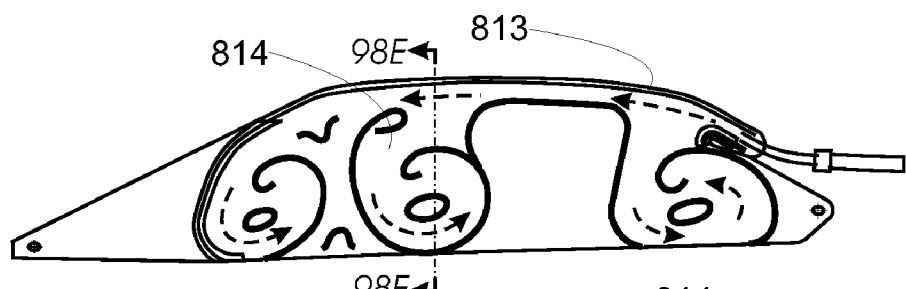
Figure 98E:
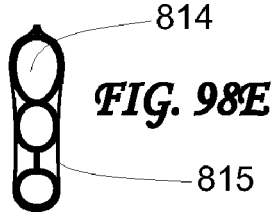
Figure 98F:
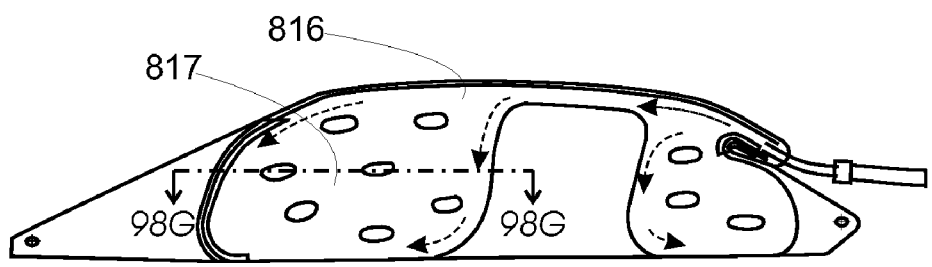
Figure 98G:
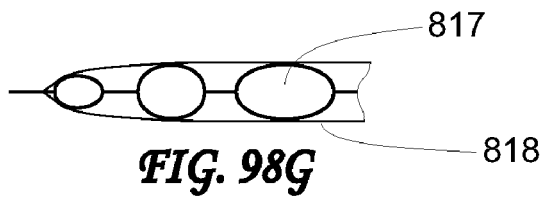

FIGS. 98D and 98E illustrate an alternate geometry of a side curtain airbag where the tubes acquire a varying thickness and shape. Curtain airbag 813 has tubes 814 and an envelope or spanning sheet 815. FIGS. 98F and 98G illustrate still another geometry of a side curtain airbag where the tubes 817 are formed by joining islands between the opposing sheets of material. As in all of the cases of FIGS. 98A, 98D, 98F, 98H, 98J and 98L, various manufacturing processes can be used to join the opposing sheets of material including sewing, heat sealing, adhesive sealing and interweaving where the entire bag is made in one pass through the loom, among others. Curtain airbag 816 has tubes 817 and an envelope or spanning sheet 818 (FIGS. 98F and 98G).

FIGS. 98H and 98I illustrate another geometry of a side curtain airbag where the tubes again acquire a roughly rectangular shape. Curtain airbag 819 has tubes 820 and an envelope or spanning sheet 821. FIGS. 98J and 98K illustrate yet another alternate geometry of a side curtain airbag where the tubes are slanted but still retain a roughly rectangular shape. Curtain airbag 822 has tubes 823 and an envelope or spanning sheet 824.

Finally, FIGS. 98L and 98M illustrate still another geometry of a side curtain airbag where the tubes again acquire a roughly rectangular shape with the tubes running roughly fore and aft in the vehicle. Curtain airbag 825 has tubes 826 and an envelope or spanning sheet 827.

Deployment of an airbag from the vehicle trim such as the headliner, A-Pillar, B-Pillar, C-Pillar was believed to be first disclosed in the current assignee's patents referenced above. As airbags begin to fill more and more of the passenger compartment as taught here and in other patents to the current assignee, the edges of the passenger compartment or the locations where the walls of the passenger compartment join become attractive locations for the deployment of airbags. This is especially the case when the airbags are made from thin plastic film that can be stored at such locations since they occupy a minimum of space. Thus, storage locations such as disclosed in U.S. Patent Application Publication No. 20030178821 are contemplated by this and previous inventions by the current assignee. For some applications, it is possible to put the entire airbag system in the headliner if knee protection is not required. This is a problem for convertible vehicles where the edges of the passenger compartment become more important.

The size of the cells or tubes in the various airbag designs discussed above can vary according to the needs of the particular application. For a given internal pressure, the thickness of the film material decreases as the diameter of the tubes decreases. Since the thickness determines the weight of the airbag and thus the potential to cause injury on impact with an occupant, in general, an airbag made from multiple smaller tubes will cause less injury than a single-chambered airbag of the same size. Therefore, when possible the designs should use more smaller cells or tubes. In the extreme, the vehicle can be filled with a large number of small airbags each measuring three inches or less in diameter, for example, and as long as the passenger compartment is substantially filled at least between the occupant and the compartment in the direction of the crash, the exact positioning of a particular airbag becomes less important as each one will receive support from others and eventually the passenger compartment walls.

Through the implementation of the ideas expressed herein, the airbag system becomes truly friendly. It can deploy prior to the accident, freeze the occupant in his or her pre-crash position, impact the occupant without causing injury, and gradually deflate after the accident. Inflators would preferably be aspirated to draw most of the required gas from the passenger compartment. Since an aspirated inflator automatically adjusts to provide just the right amount of gas, only single stage pyrotechnic systems would be required. Occupant sensors would not be necessary as the system would adjust to all occupants regardless of whether they were seated in a rear-facing child seat, belted, unbelted, out-of-position, lying down, sleeping, had their feet in the dashboard, etc. By eliminating the dual stage inflator, using aspiration thereby greatly reduces the amount of propellant required and by using thin plastic film, this airbag system is not only by far the best performing system it is also potentially the least expensive system.

In FIG. 99, the advantages of the self-limiting airbag system disclosed herein and in U.S. Pat. No. 5,772,238 and with reference to FIG. 85, when used with a rear-facing child seat, are illustrated. In this case, where multiple film airbags are illustrated, the airbags deploy but the deployment process stops when each of the film airbags interacts with the child seat and the pressure within each bag rises to where the flow is stopped. In this case, the child 666 is surrounded by airbags 664 and further protected from the accident rather than being injured as is the case with current design airbags. The airbags 664 can be additionally surrounded by a net or other envelope 665 most of which has been cutaway and removed in the figure. In other implementations, a single airbag will be used in place of the multiple airbags illustrated here or multiple attached airbags can be used eliminating the need for the net.

The self-limiting feature is illustrated here by either a variable orifice exhaust port in the airbag, discussed in more detail below, or, preferably, provision is made in the airbag inflator itself as illustrated in the referenced '238 patent where a close-down of the aspiration system is used during the deployment portion of the process and a smaller variable orifice is used during the deflation portion. The aspiration cutoff can be designed so that the airbag deploys until the pressure begins to rise within the bag which then stops the inflation process, closes the aspiration ports and the airbag then becomes stiffer to absorb the kinetic energy of the impacting occupant. Thus, during the deployment phase, very little force is exerted on the occupant, or the child seat, but as the occupant begins to move into and load the airbag, substantial force is provided to limit his or her motion.

3.6 Rear of Seat Mounted Airbags

FIG. 95, discussed above, illustrates airbags that deploy from the rear of the front seat to protect rear seat occupants of a vehicle in a crash. These airbags also provide protection for front seat occupants to help prevent unbelted occupants in the rear seat from moving into the front seat during a crash and causing injury to those occupants seated in the front seat.

3.7 Exterior Airbags

Airbags that deploy outside of the vehicle have been disclosed primarily for side impact in the current assignee's patents. Generally, these externally deployed airbags are based on the use of an anticipatory sensor that identifies that an accident is about to occur using, for example, pattern recognition technologies such as neural network. Normally, these airbags are made from fabric but as the properties of films improve, these fabric airbags will be replaced by film airbags. In particular, using technology available today, the combination of a film and a reinforcing net can now be used to construct externally deployed airbags that are both stronger and lighter in weight than fabric. U.S. Patent Publication No. 20030159875 discloses the use of a resin for a pedestrian protection airbag. All of the film airbag constructions illustrated herein for interior use are also applicable for external use with appropriate changes in dimensions, material properties etc. as needed to satisfy the requirements of a particular application.

Particular mention should be made of pedestrian protection since this is rapidly becoming a critical safety issue primarily in Japan and Europe where the percentage of people killed in automobile accidents that are pedestrians is greater than in North America. Although many patents have now issued and are pending relating to pedestrian airbags, none, except those of the current assignee, are believed to make use of an anticipatory sensor that can identify that the vehicle is about to impact with a pedestrian. See, e.g., U.S. Patent Publication No. 20030159875 and EP01338483A2. Since this technology has been developed by the current assignee, the technology is now available to identify that a pedestrian is about to be struck by the vehicle. This technology uses a camera or other imaging system and a pattern recognition system such as a neural network or combination network as defined in the above-referenced current assignee's patents.

Exterior airbags can require a substantial amount of gas for inflation and thus are candidates for aspirated inflators such as disclosed in U.S. Patent Application Publication No. 20020101067 and above herein. Exterior airbags can get quite large and thus require a substantial amount of gas. Also they frequently require a high pressure. Aspirated inflators can economically satisfy both of these requirements. Such exterior airbags can also be of the shape and construction as disclosed herein and illustrated, for example, in U.S. Patent Application Publication No. 20040011581. Such exterior airbags can be made from plastic film.

3.8 Variable Vent

A great deal of effort has gone into the design on "smart" inflators that can vary the amount of gas in the airbag to try to adjust for the severity of the crash. The most common solution is the dual stage airbag where either of two charges or both can be initiated and the timing between the initiation can be controlled depending on the crash. Typically, one charge is set off for low speed crashes and two for higher speed crashes. The problem, of course, is to determine the severity of the crash and this is typically done by a passenger compartment-mounted crash sensor. This is relatively easy to do for barrier crashes but the crashes in the real world are quite different. For example, some pole crashes can appear to be mild at the beginning and suddenly become severe as the penetrating pole strikes the engine. In this case, there may not be time to initiate the second charge. An alternate solution, as reported in current assignee's patents listed above, is to use a single stage inflator but to control the flow of gas into and/or out of the airbag. If this is an aspirated inflator, this control happens automatically and if the airbag is a film airbag, it can be designed to interact with any occupant and thus inflator control is not required.

In an alternate situation where either a conventional inflator is used or an aspirated inflator is used, the flow out of the airbag can be managed to control the acceleration of the chest of the occupant. Most airbags have a fixed vent hole. As an alternate to providing a fixed vent hole as illustrated in the previous examples, a variable vent hole can be provided as shown in FIGS. 100 and 100A, where FIG. 100 is a partial cutaway perspective view of a driver side airbag made from film having a variable vent in the seam of the airbag. In this embodiment of an airbag, a hinged elastic member or flap 835 is biased so that it tends to maintain vent 830 in a closed position. As pressure rises within the airbag, the vent 830 is forced open as shown in FIG. 100 and FIG. 100A, which is a detail of the vent 830 shown in FIG. 100 taken along line 100A-100A of FIG. 100. This construction enables the use of a smaller inflator and also reduces the maximum chest acceleration of the occupant in a crash and more accurately controls the deceleration of the occupant. In FIGS. 100 and 100A, vent 830 contains an opening 833 formed between film layer 834 and reinforcement member 832. Film layer 831 is also sealed to reinforcing member 832. Member 835 is attached to reinforcing member 832 (via portion 837) through film 834. A weakened section 836 is formed in member 835 to act as a hinge. The elasticity of the material, which may be either metal or fiber reinforced plastic or other suitable material, is used to provide the biasing force tending to hold the variable opening closed. The variable vent can also be accomplished through controlling the flow back through the inflator assembly. This latter method is particularly useful when aspirated inflators and self limiting airbags are used. For other variable vent designs, see the discussion about FIGS. 103-112.

FIG. 101 shows a typical chest G pulse experienced by an occupant and the resulting occupant motion when impacting an airbag during a 35-MPH frontal impact in a small vehicle. When the variable orifice airbag is used in place of the conventional airbag, the chest acceleration curve is limited and takes the shape similar to a simulation result shown in FIG. 102. Since it is the magnitude of the chest acceleration that injures the occupant, the injury potential of the airbag in FIG. 102 is substantially less than that of FIG. 101.

Since the variable exhaust orifice remains closed as long as the pressure in the airbag remains below the set value, the inflator need only produce sufficient gas to fill the airbag once. This is approximately half of a gas which is currently produced by standard inflators. Thus, the use of a variable orifice significantly reduces the total gas requirement and therefore the size, cost and weight of the inflator. Similarly, since the total amount of gas produced by all inflators in the vehicle is cut approximately in half, the total amount of contaminants and irritants is similarly reduced or alternately each inflator used with the variable orifice airbag is now permitted to be somewhat dirtier than current inflators without exceeding the total quantity of contaminants in the environment. This in turn, permits the inflator to be operated with less filtering, thus reducing the size and cost of the inflator. The pressure buildup in the vehicle is also substantially reduced protecting the occupants from ear injuries and permitting more or larger airbags to be deployed.

Characteristics of inflators vary significantly with temperature. Thus, the mass flow rate of gas into the airbag similarly is a significant function of the temperature of the inflator. In conventional fixed orifice airbags, the gas begins flowing out of the airbag as soon as positive pressure is achieved. Thus, the average pressure in the airbag similarly varies significantly with temperature. The use of a variable orifice system as taught by this invention however permits the bags to be inflated to the same pressure regardless of the temperature of the inflator. Thus, the airbag system will perform essentially the same whether operated at cold or hot temperature, removing one of the most significant variables in airbag performance. The airbag of this invention provides a system which will function essentially the same at both cold and hot temperatures.

The variable orifice airbag similarly solves the dual impact problem where the first impact is sufficient to trigger the crash sensors in a marginal crash where the occupant is wearing a seatbelt and does not interact with the airbag. A short time later in a subsequent, more serious accident, the airbag will still be available to protect the occupant. In conventional airbags using a fixed orifice, the gas generator may have stopped producing gas and the airbag may have become deflated.

Since the total area available for exhausting gas from the airbag can be substantially larger in the variable orifice airbag, a certain amount of protection for the out-of-position occupant is achieved even when the aspiration system of the referenced '238 patent is not used. If the occupant is close to the airbag when it deploys, the pressure will begin to build rapidly in the airbag. Since there is insufficient time for the gas to be exhausted through the fixed orifices, this high pressure results in high accelerations on the occupant's chest and can cause injury. In the variable orifice embodiment, however, the pressure will reach a certain maximum in the airbag and then the valve would open to exhaust the gas as fast as the gas generator is pumping gas into the airbag thus maintaining a constant and lower pressure than in the former case. The airbag must be sufficiently deployed for the valve to be uncovered so that it can operate. Alternately, the valving system can be placed in the inflator and caused to open even before the cover opens thereby handling the case where the occupant is already against the deployment door when the airbag deployment is initiated.

Many geometries can be used to achieve a variable orifice in an airbag. These include very crude systems such as slits placed in the bag in place of round exhaust vents, rubber patches containing one or more holes which are sewn into the bag such that the hole diameter gets larger as the rubber stretches in response to pressure in the bag, plus a whole variety of flapper valves similar to that disclosed herein. Slit systems, however, have not worked well in experiments and rubber patches are affected by temperature and thus are suitable only for very crude systems. Similarly, the bag itself could be made from a knitted material, which has the property that its porosity is a function of the pressure in the bag. Thus, once again, the total amount of gas flowing through the bag becomes a function of the pressure in the bag.

Although the case where the pressure is essentially maintained constant in the bag through the opening of a valve has been illustrated, it is possible that for some applications, a different function of the pressure in the bag may be desirable. Thus, a combination of a fixed orifice and variable valve might be desirable. The purpose of adjusting the opening area of an airbag vent hole is to control the gas flow rate out of the vent hole according to the pressure inside the airbag. If the pressure is higher, then the area of the vent hole becomes larger and allows more gas to flow out. By regulating the pressure inside an airbag, the force applied on an occupant is minimized.

A superior solution to the problem is to place an acceleration sensor on the surface to the airbag that contacts the chest of the occupant, or is expected to contact the chest of the occupant or the forwardmost part of the occupant. An electronic controlled valve can then be coupled to the accelerometer and the acceleration of the chest of the occupant can be controlled to limit this acceleration below some value such as 40 Gs. Alternately, if the severity of the crash has been accurately forecast, then the airbag can provide the minimum deceleration to the occupant's chest to bring the occupant to the same speed as the vehicle passenger compartment at the time the airbag has become deflated.

When airbags are used in conjunction with an anticipatory sensor to inflate and hold occupants in their pre-crash position, they usually will not have vents for dissipating the kinetic energy of the occupants since the occupants will never attain a significant velocity relative to the vehicle. Usually, it will be desirable to retain such airbags in their inflated state for several seconds and then to deflate them to permit the occupants to egress from the vehicle. There are several methods of permitting such airbags to deflate including: opening the aspiration vent when aspirated inflators are used; electrically and/or mechanically opening the airbags when the pressure drops below atmospheric pressure; chemically, thermally melting or burning or otherwise opening a hole in such an airbag after a predetermined time period or perhaps two seconds (for example) after the vehicle motion has stopped; etc.

3.8.1 Discharge Valves for Airbags

FIG. 103 shows an airbag 841 equipped with a discharge valve 842 in accordance with a first embodiment of the invention. The discharge valve 842 is interposed between the gas-filled interior of the airbag and an atmosphere exterior of the airbag 841 so as to enable gas or other fluid from the airbag to the outlet from the interior of the airbag to the exterior atmosphere. Discharge valve 842 is situated separate and apart from an opening in the airbag 841 through which gas flows into the interior of the airbag 841.

The airbag 841 may be any airbag arranged on or in a vehicle, including but not limited to, a frontal airbag, a side airbag, a knee bolster and an externally deployed airbag.

As shown in FIG. 103A, discharge valve 842 comprises a fixed, bottom plate 843 arranged in connection with or associated with the airbag 841, e.g., on an outer layer of the material of the airbag or arranged in conjunction with the inflator, and has a pattern of openings. Bottom plate 843 may overlie one or more openings in the airbag 841. A top plate 844 is arranged over the bottom plate 843 and is movable relative to the bottom plate 843. Top plate 844 has the same pattern of openings as the bottom plate 843. Top plate 844 is mounted to a fix component in the vehicle by a spring 845 to allow for movement relative to the bottom plate 843 to thereby vary the correspondence between the openings in the top plate 844 and the bottom plate 843.

When the phrase "pattern of openings" is used to refer to the arrangement of openings in the bottom plate 843 and top plate 844, it must be understood that the openings are not required to be arranged in any discernible or specific geometric pattern. Rather, the pattern may simply be the overall arrangement of the openings.

Gas from the airbag 841 flows through the openings in the bottom plate 843 and then through the openings in the top plate 844 with the volume and/or flow rate of the gas being determined by the degree of correspondence between the openings in the top plate 843 and the openings in the bottom plate 843. That is, in a maximum gas outflow position, the top plate 844 will be in a position so that openings in the top plate 844 correspond exactly with the openings in the bottom plate 843. On the other hand, in a minimum gas outflow position, the top plate 843 will be in a position so that the openings in the top plate 843 will over lie solid portions of the bottom plate 843. Any position between these extreme positions is also possible so that the gas outflow rate is controlled by the variable position of the top plate 843 relative to the bottom plate 843.

A movement mechanism is provided to move the top plate 843 relative to the bottom plate 843 and is generally effective to move the top plate 843 to multiple positions relative to the bottom plate 843 and for variable, adjustable durations. That is, the top plate 843 can be moved from one position to another position during the discharge of gas from the airbag 841 to vary the outflow of gas during the discharge. Movement of the top plate 843 and timing of the movement of the top plate 843 may be controlled by an appropriate control system to obtain the desired outflow rate, duration and/or volume of gas from the airbag 841. The control system can be designed to consider the properties of the occupant to be protected by the airbag 841, e.g., the occupant's position, morphology, type and identification.

One embodiment of the movement mechanism comprises a piezo-electric bi-morph crystal arrangement 18 which shakes the top plate 843 back and forth (in the direction of arrow A) to thereby modulate the valve openings defined by the openings in the bottom plate 843 and top plate 843. The piezo-electric crystal 846 is driven by a drive signal and associated electronics 847. The electronics 847 can be connected to or incorporated into a vehicle occupant sensor capable of determining an optimum discharge rate of the airbag 841 so that the top plate 843 is moved to achieve the optimum discharge rate.

Another movement mechanism could be an inductive actuator or motor arrangement with a cam offset (represented by motor 847A in FIG. 103B). In this case, the motion could be started during a pre-crash period and engaged with a magnetic clutch or piezo-electric clutch thereafter. A motor can also be used which is offset by the pitch of the openings and thereby achieve the possibility of regulating the valve openings defined by the openings in the top plate 843 and fixed plate 843.

Referring now to FIG. 104, another embodiment of a discharge valve is shown designated generally as 848. In this embodiment, an indent or groove 849 is formed in a metal foil diaphragm 850 in a peripheral surface of the airbag 841 (see FIG. 104A), or in a surface against which the pressure in the airbag 841 is effective. A signal is fed to a circuit formed by the groove 849 so that there is a large impedance ($I^2R$) drop across the groove that melts the metal foil and thereby weakens the diaphragm 850. The pressure of the gas in the airbag 841 will then cause the weakened region to break and open a passage between the interior of the airbag 841 and the exterior. A 12 V firing signal may be preferably used.

Several grooves can be provided on the metal foil diaphragm 850 to enable different size openings to be formed. Instead of metal foil, the diaphragm may be made of any material which melts upon the formation of an electric circuit. The grooves 849 can be annular and concentric.

When multiple annular grooves or rings 849 are provided, with an associated circuit formed for each groove 849, a signal can be sent to a particular circuit to cause an opening having a pre-determined size to be formed, i.e., the weakened region will be at a set diameter from a center of the diaphragm 850. In this manner, a logic input can be used to determine what size opening is needed to provide for a controlled, appropriate discharge and then generate a signal to cause the annular groove 849 which will provide for that size opening to weaken and subsequently break upon exertion of the pressure from the gas in the airbag 841.

Referring now to FIGS. 105 and 105A, another embodiment of a discharge valve is shown. In this embodiment, the discharge valve 851 comprises an elastomer diaphragm 852 with apertures 853 therein. In a rest condition, the diaphragm 852 is flat and the apertures 853 are relatively small. However, when pressure is applied, the diaphragm 852 expands to the condition shown in FIG. 105 and the apertures 853 become larger. Gas from the interior of the airbag 841 flows to the exterior through the enlarged apertures 853. The expansion of the diaphragm 852 depends on the magnitude of the pressure of the gas in the airbag 841.

The edges of the diaphragm 852 are preferably fixed relative to the airbag 841 and may even be attached to the airbag 841. For example, the edges of the diaphragm 852 may be attached to the outer material layer of the airbag 841.

Control of the flow rate and/or volume of gas from the airbag 841 can be achieved through appropriate determination of the size and/or number of the apertures 853.

The material from which the diaphragm 852 is made is preferably pre-stretched and then die cut. Instead of an elastomer, other resilient and/or flexible materials may be used.

Referring now to FIGS. 106, 106A and 106B, in this embodiment, a discharge valve for an airbag is represented generally as 854. The discharge valve includes a fixed aperture disk 855 arranged in connection with or associated with the airbag 841 and a movable aperture disk 856 mounted over the fixed disk 855. Fixed disk 855 may overlie one or more openings in the airbag 841. Movable disk 856 has alternating solid sections 857 and open sections 858 and is connected to an arm 859. The center of disk 856 is mounted through the fixed disk 855 by a mounting pin 860, although this mounting arrangement can be eliminated and other devices for mounting the movable disk 856 relative to the fixed disk 855 employed in the invention. Arm 859 is associated with a rotation mechanism 861 to enable the arm 859 to be moved in the directions of arrow B. Movement of the arm 859 results in movement of the movable disk 856 relative to the fixed disk 855 so that the correspondence between the apertures in the fixed disk 855 and the apertures in the movable disk 856 is varied (to thereby adjust valve openings defined by the apertures in the fixed disk 855 and movable disk 856). This variation enables the discharge flow to be controlled.

The rotation mechanism 861 may be a solenoid, bi-morph piezo-electric element, ferromagnetic arrangement or drive, ferroelectric arrangement or drive or a thermal-based arrangement, e.g., a phase change metal. That is, almost any type of controllable mechanism for moving the arm 859 can be used in the invention. When a solenoid is used, application of alternating electrical current causes forward and reverse motions of the arm 859.

FIGS. 107, 107A and 107B show another embodiment of a discharge valve in accordance with the invention and is designated generally as 862. Discharge valve 862 includes a valve seat 863 formed in connection with or associated with the airbag 841 and arranged to enable flow of gas from the interior of the airbag 841 therethrough. Valve seat 863 may overlie one or more openings in the airbag 841. A valve member 864 engages with the valve 863 and a valve spring 865 is arranged to provide a biasing force to press the valve member 864 toward the airbag 841 to close the opening(s) formed by the valve seat 863 and valve member 864.

FIGS. 108, 108A and 108B show another embodiment of a discharge valve for an airbag in accordance with the invention and is designated generally as 866. Discharge valve 866 includes a substrate 867 having three or more spiral cuts 868 arranged to form cantilevered arms 869 that will deflect under pressure. The cantilevered arms 869 may be die cut into the material of the airbag 841. Multiple spiral arms thus form a plurality of springs. In operation, the pressure of the gas in the interior of the airbag 841 will urge the arms 869 upward as shown in FIG. 108 thereby opening the cuts to form passages at the locations of the cuts 868.

Instead of die cutting the cantilevered arms 869 into the material of the airbag 841, a dedicated diaphragm may be provided in connection with an outer material layer of the airbag 841 and cuts made in this diaphragm.

FIGS. 109, 109A and 109B show another embodiment of a discharge valve for an airbag in accordance with the invention and is designated generally as 870. Discharge valve 870 includes a substrate 871 cut in a specific manner to define a square cantilevered spring matrix having a central region 872 and cantilevered arms 873 that will deflect under pressure. The cantilevered arms 873 may be die cut into the material of the airbag 841. Multiple spiral arms thus form a large spring valve. In operation, the pressure of the gas in the interior of the airbag 841 will urge the arms 86 upward as shown in FIG. 109 thereby raising the central region 872 and opening passages between the interior of the airbag 841 and the exterior.

Instead of die cutting the cantilevered arms 873 into the material of the airbag 841, a dedicated diaphragm may be provided in connection with an outer material layer of the airbag 841 and cuts made in this diaphragm.

Referring now to FIGS. 110A and 110B, instead of plates having a pattern of openings interposed between the airbag interior and airbag exterior, a pair of cylinders could be used.

As shown in FIGS. 110A and 110B, an inner cylinder 874 has a pattern of openings and is positionable inside an outer cylinder 875 such that the pattern of openings in the outer cylinder 875 are in alignment with the pattern of openings in the inner cylinder 874. Outer cylinder 875 is coupled to a motor 876 or other actuating device for moving the outer cylinder 875 in a stroked manner in the direction of arrow A, in which case, the outer cylinder 875 is moved up and down relative to the inner cylinder 874 (FIG. 8A). The pattern of openings in the inner cylinder 874 may completely align with the pattern of openings in the outer cylinder 875 when the outer cylinder 875 is fully in the up position.

The motor 876 is controlled by a gas discharge rate determination unit 880, e.g., a processor containing an algorithm relating the desired gas discharge rate to the required action of the motor 876 to move the outer cylinder 875 to provide for the desired gas discharge rate. Such an algorithm may be determined experimentally or empirically. The gas rate determination unit 880 is provided with or determines the desired gas discharge rate through input from a detection unit 881 which detects, measures or determines the morphology of the occupant to be protected by the airbag, the type of occupant, the identification of the occupant, the position of the occupant and/or the severity of the crash. Any of these factors, or combinations of these factors, may be used in the determination of the discharge rate to optimally protect the occupant in a crash. The discharge rate determination unit 880 and detection unit 881 may be used in any of the embodiments described herein.

As shown in FIG. 110B, a motor or other actuating device 876 may rotate the outer cylinder 875 in the direction of arrow B relative to the inner cylinder 874, in which case, the inner cylinder 875 is situated within the outer cylinder 875. The openings in the outer cylinder 875 may align fully with the openings in the inner cylinder 874 (in which case the valve is in the full discharge position) or align with material between the openings in the inner cylinder 874 (in which case the valve is in the full blocked-discharge position). Between these extreme positions is a wide range of variations in the discharge of the gas in the airbag.

Instead of having the outer cylinder 875 move relative to the inner cylinder 874, the reverse situation could also be used, i.e., move the inner cylinder relative to the stationary outer cylinder, in which case, the outer cylinder would be fixed to the airbag since the stationary cylinder is preferably fixed to the airbag. Also, as shown, the airbag interior is on the side of the outer cylinder 875 and the airbag exterior is on the side of the inner cylinder 874 so that gas is discharged from the airbag first through the openings in the outer cylinder 875 and then through the openings in the inner cylinder 874. The reverse situation could also be used. Thus, in general, the set of openings of one cylinder is in flow communication with the interior of the airbag and the set of openings in the other cylinder is in flow communication with the exterior of the airbag so that the degree of registration or alignment between the openings determines the discharge rate of gas from the airbag.

Referring now to FIGS. 111A and 111B, instead of plates or cylinders having a pattern of openings interposed between the airbag interior and airbag exterior, a pair of cones could be used.

As shown in FIGS. 111A and 111B, an inner cone 878 has a pattern of openings and is positionable inside an outer cone 877. Inner cone 878 is coupled to a motor 879 or other actuating device for moving the inner cone 878 in a stroked manner in the direction of arrow A, in which case, the inner cone 878 is moved up and down relative to the outer cone 877 (FIG. 111A). The pattern of openings in the inner cone 878 may completely align with the pattern of openings in the outer cone 96 when the inner cone 878 is fully in the up position.

In the alternative, as shown in FIG. 111B, the motor or other actuating device 876 may rotate the inner cone 878 in the direction of arrow B relative to the outer cone 877, in which case, the inner cone 878 is situated almost entirely within the outer cone 877. The openings in the inner cone 878 may align fully with the openings in the outer cone 877 (in which case the valve is in the full discharge position) or align with material between the openings in the outer cone 877 (in which case the valve is in the full blocked-discharge position). Between these extreme positions is a wide range of variations in the discharge.

Instead of having the inner cone 878 move relative to the outer cone 877, the reverse situation could also be used, i.e., have the outer cone move relative to the inner cone, in which case, the inner cone would be fixed to the airbag since the stationary cone is preferably fixed to the airbag. Also, as shown, the airbag interior is on the side of the outer cone 878 and the airbag exterior is on the side of the inner cone 878 so that gas is discharged from the airbag first through the openings in the outer cone and then through the openings in the inner cone. The reverse situation could also be used. Thus, in general, the set of openings of one cone is in flow communication with the interior of the airbag and the set of openings in the other cone is in flow communication with the exterior of the airbag so that the degree of registration or alignment between the openings determines the discharge rate of gas from the airbag.

FIG. 112 is an illustration of a discharge valve including stacked drive elements. A spring 883 biases the cone 884 to the open discharging position. A stack of bimorph piezoelectric washers 882 when activated close the valve shutting off the flow out of the airbag.

The discharge valves described above can be used individually or in combination in a single airbag. To the extent possible, the discharge valves can also be connected and controlled by a control system which tailors the outflow rate through the discharge valve to the properties of the occupant. That is, an occupant sensor is provided in the vehicle to measure or determine one or more properties of an occupant and then the control system considers the measured or determined properties when determining the desired, optimum gas outflow rate and controls the discharge valve accordingly. The control system may also consider the properties of the crash as determined by one or more crash sensors and associated circuitry. Such properties include the velocity change of the crash, the acceleration of the crash and the direction of impact.

The examples shown generally illustrate the placement of the valve in association with the fabric of the airbag, i.e., at a location on or against the fabric of the airbag over a discharge opening different from the inlet opening of the airbag which is coupled to the inflator structure or inflation mechanism of the airbag. Alternately, the valve can be placed on other structure that is in fluid communication with the interior of the airbag. Such structure can be part of, for example, the inflator structure or inflator of the airbag.

With respect to the drive elements which move one member having openings relative to another, e.g., a plate, cylinder and cone, stacked drive elements could be used. That is, a stack of piezoelectric, ferroelectric or phase change alloy elements may be used to provide a short stroke with a high modulation force and millisecond response time. Also, to increase response time into the millisecond range, a high force pre-load with a mechanical spring and an escarpment mechanism for triggering the discharge valve could be used. A popit-type valve that uses the available air pressure to obtain gain over a single stage valve may be also be used in accordance with the invention Any of the valves described in International Patent Publication No. PCT/RU02/00225 could also be used in accordance with the invention in its various forms. This publication describes a safety device installed inside a vehicle having an inflatable airbag having an inlet for receiving gas filling the airbag to its ready state, and a system for supplying gas to the airbag, including a gas source, a valve device, and a triggering unit. The valve device is formed by a pneumatic distributor having two stable positions: an open position wherein gas from the gas source is fed to the airbag through its inlet, and a closed position wherein the gas flow through the airbag inlet is interrupted.

Although multiple embodiments of discharge valves are described above, features of each can be used in the other embodiments. Also, a vehicle can be manufactured with different discharge valves for different airbags. Airbags including any of the discharge valves described above, or any combinations of the discharge valves described above, are also within the purview of the invention.

The discharge valve of an airbag in accordance with the invention can be controlled based on any number of criteria, including but not limited to the morphology of the occupant to be protected by the airbag (e.g., weight, height, etc.), the position of the occupant (either the current position or an extrapolated future position at which the occupant will be at the time of airbag deployment), the severity of the crash requiring airbag deployment, the type of occupant (i.e., adult, occupied or unoccupied child seat, rear-facing child seat, front-facing child seat, child, pet, etc.), the direction of the crash, the position of the seat or any part thereof, and the identification of the occupying items in the vehicle. These criteria may be used individually or in combination to determine the appropriate control of the gas discharge rate of the airbag.

The gas discharge rate of the airbag is controlled by controlling the motor or other actuating device. To this end, the operation of the motor is studied to determine the degree of alignment of the openings in the movable member and the fixed member and thus the gas flow through the openings, if any, for different positions of the movable plate. Then, in operation, the motor is controlled to move the plate in the required manner to provide for the desired gas discharge rate.

3.9 Airbags with a Barrier Coating

Referring now to FIGS. 113, 114, 115A and 115B, an airbag module in accordance with the invention is designated generally as 890 and comprises a module housing 891 in which an airbag 892 is folded. The housing 891 may be arranged in any vehicle structure and includes a deployment door 893 to enable the airbag to deploy to protect the occupants of the vehicle from injury. Thus, as shown, the housing 891 may be mounted in the ceiling 894 of the vehicle passenger compartment 895 to deploy downward in the direction of arrow A as a side curtain airbag to protect the occupants during the crash.

As shown in FIG. 115A, one embodiment of the airbag 892 comprises a substrate 896 and a barrier coating 897 formed on the substrate 896, either on the inner surface which will come into contact with the inflation fluid or on an outer surface so that the barrier coating 897 will come into contact only with inflation fluid passing through the substrate 895. The airbag 892 may be formed with any of the barrier coatings described herein in the parent '623 application. In one embodiment, a flat sheet of the substrate 896 would be coated with the barrier coating 897 and then cut to form airbags having an edge defining an entry opening for enabling the inflation of the airbag. The edge 898 of the airbag 892 would then be connected, e.g., by sealing, to a part 899 of the housing 891 which defines a passage through which the inflation fluid can flow into the interior of the airbag 892 (see FIG. 114). The inflation fluid may be generated by an inflator 900 possibly arranged in the module housing 891.

In the embodiment shown in FIG. 115B, the barrier coating 897 is placed between two substrates 896, 901. Any number of substrates and barrier coatings can be used in the invention. Also, the number of substrates and barrier coatings can be varied within a single airbag to provide additional substrates and/or barrier coatings for high stresses areas.

This embodiment of the invention is illustrated by non-limiting examples (Examples 1-17) set forth in U.S. patent application Ser. No. 10/413,318, which is incorporated by reference herein.

4 Systems

4.1 Self-Contained Airbag Systems

Self-contained airbag systems contain all of the parts of the airbag system within a single package, in the case of mechanical implementations, and in the case of electrical or electronic systems, all parts except the primary source of electrical power and, in some cases, the diagnostic system. This includes the sensor, inflator and airbag. Potentially, these systems have significant cost and reliability advantages over conventional systems where the sensor(s), diagnostic and backup power supply are mounted separate from the airbag module. In mechanical implementations in particular, all of the wiring, the diagnostic system and backup power supply are eliminated.

FIG. 22 is a perspective view of a side impact airbag system illustrating the placement of the airbag vents in the door panel and exhausting of the inflator gases into the vehicle door and also showing the use of a pusher plate 190 to adjust for the mismatch between the point of impact of an intruding vehicle and the sensor of a self-contained side impact airbag system. The pusher plate 190 is shown attached to the main structural door beam 191 in this illustration but other mounting systems are also possible. The pusher plate 190 is dimensioned and installed in the door so that during a side impact to any portion of the side of the vehicle which is likely to cause intrusion into the passenger compartment and contact an occupant, the pusher plate will remain in a substantially undistorted form until it has impacted with the sensor causing the sensor to begin deployment of the airbag. In this implementation, a non-sodium azide propellant, such as nitro-cellulose, is used and the gas is exhausted into the door though a pair of orifices 192 (only one of which is shown). The airbag system may be any of those disclosed herein.

FIG. 23 is a cross-sectional view of a self-contained side impact airbag system using an electronic sensor that generates a signal representative of the movement of a sensing mass. Unless otherwise stated or inconsistent with the following description of an airbag system with an electronic sensor, the airbag system with an electronic sensor may include the features of the airbag system described above and below. An electronic sensor is one in which the motion of the sensing mass is typically continuously monitored with the signal electronically amplified with the output fed into an electronic circuit which is usually a micro-processor. Electronic sensors typically use accelerometers that usually make use of micro-machined, SAW, strain gage or piezo-electric elements shown here as 193. The accelerometer element 193 generates a signal representative of the movement of the sensing mass.

Modern accelerometers are sometimes micro-machined silicon and combined with other elements on an electronic chip. In electro-mechanical sensors, the motion of the sensing mass is typically measured in millimeters and is much larger than the motion of the sensing mass in electronic sensors where the motion is frequently measured in microns or portions of a micron. The signal representative of the motion of the sensing mass is recorded over time and an algorithm in the microprocessor may be designed to determine whether the movement over time of the sensing mass results in a calculated value that is in excess of the threshold value based on the signal. The sensing mass may constitute part of the accelerometer, e.g., the sensing mass is a micro-machined acceleration sensing mass. In this case, the microprocessor determines whether the movement of the sensing mass over time results in an algorithmic determined value that is in excess of the threshold value based on the signal.

For side impact electronic sensors, the acceleration of the sensing mass is acceleration in a lateral direction or lateral acceleration since the passenger compartment is inward relative to the side of the vehicle.

In embodiments using an electronic sensor, the inflator may include a primer that is part of an electronic circuit including the accelerometer such that upon movement over time of the sensing mass which results in a calculated value in excess of the threshold value, the electronic circuit is completed thereby causing ignition of the primer. In this case, the primer may be initiated electronically through a bridge or similar device that is initiated electronically.

Figure 24:
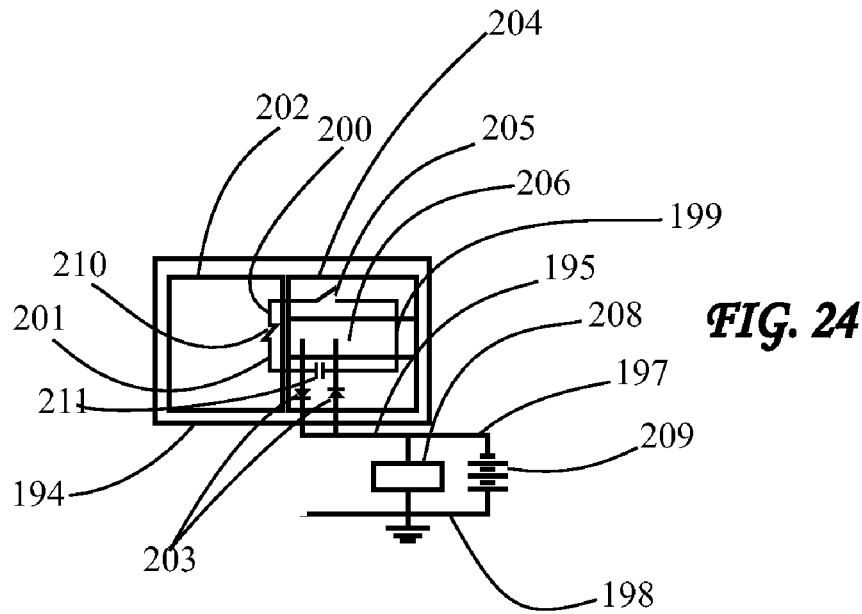
FIG. 24 is a schematic of the electric circuit of an electro-mechanical or electronic self-contained side impact airbag system.

When the term electrical is used herein, it is meant to include both electro-mechanical and electronic systems. FIG. 24 is a schematic of an exemplifying embodiment of an electric circuit of an electro-mechanical or electronic side impact airbag system in accordance with the invention. The self-contained module implementation shown generally at 194 contains a sensor assembly 204 and an airbag and inflator assembly 202. The sensor assembly 204 contains a sensor 205, a diagnostic module 206, an energy storage capacitor 207, and a pair of diodes 203 to prevent accidental discharge of the capacitor 207 if a wire becomes shorted. The module 206 is electrically connected to a diagnostic monitoring circuit 208 by a wire 195 and to the vehicle battery 209 by a wire 197. The module 206 is also connected to the vehicle ground. The sensor, diagnostic and capacitor power supplies are connected to the squib by wires 199-201.

In a basic configuration, the diagnostic monitoring circuit 208 checks that there is sufficient voltage on the capacitor 207 to initiate the inflator assembly 202 in the event of an accident, for example, and either of wires 195, 197 or 198 are severed. In this case, a diagnostic component internal to the self-contained module would not be necessary. In more sophisticated cases, the diagnostic module 206 could check that the squib resistance is within tolerance, that the sensor calibration is correct (through self testing) and that the arming sensor has not inadvertently closed. It could also be used to record that the arming sensor, discriminating sensor and airbag deployment all occurred in the proper sequence and record this and other information for future investigative purposes. In the event of a malfunction, the diagnostic unit could send a signal to the monitoring circuitry that may be no more than an indication that the capacitor 207 was not at full charge. Other related circuit components include capacitor 211 and resistor 210.

A substantial improvement in the reliability of the system is achieved by placing the diagnostic module and backup power supply within the self-contained airbag system particularly in the case of side impacts where the impact can take place at any location over a wide area. An impact into a narrow pole at the hinge pillar, for example, might be sufficient to sever the wire from the airbag module to the vehicle power source before the sensor has detected the accident. The placement of an electronic self-contained airbag module in the steering wheel also provides for significant economic and reliability improvements especially since the energy needed to trigger the airbag can be stored on the module capacitor and does not need to be transmitted to the module through the "clock spring" coiled ribbon cable that connects the steering wheel horn, switches etc. to vehicle power. Thus, the current-carrying capability of the clock spring can be substantially reduced.

Most of the advantages of placing the sensor, diagnostic and backup power supply within the self-contained module can of course be obtained if one or more of these components are placed in a second module in close proximity to the self-contained module. For the purposes of electro-mechanical or electronic self-contained modules, therefore, as used herein, the terms "self-contained module" or "self-contained airbag system" will include those cases where one or more of the components including the sensor, diagnostic and backup power supply are separate from the airbag module but in close proximity to it. For example, in the case of steering wheel-mounted systems, the sensor and backup power supply would be mounted on the steering wheel and in the case of side impact door mounted systems, they would be mounted within the door or seat. In conventional electrical or electronic systems, on the other hand, the sensor, diagnostic module and backup power supply are mounted remote from the airbag module in a convenient location typically centrally in the passenger compartment such as on the tunnel, under the seat or in the instrument panel.

With the placement of the backup power supply in the self-contained module, greater wiring freedom is permitted. For example, in some cases for steering wheel-mounted systems, the power can be obtained through the standard horn slip ring system eliminating the requirement of the ribbon coil now used on all conventional driver airbag systems. For side impact installations, the power to charge the backup power supply could come from any convenient source such as the power window or door lock circuits. The very low resistance and thus high quality circuits and connectors now used in airbag systems are not required since even an intermittent or high resistance power source would be sufficient to charge the capacitor and the existence of the charge is diagnosed as described above.

Herein, the terms capacitor, power supply and backup power supply are used interchangeably. Also, other energy storage devices such as a rechargeable battery could be used instead of a capacitor. For the purposes of this disclosure and the appended claims, therefore, the word capacitor will be used to mean any device capable of storing electrical energy for the purposes of supplying energy to initiate an inflator. Initiation of an inflator will mean any process by which the filling of an airbag with gas is started. The inflator may be either pure pyrotechnic, stored gas or hybrid or any other device which provides gas to inflate an airbag.

Figure 25:
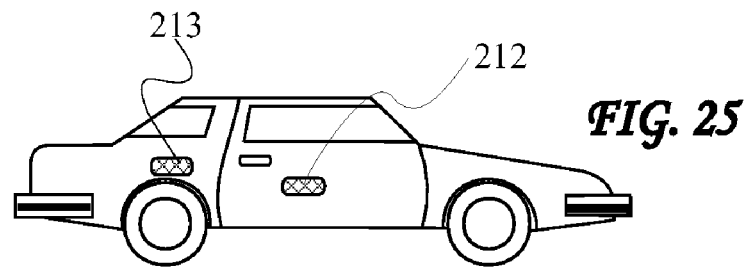
FIG. 25 is a side view of a vehicle showing the preferred mounting of two self-contained airbag modules into the side of a coupe vehicle, one inside of the door for the driver and the other between the inner and outer side panels for the rear seat passenger.

FIG. 25 is a side view showing the preferred mounting of two self-contained airbag modules 212 and 213 on the side on a two door vehicle. Module 212 is mounted inside of a door, whereby the sensor housing of module 212 is most proximate the exterior of the vehicle, while module 213 is mounted between the inner and outer side panels at a location other than the door, in this case, to protect a rear seated occupant. Each module has its own sensor and, in the case of electrical self-contained systems, its own capacitor power supply and diagnostic circuit. Any of the airbag systems disclosed herein may be mounted either inside a door or between inner and outer side panels of the vehicle at a location other than the door and for non-self-contained systems, the sensor can be mounted anywhere provided there is a sufficiently strong link to the vehicle side so that the sensor is accelerated at a magnitude similar to the vehicle side crush zone during the first few milliseconds of the crash. In view of the mounting of module 213 between inner and outer panels of the vehicle at a location other than the door, the inner and outer panels are thus fixed to the vehicle frame and the module 213 is also thus fixed to the frame. By contrast, the module 212 mounted inside the door is moved whenever the door is opened or closed.

This invention is also concerned with a novel self-contained airbag system for protecting occupants in side impacts and in particular with the sensors used either with self-contained modules or apart from the airbag module. This is accomplished by using the sensors described in U.S. Pat. No. 5,231,253, along with other improvements described in detail below. This invention is also concerned with applying some of the features of the novel side impact system to solving some of the problems of prior art mechanical airbag systems discussed above.

The inflator mechanism may be any component or combination of components which is designed to inflate an airbag, preferably by directing gas into an interior of the airbag. One embodiment of the inflator mechanism may comprise a primer. In this case, the crash sensor includes an electronic circuit including the accelerometer and the primer such that upon movement over time of the sensing mass results in a calculated value in excess of the threshold value, the electronic circuit is completed thereby causing ignition of the primer.

4.2 Occupant Sensing

In U.S. Pat. No. 5,829,782 and U.S. Pat. No. 5,563,462, the use of neural networks as a preferred pattern recognition technology is disclosed identifying a rear facing child seat located on the front passenger seat of an automobile. These patents also disclose many other applications of pattern recognition technologies for use in conjunction with monitoring the interior of an automobile passenger compartment and more generally, monitoring any interior space in a moving vehicle which might be occupied by an object.

Figure 26:
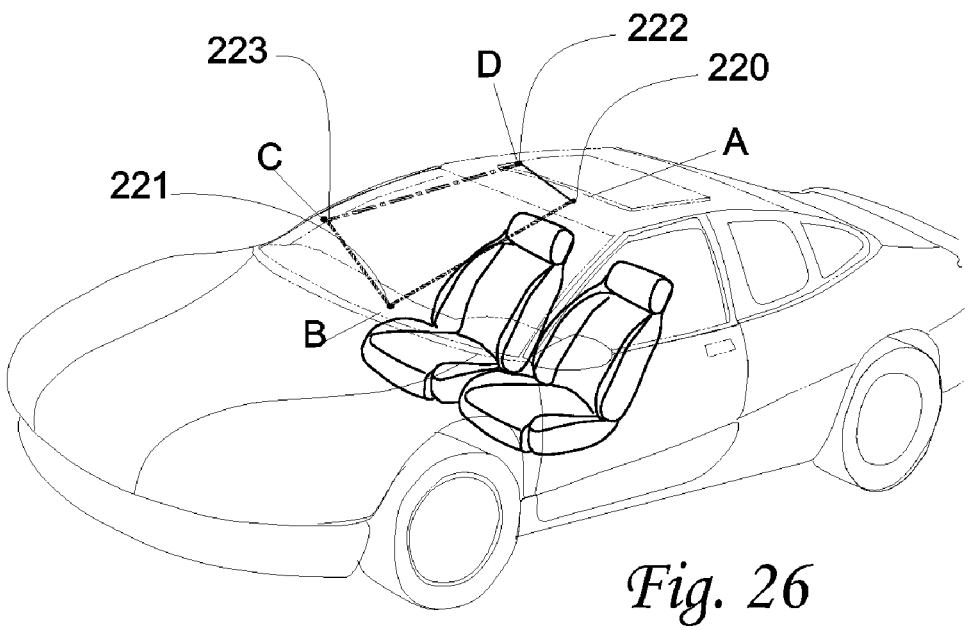
FIG. 26 is a perspective view of a vehicle with the vehicle shown in phantom illustrating one preferred location of the occupant transducers placed according to the methods taught in U.S. patent application Ser. No. 08/798,029.

FIG. 26 illustrates an occupant monitoring system that is capable of identifying the occupancy of a vehicle and measuring the location and velocity of human occupants. This system is disclosed in detail in U.S. RE37260. In this preferred implementation, four transducers 220, 221, 222 and 223 are used to provide accurate identification and position monitoring of the passenger of the vehicle. A similar system can be implemented on the driver side or rear seat. In FIG. 26, lines connecting the transducers C and D and the transducers A and B are substantially parallel permitting an accurate determination of asymmetry and thereby object rotation as described in U.S. RE37260.

The system is capable of determining the pre-crash location of the critical parts of the occupant, such as his/her head and chest, and then to track their motion toward the airbag with readings as fast as once every 10 milliseconds. This is sufficient to determine the position and velocity of the occupant during a crash event. The implementation described in U.S. RE37260 can therefore determine at what point the occupant will get sufficiently out-of-position so that deployment of the airbag should be suppressed. In the instant invention, the same data is used but instead of only making a trigger/no-trigger decision, the information is also used to determine how fast to deploy the airbag, and if the weight of the occupant is also determined in a manner such as disclosed in U.S. Pat. No. 5,748,473, the amount of gas which should be injected into the airbag and perhaps the outflow resistance can be controlled to optimize the airbag system not only based on the crash pulse but also the occupant properties. This provides the design for Phase 3 Smart Airbags.

In U.S. Pat. No. 5,684,701, concern was expressed about a possible contention for processor resources when multiple systems were using the same microprocessor. This is no longer a problem with the availability of neural computer designs that can be incorporated into an ASIC for this system. Such designs utilize a parallel computing architecture to calculate all of the node calculations simultaneously. Furthermore, the neural computer can be made with as many input nodes as desired with little penalty in ASIC cost. Thus, both the calculation of the position of the occupant and the crash pulse analysis can occur at the same time.

In the neural network ASIC design, it is anticipated that, for most applications, the node weights will be read in at execution time. Therefore, a single neural network hardware design can perform many pattern recognition functions as long as the functions that share the neural computer do not need to be done at the same time. To the extent that this sharing can be done, each of these non-critical features can be added at very little additional cost once one system is implemented.

Figures 26A, 27:
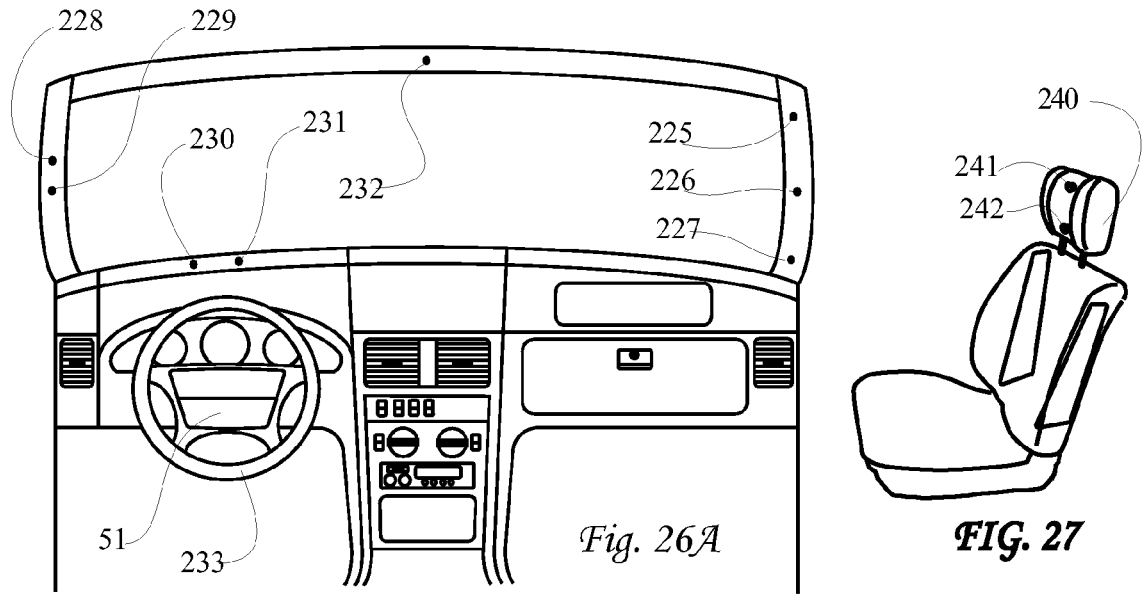
FIG. 26A is a view of the passenger compartment of a motor vehicle, with portions cut away and removed, illustrating an occupant out-of-position sensor and a rear facing child seat detector, both located on the A-pillar and both using the same computer as the pattern recognition based crash sensor.
FIG. 27 is a perspective view of a vehicle seat and headrest containing ultrasonic head location sensors consisting of one transmitter and one receiver.

In FIG. 26A, an alternate view of the passenger compartment of a motor vehicle is presented which illustrates an occupant out-of-position sensor and a rear facing child seat detector, both located on the A-pillar of the vehicle and both using the same neural computer as the neural network crash sensor. In other applications, these transducers are mounted on other locations such as the B-pillar and headliner. Thus, once one neural network application for an automobile is implemented, the same neural network computer system can be used for several pattern recognition applications.

Use of the neural network to identify or detect a rear facing child seat occurs when the vehicle is first put in motion. In contrast, use of the neural network for crash pattern recognition occurs continuously but need only take place when an abnormal event is taking place. Since it is highly unlikely that both events will take place simultaneously, the same system can easily accomplish both tasks. In event of a conflict, one of the functions takes priority. A strong motivation for the use of a neural network crash sensor, therefore, in addition to its superior performance, is that substantial economies result. Use of neural networks for interior vehicle monitoring or for crash sensing is not believed to have been discovered prior to its discovery by the current assignee, let alone the greater advantage of combining both functions with the same neural network system. When the added requirement of determining the position of an occupant dynamically is considered, the chance of a conflict between the occupant sensing and the crash sensing systems increases since both must be done continuously. Both systems can still use the same neural network system providing the processor is fast enough. One method of assuring that this is true is to use a parallel processor, such as a neural computer.

An interesting point is that each feature can be added at very little additional cost once one system is implemented. The distance measurement to determine an out-of-position occupant is a minor software change and the addition of the driver system once a passenger system is in place, or vice versa, requires only additional transducers which are inexpensive in large quantities. Since both the driver and passenger systems can share the same electronics, there will be virtually no additional cost for electronic components.

In FIG. 26A, four ultrasonic transducers 224, 225, 226, and 227, are used to identify an object occupying the front passenger seat as described in U.S. Pat. No. 5,563,462 and U.S. Pat. No. 5,829,782. In this particular implementation, an additional transducer 224 is provided to improve the identification accuracy of the system. Ultrasonic transducers 228 and 229 are used to determine the distance from the transducers to the vehicle driver and ultrasonic transducers 230, 231 and 232 are used to measure the distance to the steering wheel mounted airbag module 51 and also to the driver. The second measurement of the driver's position is used to confirm the measurements obtained from transducers 228 and 229. The distance from the airbag can be calculated knowing the distance to the driver and the distance to the steering wheel 233. Other types of transducers or measurement devices could be used without deviating from the teachings of this invention. What is illustrated and taught here is that there are many applications requiring pattern recognition technologies which can be achieved very economically through shared pattern recognition computer facilities.

Since the cost of optical or camera systems have recently plummeted, this is now the technology of choice for occupant sensing. Such systems are described in detail in the U.S. patents referenced under this subject above. A single camera is, naturally, the least expensive solution but suffers from the problem that there is no easy method of obtaining three-dimensional information about people or objects that are occupying the passenger compartment. A second camera can be added but to locate the same objects or features in the two images by conventional methods is computationally intensive unless the two cameras are close together. If they are close together, however, then the accuracy of the three dimensional information is compromised. Also, if they are not close together, then the tendency is to add separate illumination for each camera. An alternate solution is to use two cameras located at different positions in the passenger compartment but to use a single lighting source. This source can be located adjacent to one camera to minimize the installation sites. Since the LED illumination is now more expensive than the imager, the cost of the second camera does not add significantly to the system cost. Correlation of features can then be done using pattern recognition systems such as neural networks. Two cameras also provide a significant protection from blockage and one or more additional cameras, with additional illumination, can be added to provide almost complete blockage protection.

Although some implementations of an occupant sensing system has been shown in FIGS. 26 and 26A, other types of transducers or measurement devices could be used without deviating from the teachings of this invention including, for example, laser radar, stereo and other 3D imaging techniques, radar, electric field, capacitance, weight distribution etc. (see, e.g., U.S. patent application Ser. No. 10/413,426).

In FIG. 27, an occupant position sensor arrangement 241, 242 located in a headrest 240 of an automobile seat is illustrated. Such a sensor arrangement 241, 242 can be used to automatically position the headrest 240 for protection of occupants in rear impacts, as part of a system to automatically adjust the position of the seat based on the morphology of the occupant, and to monitor the position of the head in the event of a frontal impact. In each case, the sensor may interface with the neural network computer system that is used for crash sensing. In the case of rear impact protection, for example, the neural computer, using information from the accelerometers, may determine that a rear impact is in progress and command the headrest to move closer to the occupant's head. If an anticipatory sensor is used for predicting a rear impact, the neural computer can be used to identify the approaching object and decide if positioning the headrest is warranted. When the longitudinal position of the occupant's head is monitored, then the neural crash sensor would take this into account along with other occupant position information, if available, when determining whether to deploy the airbag if the occupant is out-of-position.

Other sensors which can be added to this system include those which measure the position of the seat, position of the seat back, weight of the occupant, height of the occupant, seatbelt spool out, seatbelt buckle engagement etc. The headrest position adjustment can be accomplished in a number of ways including motors and an associated mechanism such as a four-bar or other linkage.

4.3 Controlling Airbag Inflation

Figure 28:
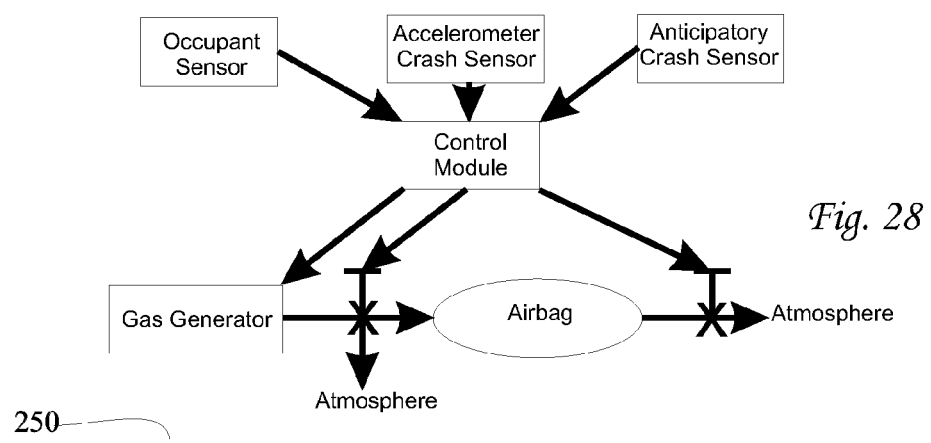
FIG. 28 is a schematic diagram showing a Phase 4 Smart Airbag System.

A schematic of an airbag gas control system in illustrated in FIG. 28 and follows the description presented above. Data from the occupant, accelerometer(s), gyroscope(s), if present, and anticipatory sensor(s) are fed into the control module which controls one or more of: (i) the quantity of gas produced by the gas generator, (ii) the flow of the gas from the gas generator into the airbag or, alternately, the flow of a portion of the gas from the gas generator to the atmosphere before it enters the airbag, and (iii) the flow of the gas out of the airbag into the atmosphere.

One issue that remains to be discussed is to derive the relationship between the gas controller setting and the desired volume or quantity of gas in the airbag. Generally, for a low velocity, long duration threshold crash, for a small light weight out-of-position occupant, the airbag should be inflated slowly with a relatively small amount of gas and the outflow of gas from the airbag should be controlled so a minimum value constant pressure is maintained as the occupant just contacts the vehicle interior at the end of the crash.

Similarly, for a high velocity crash with large heavy occupant, positioned far from the airbag before deployment is initiated, but with a significant forward relative velocity due to pre-crash braking, the airbag should be deployed rapidly with a high internal pressure and an outflow control which maintains a high pressure in the airbag as the occupant exhausts the airbag to the point where he almost contacts the interior vehicle surfaces at the end of the crash. These situations are quite different and require significantly different flow rates into and/or out of the airbag. As crash variability is introduced such as where a vehicle impacts a pole in front of a barrier, the gas flow decisions may be changed during the crash.

The neural network crash sensor has the entire history of the crash at each point in time and therefore knows what instructions it gave to the gas controller during previous portions of the crash. It therefore knows what new instructions to give the controller to account for new information. The problem is to determine the controller function when the occupant parameters and crash-forecasted severity are known. This requires the use of an occupant crash simulation program such as Madymo™ from TNO in Delft, The Netherlands, along with a model of the gas control module.

A series of simulations are run with various settings of the controllable parameters such as the gas generation rate, gas inflow and gas outflow restriction until acceptable results are obtained and the results stored for that particular crash and occupant situation. In each case, the goal may be to maintain a constant pressure within the airbag during the crash once the initial deployment has occurred. Those results for each point in time are converted to a number and that number is the desired output of the neural network used during the training. A more automated approach is to couple the simulation model with the neural network training program so that the desired results for the training are generated automatically.

Thus, as a particular case is being prepared as a training vector, the Madymo program is run which automatically determines the settings for the particular gas control module, through a trial and error process, and these settings are converted to a number and normalized, with the normalized number becoming the desired output value of the output node of the neural network. The above discussion is for illustration purposes only and there are many ways that the interface between the neural network system and the gas controller can be designed. The descriptions above have concentrated on the control of the gas flows into and out of an airbag. Other parts of the occupant restraint system can also be controlled in a similar manner as the gas flows are controlled. In particular, various systems are now in use and others are being developed for controlling the force applied to the occupant by the seatbelt. In this case, it is desired to maintain a constant acceleration to the occupant depending on the crash severity. Such systems can use retractors or pretensioners, others use methods of limiting the maximum force exerted by the seatbelt, while still others apply damping or energy absorbing devices to provide a velocity sensitive force to the occupant.

A preferred approach, as disclosed in U.S. patent application Ser. No. 10/413,426, uses a method of measuring the acceleration of the occupant, or some part such as his or her chest, and a mechanism that controls the spool out of the seatbelt to maintain the chest acceleration, for example, to an appropriate limit such as 40 Gs. To the extent that these systems can be actively controlled by the restraint system based on the pattern recognition techniques described herein, they are contemplated by this invention.

Also, the crash accelerometer(s), gyroscopes and occupant sensors have been the main inputs to the pattern recognition system as described above. This invention also contemplates the use of other available information such as seatbelt use, seat position, seat back position, vehicle velocity etc. as additional inputs into the pattern recognition system for particular applications depending on the availability of such information.

4.4 Diagnostics

For a variety of reasons, placement of electronic components in or near the airbag module is desirable. Placement of the occupant sensing as well as the diagnostics electronics within or adjacent to the airbag module has advantages to solving several current airbag problems. For example, there have been numerous inadvertent airbag deployments caused by wires in the system becoming shorted. Then, when the vehicle hits a pothole, which is sufficient to activate the arming sensor or otherwise disturb the sensing system, the airbag deploys. Such an unwanted deployment of course can directly injure an occupant who is out-of-position or cause an accident that results in occupant injuries. If the sensor were to send a coded signal to the airbag module rather than a DC voltage with sufficient power to trigger the airbag, and if the airbag module had stored within its electronic circuit sufficient energy to initiate the inflator, then these unwanted deployments would be prevented. A shorted wire cannot send a coded signal and the short can be detected by the module resident diagnostic circuitry.

This makes it desirable for the airbag module contain the backup power supply which further improves the reliability of the system since the electrical connection to the sensor, or to the vehicle power, can now partially fail, as might happen during an accident, and the system will still work properly. It is well known that the electrical resistance in the "clockspring" connection system, which connects the steering wheel mounted airbag module to the sensor and diagnostic system, is marginal in design and prone to failure. The resistance of this electrical connection must be very low or there will not be sufficient power to reliably initiate the inflator squib. To reduce the resistance to the level required, high quality gold plated connectors are used and the wires must also be of unusually high quality. Due to space constraints, however, these wires have only a marginally adequate resistance thereby reducing the reliability of the driver airbag module and increasing its cost. If, on the other hand, the power to initiate the airbag were already in the module, then only a coded signal need be sent to the module rather than sufficient power to initiate the inflator. Thus, the resistance problem disappears and the module reliability is increased. Additionally, the requirements for the clockspring wires become less severe and the design can be relaxed reducing the cost and complexity of the device. It may even be possible to return to the slip ring system that existed prior to the implementation of airbags.

Under this system, the power supply can be charged over a few seconds, since the power does not need to be sent to the module at the time of the required airbag deployment because it is already there. Thus, all of the electronics associated with the airbag system except the sensor and its associated electronics, if any, would be within or adjacent to the airbag module. This includes optionally the occupant sensor, the diagnostics and the backup power supply, which now becomes the primary power supply, and the need for a backup disappears. When a fault is detected a message is sent to a display unit located typically in the instrument panel.

Placement of the main electronics within each module follows the development path that computers themselves have followed from a large centralized mainframe base to a network of microcomputers. The computing power required by an occupant position sensor, airbag system diagnostics and backup power supply is greater than that required by a single point sensor. For this reason, it is more logical to put this electronic package within or adjacent to each module. In this manner, the advantages of a centralized single point sensor and diagnostic system fade since most of the intelligence will reside within or adjacent to the individual modules and not the centralized system. A simple and more effective CrushSwitch sensor such as disclosed in U.S. Pat. No. 5,441,301, for example, now becomes more cost effective than the single point sensor and diagnostic system which is now being widely adopted. Finally, this also is consistent with the migration to a bus system where the power and information are transmitted around the vehicle on a single bus system thereby significantly reducing the number of wires and the complexity of the vehicle wiring system. The decision to deploy an airbag is sent to the airbag module sub-system as a signal not as a burst of power. Although it has been assumed that the information would be sent over a wire bus, it is also possible to send the deploy command by a variety of wireless methods.

A partial implementation of the system as just described is depicted schematically in FIG. 67 which shows a view of the combination of an occupant position sensor and airbag module designed to prevent the deployment of the airbag for a seat which is unoccupied or if the occupant is too close to the airbag and therefore in danger of deployment induced injury. The module, shown generally at 550, includes a housing which comprises an airbag 551, an inflator assembly 552 for the airbag 551, an occupant position sensor comprising an ultrasonic transmitter 553 and an ultrasonic receiver 554. Other occupant position sensors can also be used instead of the ultrasonic transmitter/receiver pair to determine the position of the occupant to be protected by the airbag 551, and also the occupant position sensor may be located outside of the housing of the module 550. The housing of the module 550 also contains an electronic module or package 555 coupled to each of the inflator assembly 552, the transmitter 553 and the receiver 554 and which performs the functions of sending the ultrasonic signal to the transmitter 553 and processing the data from the occupant position sensor receiver 554. Electronics module 555 may be arranged within the housing of the module 550 as shown or adjacent or proximate the housing of the module 550. Module 550 also contains a power supply (not shown) for supplying power upon command by the electronics module 555 to the inflator assembly 552 to cause inflation of the airbag 551. Thus, electronics module 555 controls the inflation or deployment of the airbag 551 and may sometimes herein be referred to as a controller or control unit. In addition, the electronic module 555 monitors the power supply voltage, to assure that sufficient energy is stored to initiate the inflator assembly 552 when required, and power the other processes, and reports periodically over the vehicle bus 556 to the central diagnostic module, shown schematically at 557, to indicate that the module is ready, i.e., there is sufficient power of inflate or deploy the airbag 551 and operate the occupant position sensor transmitter/receiver pair, or sends a fault code if a failure in any component being monitored has been detected. A CrushSwitch sensor is also shown schematically at 558, which is the only discriminating sensor in the system. Sensor 558 is coupled to the vehicle bus 556 and transmits a coded signal over the bus to the electronics module 555 to cause the electronics module 555 to initiate deployment of the airbag 551 via the inflator assembly 552.

The vehicle bus 556 connects the electronic package 555, the central sensor and diagnostic module 557 and the Crush-Switch sensor 558. Bus 556 may be the single bus system, i.e., consists of a pair of wires, on which power and information are transmitted around the vehicle as noted immediately above. Instead of CrushSwitch sensor 558, other crash sensors may be used.

When several crash sensors and airbag modules are present in the vehicle, they can all be coupled to the same bus or discrete portions of the airbag modules and crash sensors can be coupled to separate buses. Other ways for connecting the crash sensors and airbag modules to an electrical bus can also be implemented in accordance with the invention such as connecting some of the sensors and/or modules in parallel to a bus and others daisy-chained into the bus. This type of bus architecture is described in U.S. Pat. No. 6,212,457, incorporated by reference herein.

It should be understood that airbag module 550 is a schematic representation only and thus, may represent any of the airbag modules described above in any of the mounting locations. For example, airbag module 550 may be arranged in connection with the seat 478 as module 477 is in FIG. 59. As such, the bus, which is connected to the airbag module 550, would inherently extend at least partially into and within the seat.

Another implementation of the invention incorporating the electronic components into and adjacent to the airbag module as illustrated in FIG. 68 which shows the interior front of the passenger compartment generally at 560. Driver airbag module 561 is partially cutaway to show an electronic module 562 incorporated within the airbag module 561. Electronic module 562 may be comparable to electronic module 555 in the embodiment of FIG. 67 in that it can control the deployment of the airbag in airbag module 561. Electronic airbag module 561 is connected to an electronic sensor illustrated generally as 566 by wire 563. The electronic sensor 566 is, e.g., an electronic single point crash sensor that initiates the deployment of the airbag when it senses a crash. Passenger airbag module 565 is illustrated with its associated electronic module 567 outside of but adjacent or proximate to the airbag module. Electronic module 567 may be comparable to electronic module 555 in the embodiment of FIG. 67 in that it can control the deployment of the airbag in airbag module 565. Electronic module 567 is connected by a wire 564, which could also be part of a bus, to the electronic sensor 566. One or both of the electronic modules 562, 567 can contain diagnostic circuitry, power storage capability (either a battery or a capacitor), occupant sensing circuitry, as well as communication electronic circuitry for either wired or wireless communication.

It should be understood that although only two airbag modules 561, 565 are shown, it is envisioned that an automotive safety network may be designed with several and/or different types of occupant protection devices. Such an automotive network would comprises one or more occupant protection devices connected to the bus, each comprising a housing and a component deployable to provide protection for the occupant, at least one sensor system for providing an output signal relevant to deployment of the deployable component(s) (such as the occupant sensing circuitry), a deployment determining system for generating a signal indicating for which of the deployable components deployment is desired (such as a crash sensor) and an electronic controller arranged in, proximate or adjacent each housing and coupled to the sensor system(s) and the deployment determining system. The electrical bus electrically couples the sensor system(s), the deployment determining system and the controllers so that the signals from one or more of the sensor systems and the deployment determining system are sent over the bus to the controllers. Each controller controls deployment of the deployable component of the respective occupant protection device in consideration of the signals from the sensor system(s) and the deployment determining system. The crash sensor(s) may be arranged separate and at a location apart from the housings and generate a coded signal when deployment of any one of the deployable components is desired. Thus, the coded signal varies depending on which of deployment components are to be deployed. If the deployable component is an airbag associated with the housing, the occupant protection device would comprise an inflator assembly arranged in the housing for inflating the airbag.

Several technologies have been described above all of which have the objective of improving the reliability and reducing the complexity of the wiring system in an automobile and particularly the safety system. Most importantly the bus technology described has as its objective simplification and increase in reliability of the vehicle wiring system. This wiring system was first conceived of as a method of permitting the location of airbag crash sensors at locations where they can most effectively sense a vehicle crash and yet permit that information to be transmitted to airbag control circuitry which may be located in a protective portion of the interior of the vehicle or may even be located on the airbag module itself. To protect this affirmation transmission requires a wiring system that is far more reliable and resistant to being destroyed in the vary crash that the sensor is sensing. This led to the realization that the data bus that carries the information from the crash sensor must be particularly reliable. Upon designing such a data bus, however, it was found that the capacity of that data bus far exceeded the needs of the crash sensor system. This then led to a realization that the capacity, or bandwidth, of such a bus would be sufficient to carry all of the vehicle information requirements. In some cases this requires the use of high bandwidth bus technology such as twisted pair wires, shielded twisted pair wires, or coax cable. If a subset of all of the vehicle devices is included on the bus, then the bandwidth requirements are less and simpler bus technologies can be used in place of the coax cable, for example. The economics that accompany a data bus design which has the highest reliability, highest bandwidth, is justified if all of the vehicle devices use the same system. This is where the greatest economies and greatest reliability occur. As described above, this permits, for example, placement of the airbag firing electronics into the same housing that contains the airbag inflator. Once the integrity of the data bus is assured, such that it will not be destroyed during the crash itself, then the proper place for the airbag intelligence is in the airbag module itself. This further proves the reliability of the system since the shorting of the wires to the airbag module will not inadvertently set off the airbag as has happened frequently in the past.

When operating on the vehicle data bus, each device should have a unique address and each associated device must know that address. For most situations, therefore, this address must be predetermined and the assigned through an agreed-upon standard for all vehicles. Thus, the left rear tail light must have a unique address so that when the turn signal is turned to flash that light it does not also flash the right tail light, for example. Similarly, the side impact crash sensor which will operate on the same data bus as the frontal impact crash sensor, must issue a command to the side impact airbag and not to the frontal impact airbag.

One of the key advantages of a single bus system connecting all sensors in the vehicle together is the possibility of using this data bus to diagnose the health of the entire vehicle, as described in the detail above. Thus, we can see the synergistic advantages of all the disparate technologies described above.

The design, construction, installation, and maintenance a vehicle data bus network requires attention to many issues, including: an appropriate communication protocol, physical layer transceivers for the selected media, capable microprocessors for both application and protocol execution, device controller hardware & software for the required sensors and actuators, etc. Such activities are known to those skilled in the art and will not be described in detail here.

An intelligent distributed system as described above can be based on the CAN Protocol, for example, which is a common protocol used in the automotive industry. CAN is a full function network protocol that provides both message checking and correction to insure communication integrity. Many of the devices on the system will have special diagnostics designed into them. For instance, some of the inflator controls can send warning messages if their backup power supply has insufficient charge. In order to assure the integrity and reliability of the bus system, most devices will be equipped with bi-directional communication as described above. Thus, when a message is sent to the rear right taillight to turn on, the light can return a message that it has executed the instruction.

A smart airbag system is really part of a general vehicle diagnostic system and many of the components that make up the airbag system and the rest of the vehicle diagnostic system can be shared. Therefore, we will now briefly discuss a general vehicle diagnostic system focusing on the interaction with the occupant restraint system. This description is taken from U.S. Pat. No. 6,484,080.

For the purposes herein the following terms are defined as follows:

The term "component" refers to any part or assembly of parts that is mounted to or a part of a motor vehicle and which is capable of emitting a signal representative of its operating state that can be sensed by any appropriate sensor. The following is a partial list of general automobile and truck components, the list not being exclusive:

Occupant restraints; engine; transmission; brakes and associated brake assembly; tires; wheel; steering wheel and steering column assembly; water pump; alternator; shock absorber; wheel mounting assembly; radiator; battery; oil pump; fuel pump; air conditioner compressor; differential gear; exhaust system; fan belts; engine valves; steering assembly; vehicle suspension including shock absorbers; vehicle wiring system; and engine cooling fan assembly.

The term "sensor" as used herein will generally refer to any measuring, detecting or sensing device mounted on a vehicle or any of its components including new sensors mounted in conjunction with the diagnostic module in accordance with the invention. A partial, non-exhaustive list of common sensors mounted on an automobile or truck is:

airbag crash sensor; accelerometer; microphone; camera; antenna; capacitance sensor or other electromagnetic wave sensor; stress or strain sensor; pressure sensor; weight sensor; magnetic field or flux sensor; coolant thermometer; oil pressure sensor; oil level sensor; air flow meter; voltmeter; ammeter; humidity sensor; engine knock sensor; oil turbidity sensor; throttle position sensor; steering wheel torque sensor; wheel speed sensor; tachometer; speedometer; other velocity sensors; other position or displacement sensors; oxygen sensor; yaw, pitch and roll angular sensors; clock; odometer; power steering pressure sensor; pollution sensor; fuel gauge; cabin thermometer; transmission fluid level sensor; gyroscopes or other angular rate sensors including yaw, pitch and roll rate sensors; coolant level sensor; transmission fluid turbidity sensor; break pressure sensor; tire pressure sensor; tire temperature sensor; tire acceleration sensor; GPS receiver; DGPS receiver; coolant pressure sensor; occupant position sensor; and occupant weight sensor.

The term "actuator" as used herein will generally refer to a device that performs some action upon receiving the proper signal. Examples of actuators include:

window motor; door opening and closing motor; electric door lock; deck lid lock; airbag inflator initiator; fuel injector; brake valves; pumps; relays; and steering assist devices.

The term "signal" as used herein will generally refer to any time varying output from a component including electrical, acoustic, thermal, or electromagnetic radiation, or mechanical vibration.

Sensors on a vehicle are generally designed to measure particular parameters of particular vehicle components. However, frequently these sensors also measure outputs from other vehicle components. For example, electronic airbag crash sensors currently in use contain an accelerometer for determining the accelerations of the vehicle structure so that the associated electronic circuitry of the airbag crash sensor can determine whether a vehicle is experiencing a crash of sufficient magnitude so as to require deployment of the airbag.

An IMU using up to three accelerometers and up to three gyroscopes can also be used. This accelerometer continuously monitors the vibrations in the vehicle structure regardless of the source of these vibrations. If a wheel is out-of-balance or delaminating, or if there is extensive wear of the parts of the front wheel mounting assembly, or wear in the shock absorbers, the resulting abnormal vibrations or accelerations can, in many cases, be sensed by the crash sensor accelerometer. There are other cases, however, where the sensitivity or location of the airbag crash sensor accelerometer is not appropriate and one or more additional accelerometers and/or gyroscopes or IMU may be mounted onto a vehicle for the purposes of this invention. Some airbag crash sensors are not sufficiently sensitive accelerometers or have sufficient dynamic range for the purposes herein.

Every component of a vehicle emits various signals during its life. These signals can take the form of electromagnetic radiation, acoustic radiation, thermal radiation, electric or magnetic field variations, vibrations transmitted through the vehicle structure, and voltage or current fluctuations, depending on the particular component. When a component is functioning normally, it may not emit a perceptible signal. In that case, the normal signal is no signal, i.e., the absence of a signal. In most cases, a component will emit signals that change over its life and it is these changes that contain information as to the state of the component, e.g., whether failure of the component is impending. Usually components do not fail without warning. However, most such warnings are either not perceived or if perceived are not understood by the vehicle operator until the component actually fails and, in some cases, a breakdown of the vehicle occurs. In a few years, it is expected that various roadways will have systems for automatically guiding vehicles operating thereon. Such systems have been called "smart highways" and are part of the field of intelligent transportation systems (ITS). If a vehicle operating on such a smart highway were to breakdown, serious disruption of the system could result and the safety of other users of the smart highway could be endangered.

As discussed in detail above, accelerometers are routinely used mounted outside of the crush zone for sensing the failure of the vehicle, that is, a crash of the vehicle. Looking at this in general terms, there is synergy between the requirements of sensing the status of the whole vehicle as well as its components and the same sensors can often be used for multiple purposes. The output of a microphone mounted in the vehicle could be used to help determine the existence and severity of a crash, for example.

In accordance with the invention, each of these signals emitted by the vehicle components is converted into electrical signals and then digitized (i.e., the analog signal is converted into a digital signal) to create numerical time series data that is then entered into a processor. Pattern recognition algorithms are then applied in the processor to attempt to identify and classify patterns in this time series data. For a particular component, such as a tire for example, the algorithm attempts to determine from the relevant digital data whether the tire is functioning properly and/or whether it requires balancing, additional air, or perhaps replacement. Future systems may bypass the A/D conversion and operate directly on the analog signals. Optical correlation systems are now used by the military that create the Fourier transform of an image directly using diffraction gratings and compare the image with a stored image.

Frequently, the data entered into the computer needs to be pre-processed before being analyzed by a pattern recognition algorithm. The data from a wheel speed sensor, for example, might be used as is for determining whether a particular tire is operating abnormally in the event it is unbalanced, whereas the integral of the wheel speed data over a long time period (integration being a pre-processing step), when compared to such sensors on different wheels, might be more useful in determining whether a particular tire is going flat and therefore needs air.

In some cases, the frequencies present in a set of data are a better predictor of component failures than the data itself. For example, when a motor begins to fail due to worn bearings, certain characteristic frequencies began to appear. In most cases, the vibrations arising from rotating components, such as the engine, will be normalized based on the rotational frequency as disclosed in a recent NASA TSP. Moreover, the identification of which component is causing vibrations present in the vehicle structure can frequently be accomplished through a frequency analysis of the data. For these cases, a Fourier transformation of the data is made prior to entry of the data into a pattern recognition algorithm. As mentioned above, optical correlations systems using Fourier transforms can also be applicable.

Other mathematical transformations are also made for particular pattern recognition purposes in practicing the teachings of this invention. Some of these include shifting and combining data to determine phase changes for example, differentiating the data, filtering the data, and sampling the data. Also, there exist certain more sophisticated mathematical operations that attempt to extract or highlight specific features of the data. This invention contemplates the use of a variety of these preprocessing techniques, and combinations thereof, and the choice of which one or ones is left to the skill of the practitioner designing a particular diagnostic module.

Another technique that is contemplated for some implementations of this invention is the use of multiple accelerometers and/or microphones that allow the system to locate the source of any measured vibrations based on the time of flight, or time of arrival of a signal at different locations, and/or triangulation techniques. Once a distributed accelerometer installation has been implemented to permit this source location, the same sensors can be used for smarter crash sensing as it will permit the determination of the location of the impact on the vehicle. Once the impact location is known, a highly tailored algorithm can be used to accurately forecast the crash severity making use of knowledge of the force vs. crush properties of the vehicle at the impact location.

When a vehicle component begins to change its operating behavior, it is not always apparent from the particular sensors, if any, which are monitoring that component. Output from any one of these sensors can be normal even though the component is failing. By analyzing the output of a variety of sensors, however, the pending failure can be diagnosed. For example, the rate of temperature rise in the vehicle coolant, if it were monitored, might appear normal unless it were known that the vehicle was idling and not traveling down a highway at a high speed. Even the level of coolant temperature which is in the normal range could in fact be abnormal in some situations signifying a failing coolant pump, for example, but not detectable from the coolant thermometer alone.

Pending failure of some components is difficult to diagnose and sometimes the design of the component requires modification so that the diagnosis can be more readily made. A fan belt, for example, frequently begins failing by a cracking of the inner surface. The belt can be designed to provide a sonic or electrical signal when this cracking begins in a variety of ways. Similarly, coolant hoses can be designed with an intentional weak spot where failure will occur first in a controlled manner that can also cause a whistle sound as a small amount of steam exits from the hose. This whistle sound can then be sensed by a general purpose microphone, for example.

A connector for joining two coaxial cables 36 and 37 is illustrated in FIGS. 69A, 69B, 69C and 69D generally as 35. A cover 35a is hingably attached to a base 38. A connector plate 40 is slidably inserted into base 38 and contains two abrasion and connection sections 42 and 43. A second connecting plate 44 contains two connecting pins 41, one corresponding to each cable to be connected. To connect the two cables 36 and 37 together, they are first inserted into their respective holes 45 and 46 in base 38 until they are engaged by pins 41. Sliding connector plate 40 is then inserted and cover 40a rotated pushing connector plate 40 downward until the catch 47 snaps over mating catch 48. Other latching arrangements are of course usable in accordance with the invention. During this process, the serrated part 42 of connector plate 45 abrades the insulating cover off of the outside of the respective cable exposing the outer conductor. The particle-coated section 43 of connector plate 40 then engages and makes electrical contact with the outer conductor of the coaxial cables 36 and 37. In this manner, the two coaxial cables 36, 37 are electrically connected together in a very simple manner.

Figure 29:
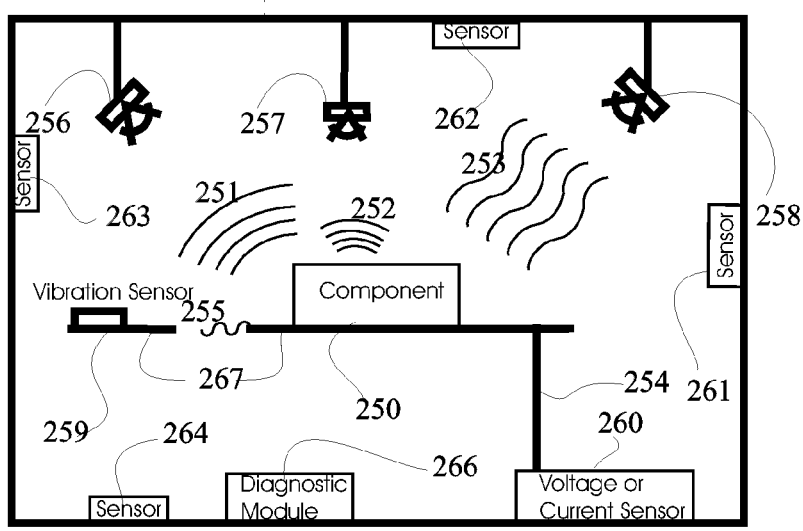
FIG. 29 is a schematic illustration of a generalized component with several signals being emitted and transmitted along a variety of paths, sensed by a variety of sensors and analyzed by the diagnostic module in accordance with the invention and for use in a method in accordance with the invention.

In FIG. 29, a generalized component 250 emitting several signals that are transmitted along a variety of paths, sensed by a variety of sensors and analyzed by the diagnostic device in accordance with the invention is illustrated schematically. Component 250 is mounted to a vehicle and during operation, it emits a variety of signals such as acoustic 251, electromagnetic radiation 252, thermal radiation 253, current and voltage fluctuations in conductor 254 and mechanical vibrations 255. Various sensors are mounted in the vehicle to detect the signals emitted by the component 250. These include one or more vibration sensors (accelerometers) 259, 261 and/or gyroscopes also mounted to the vehicle, one or more acoustic sensors 256, 262, electromagnetic radiation sensor 257, heat radiation sensor 258, and voltage or current sensor 260. In addition, various other sensors 263, 264 measure other parameters of other components that in some manner provide information directly or indirectly on the operation of component 250.

All of the sensors illustrated on FIG. 29 can be connected to a data bus 265. A diagnostic module 266, in accordance with the invention, can also be attached to the vehicle data bus 265 and receives the signals generated by the various sensors. The sensors may however be wirelessly connected to the diagnostic module 266 and be integrated into a wireless power and communications system or a combination of wired and wireless connections.

As shown in FIG. 29, the diagnostic module 266 has access to the output data of each of the sensors that have potential information relative to the component 250. This data appears as a series of numerical values each corresponding to a measured value at a specific point in time. The cumulative data from a particular sensor is called a time series of individual data points. The diagnostic module 266 compares the patterns of data received from each sensor individually, or in combination with data from other sensors, with patterns for which the diagnostic module 266 has been trained to determine whether the component 250 is functioning normally or abnormally. Note that although a general vehicle component diagnostic system is being described, the state of some vehicle components can provide information to the vehicle safety system. A tire failure, for example, can lead to a vehicle rollover.

Important to this invention is the manner in which the diagnostic module 266 determines a normal pattern from an abnormal pattern and the manner in which it decides what data to use from the vast amount of data available. This is accomplished using pattern recognition technologies such as artificial neural networks and training. The theory of neural networks including many examples can be found in several books on the subject as discussed above. The neural network pattern recognition technology is one of the most developed of pattern recognition technologies. The neural network will be used here to illustrate one example of a pattern recognition technology but it is emphasized that this invention is not limited to neural networks. Rather, the invention may apply any known pattern recognition technology including sensor fusion and various correlation technologies. A brief description of the neural network pattern recognition technology is set forth below.

Neural networks are constructed of processing elements known as neurons that are interconnected using information channels call interconnects. Each neuron can have multiple inputs but generally only one output. Each output however is connected to all other neurons in the next layer. Neurons in the first layer operate collectively on the input data as described in more detail below. Neural networks learn by extracting relational information from the data and the desired output. Neural networks have been applied to a wide variety of pattern recognition problems including automobile occupant sensing, speech recognition, optical character recognition, and handwriting analysis.

To train a neural network, data is provided in the form of one or more time series that represents the condition to be diagnosed as well as normal operation. As an example, the simple case of an out-of-balance tire will be used. Various sensors on the vehicle can be used to extract information from signals emitted by the tire such as an accelerometer, a torque sensor on the steering wheel, the pressure output of the power steering system, a tire pressure monitor or tire temperature monitor. Other sensors that might not have an obvious relationship to an unbalanced tire are also included such as, for example, the vehicle speed or wheel speed. Data is taken from a variety of vehicles where the tires were accurately balanced under a variety of operating conditions also for cases where varying amounts of unbalance was intentionally introduced.

Once the data has been collected, some degree of preprocessing or feature extraction is usually performed to reduce the total amount of data fed to the neural network. In the case of the unbalanced tire, the time period between data points might be chosen such that there are at least ten data points per revolution of the wheel. For some other application, the time period might be one minute or one millisecond.

Once the data has been collected, it is processed by a neural network-generating program, for example, if a neural network pattern recognition system is to be used. Such programs are available commercially, e.g., from NeuralWare of Pittsburgh, Pa. The program proceeds in a trial and error manner until it successfully associates the various patterns representative of abnormal behavior, an unbalanced tire, with that condition. The resulting neural network can be tested to determine if some of the input data from some of the sensors, for example, can be eliminated. In this way, the engineer can determine what sensor data is relevant to a particular diagnostic problem. The program then generates an algorithm that is programmed onto a microprocessor, microcontroller, neural processor, or DSP (herein collectively referred to as a microprocessor or processor). Such a microprocessor appears inside the diagnostic module 266 in FIG. 29.

Once trained, the neural network, as represented by the algorithm, will now operationally recognize an unbalanced tire on a vehicle when this event occurs. At that time, when the tire is unbalanced, the diagnostic module 266 will output a signal indicative of the unbalanced tire, such as a signal to be sent to an output device which provides a message to the driver indicating that the tire should be now be balanced as described in more detail below. The message to the driver is provided by an output device coupled to or incorporated within the module 266 and may be, e.g., a light on the dashboard, a vocal tone or any other recognizable indication apparatus. Messages can also be transmitter to others outside of the vehicle such as other vehicles or to a vehicle dealer. In some cases, control of the vehicle may be taken over by a vehicle system in response to a message. In some cases, the vehicle component failure portends an oncoming accident and one or more parts of the restraint system can be deployed.

It is important to note that there may be many neural networks involved in a total vehicle diagnostic system. These can be organized either in parallel, series, as an ensemble, cellular neural network or as a modular neural network system. In one implementation of a modular neural network, a primary neural network identifies that there is an abnormality and tries to identify the likely source. Once a choice has been made as to the likely source of the abnormality, another of a group of neural networks is called upon to determine the exact cause of the abnormality. In this manner, the neural networks are arranged in a tree pattern with each neural network trained to perform a particular pattern recognition task.

Discussions on the operation of a neural network can be found in the above references on the subject and are well understood by those skilled in the art. Neural networks are the most well-known of the pattern recognition technologies based on training, although neural networks have only recently received widespread attention and have been applied to only very limited and specialized problems in motor vehicles. Other non-training based pattern recognition technologies exist, such as fuzzy logic. However, the programming required to use fuzzy logic, where the patterns must be determined by the programmer, render these systems impractical for general vehicle diagnostic problems such as described herein. Therefore, preferably the pattern recognition systems that learn by training are used herein. On the other hand, the combination of neural networks and fuzzy logic, such as in a Neural-Fuzzy system, are applicable and can result in superior results.

The neural network is the first highly successful of what will be a variety of pattern recognition techniques based on training. There is nothing that suggests that it is the only or even the best technology. The characteristics of all of these technologies which render them applicable to this general diagnostic problem include the use of time-based input data and that they are trainable. In all cases, the pattern recognition technology learns from examples of data characteristic of normal and abnormal component operation.

A diagram of one example of a neural network used for diagnosing an unbalanced tire, for example, based on the teachings of this invention is shown in FIG. 2 (discussed above). The process can be programmed to periodically test for an unbalanced tire. Since this need be done only infrequently, the same processor can be used for many such diagnostic problems. When the particular diagnostic test is run, data from the previously determined relevant sensors is preprocessed and analyzed with the neural network algorithm. For the unbalanced tire, using the data from an accelerometer for example, the digital acceleration values from the analog to digital converter in the accelerometer are entered into nodes 1 through n and the neural network algorithm compares the pattern of values on nodes 1 through n with patterns for which it has been trained as follows.

Each of the input nodes is connected to each of the second layer nodes, h-1, h-2, . . . , h-n, called the hidden layer, either electrically as in the case of a neural computer, or through mathematical functions containing multiplying coefficients called weights, in the manner described in more detail in the above references. At each hidden layer node, a summation occurs of the values from each of the input layer nodes, which have been operated on by functions containing the weights, to create a node value. Similarly, the hidden layer nodes are in like manner connected to the output layer node(s), which in this example is only a single node O representing the decision to notify the driver of the unbalanced tire. During the training phase, an output node value of 1, for example, is assigned to indicate that the driver should be notified and a value of 0 is assigned to not providing an indication to the driver. Once again, the details of this process are described in above-referenced texts and will not be presented in detail here.

In the example above, twenty input nodes were used, five hidden layer nodes and one output layer node. In this example, only one sensor was considered and accelerations from only one direction were used. If other data from other sensors such as accelerations from the vertical or lateral directions were also used, then the number of input layer nodes would increase. Again, the theory for determining the complexity of a neural network for a particular application has been the subject of many technical papers and will not be presented in detail here. Determining the requisite complexity for the example presented here can be accomplished by those skilled in the art of neural network design. For an example of the use of a neural network crash sensor algorithm, see U.S. Pat. No. 5,684,701. Note that the inventors of this invention contemplate all combinations of the teachings of the '701 patent and those described herein.

It is also possible to apply modular neural networks in accordance with the invention wherein several neural network are trained, each having a specific function relating to the detection of the abnormality in the operation of the component. The particular neural network(s) used, i.e., those to which input is provided or from which output is used, can be determined based on the measurements by one or more of the sensors.

Briefly, the neural network described above defines a method, using a pattern recognition system, of sensing an unbalanced tire and determining whether to notify the driver and comprises:

(a) obtaining an acceleration signal from an accelerometer mounted on a vehicle;

(b) converting the acceleration signal into a digital time series;

(c) entering the digital time series data into the input nodes of the neural network;

(d) performing a mathematical operation on the data from each of the input nodes and inputting the operated on data into a second series of nodes wherein the operation performed on each of the input node data prior to inputting the operated on value to a second series node is different from (e.g. may employ a different weight) that operation performed on some other input node data;

(e) combining the operated on data from all of the input nodes into each second series node to form a value at each second series node;

(f) performing a mathematical operation on each of the values on the second series of nodes and inputting this operated on data into an output series of nodes wherein the operation performed on each of the second series node data prior to inputting the operated on value to an output series node is different from that operation performed on some other second series node data;

(g) combining the operated on data from all of the second series nodes into each output series node to form a value at each output series node; and (h) notifying a driver or taking some other action if the value on one output series node is within a selected range signifying that a tire requires balancing.

This method can be generalized to a method of predicting that a component of a vehicle will fail comprising:

(a) sensing a signal emitted from the component;

(b) converting the sensed signal into a digital time series;

(c) entering the digital time series data into a pattern recognition algorithm;

(d) executing the pattern recognition algorithm to determine if there exists within the digital time series data a pattern characteristic of abnormal operation of the component; and (e) notifying a driver or taking some other action, including, in some cases, deployment of an occupant restraint system, if the abnormal pattern is recognized.

The particular neural network described above contains a single series of hidden layer nodes. In some network designs, more than one hidden layer is used, although only rarely will more than two such layers appear. There are of course many other variations of the neural network architecture illustrated above which appear in the referenced literature. For the purposes herein, therefore, "neural network" will be defined as a system wherein the data to be processed is separated into discrete values which are then operated on and combined in at least a two-stage process and where the operation performed on the data at each stage is, in general, different for each discrete value and where the operation performed is at least determined through a training process.

Implementation of neural networks can take on at least two forms, an algorithm programmed on a digital microprocessor, DSP or in a neural computer. In this regard, it is noted that neural computer chips are now becoming available.

In the example above, only a single component failure was discussed using only a single sensor since the data from the single sensor contains a pattern which the neural network was trained to recognize as either normal operation of the component or abnormal operation of the component. The diagnostic module 266 contains preprocessing and neural network algorithms for a number of component failures. The neural network algorithms are generally relatively simple, requiring only a few hundred lines of computer code. A single general neural network program can be used for multiple pattern recognition cases by specifying different coefficients for various terms, one set for each application. Thus, adding different diagnostic checks has only a small affect on the cost of the system. Also, the system has available to it all of the information available on the data bus. During the training process, the pattern recognition program sorts out from the available vehicle data on the data bus or from other sources, those patterns that predict failure of a particular component. Sometimes more than one data bus is used. For example, in some cases, there is a general data bus and one reserved for safety systems. Any number of data buses can of course be monitored.

In FIG. 30, a schematic of a vehicle with several components and several sensors in their approximate locations on a vehicle is shown along with a total vehicle diagnostic system in accordance with the invention utilizing a diagnostic module in accordance with the invention. A flow diagram of information passing from the various sensors shown on FIG. 30 onto a vehicle data bus and thereby into the diagnostic device in accordance with the invention is shown in FIG. 31 along with outputs to a display 278 for notifying the driver and/or to the vehicle cellular phone 279, or other communication device, for notifying the dealer, vehicle manufacturer or other entity concerned with the failure of a component in the vehicle including the vehicle itself such as occurs in a crash. If the vehicle is operating on a smart highway, for example, the pending component failure information may also be communicated to a highway control system and/or to other vehicles in the vicinity so that an orderly exiting of the vehicle from the smart highway can be facilitated. FIG. 31 also contains the names of the sensors shown numbered on FIG. 30.

Sensor 1 is a crash sensor having an accelerometer (alternately one or more dedicated accelerometers can be used), sensor 2 is represents one or more microphones, sensor 3 is a coolant thermometer, sensor 4 is an oil pressure sensor, sensor 5 is an oil level sensor, sensor 6 is an air flow meter, sensor 7 is a voltmeter, sensor 8 is an ammeter, sensor 9 is a humidity sensor, sensor 10 is an engine knock sensor, sensor 11 is an oil turbidity sensor, sensor 12 is a throttle position sensor, sensor 13 is a steering torque sensor, sensor 14 is a wheel speed sensor, sensor 15 is a tachometer, sensor 16 is a speedometer, sensor 17 is an oxygen sensor, sensor 18 is a pitch/roll sensor, sensor 19 is a clock, sensor 20 is an odometer, sensor 21 is a power steering pressure sensor, sensor 22 is a pollution sensor, sensor 23 is a fuel gauge, sensor 24 is a cabin thermometer, sensor 25 is a transmission fluid level sensor, sensor 26 is a yaw sensor, sensor 27 is a coolant level sensor, sensor 28 is a transmission fluid turbidity sensor, sensor 29 is brake pressure sensor and sensor 30 is a coolant pressure sensor. Other possible sensors include a temperature transducer, a pressure transducer, a liquid level sensor, a flow meter, a position sensor, a velocity sensor, a RPM sensor, a chemical sensor and an angle sensor, angular rate sensor or gyroscope.

If a distributed group of acceleration sensors or accelerometers are used to permit a determination of the location of a vibration source, the same group can, in some cases, also be used to measure the pitch, yaw and/or roll of the vehicle eliminating the need for dedicated angular rate sensors. In addition, as mentioned above, such a suite of sensors can also be used to determine the location and severity of a vehicle crash and additionally to determine that the vehicle is on the verge of rolling over. Thus, the same suite of accelerometers optimally performs a variety of functions including inertial navigation, crash sensing, vehicle diagnostics, roll over sensing etc.

Consider now some examples. The following is a partial list of potential component failures and the sensors from the list on FIG. 31 that might provide information to predict the failure of the component:

| | |
|---|---|
| Vehicle crash | 1, 2, 14, 16, 18, 26, 31, 32, 33 |
| Vehicle Rollover | 1, 2, 14, 16, 18, 26, 31, 32, 33 |
| Out of balance tires | 1, 13, 14, 15, 20, 21 |
| Front end out of alignment | 1, 13, 21, 26 |
| Tune up required | 1, 3, 10, 12, 15, 17, 20, 22 |
| Oil change needed | 3, 4, 5, 11 |
| Motor failure | 1, 2, 3, 4, 5, 6, 10, 12, 15, 17, 22 |
| Low tire pressure | 1, 13, 14, 15, 20, 21 |
| Front end looseness | 1, 13, 16, 21, 26 |
| Cooling system failure | 3, 15, 24, 27, 30 |
| Alternator problems | 1, 2, 7, 8, 15, 19, 20 |
| Transmission problems | 1, 3, 12, 15, 16, 20, 25, 28 |
| Differential problems | 1, 12, 14 |
| Brakes | 1, 2, 14, 18, 20, 26, 29 |
| Catalytic converter and muffler | 1, 2, 12, 15, 22 |
| Ignition | 1, 2, 7, 8, 9, 10, 12, 17, 23 |
| Tire wear | 1, 13, 14, 15, 18, 20, 21, 26 |
| Fuel leakage | 20, 23 |
| Fan belt slippage | 1, 2, 3, 7, 8, 12, 15, 19, 20 |
| Alternator deterioration | 1, 2, 7, 8, 15, 19 |
| Coolant pump failure | 1, 2, 3, 24, 27, 30 |
| Coolant hose failure | 1, 2, 3, 27, 30 |
| Starter failure | 1, 2, 7, 8, 9, 12, 15 |
| Dirty air filter | 2, 3, 6, 11, 12, 17, 22 |

Several interesting facts can be deduced from a review of the above list. First, all of the failure modes listed can be at least partially sensed by multiple sensors. In many cases, some of the sensors merely add information to aid in the interpretation of signals received from other sensors. In today's automobile, there are few if any cases where multiple sensors are used to diagnose or predict a problem. In fact, there is virtually no failure prediction undertaken at all. Second, many of the failure modes listed require information from more than one sensor. Third, information for many of the failure modes listed cannot be obtained by observing one data point in time as is now done by most vehicle sensors. Usually, an analysis of the variation in a parameter as a function of time is necessary. In fact, the association of data with time to create a temporal pattern for use in diagnosing component failures in automobile is believed to be unique to this invention as is the combination of several such temporal patterns. Fourth, the vibration measuring capability of the airbag crash sensor, or other accelerometer, is useful for most of the cases discussed above yet, at the time of this invention, there was no such use of accelerometers except as non-crush zone mounted crash sensors. The airbag crash sensor is used only to detect crashes of the vehicle. Fifth, the second most-used sensor in the above list, a microphone, does not currently appear on any automobiles yet sound is the signal most often used by vehicle operators and mechanics to diagnose vehicle problems. Another sensor that is listed above which also did not currently appear on automobiles at the time of this invention is a pollution sensor. This is typically a chemical sensor mounted in the exhaust system for detecting emissions from the vehicle. It is expected that this and other chemical sensors will be used more in the future.

In addition, from the foregoing depiction of different sensors which receive signals from a plurality of components, it is possible for a single sensor to receive and output signals from a plurality of components which are then analyzed by the processor to determine if any one of the components for which the received signals were obtained by that sensor is operating in an abnormal state. Likewise, it is also possible to provide for a multiplicity of sensors each receiving a different signal related to a specific component which are then analyzed by the processor to determine if that component is operating in an abnormal state. Note that neural networks can simultaneously analyze data from multiple sensors of the same type or different types.

The discussion above has centered on notifying the vehicle operator of a pending problem with a vehicle component. Today, there is great competition in the automobile marketplace and the manufacturers and dealers who are most responsive to customers are likely to benefit by increased sales both from repeat purchasers and new customers. The diagnostic module disclosed herein benefits the dealer by making him instantly aware, through the cellular telephone system, or other communication link, coupled to the diagnostic module or system in accordance with the invention, when a component is likely to fail.

As envisioned, on some automobiles, when the diagnostic module 266 detects a potential failure, it not only notifies the driver through a display 278, but also automatically notifies the dealer through a vehicle cellular phone 279. The dealer can thus contact the vehicle owner and schedule an appointment to undertake the necessary repair at each party's mutual convenience. The customer is pleased since a potential vehicle breakdown has been avoided and the dealer is pleased since he is likely to perform the repair work. The vehicle manufacturer also benefits by early and accurate statistics on the failure rate of vehicle components. This early warning system can reduce the cost of a potential recall for components having design defects. It could even have saved lives if such a system had been in place during the Firestone tire failure problem mentioned above. The vehicle manufacturer will thus be guided toward producing higher quality vehicles thus improving his competitiveness. Finally, experience with this system will actually lead to a reduction in the number of sensors on the vehicle since only those sensors that are successful in predicting failures will be necessary.

For most cases, it is sufficient to notify a driver that a component is about to fail through a warning display. In some critical cases, action beyond warning the driver may be required. If, for example, the diagnostic module detected that the alternator was beginning to fail, in addition to warning the driver of this eventuality, the module could send a signal to another vehicle system to turn off all non-essential devices which use electricity thereby conserving electrical energy and maximizing the time and distance that the vehicle can travel before exhausting the energy in the battery. Additionally, this system can be coupled to a system such as ONSTAR® or a vehicle route guidance system, and the driver can be guided to the nearest open repair facility or a facility of his or her choice.

In the discussion above, the diagnostic module of this invention assumes that a vehicle data bus exists which is used by all of the relevant sensors on the vehicle. Most vehicles manufactured at the time of this invention did not have a data bus although it was widely believed that most vehicles will have one in the near future. A vehicle safety bus has been considered for several vehicle models. Relevant signals can be transmitted to the diagnostic module through a variety of coupling systems other than through a data bus and this invention is not limited to vehicles having a data bus. For example, the data can be sent wirelessly to the diagnostic module using the Bluetooth or WiFi specification. In some cases, even the sensors do not have to be wired and can obtain their power via RF from the interrogator as is well known in the RFID (radio frequency identification) field. Alternately, an inductive or capacitive power transfer system can be used.

As can be appreciated from the above discussion, the invention described herein brings several new improvements to automobiles including, but not limited to, use of pattern recognition technologies to diagnose potential vehicle component failures, use of trainable systems thereby eliminating the need of complex and extensive programming, simultaneous use of multiple sensors to monitor a particular component, use of a single sensor to monitor the operation of many vehicle components, monitoring of vehicle components which have no dedicated sensors, and notification to the driver and possibly an outside entity of a potential component failure in time so that the failure can be averted and vehicle breakdowns substantially eliminated. Additionally, improvements to the vehicle stability, crash avoidance, crash anticipation and occupant protection are available.

To implement a component diagnostic system for diagnosing the component utilizing a plurality of sensors not directly associated with the component, i.e., independent of the component, a series of tests are conducted. For each test, the signals received from the sensors are input into a pattern recognition training algorithm with an indication of whether the component is operating normally or abnormally (the component being intentionally altered to provide for abnormal operation). Data from the test is used to generate the pattern recognition algorithm, e.g., a neural network, so that in use, the data from the sensors is input into the algorithm and the algorithm provides an indication of abnormal or normal operation of the component. Also, to provide a more versatile diagnostic module for use in conjunction with diagnosing abnormal operation of multiple components, tests may be conducted in which each component is operated abnormally while the other components are operating normally, as well as tests in which two or more components are operating abnormally. In this manner, the diagnostic module may be able to determine based on one set of signals from the sensors during use that either a single component or multiple components are operating abnormally. Of course, crash tests are also run to permit crash sensing.

Furthermore, the pattern recognition algorithm may be trained based on patterns within the signals from the sensors. Thus, by means of a single sensor, it would be possible to determine whether one or more components are operating abnormally. To obtain such a pattern recognition algorithm, tests are conducted using a single sensor, such as a microphone, and causing abnormal operation of one or more components, each component operating abnormally while the other components operate normally and multiple components operating abnormally. In this manner, in use, the pattern recognition algorithm may analyze a signal from a single sensor and determine abnormal operation of one or more components. In some cases, simulations can be used to analytically generate the relevant data.

The invention is also particularly useful in light of the foreseeable implementation of smart highways. Smart highways will result in vehicles traveling down highways under partial or complete control of an automatic system, i.e., not being controlled by the driver. The on-board diagnostic system will thus be able to determine failure of a component prior to and/or upon failure thereof and inform the vehicle's guidance system to cause the vehicle to move out of the stream of traffic, i.e., onto a shoulder of the highway, in a safe and orderly manner. Moreover, the diagnostic system may be controlled or programmed to prevent movement of the disabled vehicle back into the stream of traffic until repair of the component is satisfactorily completed.

In a method in accordance with this embodiment, the operation of the component would be monitored and if abnormal operation of the component is detected, e.g., by any of the methods and apparatus disclosed herein (although other component failure systems may of course be used in this implementation), the vehicle guidance system which controls the movement of the vehicle would be notified, e.g., via a signal from the diagnostic module to the guidance system, and the guidance system would be programmed to move the vehicle out of the stream of traffic, or off of the restricted roadway, possibly to a service station or dealer, upon reception of the particular signal from the diagnostic module. The automatic guidance systems for vehicles traveling on highways may be any existing system or system being developed, such as one based on satellite positioning techniques or ground-based positioning techniques. Since the guidance system may be programmed to ascertain the vehicle's position on the highway, it can determine the vehicle's current position, the nearest location out of the stream of traffic, or off of the restricted roadway, such as an appropriate shoulder or exit to which the vehicle may be moved, and the path of movement of the vehicle from the current position to the location out of the stream of traffic, or off of the restricted roadway. The vehicle may thus be moved along this path under the control of the automatic guidance system. In the alternative, the path may be displayed to a driver and the driver can follow the path, i.e., manually control the vehicle. The diagnostic module and/or guidance system may be designed to prevent re-entry of the vehicle into the stream of traffic, or off of the restricted roadway, until the abnormal operation of the component is satisfactorily addressed.

FIG. 32 is a flow chart of a method for directing a vehicle off of a roadway if a component is operating abnormally. The component's operation is monitored at 40 and a determination is made at 42 whether its operation is abnormal. If not, the operation of the component is monitored further (at periodic intervals). If the operation of the component is abnormal, the vehicle can be directed off the roadway at 44. More particularly, this can be accomplished by generating a signal indicating the abnormal operation of the component at 46, directing this signal to a guidance system in the vehicle at 48 that guides movement of the vehicle off of the roadway at 50. Also, if the component is operating abnormally, the current position of the vehicle and the location of a site off of the roadway can be determined at 52, e.g., using satellite-based or ground-based location determining techniques, a path from the current location to the off-roadway location determined at 54 and then the vehicle directed along this path at 56. Periodically, a determination is made at 58 whether the component's abnormality has been satisfactorily addressed and/or corrected and if so, the vehicle can re-enter the roadway and operation and monitoring of the component begin again. If not, the re-entry of the vehicle onto the roadway is prevented at 60.

Figure 33:
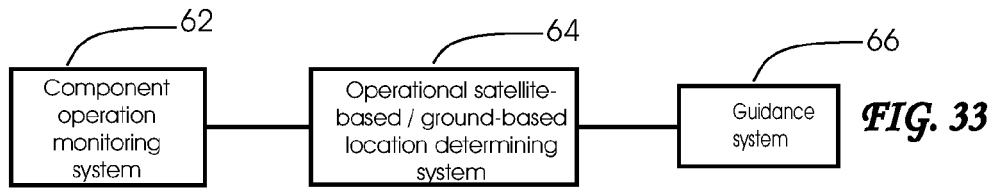
FIG. 33 is a schematic illustration of the components used in the methods for automatically monitoring a vehicular component.

FIG. 33 schematically shows basic components for performing this method, i.e., a component operation monitoring system 62 (such as described above), an optional satellite-based or ground-based positioning system 64 and a vehicle guidance system 66.

Figure 34:
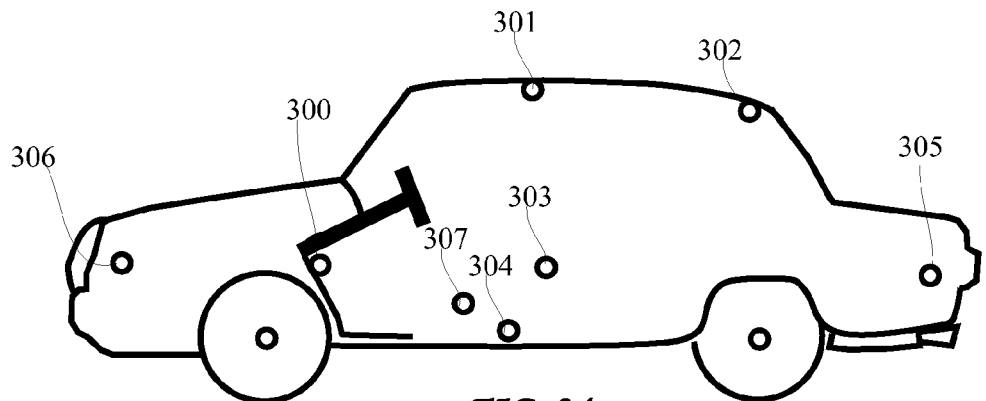
FIG. 34 is a schematic of a vehicle with several accelerometers and/or gyroscopes at preferred locations in the vehicle.

FIG. 34 illustrates the placement of a variety of sensors, primarily accelerometers and/or gyroscopes, which can be used to diagnose the state of the vehicle itself. Sensor 300 can measure the acceleration of the firewall or instrument panel and is located thereon generally midway between the two sides of the vehicle. Sensor 301 can be located in the headliner or attached to the vehicle roof above the side door. Typically, there will be two such sensors, one on either side of the vehicle. Sensor 302 is shown in a typical mounting location midway between the sides of the vehicle attached to or near the vehicle roof above the rear window. Sensor 305 is shown in a typical mounting location in the vehicle trunk adjacent the rear of the vehicle. One, two or three such sensors can be used depending on the application. If three such sensors are used, one would be adjacent each side of vehicle and one in the center. Sensor 303 is shown in a typical mounting location in the vehicle door and sensor 304 is shown in a typical mounting location on the sill or floor below the door. Finally, sensor 306, which can be also multiple sensors, is shown in a typical mounting location forward in a forward crush zone of the vehicle. If three such sensors are used, one would be adjacent each vehicle side and one in the center.

In general, sensors 300-306 provide a measurement of the state of the sensor, such as its velocity, acceleration, angular orientation or temperature, or a state of the location at which the sensor is mounted. Thus, measurements related to the state of the sensor 300-306 would include measurements of the acceleration of the sensor, measurements of the temperature of the mounting location as well as changes in the state of the sensor and rates of changes of the state of the sensor. As such, any described use or function of the sensors 300-306 above is merely exemplary and is not intended to limit the form of the sensor or its function.

Each of the sensors 300-306 may be single axis, double axis or triaxial accelerometers and/or gyroscopes typically of the MEMS type. MEMS stands for microelectromechanical system and is a term known to those skilled in the art. These sensors 300-306 can either be wired to the central control module or processor directly wherein they would receive power and transmit information, or they could be connected onto the vehicle bus or, in some cases, using RFID technology, the sensors can be wireless and would receive their power through RF from one or more interrogators located in the vehicle. RFID stands for radio frequency identification wherein sensors are each provided with an identification code and designed to be powered by the energy in a radio frequency wave containing that code which is emitted by the interrogator. In this case, the interrogators can be connected either to the vehicle bus or directly to control module. Alternately, an inductive or capacitive power and information transfer system can be used.

One particular implementation will now be described. In this case, each of the sensors 300-306 is a single or dual axis accelerometer. They are made using silicon micromachined technology such as disclosed in U.S. Pat. No. 5,121,180 and U.S. Pat. No. 5,894,090. These are only representative patents of these devices and there exist more than 100 other relevant U.S. patents describing this technology. Commercially available MEMS gyroscopes such as from Systron Doner have accuracies of approximately one degree per second. In contrast, optical gyroscopes typically have accuracies of approximately one degree per hour. Unfortunately, the optical gyroscopes are prohibitively expensive for automotive applications. On the other hand, typical MEMS gyroscopes are not sufficiently accurate for many control applications.

Figure 35:
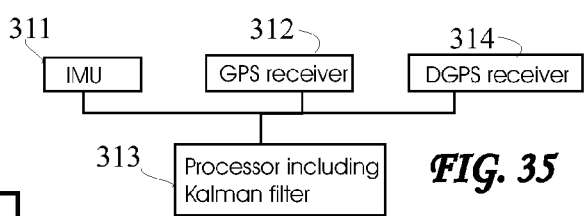
FIG. 35 is a block diagram of an inertial measurement unit calibrated with a GPS and/or DGPS system using a Kalman filter.

Referring now to FIG. 35, one solution is to use an IMU 311 that can contain up to three accelerometers and three gyroscopes all produced as MEMS devices. If the devices are assembled into a single unit and carefully calibrated to remove all predictable errors, and then coupled with a GPS 312 and/or DGPS system 314 using a Kalman filter embodied in a processor or other control unit 313, the IMU 311 can be made to have accuracies comparable with military grade IMU containing precision accelerometers and fiber optic gyroscopes at a small fraction of the cost of the military IMU.

Thus, in connection with the control of parts of the vehicle, location information may be obtained from the GPS receiver 312 and input to a pattern recognition system for consideration when determining a control signal for the part of the vehicle. Position information from the IMU 311 could alternatively or additionally be provided to the pattern recognition system. The location determination by the GPS receiver 312 and IMU 311 may be improved using the Kalman filter embodied in processor 313 in conjunction with the pattern recognition system to diagnose, for example, the state of the vehicle.

Another way to use the IMU 311, GPS receiver 312 and Kalman filter embodied in processor 313 would be to use the GPS receiver 312 and Kalman filter in processor 313 to periodically calibrate the location of the vehicle as determined by the IMU 311 using data from the GPS receiver 312 and the Kalman filter embodied in processor 313. A DGPS receiver 314 could also be coupled to the processor 313 in which case, the processor 313 would receive information from the DGPS receiver 314 and correct the determination of the location of the vehicle as determined by the GPS receiver 312 or the IMU 311.

The angular rate function can be obtained through placing accelerometers at two separated, non-co-located points in a vehicle and using the differential acceleration to obtain an indication of angular motion and angular acceleration. From the variety of accelerometers shown on FIG. 34, it can be readily appreciated that not only will all accelerations of key parts of the vehicle be determined, but the pitch, yaw and roll angular rates can also be determined based on the accuracy of the accelerometers. By this method, low cost systems can be developed which, although not as accurate as the optical gyroscopes, are considerably more accurate than conventional MEMS gyroscopes. The pitch, yaw and roll of a vehicle can also be accurately determined using GPS and three antennas by comparing the phase of the carrier frequency from a satellite.

Instead of using two accelerometers at separate locations on the vehicle, a single conformal MEMS-IDT gyroscope may be used. A MEMS-IDT gyroscope is a microelectromechanical system-interdigital transducer gyroscope. Such a conformal MEMS-IDT gyroscope is described in a paper by V. K. Varadan, Conformal MEMS-IDT Gyroscopes and Their Comparison With Fiber Optic Gyro, incorporated in its entirety herein. The MEMS-IDT gyroscope is based on the principle of surface acoustic wave (SAW) standing waves on a piezoelectric substrate. A surface acoustic wave resonator is used to create standing waves inside a cavity and the particles at the anti-nodes of the standing waves experience large amplitude of vibrations, which serves as the reference vibrating motion for the gyroscope. Arrays of metallic dots are positioned at the anti-node locations so that the effect of Coriolis force due to rotation will acoustically amplify the magnitude of the waves. Unlike other MEMS gyroscopes, the MEMS-IDT gyroscope has a planar configuration with no suspended resonating mechanical structures.

The system of FIG. 34 preferably uses dual axis accelerometers, and therefore provides a complete diagnostic system of the vehicle itself and its dynamic motion. Such a system is believed to be far more accurate than any system currently available in the automotive market. This system provides very accurate crash discrimination since the exact location of the crash can be determined and, coupled with knowledge of the force deflection characteristics of the vehicle at the accident impact site, an accurate determination of the crash severity and thus the need for occupant restraint deployment can be made. Similarly, the tendency of a vehicle to roll-over can be predicted in advance and signals sent to the vehicle steering, braking and throttle systems to attempt to ameliorate the rollover situation or prevent it. In the event that it cannot be prevented, the deployment side curtain airbags can be initiated in a timely manner.

Similarly, the tendency of the vehicle to slide or skid can be considerably more accurately determined and again the steering, braking and throttle systems commanded to minimize the unstable vehicle behavior.

Thus, through the sample deployment of inexpensive accelerometers at a variety of locations in the vehicle, significant improvements are many in the areas of vehicle stability control, crash sensing, rollover sensing, and resulting occupant protection technologies.

Finally, as mentioned above, the combination of the outputs from these accelerometer sensors and the output of strain gage weight sensors in a vehicle seat, or in/on a support structure of the seat, can be used to make an accurate assessment of the occupancy of the seat and differentiate between animate and inanimate occupants as well as determining where in the seat the occupants are sitting. This can be done by observing the acceleration signals from the sensors of FIG. 34 and simultaneously the dynamic strain gage measurements from seat mounted strain gages. The accelerometers provide the input function to the seat and the strain gages measure the reaction of the occupying item to the vehicle acceleration and thereby provide a method for dynamically determining the mass of the occupying item and its location. This is particularly important for occupant position sensing during a crash event. By combining the outputs of accelerometers and strain gages and appropriately processing the same, the mass and weight of an object occupying the seat can be determined as well as the gross motion of such an object so that an assessment can be made as to whether the object is a life form such as a human being.

For this embodiment, sensor 307 in FIG. 34 (not shown) represents one or more strain gage or bladder weight sensors mounted on the seat or in connection with the seat or its support structure. Suitable mounting locations and forms of weight sensors are discussed in U.S. Pat. No. 6,242,701 and U.S. Pat. No. 6,442,504 and contemplated for use in this invention as well. The mass or weight of the occupying item of the seat can thus be measured based on the dynamic measurement of the strain gages with optional consideration of the measurements of accelerometers on the vehicle, which are represented by any of sensors 300-307.

Thus, discussed above is an embodiment of a component diagnostic system for diagnosing the component in accordance with the invention which comprises a plurality of sensors not directly associated with the component, i.e., independent therefrom, such that the component does not directly affect the sensors, each sensor detecting a signal containing information as to whether the component is operating normally or abnormally and outputting a corresponding electrical signal, a processor coupled to the sensors for receiving and processing the electrical signals and for determining if the component is operating abnormally based on the electrical signals, and an output system coupled to the processor for affecting another system within the vehicle if the component is operating abnormally. The processor preferably comprise a pattern recognition system such as a trained pattern recognition algorithm such as a neural network, modular neural network or an ensemble of neural networks, cellular neural networks, support vector machines or the like. In some cases, fuzzy logic will be used which can be combined with a neural network to form a neural fuzzy algorithm.

The second system may be a display for indicating the abnormal state of operation of the component arranged in a position in the vehicle to enable a driver of the vehicle to view the display and thus the indicated abnormal operation of the component. At least one source of additional information, e.g., the time and date, may be provided and an input system coupled to the vehicle for inputting the additional information into the processor. The second system may also be a warning device including a transmission system for transmitting information related to the component abnormal operating state to a site remote from the vehicle, e.g., a vehicle repair facility.

In another embodiment of the component diagnostic system discussed above, at least one sensor detects a signal containing information as to whether the component is operating normally or abnormally and outputs a corresponding electrical signal. A processor is coupled to the sensor(s) for receiving and processing the electrical signal(s) and for determining if the component is operating abnormally based thereon. The processor preferably comprises a pattern recognition algorithm for analyzing a pattern within the signal detected by each sensor. An output system is coupled to the processor for affecting another system within the vehicle if the component is operating abnormally. The second system may be a display as mentioned above or a warning device.

A method for automatically monitoring one or more components of a vehicle during operation of the vehicle on a roadway entails, as discussed above, monitoring operation of the component in order to detect abnormal operation of the component, e.g., in one or the ways described above, and if abnormal operation of the component is detected, automatically directing the vehicle off of the restricted roadway. For example, in order to automatically direct the vehicle off of the restricted roadway, a signal representative of the abnormal operation of the component may be generated and directed to a guidance system of the vehicle that guides the movement of the vehicle. Possibly the directing the vehicle off of the restricted roadway may entail applying satellite positioning techniques or ground-based positioning techniques to enable the current position of the vehicle to be determined and a location off of the restricted highway to be determined and thus a path for the movement of the vehicle. Re-entry of the vehicle onto the restricted roadway may be prevented until the abnormal operation of the component is satisfactorily addressed.

The state of the entire vehicle may be diagnosed whereby two or more sensors, preferably acceleration sensors and gyroscopes, detect the state of the vehicle and if the state is abnormal, an output system is coupled to the processor for affecting another system in the vehicle. The second system may be the steering control system, the brake system, the accelerator or the frontal or side occupant protection system.

An exemplifying control system for controlling a part of the vehicle in accordance with the invention thus comprises a plurality of sensors or systems mounted at different locations on the vehicle, each sensor system providing a measurement related to a state of the sensor system or a measurement related to a state of the mounting location, and a processor coupled to the sensors or sensor systems and arranged to diagnose the state of the vehicle based on the measurements of the sensor system, e.g., by the application of a pattern recognition technique. The processor controls the part based at least in part on the diagnosed state of the vehicle.

At least one of the sensors or sensor systems may be a high dynamic range accelerometer or a sensor selected from a group consisting of a single axis acceleration sensor, a double axis acceleration sensor, a triaxial acceleration sensor and a gyroscope, and may optionally include an RFID (radio frequency identification) response unit. The gyroscope may be a MEMS-IDT (microelectromechanical system-interdigital transducer) gyroscope including a surface acoustic wave resonator which applies standing waves on a piezoelectric substrate. If an RFID response unit is present, the control system would then comprise an RFID interrogator device which causes the RFID response unit(s) to transmit a signal representative of the measurement of the sensor system associated therewith to the processor.

The state of the vehicle diagnosed by the processor may be the vehicle's angular motion, angular acceleration and/or angular velocity. As such, the steering system, braking system or throttle system may be controlled by the processor in order to maintain the stability of the vehicle. The processor can also be arranged to control an occupant restraint or protection device in an attempt to minimize injury to an occupant.

The state of the vehicle diagnosed by the processor may also be a determination of a location of an impact between the vehicle and another object. In this case, the processor can forecast the severity of the impact using the force/crush properties of the vehicle at the impact location and control an occupant restraint or protection device based at least in part on the severity of the impact.

The system can also include a weight sensing system coupled to a seat in the vehicle for sensing the weight of an occupying item of the seat. The weight sensing system is coupled to the processor whereby the processor controls deployment or actuation of the occupant restraint or protection device based on the state of the vehicle and the weight of the occupying item of the seat sensed by the weight sensing system.

A display may be coupled to the processor for displaying an indication of the state of the vehicle as diagnosed by the processor. A warning device may be coupled to the processor for relaying a warning to an occupant of the vehicle relating to the state of the vehicle as diagnosed by the processor. Further, a transmission device may be coupled to the processor for transmitting a signal to a remote site relating to the state of the vehicle as diagnosed by the processor.

The state of the vehicle diagnosed by the processor may include angular acceleration of the vehicle whereby angular velocity and angular position or orientation are derivable from the angular acceleration. The processor can then be arranged to control the vehicle's navigation system based on the angular acceleration of the vehicle.

A method for controlling a part of the vehicle in accordance with the invention comprises mounting a plurality of sensors or sensor systems at different locations on the vehicle, measuring a state of the sensor system or a state of the respective mounting location of the sensor system, diagnosing the state of the vehicle based on the measurements of the state of the sensors or sensor systems or the state of the mounting locations of the sensors or sensor systems, and controlling the part based at least in part on the diagnosed state of the vehicle. The state of the sensor system may be any one or more of the acceleration, angular acceleration, angular velocity or angular orientation of the sensor system. Diagnosis of the state of the vehicle may entail determining whether the vehicle is stable or is about to rollover or skid and/or determining a location of an impact between the vehicle and another object. Diagnosis of the state of the vehicle may also entail determining angular acceleration of the vehicle based on the acceleration measured by accelerometers if multiple accelerometers are present as the sensors or sensor systems.

Another control system for controlling a part of the vehicle in accordance with the invention comprises a plurality of sensors or sensor systems mounted on the vehicle, each providing a measurement of a state of the sensor system or a state of the mounting location of the sensor system and generating a signal representative of the measurement, and a pattern recognition system for receiving the signals from the sensors or sensor systems and diagnosing the state of the vehicle based on the measurements of the sensors or sensor systems. The pattern recognition system generates a control signal for controlling the part based at least in part on the diagnosed state of the vehicle. The pattern recognition system may comprise one or more neural networks. The features of the control system described above may also be incorporated into this control system to the extent feasible.

The state of the vehicle diagnosed by the pattern recognition system may include a state of an abnormally operating component whereby the pattern recognition system is designed to identify a potentially malfunctioning component based on the state of the component measured by the sensors or sensor systems and determine whether the identified component is operating abnormally based on the state of the component measured by the sensors or sensor systems.

In one preferred embodiment, the pattern recognition system may comprise a neural network system and the state of the vehicle diagnosed by the neural network system includes a state of an abnormally operating component. The neural network system includes a first neural network for identifying a potentially malfunctioning component based on the state of the component measured by the sensors or sensor systems and a second neural network for determining whether the identified component is operating abnormally based on the state of the component measured by the sensors or sensor systems.

Modular neural networks can also be used whereby the neural network system includes a first neural network arranged to identify a potentially malfunctioning component based on the state of the component measured by the sensors or sensor systems and a plurality of additional neural networks. Each of the additional neural networks is trained to determine whether a specific component is operating abnormally so that the measurements of the state of the component from the sensors or sensor systems are input into that one of the additional neural networks trained on a component which is substantially identical to the identified component.

Another method for controlling a part of the vehicle comprises mounting a plurality of sensors or sensor systems on the vehicle, measuring a state of the sensor system or a state of the respective mounting location of the sensor system, generating signals representative of the measurements of the sensors or sensor systems, inputting the signals into a pattern recognition system to obtain a diagnosis of the state of the vehicle and controlling the part based at least in part on the diagnosis of the state of the vehicle.

In one notable embodiment, a potentially malfunctioning component is identified by the pattern recognition system based on the states measured by the sensors or sensor systems and the pattern recognition system determine whether the identified component is operating abnormally based on the states measured by the sensors or sensor systems. If the pattern recognition system comprises a neural network system, identification of the component entails inputting the states measured by the sensors or sensor systems into a first neural network of the neural network system and the determination of whether the identified component is operating abnormally entails inputting the states measured by the sensors or sensor systems into a second neural network of the neural network system. A modular neural network system can also be applied in which the states measured by the sensors or sensor systems are input into a first neural network and a plurality of additional neural networks are provided, each being trained to determine whether a specific component is operating abnormally, whereby the states measured by the sensors or sensor systems are input into that one of the additional neural networks trained on a component which is substantially identical to the identified component.

Another control system for controlling a part of the vehicle based on occupancy of the seat in accordance with the invention comprises a plurality of strain gages mounted in connection with the seat, each measuring strain of a respective mounting location caused by occupancy of the seat, and a processor coupled to the strain gages and arranged to determine the weight of an occupying item based on the strain measurements from the strain gages over a period of time, i.e., dynamic measurements. The processor controls the part based at least in part on the determined weight of the occupying item of the seat. The processor can also determine motion of the occupying item of the seat based on the strain measurements from the strain gages over the period of time. One or more accelerometers may be mounted on the vehicle for measuring acceleration in which case, the processor may control the part based at least in part on the determined weight of the occupying item of the seat and the acceleration measured by the accelerometer(s).

By comparing the output of various sensors in the vehicle, it is possible to determine activities that are affecting parts of the vehicle while not affecting other parts. For example, by monitoring the vertical accelerations of various parts of the vehicle and comparing these accelerations with the output of strain gage load cells placed on the seat support structure, a characterization can be made of the occupancy of the seat. Not only can the weight of an object occupying the seat be determined, but also the gross motion of such an object can be ascertained and thereby an assessment can be made as to whether the object is a life form such as a human being. Strain gage weight sensors are disclosed in U.S. Pat. No. 6,242,701. In particular, the inventors contemplate the combination of all of the ideas expressed in this patent with those expressed in the current invention.

4.5 Smart Airbags

Figure 36:
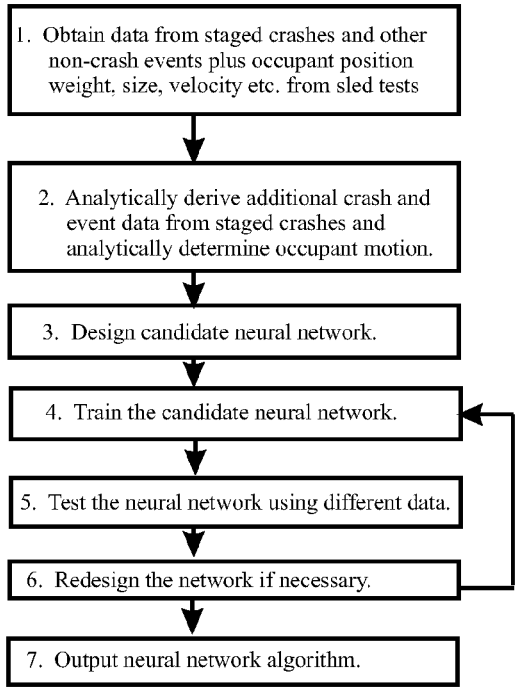
FIG. 36 is a block diagram illustrating a method of obtaining a sensor and prediction algorithm using a neural network.

A block diagram of the neural network computer method of obtaining a smart airbag algorithm is illustrated in FIG. 36. In the first step, one or more vehicle models are crashed under controlled conditions where the vehicle and crash dummies are fully instrumented so that the severity of the crash, and thus the need for an airbag, can be determined. An occupant sensor is also present and in use so that key occupant motion data can be obtained. The occupant data will be insufficient for the full neural network algorithm development but will provide important verification data. Acceleration during the crash is measured at all potential locations for mounting the crash sensors. Normally, any position which is rigidly attached to the main structural members of the vehicle is a good mounting location for the non-crush zone sensors.

The following crash event types, at various velocities, are representative of those that should be considered in establishing crash sensor designs and calibrations for frontal impacts, a similar set also exists for side and rear impacts:

Frontal Barrier Impact
Right Angle Barrier Impact
Left Angle Barrier Impact
Frontal Offset Barrier Impact Frontal Far Offset (Outside of Rails) Barrier Impact
High Pole on Center Impact
High Pole off Center Impact
Low Pole (below bumper) Impact
Frontal Car-to-Car Impact
Partial Frontal Car-to-Car Impact
Angle car-to-car Impact
Front to Rear car-to-car Impact
Front to Side Car-to-Car Impact, Both Cars Moving
Bumper Underride Impact
Animal Impact—Simulated Deer
Undercarriage Impact (hang-up on railroad track type of object)
Impact Into Highway Energy Absorbing Device (Yellow Barrels, etc.)
Impact Into Guardrail
Curb Impacts The following non-crash event types are representative of those considered in establishing crash sensor designs and calibrations:

Hammer Abuse (shop abuse)
Rough Road (rough driving conditions)

Normally, a vehicle manufacturer will only be concerned with a particular vehicle model and instruct the crash sensor designer to design a sensor system for that particular vehicle model. This is in general not necessary when using the techniques described herein and vehicle crash data from a variety of different vehicle models can be included in the training data.

Since the system is typically being designed for a particular vehicle model, static occupant data needs to be obtained for that particular model and still maintain approximately 100% accuracy. As vision systems improve, the ability to move systems from vehicle to vehicle will also improve and eventually all of the occupant portion of the training will be done by simulation and through use of databases on a computer. Although crash data from one vehicle can frequently be used for the training purposes, occupant data cannot in general be interchanged from one vehicle model to another vehicle model. Dynamic position data for an occupant will, in general, be analytically derived based on the initial position and rules as to how the body translates and rotates which will be determined from sled and crash tests. This is not as complicated as might first appear since for most practical purposes, an unbelted occupant will just translate forward as a free mass and thus the initial position plus the acceleration of the vehicle allows a reasonably accurate determination of position over time. The problem is more complicated for a belted occupant and rules governing occupant motion must be learned from modeling and verified by sled and crash tests. Fortunately, belted occupants are unlikely to move significantly during the critical part of the crash and thus, the initial position plus some belt payout and stretch at least for the chest is a good approximation.

The vehicle manufacturer will be loath to conduct all of the crashes listed above for a particular vehicle since crash tests are very expensive. If, on the other hand, a particular crash type that occurs in the real world is omitted from the library, there is a chance that the system will not perform optimally when the event occurs later and one or more people will unfortunately be killed or injured. One way to partially solve this dilemma is to use crash data from other vehicles as discussed above. Another method is to create data using the data obtained from the staged crash tests and operating on the data using various mathematical techniques that permits the creation of data that is representative of crashes not run. One method of accomplishing this is to use velocity and crash scaling as described in detail in the above referenced papers and particularly in reference (1) at page 8 and reference (2) at pages 37-49. This is the second step in the process illustrated in FIG. 36. Also included in the second step is the analytical determination of the occupant motion discussed above.

The third step is to assume a candidate neural network architecture. A choice that is moderately complex is suggested such as one with 100 input nodes and 6 hidden layer nodes. If the network is too simple, there will be cases for which the system cannot be trained and, if these are important crashes, the network will have to be revised by adding more nodes. If the initial choice is too complex, this will usually show up after the training with one or more of the weights having a near zero value. In any event, the network can be tested later by removing one node at a time to see if the accuracy of the network degrades. Alternately, genetic algorithms are used to search for the optimum network architecture. A similar set of steps apply to other pattern recognition technologies.

Usually a combination neural network is used and tools are now available of generating and training such a network. This is described in some detail for occupant sensing in U.S. Pat. No. 6,445,988.

The training data must now be organized in a fashion similar to the way it will be seen on a vehicle during a crash. Although data from a previously staged crash is available for the full time period of the crash, the vehicle-mounted system will only see the data one value at a time. Thus, the training data must be fed to the pattern recognition computer, or computer program, in that manner. This can be accomplished by taking each crash data file and creating 100 cases from it, assuming that the time period chosen for a crash is 200 milliseconds and that each data point is the pre-processed acceleration over two milliseconds. This data must also be combined with the occupant data derived as discussed above. The first training case contains the first crash data point and the remaining 99 points are zero, or random small values for the crash data nodes, and the segmented occupant position data as described in U.S. RE37260 for the occupant nodes.

Since the handling of the occupant data is described in the '260 patent, the remaining description here will be limited to the handling of the crash data. The second crash data case contains the first two data points with the remaining 98 points set to zero or random low values etc. For the tenth data file, data point one will contain the 2 ms average acceleration at twenty milliseconds into the crash, data point two the average acceleration at eighteen milliseconds into the crash, and data point ten will contain the data from the first two milliseconds of the crash. This process is continued until the one hundred data cases are created for the crash. Each case is represented as a line of data in the training file. This same process must be done for each of the crashes and non-crash events for which there is data. A typical training set will finally contain on the order of 50,000 crash data cases and 500,000 occupant static data cases. The addition of other data such as from multiple accelerometers and gyroscopes can result in a significant increase in the dataset. One variable that has not been considered is pre-crash braking. This can influence the initial crash data points prior to the start of the crash, those that were set to small random values. One alternative to eliminate this influence, since pre-crash braking may or may not be present, is to set all acceleration values less than 1 G to zero. On the other hand, there can be significant information in the pre-crash braking data and therefore it may be desirable to present this as additional information for the smart airbag system to consider.

In the pure neural network crash sensor case as described in U.S. Pat. No. 5,684,701, it was possible to substantially trim the data set to exclude all those cases for which there is no definite requirement to deploy the restraint and the same is true here. For a particular 30 mph frontal barrier crash, for example, analysis of the crash has determined that the sensor must trigger the deployment of the airbag by 20 milliseconds for a 50% male with the seat in the mid seating position. For data greater than 20 milliseconds, the data is of little value from the point of view of a neural network crash sensor that only needs to determine whether to deploy the airbag since that would represent a late deployment, such is not the case here since, for some gas control modules, the inflation/deflation rate can be controlled after the decision to deploy. Also, the 20 millisecond triggering requirement is no longer applicable since it depends on the initial seating position and perhaps the size of the occupant.

For cases where the airbag should not trigger, on the other hand, the entire data set of 200 data files must be used. Finally, the training set must be balanced so that there are about as many no-trigger cases as trigger cases so that the output will not be biased toward one or the other decision. This then is the fourth step in the process as depicted in FIG. 36.

In the fifth step, the pattern recognition program is run with the training set. The program, if it is a neural network program, uses a variety of techniques such as the "back propagation" technique to assign weights to the connections from the input layer nodes to the hidden layer nodes and from the hidden layer nodes to the output layer nodes to try to minimize the error at the output nodes between the value calculated and the value desired. For example, for a particular crash such as a 30 mph frontal barrier impact, an analysis of the crash and the particular occupant has yielded the fact that the sensor must trigger in 20 milliseconds and the data file representing the first 20 milliseconds of the crash would have a desired output node value which would instruct the gas module to inject a particular amount of gas into the airbag.

For another crash such as an 8 mph barrier crash where airbag deployment is not desired, the desired output value for all of the data vectors which are used to represent this crash (100 vectors) would have associated with them a desired output node value of 0 which corresponds to a command to the gas control module not to inject or direct gas into the airbag. The network program then assigns different weights to the nodes until all of the airbag-deployment-not-desired cases have an output node value nearly equal to 0 and similarly, all of the airbag-deployment-desired cases have an output value close to that which is required for the gas control module to inject the proper amount of gas into the airbag. The program finds those weights that minimize the error between the desired output values and the calculated output values.

Since a neural network may have a problem with the discontinuity between zero gas flow and a substantial flow needed even for a marginal airbag deployment, a continuous function may be used and then interpreted such that all flows below a certain value are set to zero at postprocessing.

The term weight is a general term in the art used to describe the mathematical operation that is performed on each datum at each node at one layer before it is inputted into a node at a higher layer. The data at input layer node 1, for example, will be operated on by a function that contains at least one factor that is determined by the training process. In general this factor, or weight, is different for each combination of an input node and hidden layer node. Thus, in the example above where there were 100 input nodes, 12 hidden layer nodes and 1 output node, there will in general be 1,212 weights which are determined by the neural network program during the training period. An example of a function used to operate on the data from one node before it is input to a higher level node is the sigmoid function:

In the usual back propagation trained network, let $O_{ij}$ be the output of node j in layer i,
then the input to node k in layer i+1 is $$I_{i+1,k} = \Sigma_j W_{kj}^{(i)} O_{ij}$$

where $W_{kj}^{(i)}$ is the weight applied to the connection between node j in layer i and node k in layer i+1.

Then the output of node k in layer i+1 is found by transforming its input, for example, with the sigmoid function:

$$O_{i+1,k} = 1/(1+e^{-I_{i+1,k}})$$

and this is used in the input to the next, i+2, layer.

If the neural network is sufficiently complex, that is if it has many hidden layer nodes, and if the training set is small, the network may "memorize" the training set with the result that it can fail to respond properly on a slightly different case from those presented. This is one of the problems associated with neural networks which is now being solved by more advanced pattern recognition systems including genetic algorithms which permits the determination of the minimum complexity network to solve a particular problem. Memorizing generally occurs only when the number of vectors in the training set is not sufficiently large compared to the number of weights. The goal is to have a network that generalizes from the data presented and therefore will respond properly to a new case that is similar to but only slightly different from one of the cases presented.

The network can also effectively memorize the input data if many cases are nearly the same. It is sometimes difficult to determine this by looking at the network so it is important that the network not be trained on all available data but that some significant representative sample of the data is held out of the training set to be used to test the network. It is also important to have a training set which is very large (one hundred to one thousand times the number of weights or more is desirable). This is the function of step five, to test the network using data that it has not seen before, i.e., which did not constitute part of the training data.

Step six involves redesigning the network and then repeating steps three through five until the results are satisfactory. This step is automatically accomplished by some of the neural network software products available on the market.

The final step is to output the computer code for the algorithm and to program a microprocessor, FPGA or design an ASIC with a neural computer, with this code. One important feature of this invention is that the neural network system chosen is very simple and yet, because of the way that the data is fed to the network, all relevant calculations are made with a single network. There is no need, for example, to use an additional network to translate a prediction of a vehicle velocity change, and thus the crash severity, into a time to trigger airbag deployment or the setting for the gas controller. In fact, to do this would be difficult since the entire time history would need to be considered. The output from the network is the setting of the gas controller in the preferred implementation. Naturally, there may be cases where some intermediate step might be desirable.

The steps described above and illustrated in FIG. 36 are for the case where a neural computer program is used to generate code that will be then used to program a standard microprocessor. Similar steps apply also to the case where a neural computer is used. Finally, smart seatbelts are under development wherein the seatbelt induced deceleration to the occupant is another controllable parameter and when available they can also be incorporated in the above smart airbag development process.

5 Summary

Disclosed herein is an airbag deployment system which comprises at least one module housing, at least one deployable airbag associated with each housing, an inflator associated with each housing for inflating the airbag(s) to deploy, e.g., into the passenger compartment, an airbag inflation determining system for determining that deployment of the airbag(s) is/are desired, and a respective electronic control system arranged within or proximate each housing and coupled to a respective inflator and to the airbag inflation determining system for initiating the inflator to inflate the airbag(s) in the respective housing upon receiving a signal from the airbag inflation determining system. The control device includes a power supply for enabling initiation of the inflator. The airbag inflation determining system preferably generates a coded signal when deployment of the airbag(s) is desired and the control device receive the coded signal and initiate the inflator based thereon.

The system may also comprise an occupant position sensor or position-sensing system coupled to the control device of each housing for detecting the position of an occupant to be protected by the deployment of the airbag from the housing. In this case, the control device initiates the respective inflator to inflate the airbag(s) in the respective housing in consideration of (or based in part on) the detected position of the occupant. Also, the position sensing system may comprise a wave transmitter for transmitting waves into the passenger compartment and a wave receiver for receiving waves from the passenger compartment, the wave transmitter and wave receiver both being coupled to the control device. The control device may send a signal to the wave transmitter to cause the wave transmitter to transmit the waves into the passenger compartment. In some embodiments, there are several housings and the system thus may include a delay unit arranged in association with at least one housing for providing a delay in the inflation of the airbag(s) therein initiated by the control device associated with the housing upon receiving the signal from the airbag inflation determining system. The delay device provides variable delays in the inflation of the airbag(s) in the housings such that the airbag(s) in the housings inflate at different times.

The system may also include a diagnostic component arranged within each housing for determining the status of the control device, and a monitoring system coupled to each diagnostic component for receiving the status of the control device associated with each module and providing a warning if the control device of any module fails. The airbag inflation determining system and control device may be arranged on a single vehicle bus.

The aspect of reducing the concentration of toxic gas in the passenger compartment resulting from airbag deployment in the present invention is centered around solving the problem of an excess build up of pressure when more than two airbags (or an unconventionally large airbag) are deployed in an accident by reducing the pressure before, during and/or after deployment of a plurality of airbags. Initially, care is taken to reduce the problem by not deploying any unnecessary airbags by detecting the presence of occupants on particular seats. Thus, if there is no front seat passenger present then the airbags designed to protect such an occupant are not inflated. This is not for the purpose of minimizing the repair costs as is the object of other similar systems, but to control the pressure buildup when multiple airbags are deployed. After a decision is made as to what seats need to be protected, the next step is to determine how many airbags are needed to provide the best protection to the vehicle occupants in those seats. This might require the deployment of a knee airbag, especially if the occupant is not wearing a seatbelt, and of a side head protection airbag if the frontal impact has an angular component which might cause the occupant's head to strike the A-pillar of the vehicle, for example. When the total number of airbags deployed exceeds a given number, a system is then provided to open a hole in the vehicle to reduce the pressure buildup.

Other factors are taken into account to determine the particular given number of deploying airbags that necessitate the opening of a hole. These include the use of highly aspirated airbags systems. Aspirated systems are in use but not always for the purpose of reducing the pressure buildup in the vehicle caused by the deployment of multiple airbags. Indeed, it has been the case that no more than two airbags have yet been deployed in a vehicle accident.

An unexpected result of the pressure reducing features of the present invention is the fact that now propellants which have heretofore not been considered for airbags can now be used which substantially reduce the cost and improve the performance of airbag systems.

A further unexpected result of the incorporation of the electronics into the module feature of the present invention is that the reliability of the system is substantially improved.

In one embodiment disclosed herein, the airbag module in accordance with the invention is long and thin and can conveniently be made in any length and bent into almost any generally linear shape. This module is typically mounted on or slightly below a surface in the passenger compartment such as the ceiling, instrument panel, seat or knee bolster support structure. When the deployment of the module is initiated, a cover is released and a thin, preferably film, airbag is inflated using a highly aspirated inflator using a clean propellant which if undiluted might be toxic to humans.

More particularly, in certain embodiments in accordance with the invention, the airbag module comprises an elongate housing having a length in the longitudinal direction which is substantially larger than a width or thickness thereof in a direction transverse to the longitudinal direction, an airbag situated within the housing, an inflator arranged in the housing for producing pressurized gas to inflate the airbag, mounting structure for mounting the module in the passenger compartment, an initiation device for initiating the inflator to produce the pressurized gas in response to the crash of the vehicle, and the housing comprises a cover unit for releasably retaining the airbag. Preferably, the length of the housing is at least ten times larger than the width or the thickness of the housing thereby permitting mounting of the module with minimal penetration below a mounting surface of the passenger compartment. In one embodiment, the inflator and airbag extend in the longitudinal direction of the housing and the inflator is elongate and has a length which is more than half the length of the airbag measured in the longitudinal direction when the airbag is inflated. The airbag system also optionally includes a system for reducing the concentration of toxic gas in the passenger compartment which are ideally activated upon deployment of the airbag.

The inflator may comprise a gas generator having a length substantially in the longitudinal direction of the housing exceeding ten times a width or thickness of the gas generator in a direction transverse to the longitudinal direction.

Furthermore, the housing includes an elongate support base mounted to a surface of the passenger compartment by the mounting structure and which has a catch at each longitudinal side. In this embodiment, the cover unit comprises a tab engaging with the catch to retain the cover unit, the tab being released from the catch during deployment of the airbag.

In another embodiment disclosed herein, the inflator comprises an elongate gas generator including a propellant for producing pressurized gas to inflate the airbag which has a length at least ten times its width or thickness. The module is mounted substantially onto a peripheral surface of the passenger compartment while the initiation device is structured and arranged to initiate the gas generator to produce the pressurized gas in response to the crash of the vehicle. The cover unit covers the airbag prior to the production of the pressurized gas and the housing further includes a removal system for enabling removal of the cover unit to permit the deployment of the airbag. The surface of the passenger compartment to which the module is mounted is a back surface of a front seat of the vehicle, an instrument panel in the vehicle, possibly in such a position as to afford protection to the knees of a front seat occupant during the crash of the vehicle, or the ceiling of the vehicle, e.g., at a location in front of a front seat of the vehicle and suitable for mounting the module for protecting occupants of the front seat in a frontal impact or at a location along a side of the vehicle and suitable for mounting the module for protecting occupants of both front and rear seats in a side impact or at a location behind a front seat of the vehicle.

In yet another embodiment disclosed herein, the inflator comprises an elongate gas generator for producing the pressurized gas to inflate the airbag and therefore, the initiation system is structured and arranged to initiate the gas generator to produce the pressurized gas in response to the crash of the vehicle. The module further includes an aspiration system for combining gas from the passenger compartment with the pressurized gas from the gas generator and directing the combined gas into the airbag. Such an aspiration system may comprise a linear nozzle leading from a combustion chamber in the gas generator and having a converging section followed by a diverging section and ending at a mixing chamber in the module, whereby the pressurized gas flows from the combustion chamber through the linear nozzle into the mixing chamber, and defines at least one aspiration inlet port such that gas from the passenger compartment flows through the aspiration inlet port into the mixing chamber. The mixing length is at least fifty times the minimum thickness of a jet of the pressurized gas from the gas generator within the nozzle. The mixing chamber comprises a nozzle defining a converging section and a diverging section arranged after the converging section in a direction of flow of the combined pressurized gas and gas from the passenger compartment. The dimensions of the converging-diverging nozzle and aspiration inlet port(s) are selected so that the gas entering the airbag is at least about 80 percent from the passenger compartment. The aspiration system may also comprise a pair of nozzle walls extending in the longitudinal direction at a respective side of the gas generator, such that the gas generator is situated between the nozzle walls and the pressurized gas from the gas generator is directed into a mixing chamber defined in part between the nozzle walls, and springs for connecting the nozzle walls to the support base. The springs have a first position in which the nozzle walls are proximate to the support base and a second position in which the nozzle walls are spaced apart from the support base. The springs are extended to the second position during production of the pressurized gas to separate the nozzle walls from the support base to define aspiration inlet ports between the nozzle walls and the support base. In this case, the module also includes support shields connected to and extending between the nozzle walls. The support shields define the mixing chamber prior to deployment of the airbag and are forced outward to define a second converging-diverging nozzle leading from the mixing chamber to the airbag through which the pressurized gas flows.

The gas generator preferably comprises an elongate housing, which may be made of plastic, having a length at least 10 times its thickness or width, propellant dispersed in an interior of and substantially along the length of the gas generator housing, an igniter for initiating burning of the propellant; and a gas generator mounting system for mounting the gas generator in the passenger compartment. The gas generator housing comprises at least one opening through which gas passes from the interior of the gas generator into the airbag. The opening(s) has/have a variable size depending on the pressure of the gas in the interior of the gas generator housing.

The present invention also relates to an occupant protection system for a vehicle including an airbag module and having a power steering system comprising a steering wheel opposed to a driver side portion of a front seat, a servo control system and structure for connecting the steering wheel to the control system, e.g., a deformable support member. The module is mounted in the passenger compartment apart from the steering wheel of the vehicle. In this case, the occupant protection system comprises a yieldable steering wheel support system for enabling the steering wheel to be displaced away from a position opposed to a driver when situated in the driver side portion of the front seat. The module is thus structured and arranged such that the airbag after deployment cushions the driver from impact with surfaces of the passenger compartment. As such, it is possible to provide a single airbag module to provide protection for the entire front seat which would deploy an airbag from one side of the vehicle to the other side.

It is also envisioned that a single airbag module can provide protection for both a front seat occupant and a rear seat occupant on the same side of the vehicle. In this case, the airbag module is mounted to a surface of the passenger compartment such that it extends in a horizontal direction from a front portion of the passenger compartment toward a rear portion of the passenger compartment adjacent a side of the vehicle. The module would deploy an airbag extending substantially across the entire side of the vehicle alongside the front seat and the rear seat.

Furthermore, it will be appreciated by those skilled in the art, and as explained below, that it is ideal to vary the size of the nozzle of the gas generator through which gas generated by the burning propellant flows in response to variations in the pressure in the chamber in which the propellant is burning. To this end, the present invention includes a gas generator having a housing, propellant dispersed in an interior thereof, an igniter for initiating burning of the propellant, and a gas generator mounting system for mounting the gas generator housing to the support base and spaced from the support base to define a nozzle therebetween and which comprise elastic support brackets arranged in the nozzle between the gas generator housing and the support base or strips of deformable material, which deforms as a function of temperature variation, arranged in the nozzle between the gas generator housing and the support base.

In yet another embodiment disclosed herein, the airbag module comprises an airbag, an inflator for producing pressurized gas to inflate the airbag and which comprises a housing, a gas generator arranged therein, and a variable exit opening from the housing through which gas from the gas generator flows to inflate the airbag. The size of the variable exit opening is controlled by the pressure within the housing. The remaining structure of this module may be as described above.

One embodiment of the vehicle electrical system in accordance with the invention discussed above includes a plurality of electrical devices used in the operation of the vehicle, a single communication bus, all of the devices being connected to the communication bus and a single power bus, all of the devices being connected to the power bus (which may be one and the same as the communication bus). The devices are preferably provided with individual device addresses such that each device will respond only to its device address. Each bus may comprise a pair of wires connected to all of the devices. The devices are, e.g., actuators, sensors, airbag modules, seatbelt retractors, lights and switches. If each device is assigned a unique address, the communication bus may be arranged to transfer data in the form of messages each having an address of a respective device such that only the respective device assigned to that address is responsive to the message having the address. Each device thus determines whether the messages of the communication bus include the address assigned to the device, e.g., a microprocessor. The communication bus may also include a token ring network to provide a protocol for the transfer of messages through the communication bus. Each device may be arranged to acknowledge receipt of a communication via the communication bus and indicate operability of the device upon ignition of the vehicle.

Another electrical system for a vehicle in accordance with the invention comprises a plurality of devices used in the operation of the vehicle, and a single network constituting both a power distribution and a communication/information bus. The network may be a time multiplex network or a code division multiple access or other shared network and consists of a single wire, or a pair of wires, connecting all of the devices. For the single wire case, each device is grounded to an adjacent part of the vehicle.

Still another electrical system for a vehicle in accordance with the invention comprises a plurality of sensors, each detecting a physical characteristic, property or state of the vehicle, and a data bus, all of the sensors being connected to the data bus. A module is also preferably connected to the data bus and arranged to receive signals from the sensors and process the signals to provide information derived from the physical characteristics, properties or states detected by the sensors. The module may be arranged to process the physical characteristics, properties or states detected by the sensors to determine whether a component in the vehicle is operating normally or abnormally. A display, e.g., a light on the vehicle dashboard, may be coupled to the module for displaying the information derived from the physical characteristics, properties or states detected by the sensors. A telecommunications device may also be coupled to the module for communicating with a remote station to provide the remote station with the information derived from the physical characteristics, properties or states detected by the sensors, e.g., impending failure of a specific vehicle component or a vehicle crash. More specifically, the sensors may generate signals containing information as to whether the component is operating normally or abnormally whereby the module comprises a pattern recognition system for receiving the signals and ascertaining whether the signals contain patterns representative of normal or abnormal operation of the component.

With a single pair of wires in a twisted pair or coaxial configuration for the communication bus, and perhaps another for the power bus, the connector problem can now be addressed as a single design can be used for all connections on the bus and each connector will only be connecting at most two wires. A great deal of effort can thus be applied to substantially improve the reliability of such a connector.

In another embodiment of a vehicle electrical wiring system in accordance with the invention, substantially all of the devices, and especially substantially all of the safety devices, are connected together with a single communication bus and a single power bus. In the preferred case, a single wire pair will serve as both the power and communication buses. When completely implemented each device on the vehicle will be coupled to the power and communication buses so that they will now have an intelligent connection and respond only to data that is intended for that device, that is, only that data with the proper device address.

The benefits to be derived from the vehicle electrical system described herein include at least at 50% cost saving when fully implemented compared with current wire harnesses. A weight savings of at least 50% is also expected. Most importantly, a multi-fold improvement in reliability will result. The assembly of the system into the vehicle is greatly simplified as is the repair of the system in the event that there is a failure in the wiring harness. Most of the connectors are eliminated and the remaining ones are considerably more reliable. Diagnostics on all devices on key-on can now be accomplished over the network with a single connection from the diagnostic circuit.

In contrast to other multiplexing systems based on zone modules, the communication to and from each device in the instant invention is bi-directional.

It is now believed that for side impacts, the airbag crash sensor should be placed in the door. There is reluctance to do so by the automobile manufacturers since in a crash into the A-pillar of the vehicle, for example, the wires leading to and form the door may be severed before the crash sensor activates. By using the two wire network as described herein, only two, or possibly four if a separate pair is used for power, of wires will pass from the door into the A-pillar instead of the typically fifty or more wires. In this case, the wires can be protected so that they are stronger than the vehicle metal and therefore will not sever during the early stages of the accident and thus the door mounted sensor can now communicate with the airbag in the seat, for example.

In the preferred system then, the power line or distribution network in the vehicle is used to simultaneously carry both power and data to all switches, sensors, lights, motors, actuators and all other electrical and electronic devices (hereinafter called devices) within the vehicle and especially all devices related to deployable restraints. The same system will also work for vehicles having different voltages such as 48 volts. Also a subset of all vehicle devices can be on a net. Initially, for example, an automotive manufacturer may elect to use the system of this invention for the automobile safety system and later expand it to include other devices. The data, in digital form, is carried on a carrier frequency, or as pulse data as in the Ethernet protocol, and is separated at each device using either a microprocessor, "high-side driver" or other similar electronic circuit. Each device will have a unique, individualized address and be capable of responding to a message sent with its address. A standard protocol will be implemented such as SAE J1850 where applicable. The return can be through vehicle ground comprising the vehicle sheet metal and chassis or through a wire.

The advantages of such a system when fully implemented are numerous, among which the following should be mentioned:

1. The amount of wire in the vehicle will be substantially reduced. There is currently about 500 or more meters of wire in a vehicle.

2. The number and complexity of connectors will be substantially reduced. There are currently typically about 1000 pin connections in a vehicle. When disconnection is not required, a sealed permanent connector will be used to join wires in, for example, a T connection. On the other hand, when disconnection is required, a single or dual conductor connector is all that is required and the same connector can be used throughout the vehicle. Thus, there will be only one or two universal connector designs on the vehicle.

3. The number of electronic modules will be substantially reduced and maybe even be completely eliminated. Since each device will have its own microprocessor, zone modules, for example, will be unnecessary.

4. Installation in the vehicle will be substantially easier since a single conductor, with branches where required, will replace the multi-conductor wire harnesses currently used. Wire "choke points" will be eliminated.

5. Reliability will be increased based on system simplicity.

6. Two way or bi-directional communication is enabled between all devices. This simplifies OBD2 (On Board Diagnostic Level 2 now required by the U.S. Government for pollution control) installation, for example.

7. All devices on the vehicle are diagnosed on key-on. The driver is made aware of all burned out lamps, for example before he or she starts the vehicle.

8. Devices can be located at optimum places. A side impact sensor can be placed within the vehicle door and still communicate with an airbag module located in the seat, for example, with high reliability and without installation of separate wiring. In fact, only a single or dual wire is required to connect all of the switches, sensors, actuators and other devices in the vehicle door with the remainder of the vehicle electrical system.

9. Electro-magnetic interference (EMI) Problems are eliminated. The driver airbag system, for example would have the final circuit that deploys the airbag located inside the airbag module and activated when the proper addressed signal is received. Such a circuit would have an address recognition as well as diagnostic capabilities and might be known as a "smart inflator". EMI, which can now cause an inadvertent airbag deployment, ceases to be a problem.

10. Vehicle repair is simplified and made more reliable.

It is important that any wire used in this embodiment of the invention be designed so that it won't break even in an accident since if the single bus breaks the results can be catastrophic. Additionally, the main bus wire or pair of wires can be in the form of a loop around the vehicle with each device receiving its messages from either direction such that a single major break can be tolerated. Alternately, a tree or other convenient structure can be used and configured so that at most a single branch of the network is disabled.

It should be understood that with all devices having access to the network, there is an issue of what happens if many devices are attempting to transmit data and a critical event occurs, such as a crash of the vehicle, where time is critical, i.e., will the deployment of an airbag be delayed by this process. However, it is emphasized that although the precise protocol has not yet been determined pending consultation with a customer, protocols do exist which solve this problem. For example, a token ring or token slot network where certain critical functions are given the token more frequently than non-critical functions and where the critical device can retain the token when a critical event is in progress is one solution. A crash sensor, for example, knows that a crash is in progress before it determines that the crash severity requires airbag deployment. That information can then be used to allocate the bandwidth to the crash sensor. An alternate approach is to use a spread spectrum system whereby each device sends and is responsive to a pattern of data that is sorted out using correlation techniques permitting any device to send and receive at anytime regardless of the activity of any other device on the network.

Another issue of concern is the impact of vehicle noise on the network. In this regard, since every device will be capable of bi-directional communication, standard error checking and correction algorithms are employed. Each device is designed to acknowledge receipt of a communication or the communication will be sent again until such time as receipt thereof by the device is acknowledged. Calculations show that the bandwidth available on a single or dual conductor is much greater than required to carry all of the foreseeable communication required within an automobile. Thus, many communication failures can be tolerated.

Furthermore, an airbag deployment system for a vehicle in accordance with the invention disclosed above comprises a module housing, an airbag associated with the housing, an inflator or inflator assembly arranged in the housing for inflating the airbag, and an inflation determining system for generating a signal indicative of whether deployment of the airbag is desired. The inflation determining system preferably comprises one or more crash sensors, at least one of which is arranged separate and at a location apart from the housing. An electronic controller is arranged in or adjacent the housing and coupled to the inflation determining system. The controller controls inflation of the airbag by the inflator assembly in response to the signal generated by the inflation determining system. An electrical bus electrically couples the controller and the inflation determining system whereby the signal from the inflation determining system is sent over the bus to the controller to enable inflation of the airbag. The bus may consists of a single pair of wires over which power and information is conveyed. A sensor and diagnostic module is also coupled to the bus for monitoring the controller. The inflation determining system, e.g., crash sensor, is designed to preferably generate a coded signal when deployment of the airbag is desired which coded signal is conveyed over the bus to the controller to enable the controller to control inflation of the airbag by the inflator assembly based thereon. The controller will preferably include a power supply for enabling initiation of the inflator assembly. An occupant position sensor, e.g., an ultrasonic transmitter/receiver pair, may be arranged to detect the position of the occupant to be protected by the airbag in which case, the controller would control inflation of the airbag by the inflator assembly in consideration of the detected position of the occupant. The occupant position sensor may be arranged in the same housing as the inflator assembly, airbag and controller.

An embodiment of an occupant protection system in accordance with the invention comprises a plurality of occupant protection devices, each comprising a housing and a component deployable to provide protection for the occupant (such as an airbag), and a deployment determining system for generating a signal indicating for which of the deployable components deployment is desired, e.g., one or more crash sensors which may be located around the vehicle and preferably separate and at locations apart from the same housings as the deployable components. An electronic controller is arranged in, proximate or adjacent each housing and coupled to the deployment determining system. Each controller controls deployment of the deployable component of the respective occupant protection device in response to the signal generated by the deployment determining system. An electrical bus electrically couples the controllers and deployment determining system so that the signal from the deployment determining system is sent over the bus to the controllers to enable deployment of the deployable components. A sensor and diagnostic module may be coupled to the bus for monitoring the controllers. The deployment determining system preferably generates a coded signal when deployment of one or more of the deployable components is desired so that since each controller initiates deployment of the respective deployable component only if the coded signal contains a specific initiation code associated with the controller. An occupant position sensor could also be provided to detect the position of the occupant to be protected by the deployable components so that the controller of any of the deployable components would control deployment thereof in consideration of the detected position of the occupant.

One embodiment of an occupant protection system, for a vehicle in accordance with the invention comprises an occupant protection device for protecting an occupant in the event of a crash involving the vehicle, an initiation system for initiating deployment of the occupant protection device, a power unit for storing sufficient energy to enable the initiation system to initiate deployment of the occupant protection device, an electronic controller connected to the power unit for monitoring voltage thereof and controlling the initiation system, a diagnostic module arranged to receive a signal from the controller as to whether the voltage of the power unit is sufficient to enable the initiation system to initiate deployment of the occupant protection device, and an electrical bus electrically coupling the controller and the diagnostic module. The controller is arranged to generate a fault code in the event of a failure of the power unit or the initiation system, which fault code is sent to the diagnostic module over the bus. One or more crash sensors or other deployment determining system are preferably coupled to the bus for generating a (coded) signal indicative of whether deployment of the occupant protection device is desired, the signal being sent from the determining system over the bus to the controller. The controller may be arranged in the housing or adjacent the housing.

Another embodiment of an occupant protection system in accordance with the invention comprises a deployable occupant protection device, a deployment determining system for generating a coded signal indicative of whether deployment of the occupant protection device is desired, and an electrical bus electrically coupling the occupant protection device and the deployment determining system. The coded signal from the deployment determining system is sent over the bus to the occupant protection device to enable deployment of the occupant protection device. The deployment determining system may comprise one or more crash sensors arranged separate and at locations apart from the occupant protection device. A controller may be coupled to the deployment determining system, the occupant protection device and the bus, and controls deployment of the occupant protection device in response to the coded signal generated by the deployment determining system. The coded signal from the deployment determining system is sent over the bus to the controller to enable deployment of the occupant protection device.

A method for controlling deployment of an occupant protection system for protecting an occupant in a vehicle comprises arranging a deployable occupant protection device in the vehicle, generating a coded signal indicative of whether deployment of the occupant protection device is desired, electrically coupling the occupant protection device and the crash sensor by means of an electrical bus, and directing the coded signal from the crash sensor over the bus to the occupant protection device to enable deployment of the occupant protection device. The coded signal may be generated by a crash sensor in response to a crash of the vehicle for which deployment of the occupant protection device might be required.

Although several preferred embodiments are illustrated and described above, there are possible combinations using other geometries, materials and different dimensions for the components that perform the same functions as described and illustrated herein. This invention is not limited to the above embodiments and should be determined by the following claims. For example, the reducing system for reducing the concentration of toxic gas in the passenger compartment of the vehicle in conjunction with deployment of the at least one airbag may be coupled to an element of the airbag module which would indicate deployment of the airbag or may be a completely separate system which is positioned to detect or sense deployment of the air bag and activate accordingly. Also, for example, although the airbag is described as being a film airbag, it must be understood that this is only a preferred embodiment and that the airbag can be made of any other material, even though this may detract from efficient operation of the airbag module. A variety of different processes for inflating an airbag so as to provide a high pumping ratio, i.e., a high ratio of gas from the passenger compartment to pressurized gas from the inflator, as well as to achieve the numerous objects mentioned above, are also within the scope of the invention disclosed herein as are different configurations of the electronic circuits. It is quite possible to house the passenger side electronic circuit within the passenger module instead of adjacent to it and it is also possible to house the electronic circuitry within either the passenger or driver electronic circuitry.

Described above is an airbag for a vehicle which includes a plurality of sections of material joined to one another, e.g., heat-sealed or adhesively-sealed, to form a plurality of substantially interconnected compartments receivable of an inflating medium. The sections of material may be discrete sheets of film with optional tear propagation arresting structure. Two or more of the sections of material may be at least partially in opposed relationship to one another and then joined to one another at locations other than at a periphery of any of the sections to thereby form the interconnected compartments between the sections of material. The sections of material may be joined to one another along parallel or curved lines or links to thereby form the interconnected compartments between the sections of material, which when inflated, will be cellular or tubular.

Also described above is an inflatable occupant protection system which includes a housing mounted in the vehicle and having an interior, a deployable inflatable element or airbag contained within the housing interior prior to deployment, an inflator coupled to the housing for inflating the airbag (such as a gas generator for supplying a gas into the interior of the airbag), the airbag being attached to and in fluid communication with the inflator, and an initiator for initiating the gas generator to supply the gas into the interior of the airbag in response to a crash of the vehicle, i.e., a crash sensor. The airbag may be as described in the paragraphs above. The housing may be elongate and extends substantially along the entire side of the vehicle such that the airbag is arranged to inflate between a side of the vehicle and the respective spaces above both the front and rear seats. In another implementation, the housing is arranged in the front seat and extends between sides of the vehicle such that the airbag is arranged to inflate outward from the front seat toward the rear seat.

Also disclosed is a method for manufacturing an airbag for a vehicle in which a plurality of sections of material are joined together to form a plurality of interconnected compartments, e.g., by applying an adhesive between opposed surfaces of the sections of material to be joined together or heating the sections of material to be joined together. The sections of material may be joined together along parallel or curved lines to form straight or curved, elongate interconnected compartments which become tubular or cellular when inflated with a gas.

The tear propagation arresting structure for the film sheets may be (i) the incorporation of an elastomeric film material, a laminated fabric, or net, which are connected to each of the pieces of plastic film (e.g., the inelastic film which provides the desired shape upon deployment of the airbag), or (ii) means incorporated into the formulation of the plastic film material itself. Also, the two pieces of film may be formed as one integral piece by a blow molding or similar thermal forming or laminating process.

In accordance with another embodiment of the invention, an airbag has a coating composition which contains substantially dispersed exfoliated layered silicates in an elastomeric polymer. This coating, when dry, results in an elastomeric barrier with a high effective aspect ratio and improved permeability characteristics, i.e., a greater increase in the reduction of permeability of the coating. Drying may occur naturally over time and exposure to air or through the application of heat. This is a further use of a plastic film where although the mechanical properties of the base material are not altered the flow properties through the material are.

The airbag is optionally made of fabric and can take any form including those in the prior art. For example, if a side curtain airbag, then the airbag can define a series of tubular gas-receiving compartments, or another series of compartments. The side curtain airbag can be arranged in a housing mounted along the side of the vehicle, possibly entirely above the window of the vehicle or partially along the A-pillar of the vehicle.

The side curtain airbag includes opposed sections or layers of material, either several pieces of material joined together at opposed locations or a single piece of material folded over onto itself and then joined at opposed locations. Gas is directed into the compartments from a gas generator or a source of pressurized gas. Possible side curtain airbags include those disclosed in the current assignee's U.S. Pat. No. 5,863,068, U.S. Pat. No. 6,149,194 and U.S. Pat. No. 6,250,668.

The invention is not limited to side curtain fabric airbags and other fabric airbags are also envisioned as being encompassed by the invention. Also, it is conceivable that airbags may be made of materials other than fabric and used with a barrier coating such as any of those disclosed herein and other barrier coatings which may be manufactured using the teachings of this invention or other inventions relates to barrier coatings for objects other than airbags. Thus, the invention can encompass the use of a barrier coating for an airbag, regardless of the material of the airbag and its placement on the vehicle.

In one aspect, the present invention provides a side curtain airbag including one or more sheets of fabric that contains air or a gas under pressure, and having on an interior or exterior surface of the fabric sheet(s) a barrier coating formed by applying to the surface a mixture comprising in a carrier liquid an elastomeric polymer, a dispersed exfoliated layered platelet filler preferably having an aspect ratio greater than about 25 and optionally at least one surfactant. The solids content of the mixture is optionally less than about 30% and the ratio of polymer to the filler is optionally between about 20:1 and about 1:1. The coating may be dried on the coated surface, wherein the dried barrier coating has the same polymer to filler ratio as in the mixture and provides an at least 5-fold greater reduction in gas, vapor, moisture or chemical permeability than a coating formed of the unfilled polymer alone.

In a preferred embodiment, the fabric is coated with a barrier coating mixture, which contains the polymer at between about 1% to about 30% in liquid form and between about 45% to about 95% by weight in the dried coating. The dispersed layered filler is present in the liquid coating mixture at between about 1% to about 10% by weight, and in the dried coating formed thereby, at between about 5% to about 55% by weight. The dried coating, in which the filler exhibits an effective aspect ratio of greater than about 25, and preferably greater than about 100, reduces the gas, vapor or chemical permeability greater than 5-fold that of the dried, unfilled polymer alone.

In another preferred embodiment, the invention provides a fabric side curtain airbag coated with a preferred barrier coating mixture which has a solids contents of between about 5% to about 15% by weight, and comprises in its dried state between about 65% to about 90% by weight of a butyl rubber latex, between about 10% to about 35% by weight of a layered filler, desirably vermiculite, and between about 0.1% to about 15% by weight of a surfactant.

In another embodiment, the invention provides a fabric side curtain airbag on a surface or at the interface of two surfaces therein a dried barrier coating formed by a barrier coating mixture comprising in a carrier liquid, an elastomeric polymer, a dispersed exfoliated layered platelet filler preferably having an aspect ratio greater than about 25 and optionally at least one surfactant, wherein the solids content of the mixture may be less than about 30% and the ratio of polymer to the filler is optionally between about 20:1 and about 1:1. When dried, the coating optionally comprises about 45% to about 95% by weight of the polymer, between about 5% to about 55% by weight the dispersed layered filler; and between about 1.0% to about 15% by weight the surfactant. The coating on the article, in which the filler exhibits an effective aspect ratio of greater than about 25, preferably greater than about 100, reduces the gas, vapor or chemical permeability of the airbag greater than 5-fold the permeability of the airbag coated with the polymer alone.

In still another embodiment, the invention provides a fabric side curtain airbag having on a surface or at the interface of two surfaces therein a dried barrier coating formed by a barrier coating mixture comprising in a carrier liquid, a butyl-containing polymer latex, a dispersed exfoliated layered vermiculite filler preferably having an aspect ratio about 1000 or greater; and optionally at least one surfactant. The solids content of the mixture may be less than about 17% and the ratio of the polymer to the filler may be between about 20:1 and about 1:1.

In a preferred embodiment, the coating mixture has a solids content of between about 5% to about 15% by weight, and forms a dried coating on the surface that comprises between about 65% to about 90% by weight the butyl-containing polymer, between about 10% to about 35% by weight the vermiculite filler, and between about 1.0% to about 15% by weight the surfactant. The coating on the inflated product in which the filler exhibits an effective aspect ratio of greater than about 25, preferably greater than about 100, reduces the gas, vapor or chemical permeability of the airbag greater than 5-fold the permeability of the article coated with the polymer alone.

In still a further embodiment, the invention provides a method for making a fabric side curtain airbag, the method involving coating a surface of the fabric airbag with, or introducing into the interface between two surfaces of the fabric airbag, an above-described barrier coating mixture.

One method for manufacturing an airbag module including an airbag in accordance with the invention entails applying to a surface of a substrate a solution comprising an elastomeric polymer and a dispersed exfoliated layered filler and causing the solution to dry to thereby form a barrier coating on the substrate, forming an airbag having an edge defining an entry opening for enabling the inflation of the airbag from the substrate having the barrier coating thereon, arranging the airbag in a housing, sealing the edge of the airbag to the housing and providing a flow communication in the housing to allow inflation fluid to pass through the entry opening into the airbag. The airbag is preferably folded in the housing. The airbag may be formed by cutting the substrate to the desired shape and size.

Another method for manufacturing an airbag module entails applying to a surface of a first substrate a solution comprising an elastomeric polymer and a dispersed exfoliated layered filler, covering the solution with a second substrate, causing the solution to dry to thereby form a barrier coating between the first and second substrates, forming an airbag having an edge defining an entry opening for enabling the inflation of the airbag from the first and second substrates having the barrier coating therebetween, arranging the airbag in a housing and sealing the edge of the airbag to the housing. Further, a flow communication is provided in the housing to allow inflation fluid to pass through the entry opening into the airbag. The airbag may be folded in the housing. The formation of the airbag may involve cutting the first and second substrates having the barrier coating therebetween.

Another method for forming an airbag, in particular a side curtain airbag or another type of airbag made of a first piece for fabric constituting a front panel of the airbag and a second piece of fabric constituting a rear panel of the airbag, entails heat or adhesive sealing the first and second pieces of fabric together over an extended seam width to form an airbag while maintaining an entry opening for passage of inflation fluid into an interior of the airbag and partitioning the airbag along partition lines into a plurality of chambers each receivable of the inflation fluid. The location of the partition lines is determined to prevent concentration of stress in the seams, e.g., by analyzing the airbag using finite element analysis as described in Appendix 1 of the parent '623 application and Appendices 1-6 of the '379 application. The first and second pieces of fabric may be coated with a barrier coating.

Still another method for forming an airbag in accordance with the invention comprises the steps of providing a plurality of layers of material, interweaving, heat sealing or sewing the layers together to form the airbag while maintaining an entry opening for passage of inflation fluid into an interior of the airbag and coating the airbag with a barrier coating. The airbag may be a side airbag with front and rear panel joined together over an extended seam width. As such, it is possible to partition the airbag along partition lines into a plurality of chambers each receivable of the inflation fluid and determine the location of the partition lines to prevent concentration of stress in the seams.

There has thus been shown and described an airbag system with a self-limiting and self-shaping airbag which fulfills all the objects and advantages sought after. Further, there has been shown and described an airbag system with a film airbag utilizing a film material which comprises at least one layer of a thermoplastic elastomer film material which fulfills all the objects and advantages sought after. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the following claims. For example, the present invention describes numerous different airbag constructions as well as different methods for fabricating airbags. It is within the scope of the invention that all of the disclosed airbags can, for the most part, be made by any of the methods disclosed herein. Thus, in one typical process for constructing a film airbag having at least two compartments, either isolated from one another, within one another or in flow communication with each other, at least one flat panel of film airbag material is provided and then manipulated, processed or worked to form the different compartments. More particularly, the flat panel is joined at appropriate locations to form the different compartments, e.g., by heat sealing or an adhesive. The compartments may be any shape disclosed herein, e.g., tubular-shaped.

With respect to the construction of the airbag as shown in FIGS. 74C and 74D, another method of obtaining the airbag with a variable thickness is to provide an initial, substantially uniformly thick film substrate (inelastic film) and thereafter applying a coating (a thermoplastic elastomer) thereon in predetermined locations on the substrate, preferably in an organized predetermined pattern, such that it is possible to obtain thicker portions in comparison to other uncoated portions. In this manner, the film airbag can be provided with distinct thicknesses at different locations, e.g., thicker portions which constitute rings and ribs (i.e., the polar symmetric pattern of FIG. 74C), or only at specific locations where it is determined that higher stresses arise during deployment for which reinforcements by means of the thicker film is desired. An alternative fabrication method would be to produce the airbag from thermoplastic elastomeric material with an initial varying thickness as well as a layer of inelastic film to provide the airbag with the desired shape. In this regard, plastic-manufacturing equipment currently exists to generate a plastic sheet with a variable thickness. Such equipment could be operated to provide an airbag having thicker portions arranged in rings and ribs as shown in FIG. 74C.

The limiting net described above may be used to limit the deployment of any and all of the airbags described herein, including embodiments wherein there is only a single airbag.

This application is one in a series of applications covering safety and other systems for vehicles and other uses. The disclosure herein goes beyond that needed to support the claims of the particular invention that is claimed herein. This is not to be construed that the inventors are thereby releasing the unclaimed disclosure and subject matter into the public domain. Rather, it is intended that patent applications have been or will be filed to cover all of the subject matter disclosed above.

The inventions described above are, of course, susceptible to many variations, modifications and changes, all of which are within the skill of the art. It should be understood that all such variations, modifications and changes are within the spirit and scope of the inventions and of the appended claims. Similarly, it will be understood that applicant intends to cover and claim all changes, modifications and variations of the examples of the preferred embodiments of the invention herein disclosed for the purpose of illustration which do not constitute departures from the spirit and scope of the present invention as claimed.

Although several preferred embodiments are illustrated and described above, there are possible combinations using other geometries, materials and different dimensions for the components and different forms of the neural network implementation that perform the same functions. Also, the neural network has been described as an example of one pattern recognition system. Other pattern recognition systems exist and still others are under development and will be available in the future. Such a system can be used to identify crashes requiring the deployment of an occupant restraint system and then, optionally coupled with additional information related to the occupant, for example, create a system that satisfies the requirements of one of the Smart Airbag Phases. Also, with the neural network system described above, the input data to the network may be data which has been pre-processed rather than the raw acceleration data either through a process called "feature extraction", as described in Green (U.S. Pat. No. 4,906,940) for example, or by integrating the data and inputting the velocity data to the system, for example. This invention is not limited to the above embodiments and should be determined by the following claims.

The invention claimed is:

1. An airbag assembly mounted in connection with a steering wheel assembly in a vehicle, the steering wheel assembly includes a rotatable steering column and a steering wheel arranged at one end of the steering column and to rotate with the steering column, comprising:
   a housing arranged on a first side of the steering wheel and including an airbag having an interior and an opening communicating with the interior;
   a gas generating inflator arranged on a second side of the steering wheel opposite the first side of the steering wheel, the inflator generating gas to inflate the airbag through the opening and directing the generated gas into a conduit situated between the inflator and the interior of the airbag, the conduit extending from the second side of the steering wheel through the steering wheel to the first side of the steering wheel; and
   an aspirating structure connected to the steering wheel and arranged on the second side of the steering wheel and in connection with the conduit, the aspirating structure being arranged to induce air from a passenger compartment in the vehicle into the aspirating structure, mix the induced air with the gas generated by the inflator within the aspirating structure and then cause the mixed air and gas to flow into and through the conduit so that the mixed air and gas then flows into the interior of the airbag to thereby aspirate the gas generated by the inflator,
   the aspirating structure comprising a nozzle having an inlet and an outlet, the inflator being arranged to direct gas into the nozzle between the inlet and the outlet to induce air from the passenger compartment to flow into the inlet and mix with the gas from the inflator with the mixed flow being directed toward the opening of the airbag.

2. The assembly of claim 1, further comprising a valve arranged at the inlet of the nozzle to regulate flow of the air through the inlet of the nozzle.

3. The assembly of claim 1, wherein the aspirating structure is arranged entirely on the second side of the steering wheel.

4. A combined steering wheel assembly and occupant protection system for use by a driver situated in a passenger compartment of a vehicle, comprising:
   a rotatable steering column;
   a steering wheel arranged at an end of said steering column and to rotate with said steering column;
   an airbag module arranged on a first side of said steering wheel and to rotate with said steering wheel, said airbag module including an airbag having an interior and at least one opening communicating with said interior;
   an aspirated inflator assembly coupled to said steering column and including a gas generator that generates gas to inflate said airbag and a nozzle, said inflator assembly being arranged on a second side of said steering wheel opposite the first side of said steering wheel; and
   bearings positioned between said inflator assembly and said steering wheel and steering column to enable said inflator assembly to remain stationary when said steering wheel and said steering column rotate,
   said steering wheel including a conduit situated between said nozzle and said at least one opening, said conduit extending from the second side of said steering wheel through said steering wheel to the first side of said steering wheel,
   said inflator assembly being arranged to induce air from the passenger compartment into said nozzle, mix the induced air with the gas generated by said generator in said nozzle and then cause the mixed air and gas to flow from said nozzle into and through said conduit to said at least one opening and then into the interior of said airbag to thereby aspirate the gas generated by said gas generator.

5. The combined steering wheel assembly and occupant protection system of claim 4, wherein said inflator assembly further includes a valve arranged at an inlet of said nozzle through which the air from the passenger compartment flows.

6. The combined steering wheel assembly and occupant protection system of claim 5, wherein said gas generator is arranged relative to said nozzle to generate a gas flow that induces air through said valve and said nozzle.

7. The combined steering wheel assembly and occupant protection system of claim 4, wherein said gas generator includes an outer annular wall around said steering column and propellant distributed around said outer wall.

8. The combined steering wheel assembly and occupant protection system of claim 4, wherein said gas generator and said nozzle are arranged on one side of said steering column.

9. The combined steering wheel assembly and occupant protection system of claim 4, wherein said gas generator and said nozzle surround said steering column.

10. The combined steering wheel assembly and occupant protection system of claim 4, wherein said inflator assembly is fixed relative to the passenger compartment so that it does not rotate along with said steering column and said steering wheel.

11. An airbag assembly mounted in connection with a steering wheel assembly in a vehicle, the steering wheel assembly includes a rotatable steering column and a steering wheel arranged at one end of the steering column and to rotate with the steering column, comprising:
   a housing arranged on a first side of the steering wheel and including an airbag having an interior and an opening communicating with the interior;
   a gas generating inflator arranged on a second side of the steering wheel opposite the first side of the steering wheel, the inflator generating gas to inflate the airbag through the opening and directing the generated gas into a conduit situated between the inflator and the interior of the airbag, the conduit extending from the second side of the steering wheel through the steering wheel to the first side of the steering wheel; and
   an aspirating structure connected to the steering wheel and arranged on the second side of the steering wheel and in connection with the conduit, the aspirating structure being arranged to induce air from a passenger compartment in the vehicle into the aspirating structure, mix the induced air with the gas generated by the inflator within the aspirating structure and then cause the mixed air and gas to flow into and through the conduit so that the mixed air and gas then flows into the interior of the airbag to thereby aspirate the gas generated by the inflator, wherein the housing is arranged to rotate with the steering wheel, the inflator being arranged to remain stationary while the steering column and the steering wheel rotate.

12. An airbag assembly mounted in connection with a steering wheel assembly in a vehicle, the steering wheel assembly includes a rotatable steering column and a steering wheel arranged at one end of the steering column and to rotate with the steering column, comprising:

a housing arranged on the steering wheel and including an airbag having an interior and an opening communicating with the interior;

a gas generating inflator arranged on the steering wheel, the inflator generating gas to inflate the airbag through the opening; and an aspirating structure connected to the steering wheel and including a nozzle having an inlet and an outlet, the inflator being arranged to direct gas into the nozzle between the inlet and the outlet to induce air from the passenger compartment to flow into the inlet of the nozzle and mix with the gas from the inflator, and to then cause the mixed air and gas to flow toward the opening of the airbag and then into the airbag.

13. The assembly of claim 12, wherein the housing is arranged in a middle of the steering wheel.

14. The assembly of claim 12, wherein the inflator includes propellant distributed around an outer wall of the inflator.

15. The assembly of claim 12, wherein the inflator and the aspirating structure are arranged on one side of the steering column.

16. The assembly of claim 12, wherein the inflator and the aspirating structure are arranged to surround the steering column.

17. The assembly of claim 12, wherein the aspirating structure includes a valve that regulates air flow from the passenger compartment into the aspirating structure.

18. The assembly of claim 12, wherein the inflator rotates with the steering wheel.

19. The assembly of claim 12, further comprising bearings to enable the inflator to remain stationary while the steering column rotates.

* * * * *